June 20, 1961 N. J. ALBANES 2,989,731

DATA STORAGE UNIT

Filed March 8, 1955 46 Sheets-Sheet 1

INVENTOR.
NICHOLAS J. ALBANES

BY

Edwin Lester
AGENT

INVENTOR.
NICHOLAS J. ALBANES
BY
Edwin Lester
AGENT

*INVENTOR.*
NICHOLAS J. ALBANES

*BY* Edwin Lester
AGENT

June 20, 1961 N. J. ALBANES 2,989,731

DATA STORAGE UNIT

Filed March 8, 1955 46 Sheets-Sheet 4

June 20, 1961 N. J. ALBANES 2,989,731
DATA STORAGE UNIT
Filed March 8, 1955 46 Sheets-Sheet 6
FIG. 5 C STORAGE CONTROL
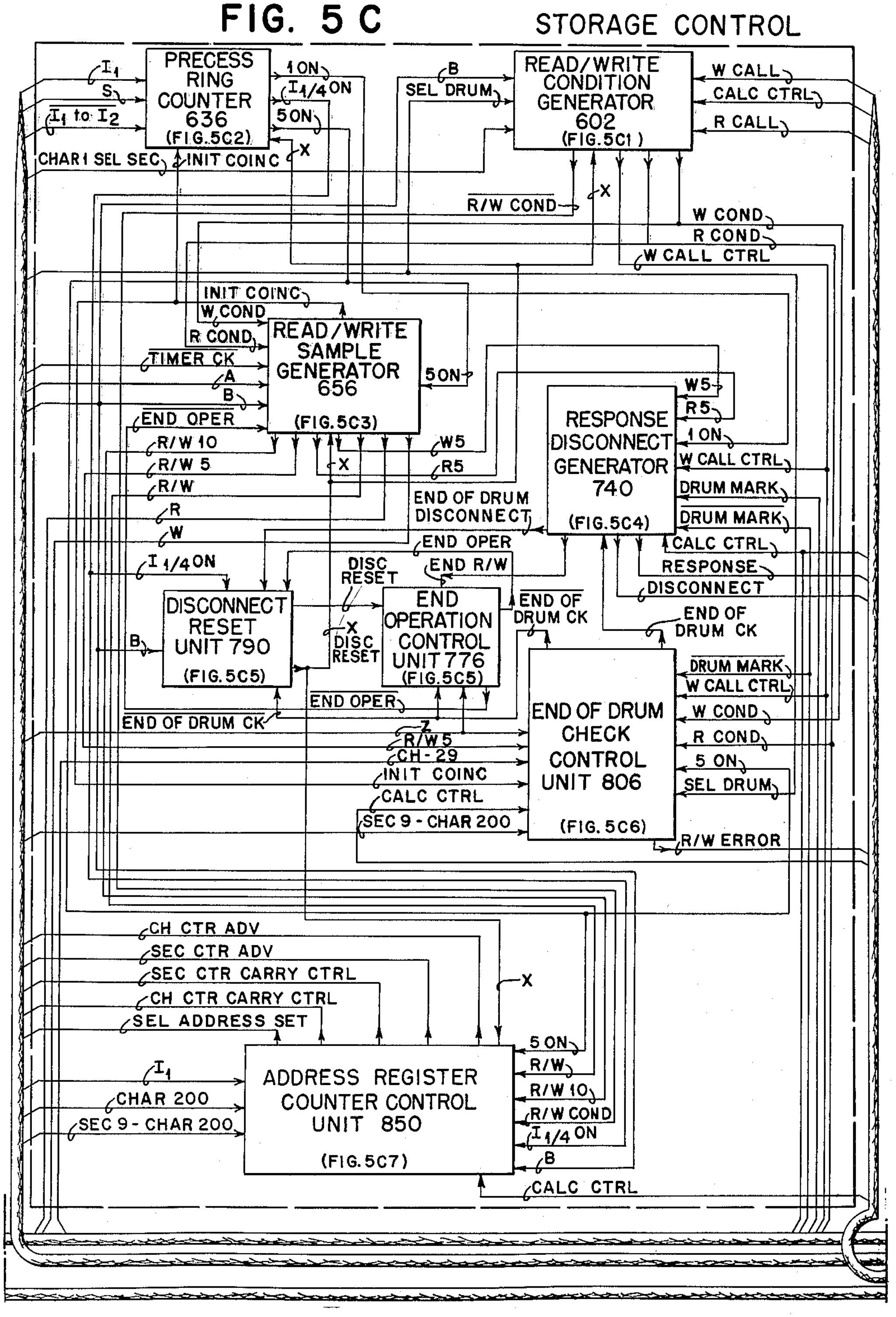

FIG. 5A1
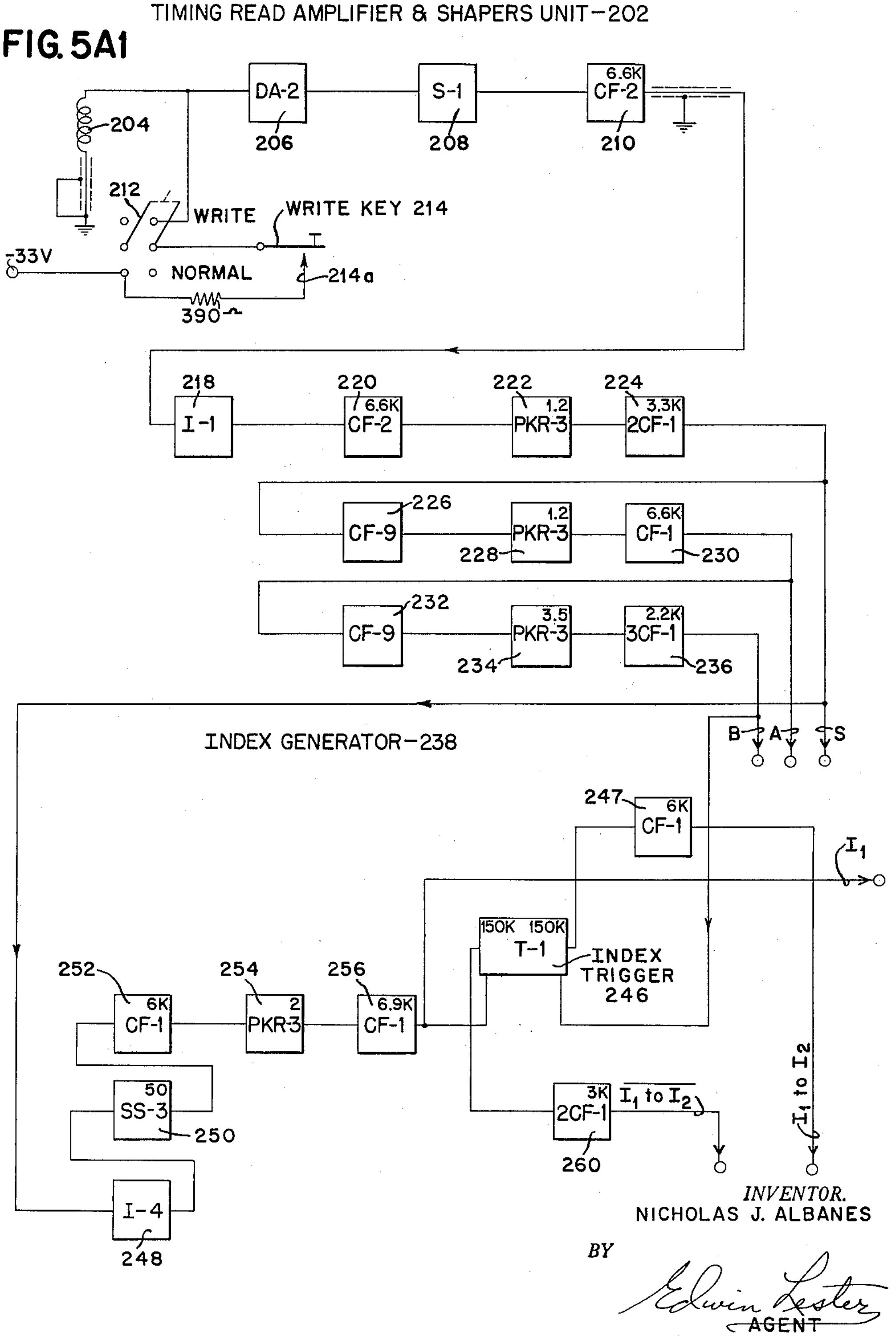
INVENTOR.
NICHOLAS J. ALBANES
BY
Edwin Lester
AGENT

June 20, 1961 N. J. ALBANES 2,989,731
DATA STORAGE UNIT
Filed March 8, 1955 46 Sheets-Sheet 9
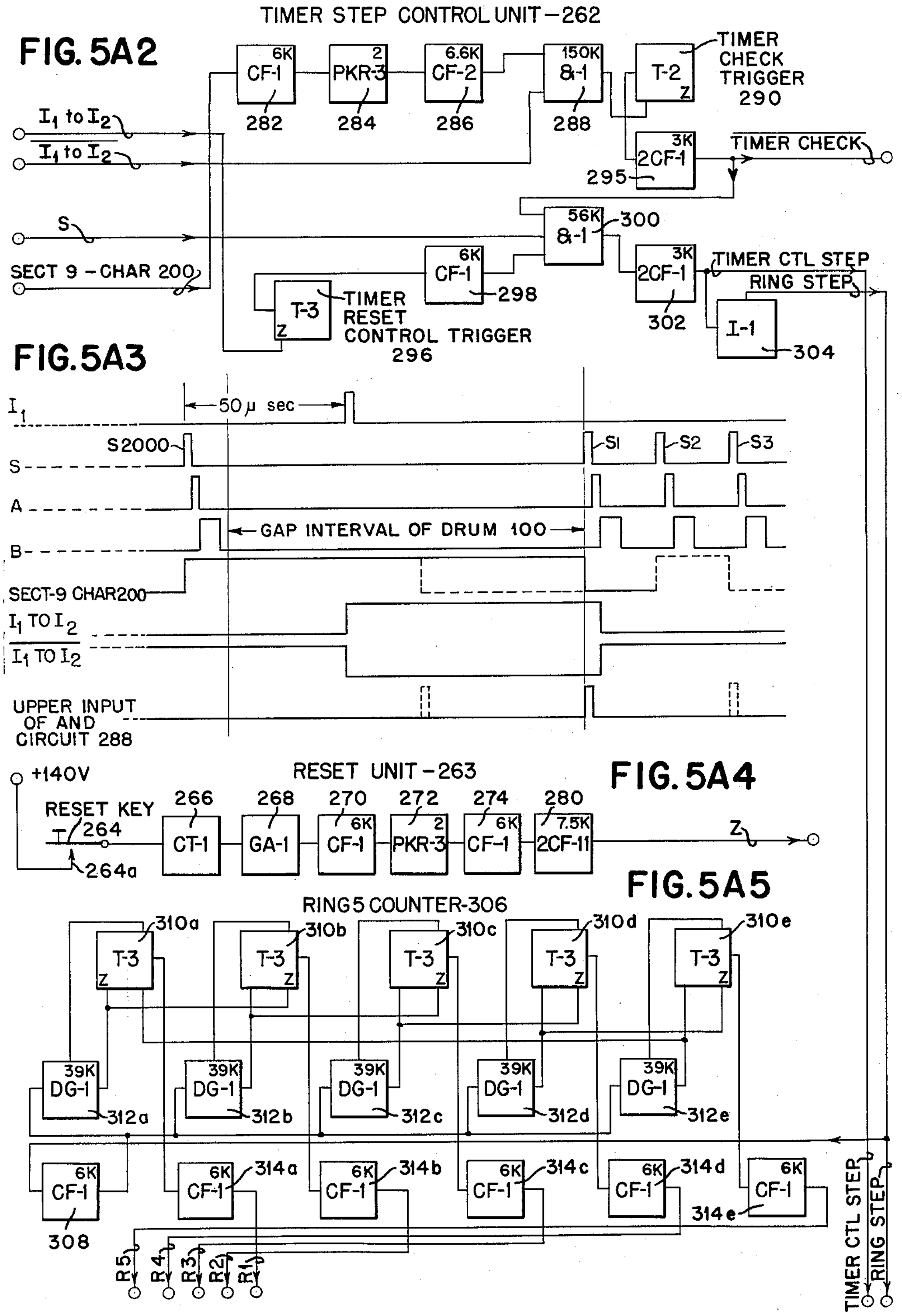
FIG. 5A2, FIG. 5A3, FIG. 5A4, FIG. 5A5

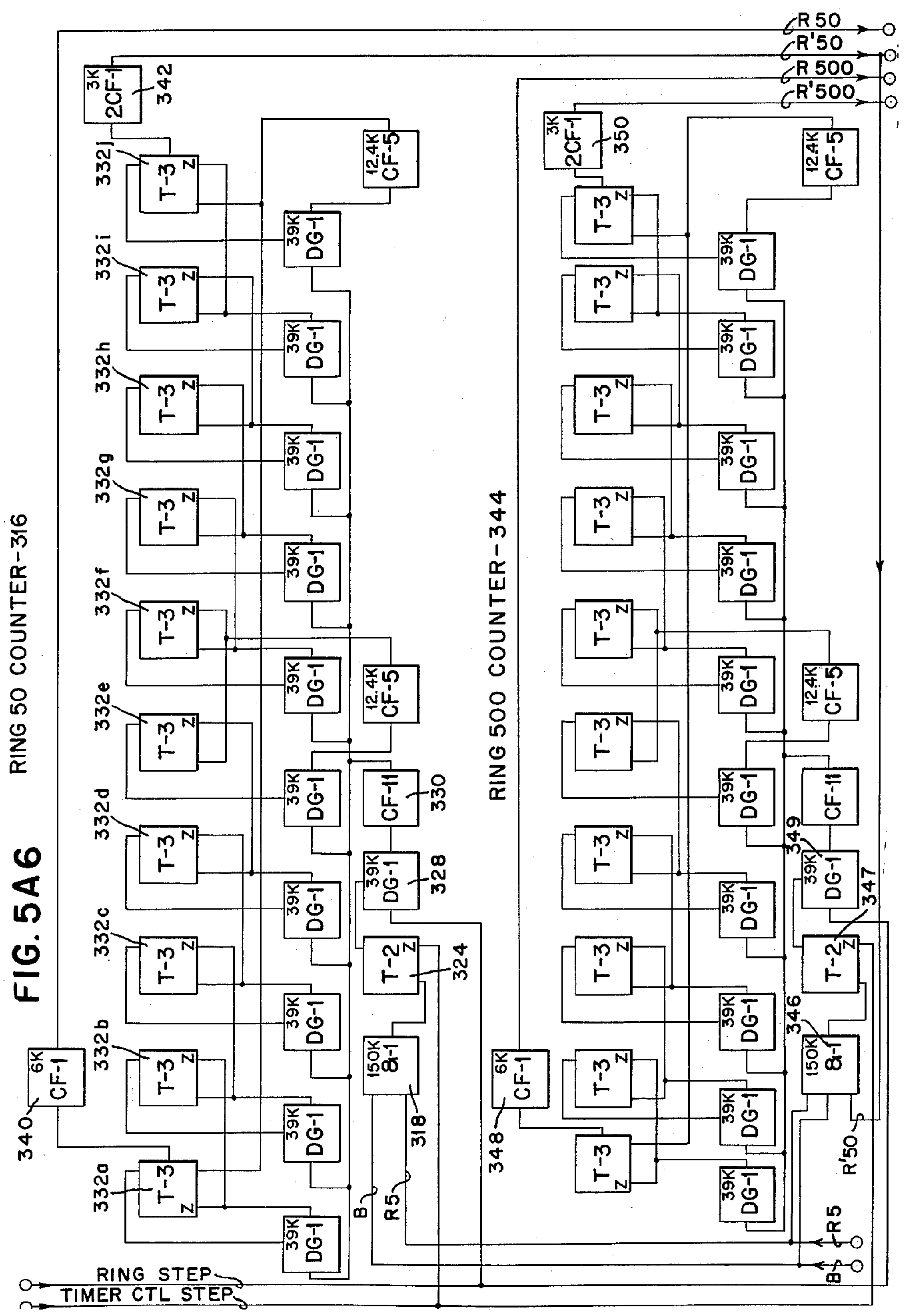
FIG. 5A6

June 20, 1961 N. J. ALBANES 2,989,731
DATA STORAGE UNIT
Filed March 8, 1955 46 Sheets-Sheet 11
FIG. 5A7
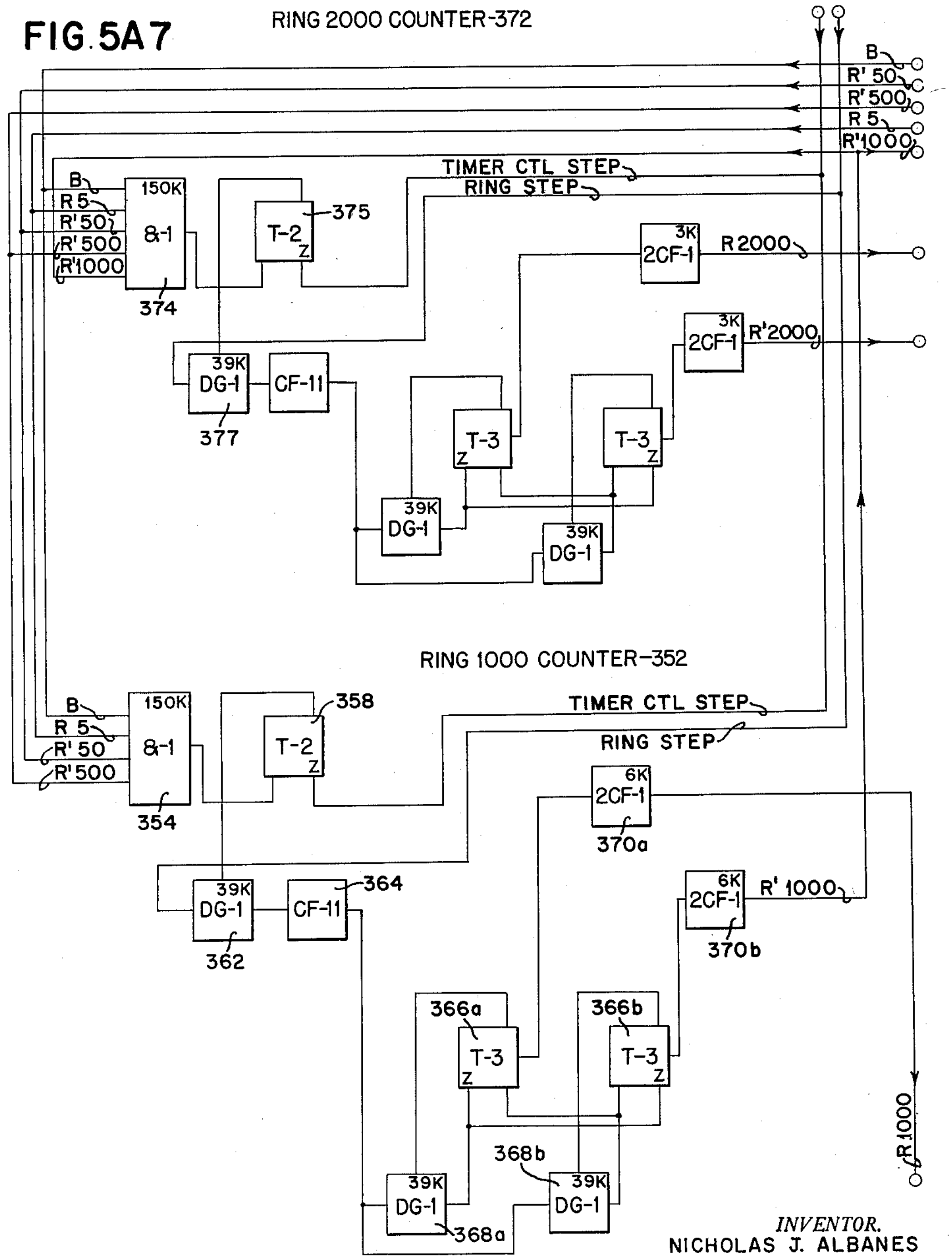
INVENTOR.
NICHOLAS J. ALBANES
BY Edwin Lester
AGENT

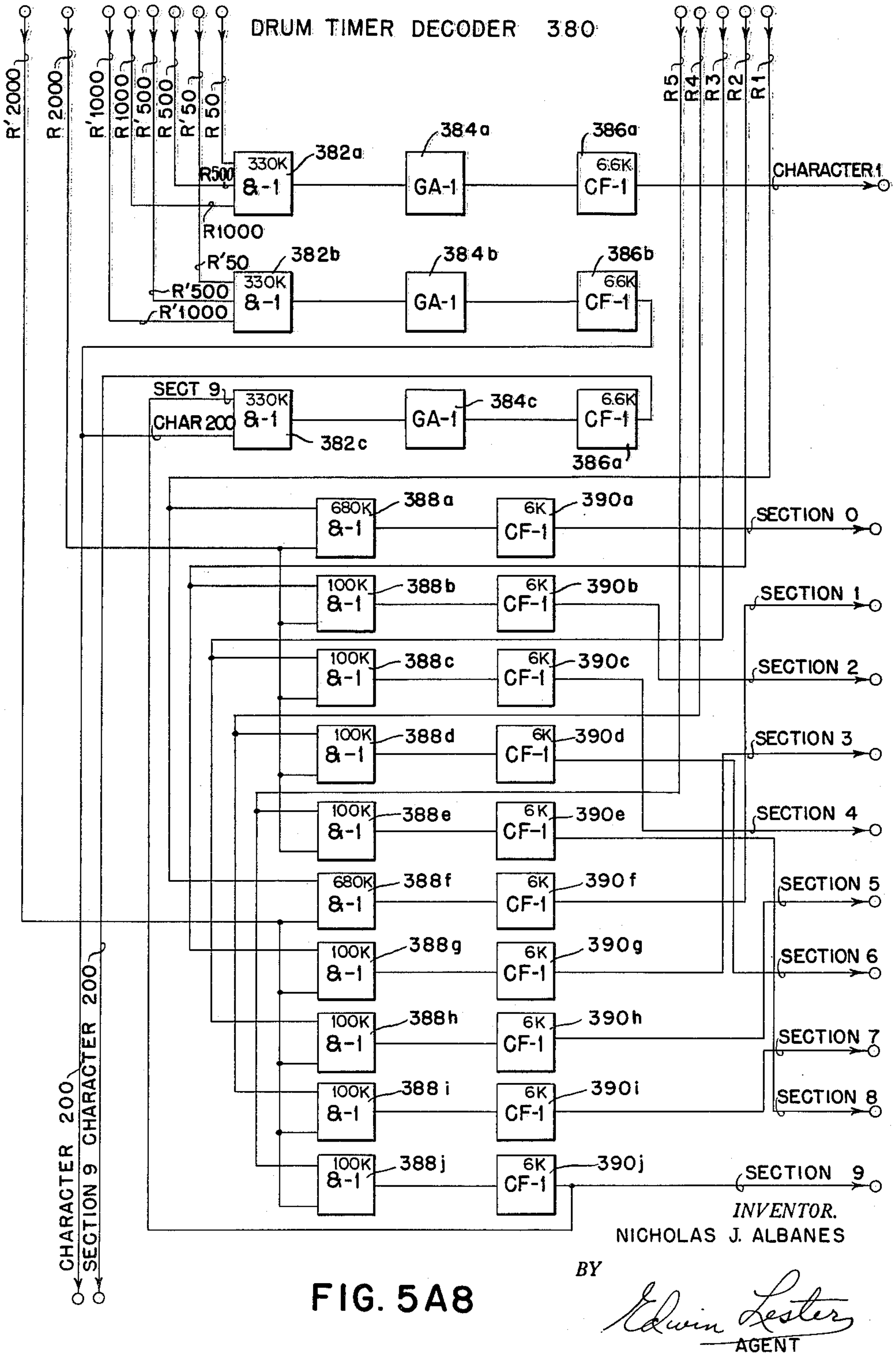
FIG. 5A8
INVENTOR.
NICHOLAS J. ALBANES
BY Edwin Lester
AGENT

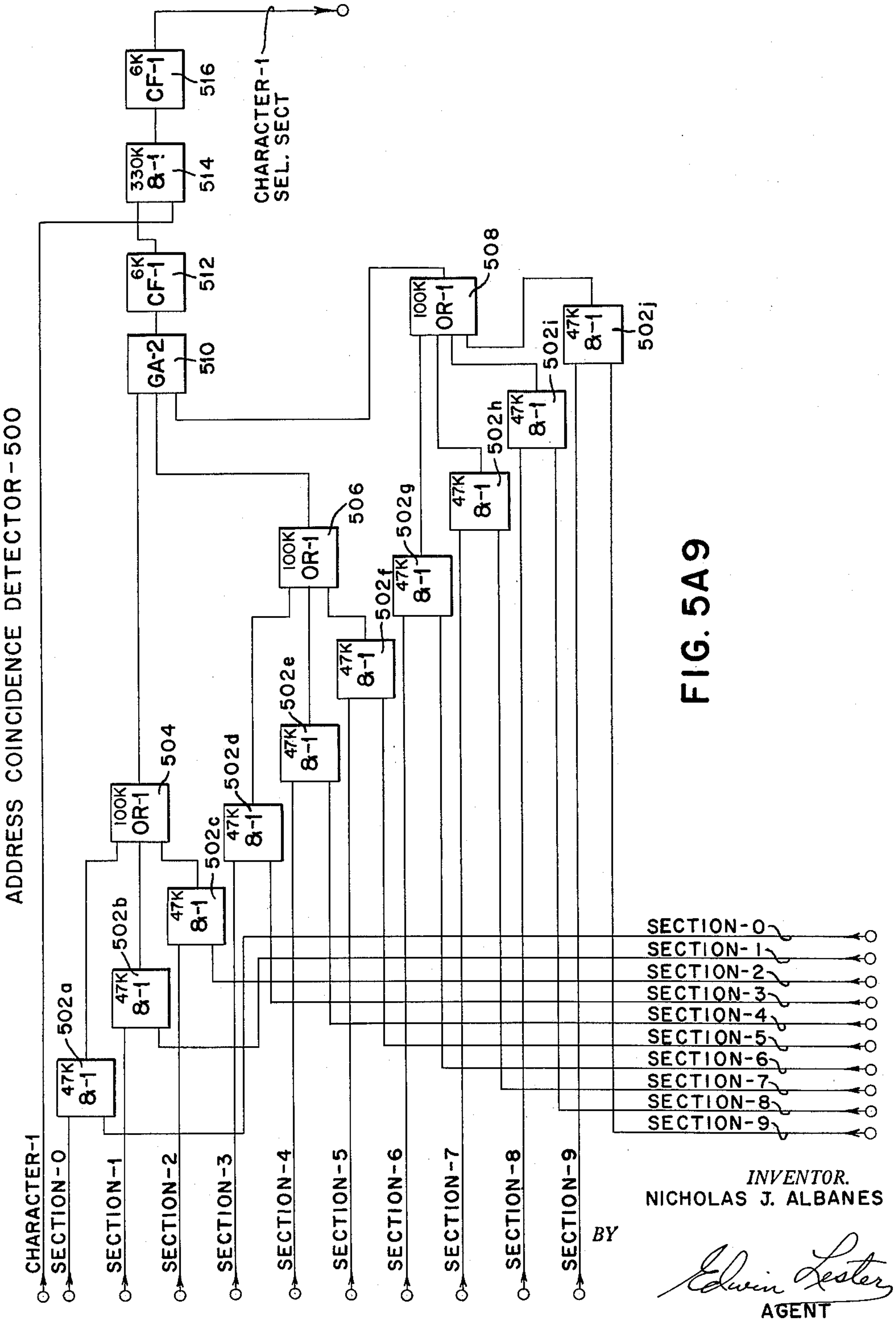
FIG. 5A9
INVENTOR.
NICHOLAS J. ALBANES
BY Edwin Lester
AGENT

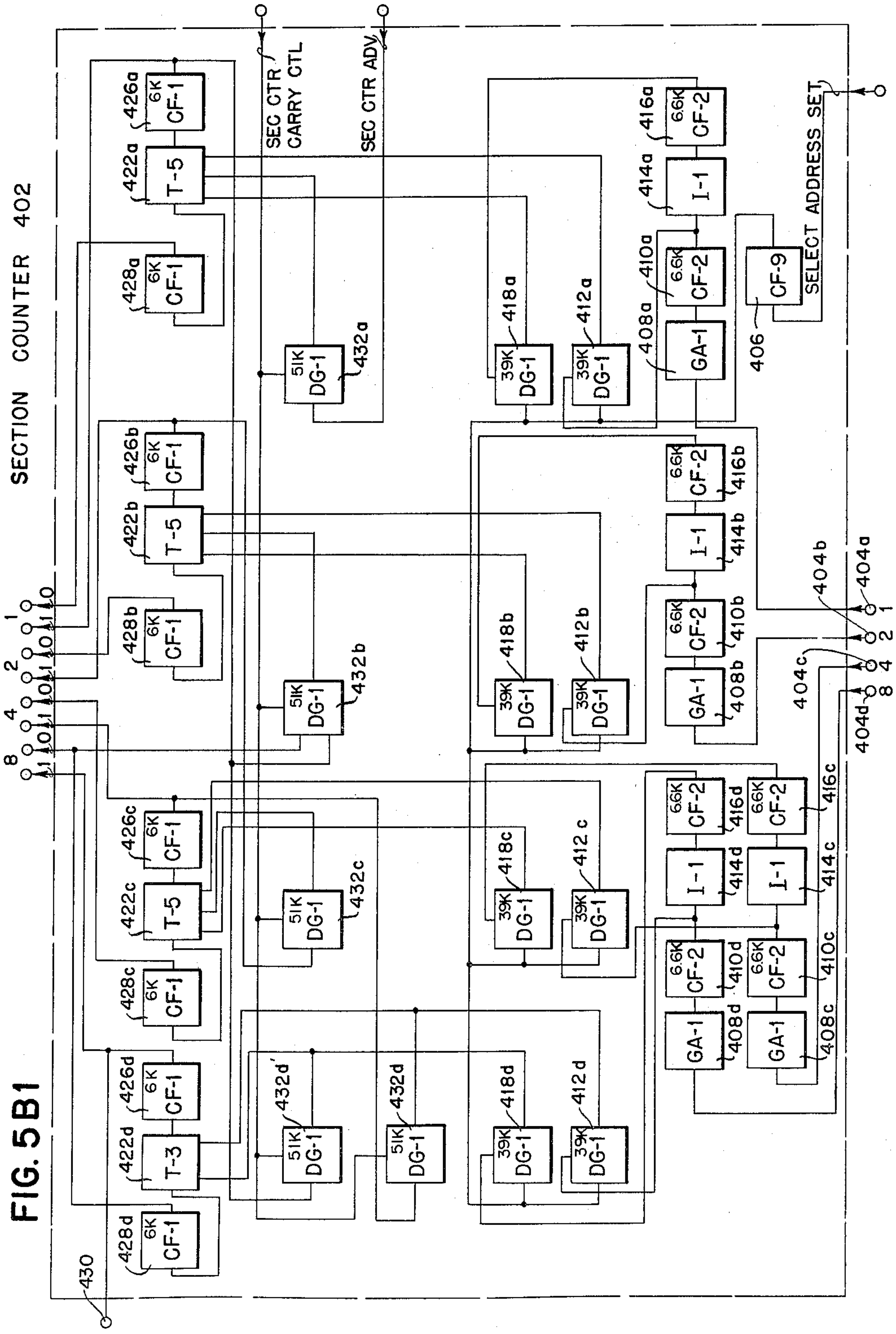
FIG. 5B1

DATA STORAGE UNIT
Filed March 8, 1955 
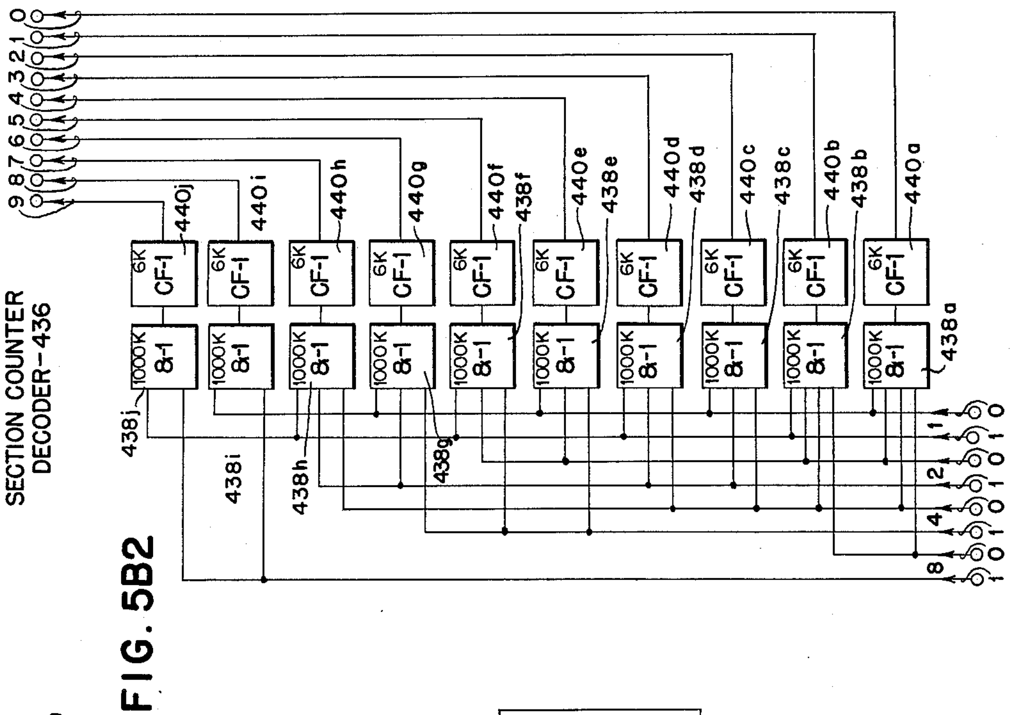
FIG. 5B2
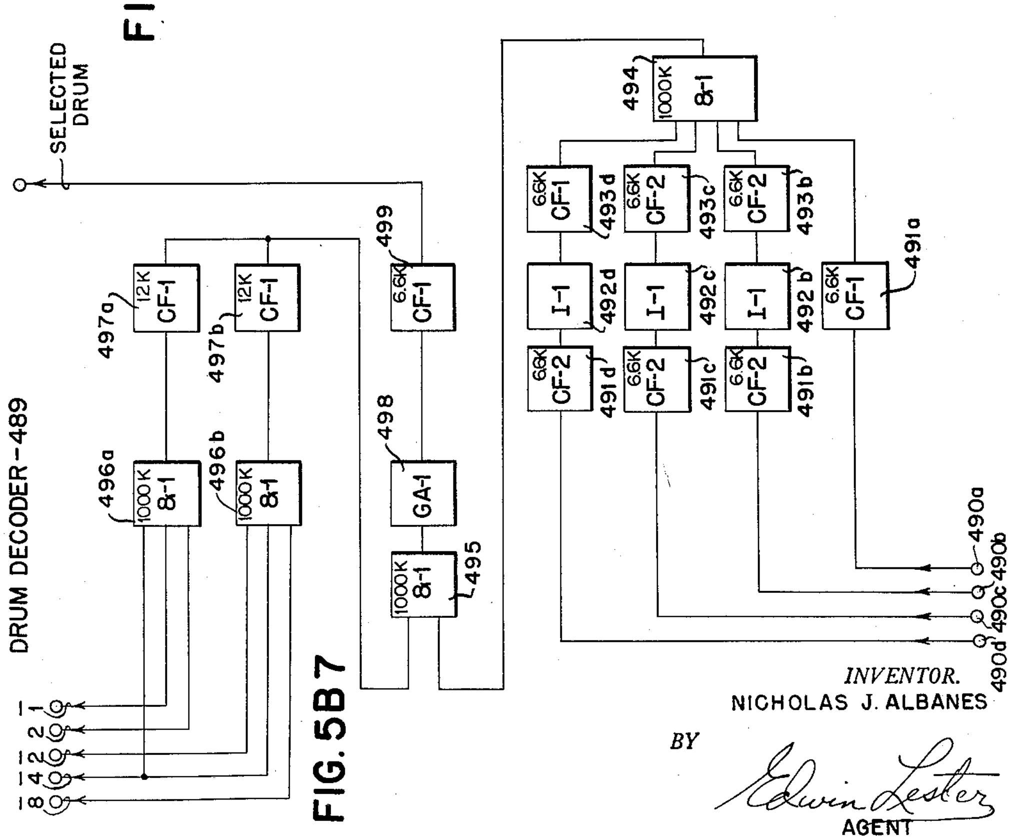
FIG. 5B7
INVENTOR.
NICHOLAS J. ALBANES
BY Edwin Lester
AGENT

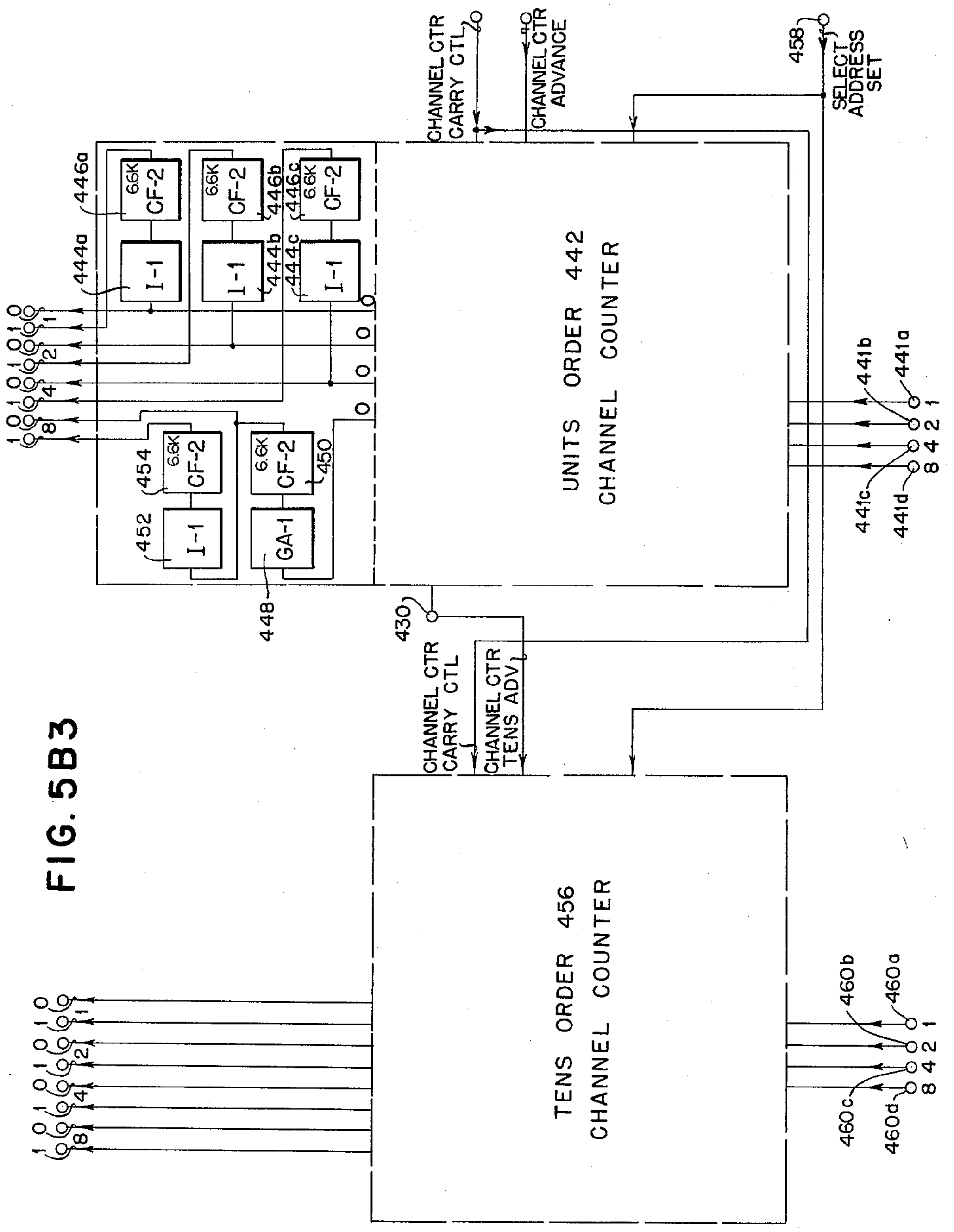
FIG. 5B3
INVENTOR.
NICHOLAS J. ALBANES
BY
Edwin Lester
AGENT

June 20, 1961 N. J. ALBANES 2,989,731
DATA STORAGE UNIT
Filed March 8, 1955 46 Sheets-Sheet 17
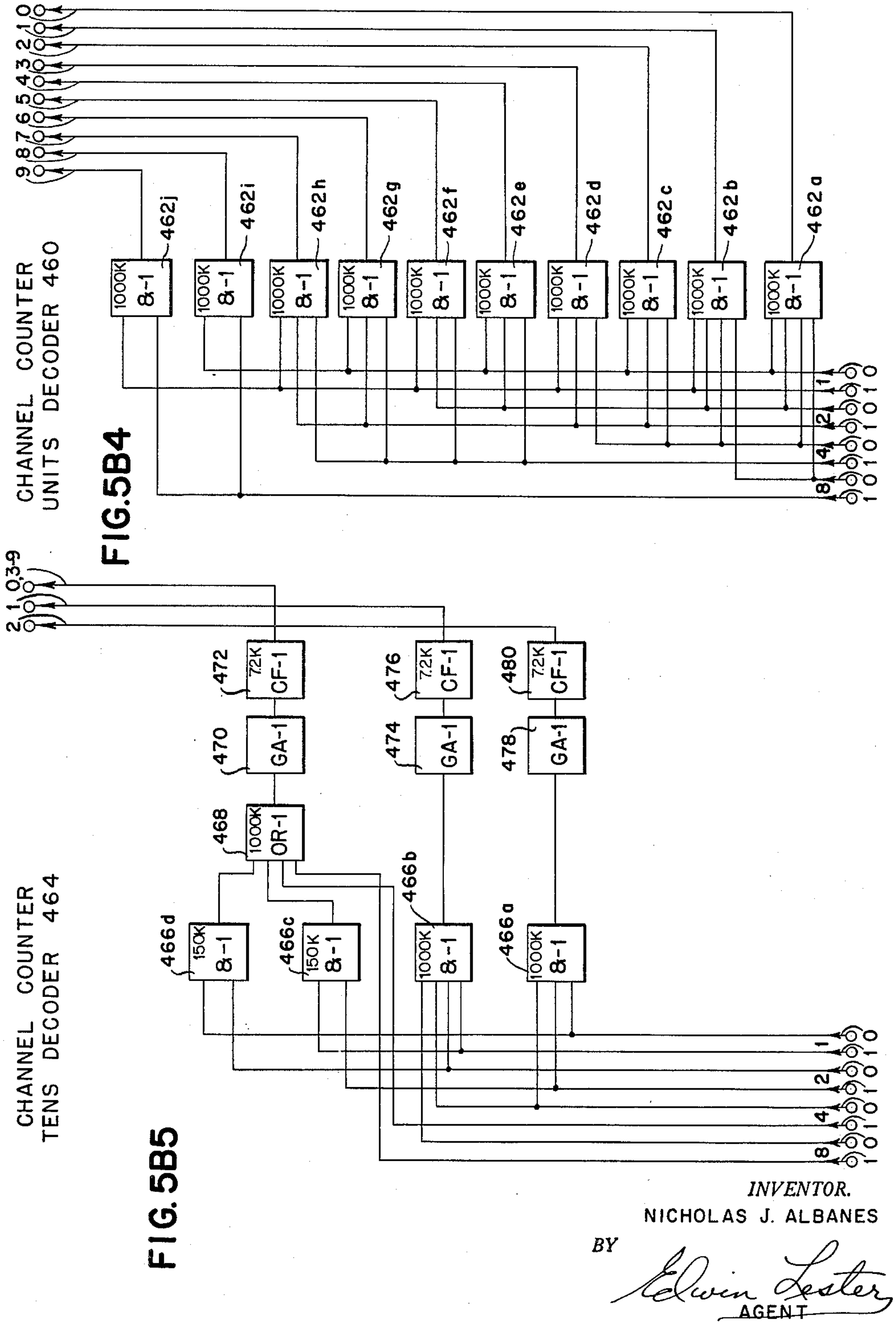
FIG. 5B4, FIG. 5B5
INVENTOR.
NICHOLAS J. ALBANES
BY Edwin Lester
AGENT DATA STORAGE UNIT
Filed March 8, 1955
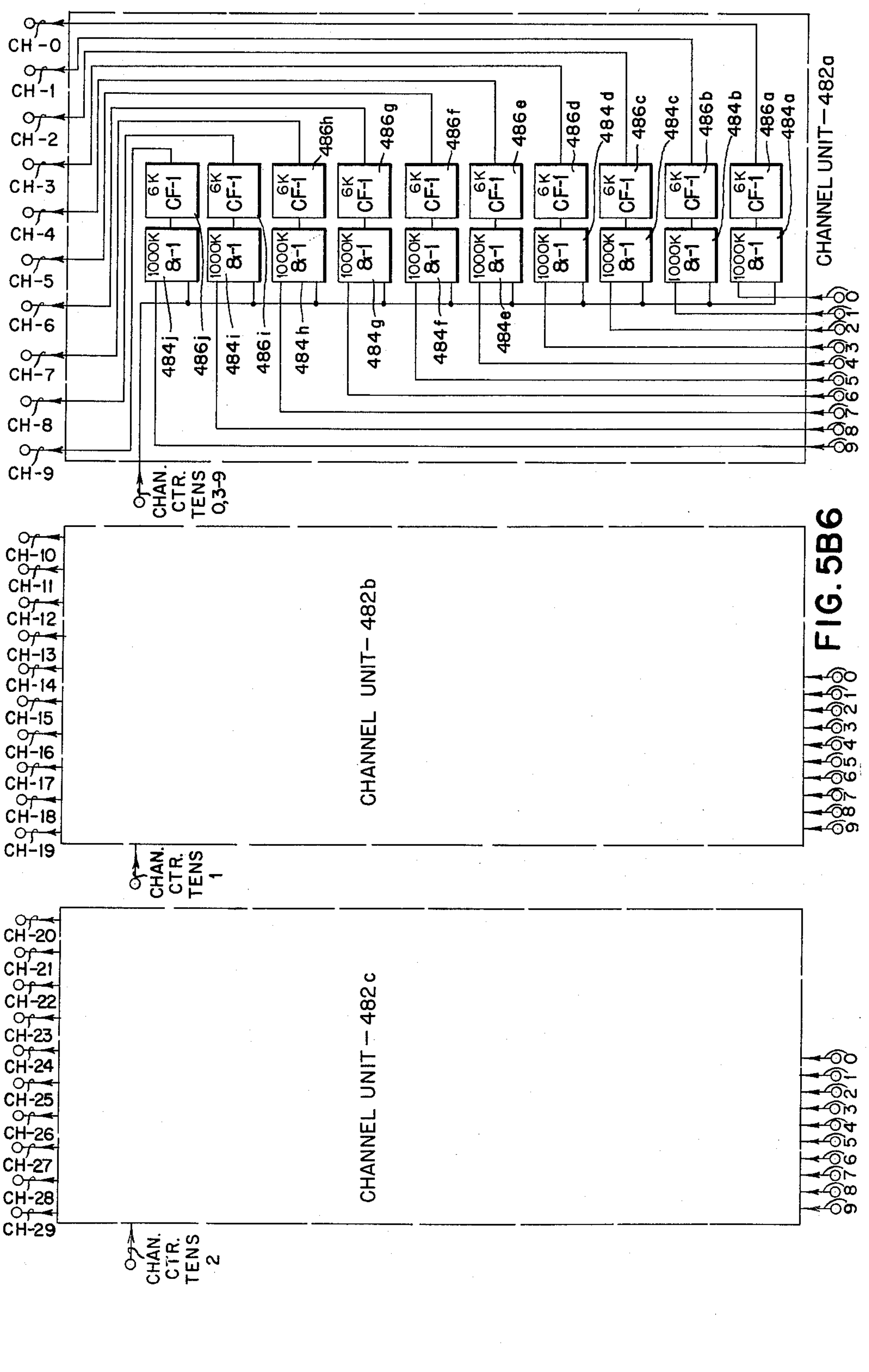
FIG. 5B6

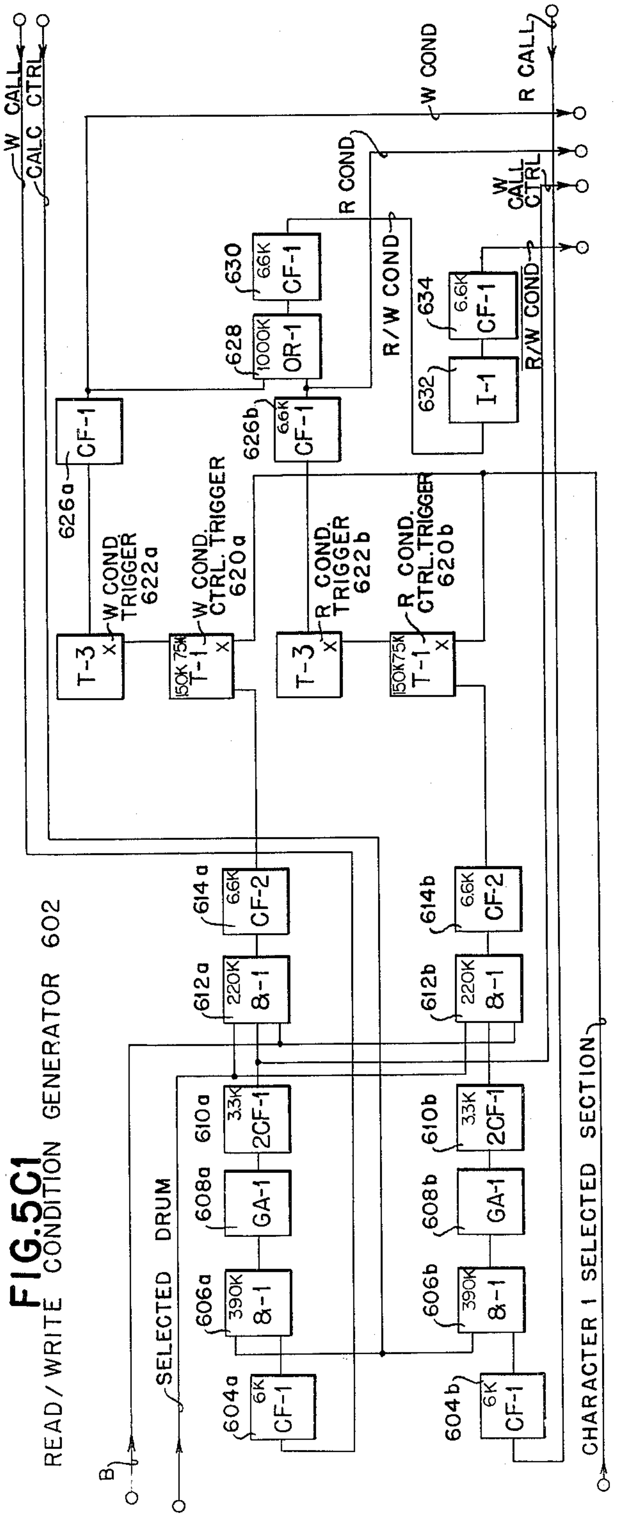
FIG. 5C1
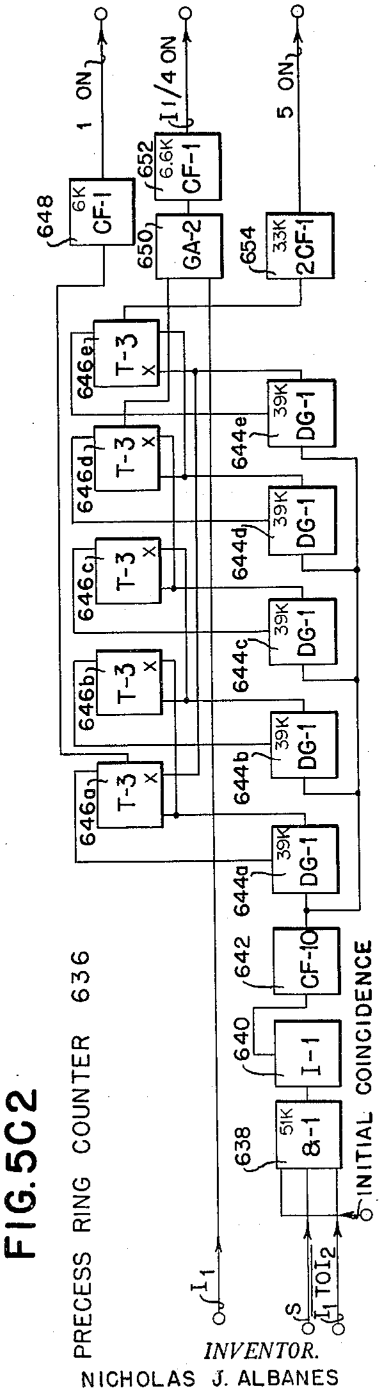
FIG. 5C2
INVENTOR.
NICHOLAS J. ALBANES
BY Edwin Lester
AGENT

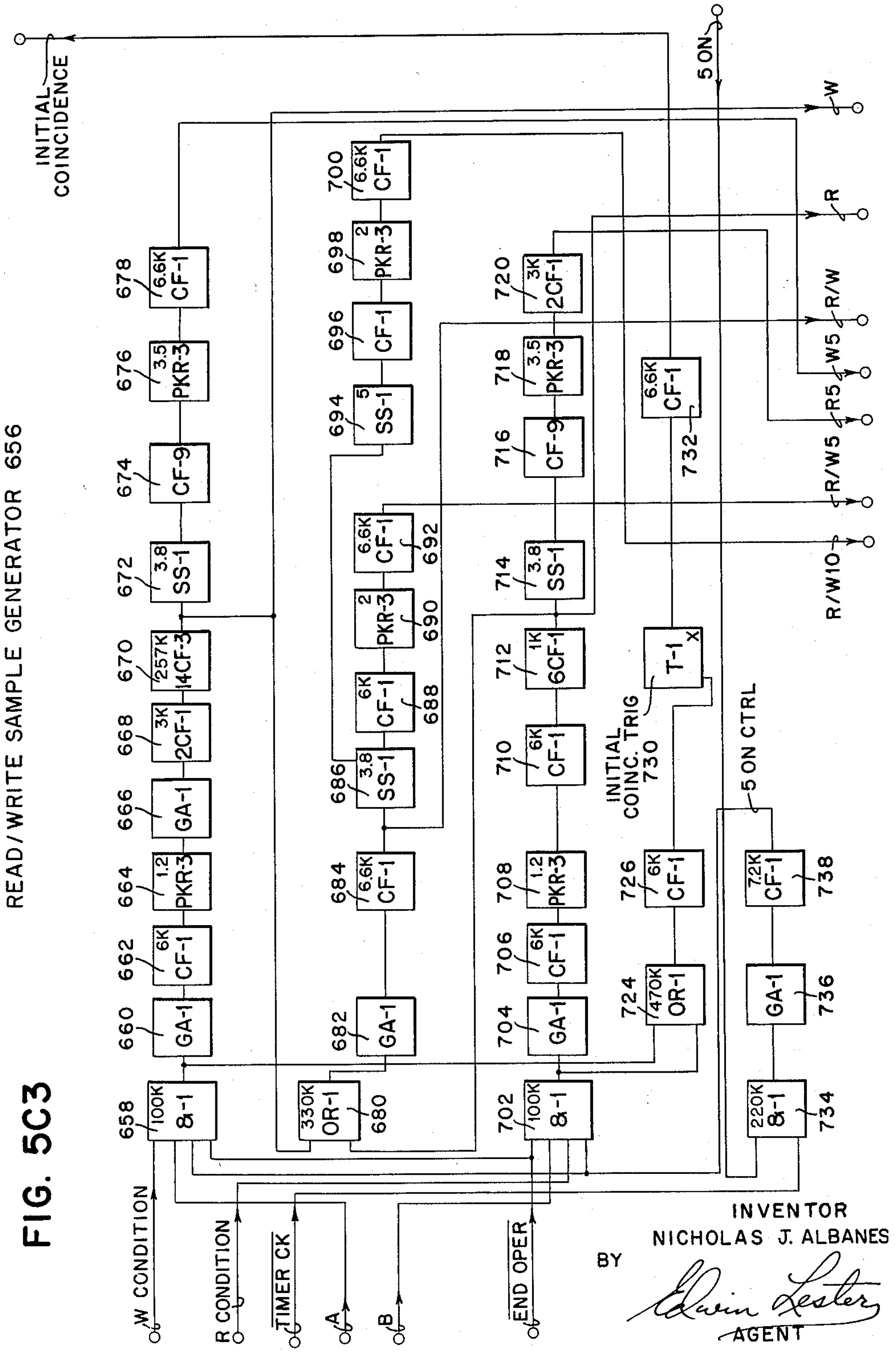
FIG. 5C3
INVENTOR
NICHOLAS J. ALBANES
BY Edwin Lester
AGENT

RESPONSE DISCONNECT GENERATOR 740
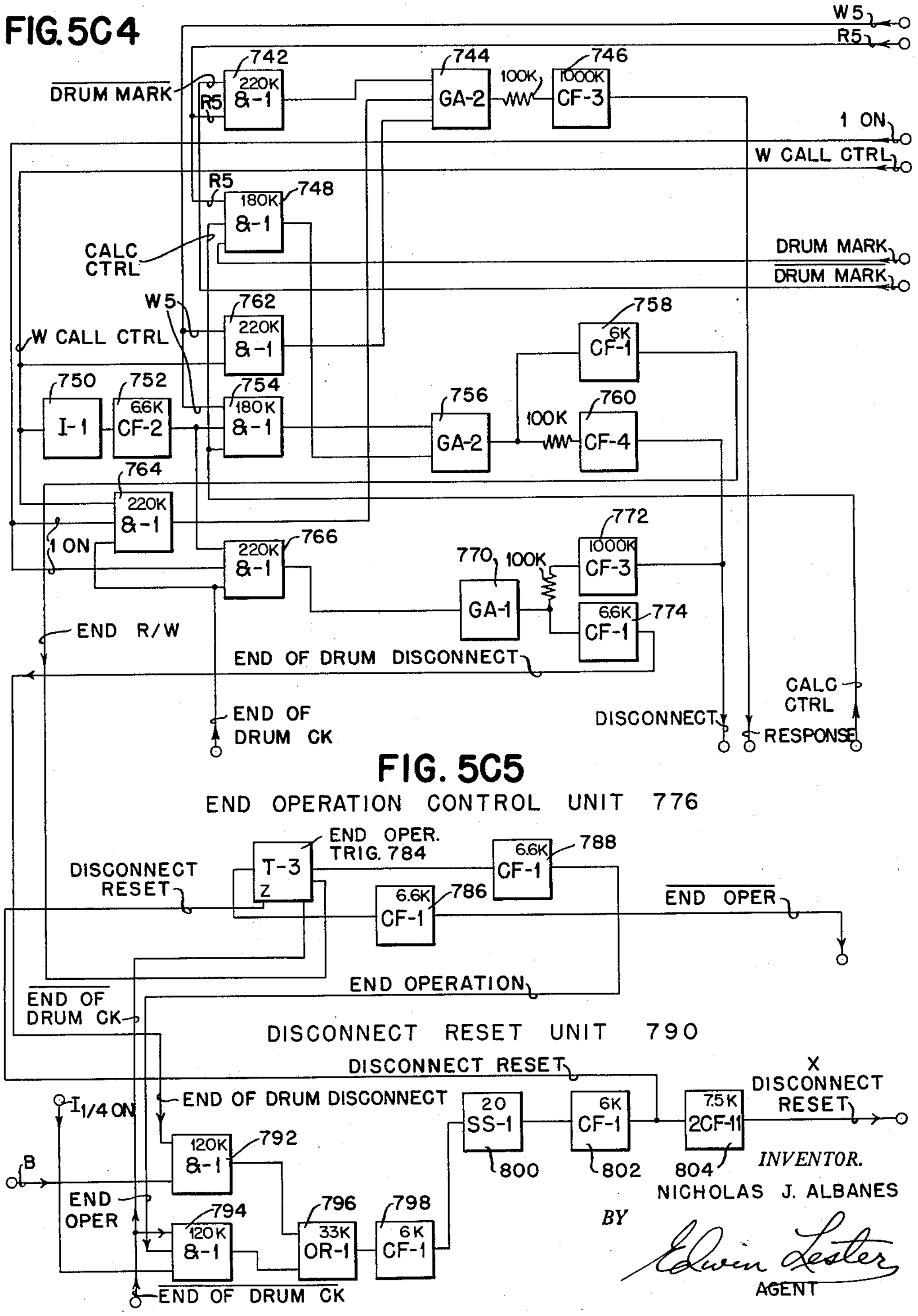
FIG. 5C4, FIG. 5C5
INVENTOR.
NICHOLAS J. ALBANES
BY Edwin Lester
AGENT END OF DRUM CHECK CONTROL UNIT 806
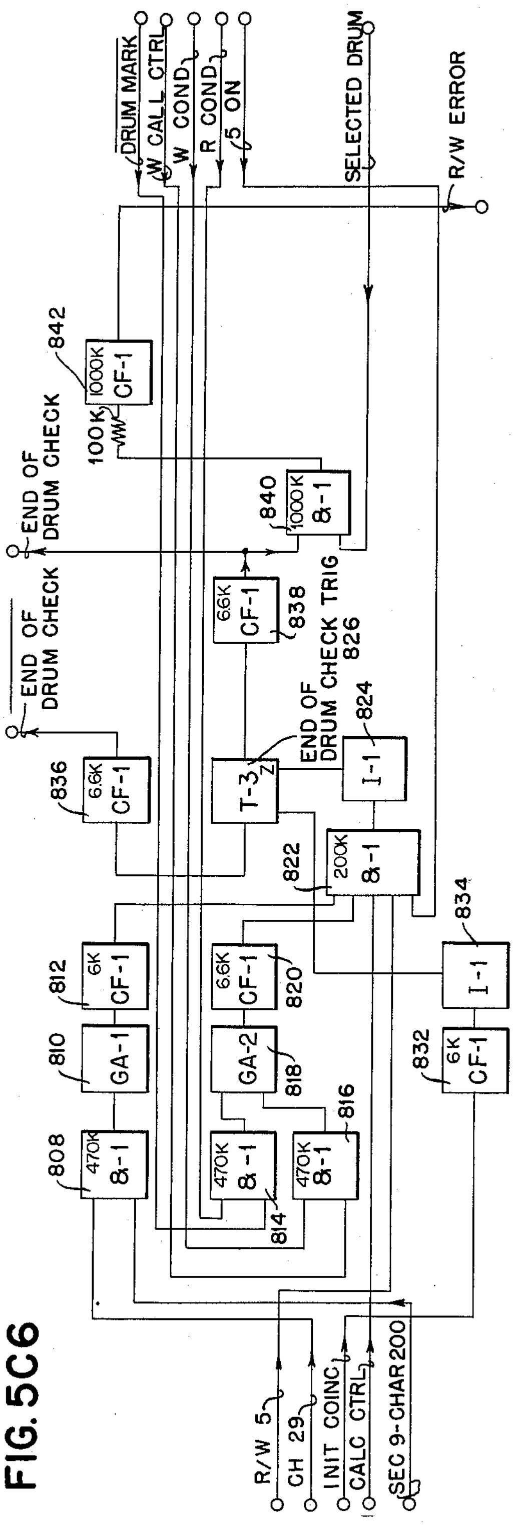
FIG. 5C6
ADDRESS REGISTER COUNTER CONTROL UNIT 850
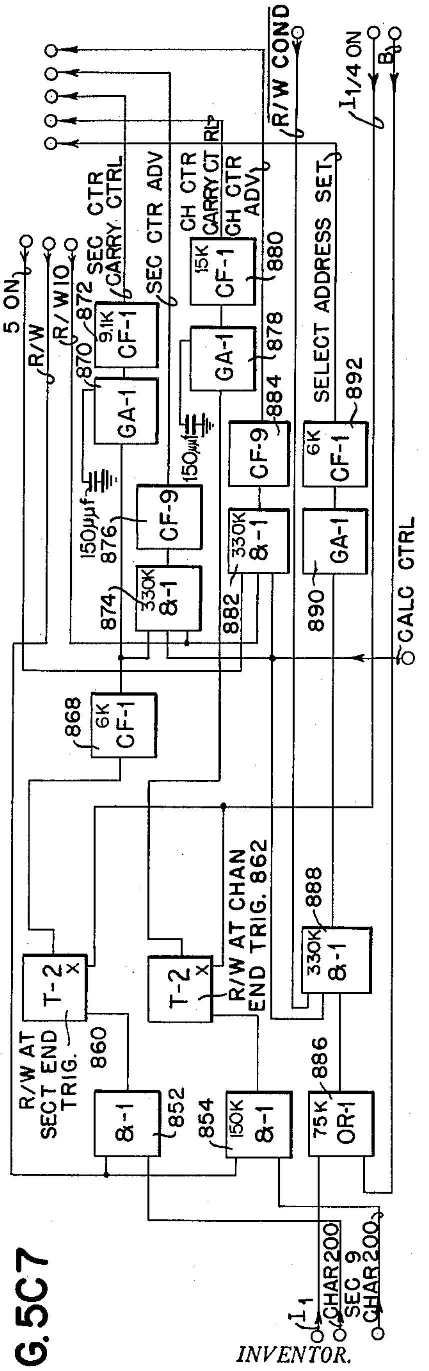
FIG. 5C7
INVENTOR.
NICHOLAS J. ALBANES
BY Edwin Lester
AGENT June 20, 1961 N. J. ALBANES 2,989,731
DATA STORAGE UNIT
Filed March 8, 1955 46 Sheets-Sheet 23
FIG. 5D1B
WRITE CONTROL UNIT-902
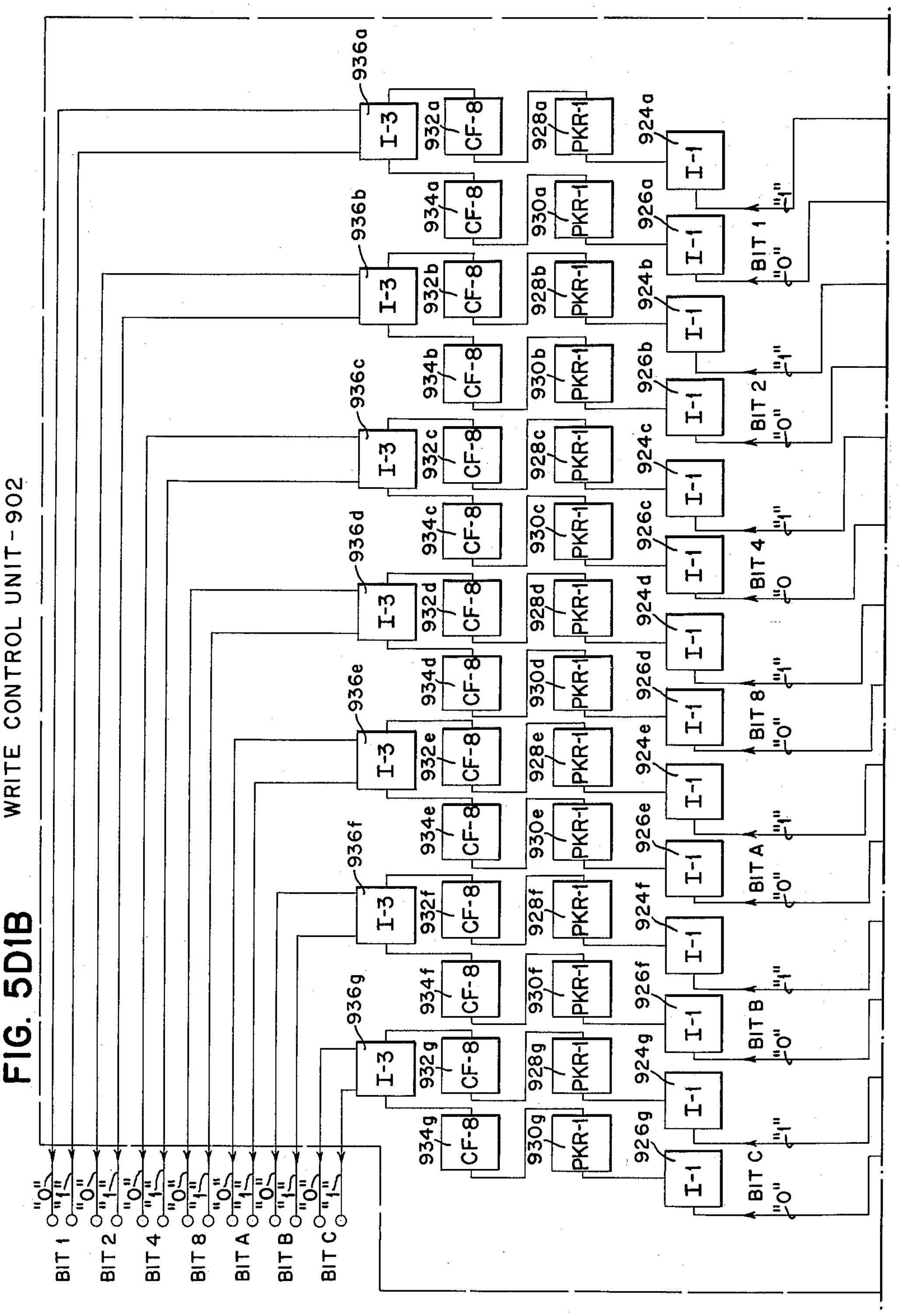

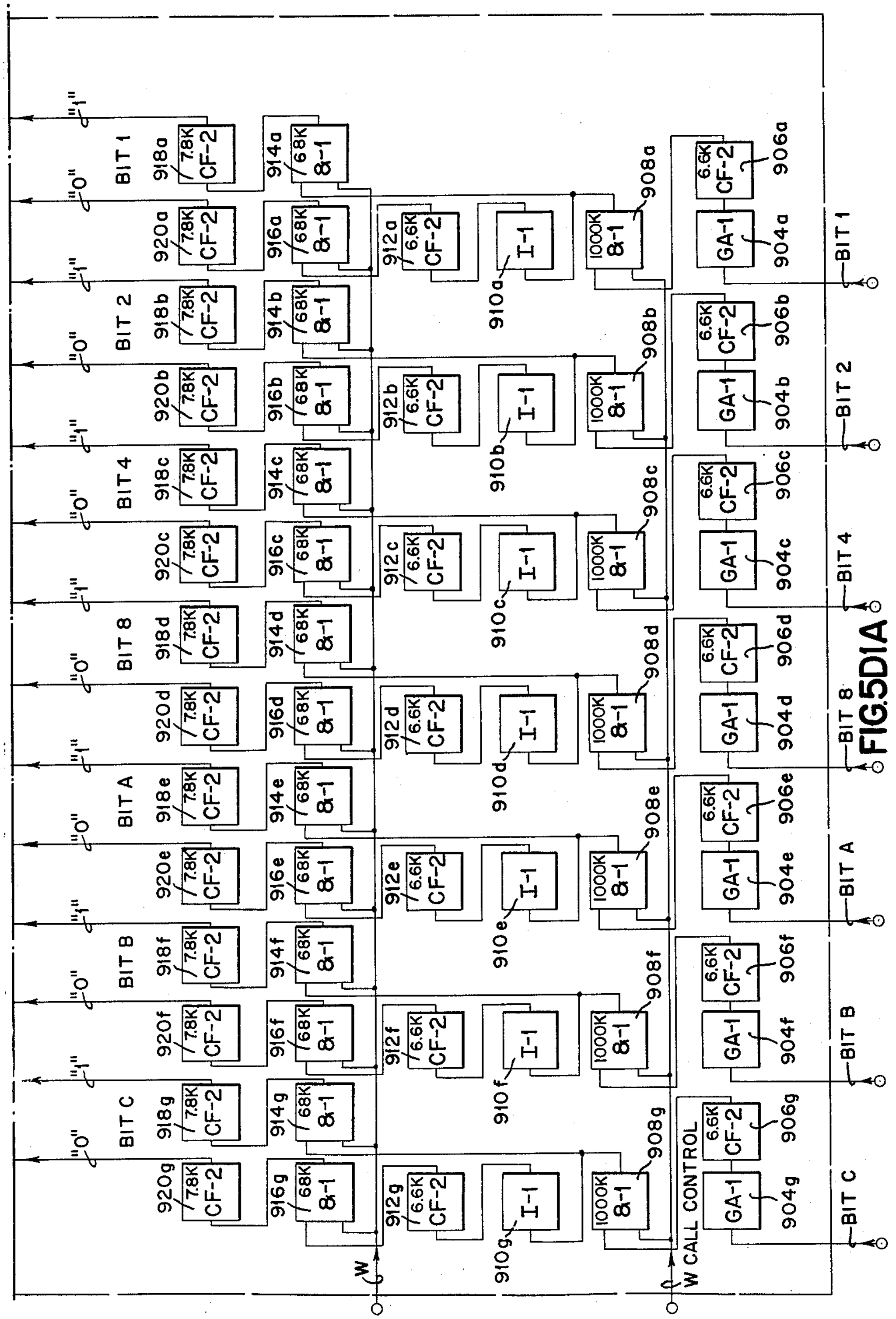
FIG. 5D1A

June 20, 1961 N. J. ALBANES 2,989,731
DATA STORAGE UNIT
Filed March 8, 1955 46 Sheets-Sheet 25
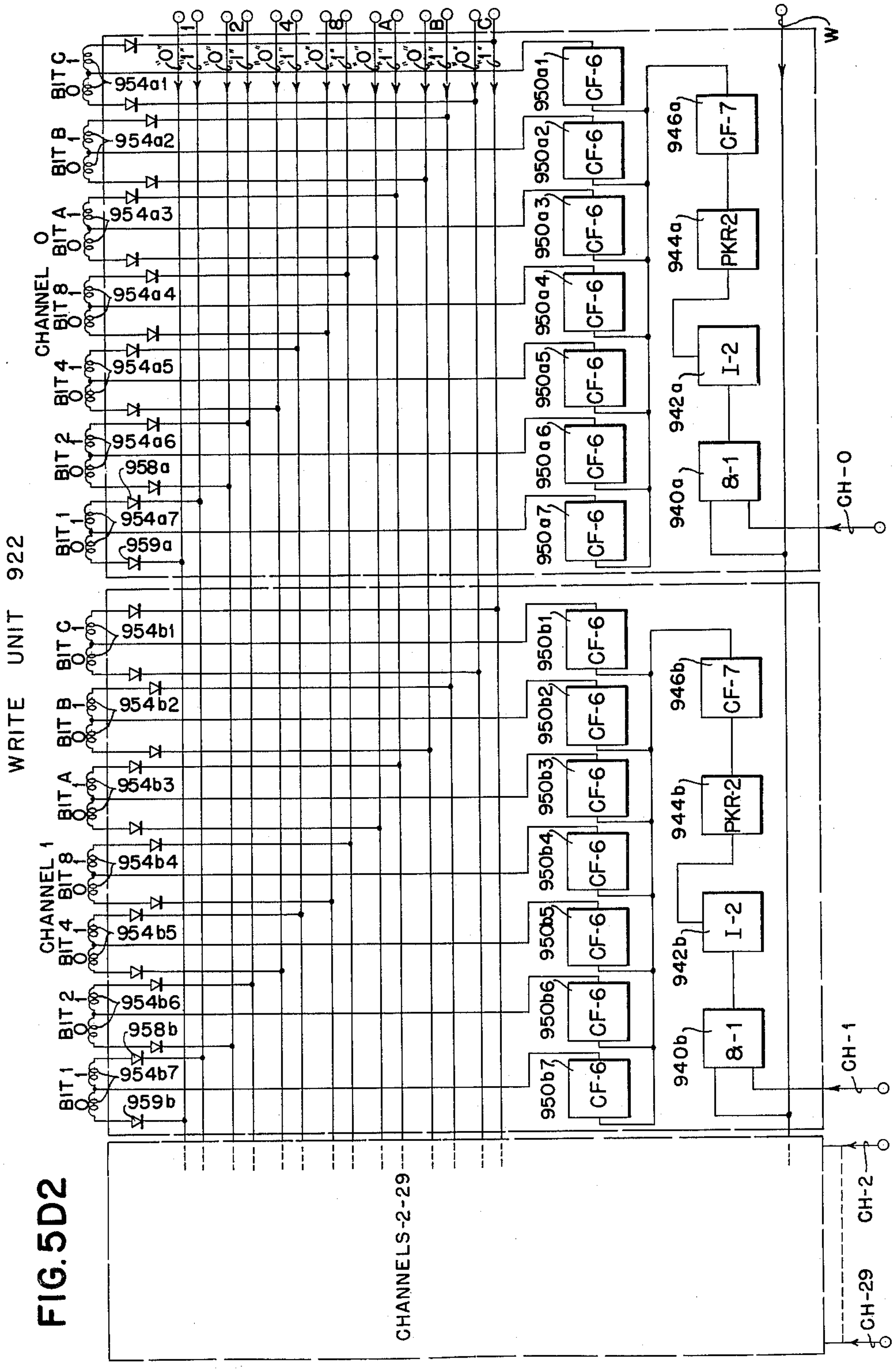
FIG. 5D2

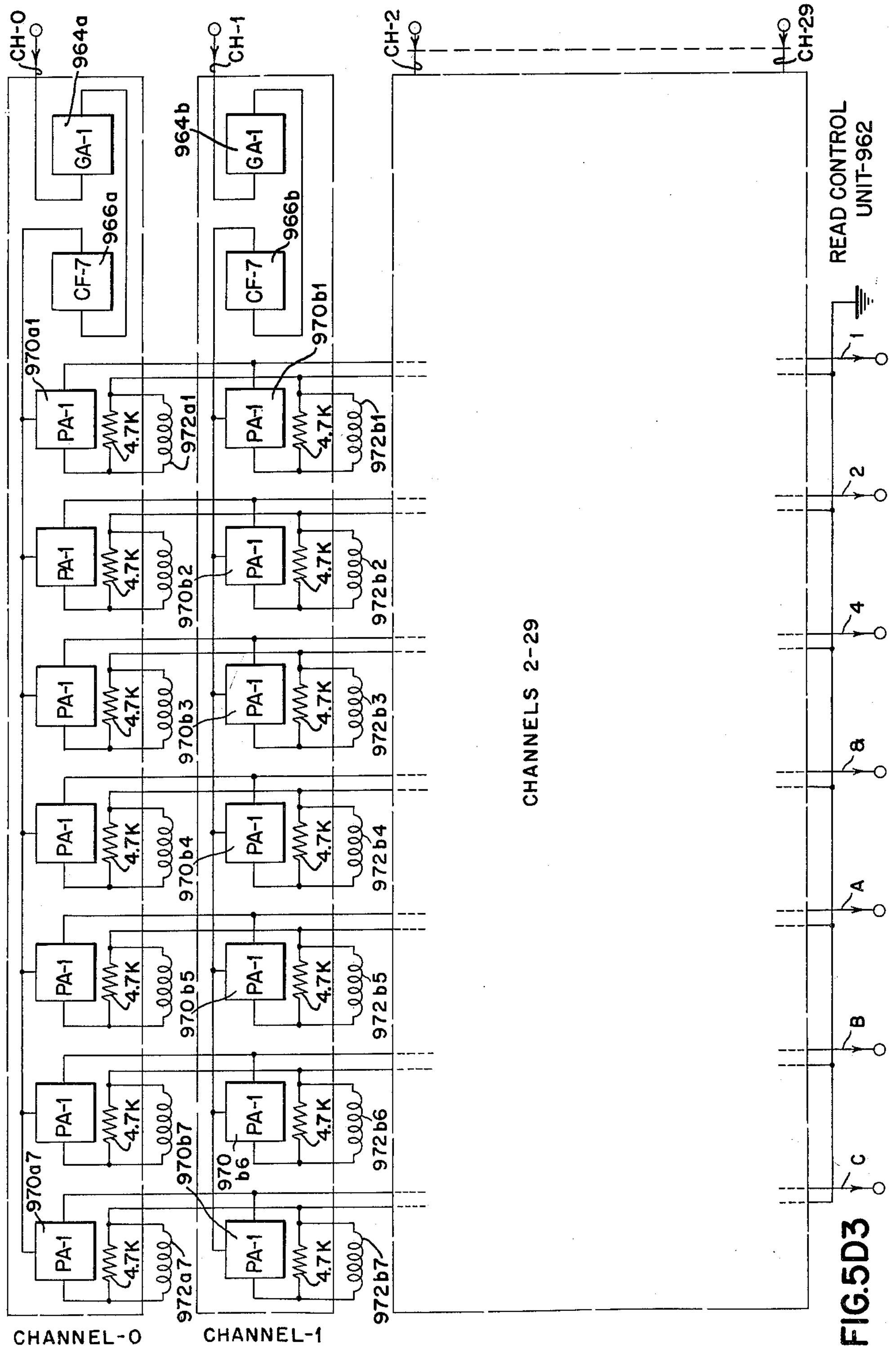
FIG.5D3

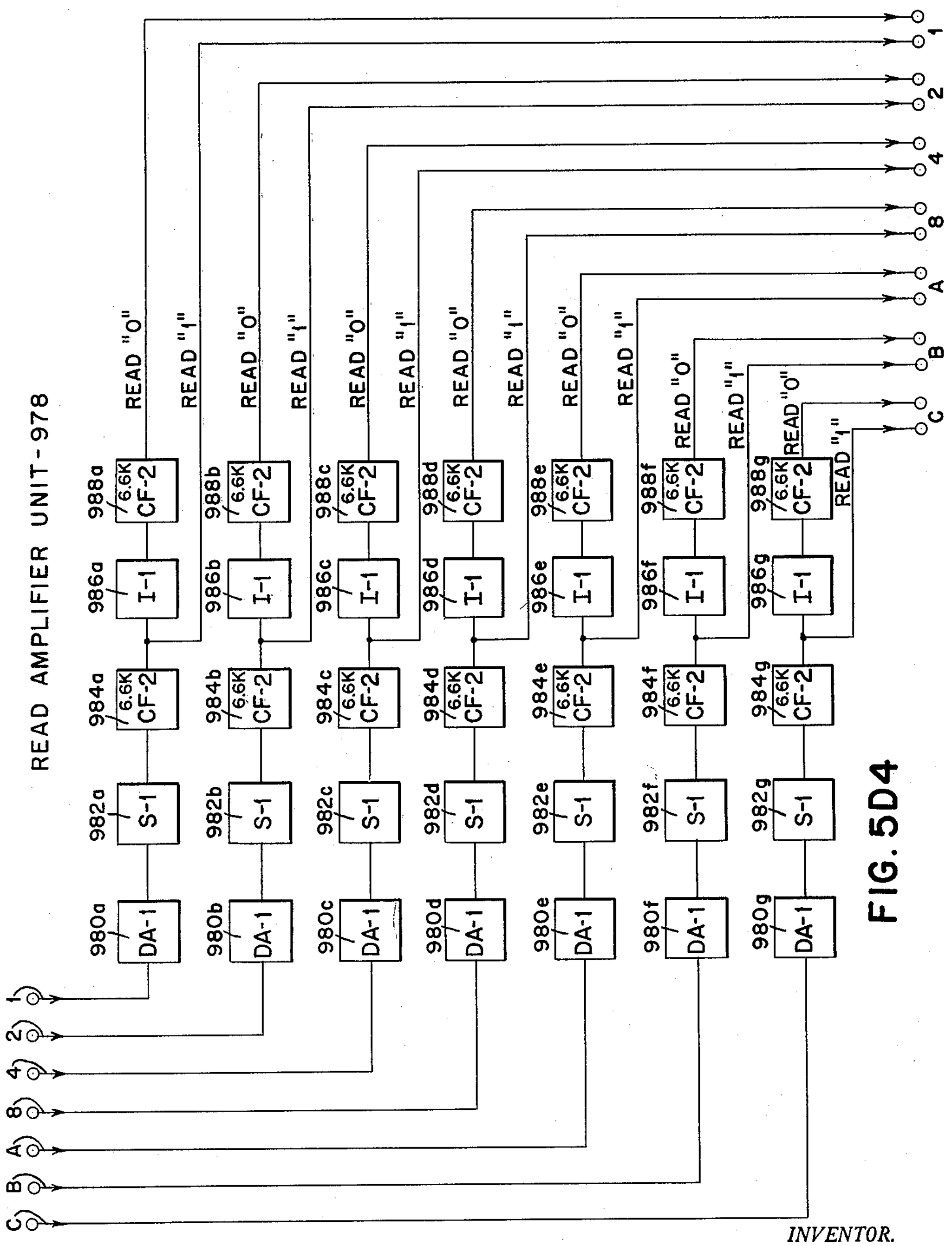
FIG. 5D4
INVENTOR.
NICHOLAS J. ALBANES
BY Edwin Lester
AGENT

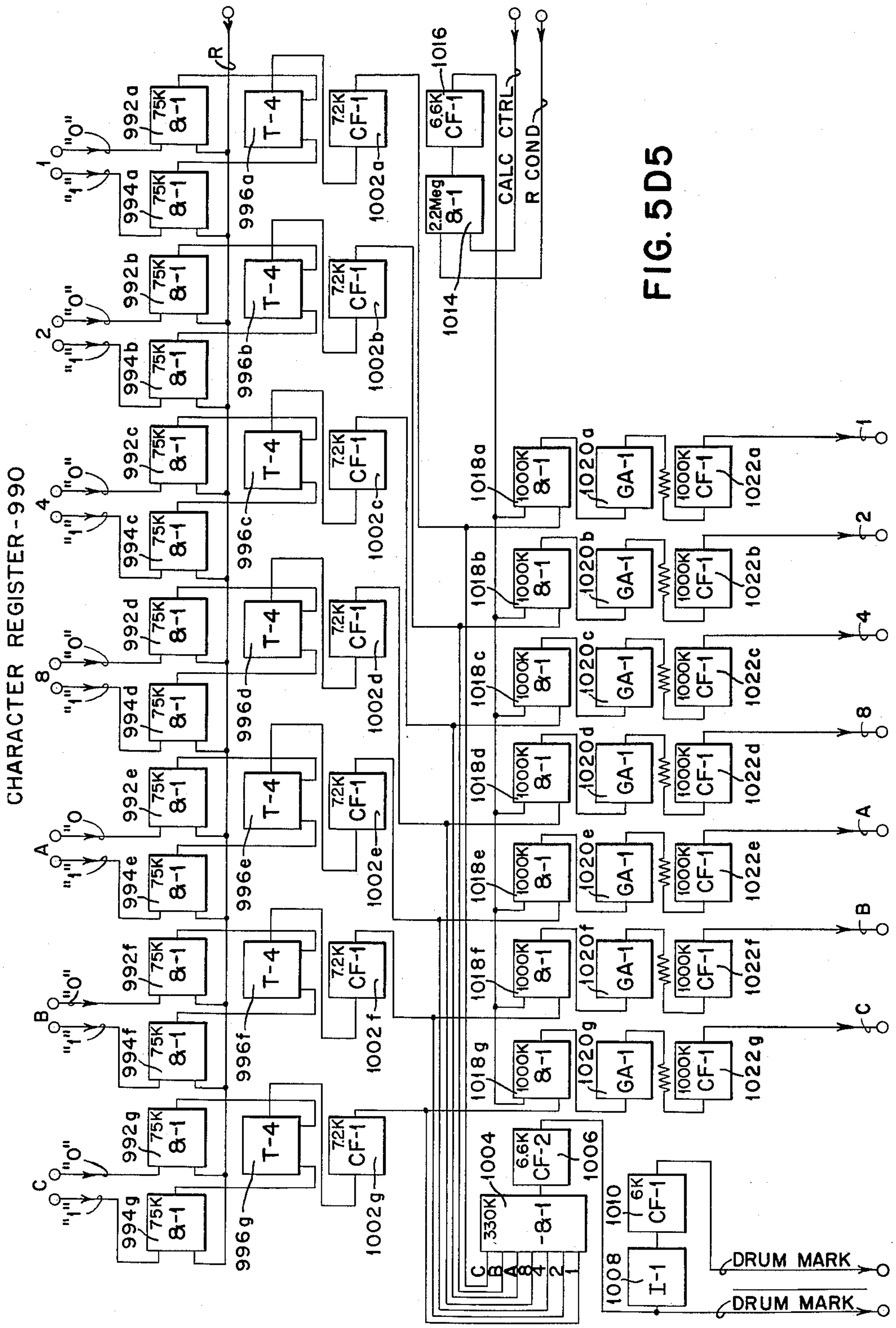
FIG. 5D5

*INVENTOR.*
NICHOLAS J. ALBANES
*BY*
Edwin Lester
AGENT

INVENTOR.
NICHOLAS J. ALBANES
BY Edwin Lester
AGENT

INVENTOR.
NICHOLAS J. ALBANES
BY Edwin Lester
AGENT

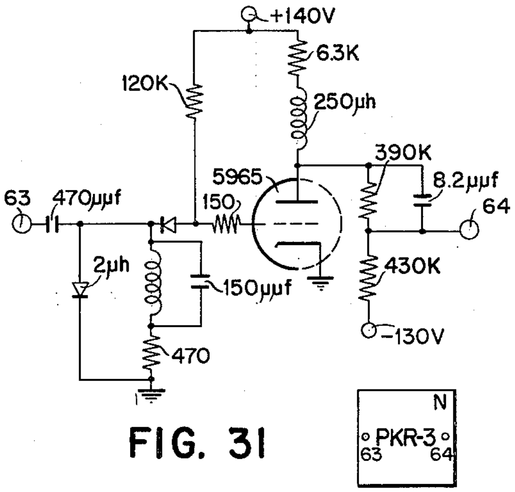
FIG. 31
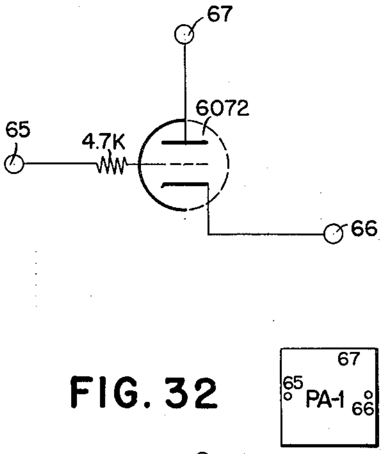
FIG. 32
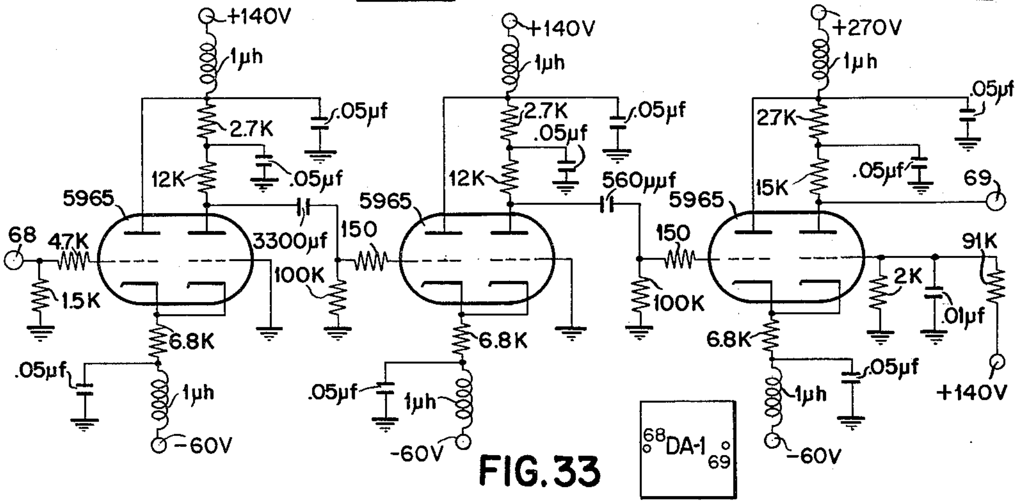
FIG. 33
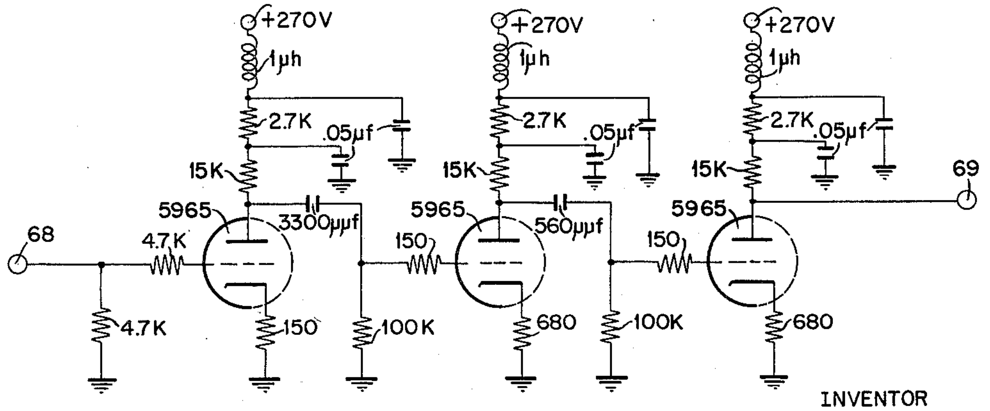
FIG. 34
INVENTOR
NICHOLAS J. ALBANES
BY Edwin Lester
AGENT INVENTOR.
NICHOLAS J. ALBANES
BY Edwin Lester
AGENT June 20, 1961 N. J. ALBANES 2,989,731

DATA STORAGE UNIT

Filed March 8, 1955 46 Sheets-Sheet 36

INVENTOR.

NICHOLAS J. ALBANES

BY Edwin Lester

AGENT

June 20, 1961 N. J. ALBANES 2,989,731

DATA STORAGE UNIT

Filed March 8, 1955 46 Sheets-Sheet 38

June 20, 1961 N. J. ALBANES 2,989,731

DATA STORAGE UNIT

Filed March 8, 1955 46 Sheets-Sheet 40

WRITE OPERATION

June 20, 1961 N. J. ALBANES 2,989,731

DATA STORAGE UNIT

Filed March 8, 1955 46 Sheets-Sheet 42

WRITE OPERATION

WRITE OPERATION

June 20, 1961 N. J. ALBANES 2,989,731

DATA STORAGE UNIT

Filed March 8, 1955 46 Sheets-Sheet 46

READ OPERATION

United States Patent Office 2,989,731

Patented June 20, 1961

2,989,731

DATA STORAGE UNIT

Nicholas J. Albanes, Poughkeepsie, N.Y., assignor to International Business Machines Corporation, New York, N.Y., a corporation of New York Filed Mar. 8, 1955, Ser. No. 492,858

22 Claims. (Cl. 340—172.5)

This invention relates to data storage systems and, more particularly, to a magnetic drum storage unit for a data processing machine.

At the present time, high speed automatic electronic data processing machines are utilized for rapidly processing data. It is often necessary to supplement the internal storage capacity of such machines by a dependable auxiliary storage system for storing data for varying periods of time. Additionally, because of the quantity of data that is processed and the high operating speeds of such machines, the storage system must have a large capacity and there must be rapid access to the system. Magnetic drum storage systems have been developed to meet these requirements of the modern data processing machines as they are dependable, in that stored data is not affected by power failures, they have large capacity and access to the drum for transducing operations is rapidly accomplished.

Accordingly, the principal object of the present invention is to provide a highly flexible storage unit having a large capacity and rapid accessibility.

In accordance with the present invention disclosed herein, a storage unit is provided with a magnetic drum for storing records of data characters on its surface. A plurality of storage channels extend about the surface of the drum, each of which is divided into a predetermined number of sections arranged in an interlaced manner with each section containing a fixed number of character positions. Additionally, a timing track is provided with means operable in synchronism with the rotation of the drum for providing synchronizing signals. The storage unit includes an address timing register responsive to the synchronizing signals for producing different voltage patterns corresponding to the different sections in each of the storage channels but the same voltage pattern for each character position in the same section, signals identifying the first character positions in corresponding sections of the storage channels and signals identifying the last character position in each of the storage channels. The storage unit also includes read/write means associated with each of the storage channels of the drum. Further, the storage unit includes an address input register which may be set by the data processing machine for addressing a particular section of a particular storage channel of the drum including means providing a voltage pattern corresponding to the addressed section, means providing a channel signal to condition the read/write means associated with the addressed channel and means providing a signal identifying the drum as the selected storage unit. Additionally, the storage unit includes an address coincidence detector responsive to the signals identifying the first character positions in corresponding sections of the storage channels for comparing the voltage pattern produced by the address input register with the continuously changing voltage patterns produced by the address timing register and producing a signal identifying the first character position in the selected section of the selected storage channel of the drum. Lastly, the storage unit includes a read/write enabling means conditioned by the selected drum signal and initially rendered effective by the signal identifying the first character position in the selected section of the selected channel to be operatively controlled thereafter by the synchronizing signals for selectively enabling the read/write means associated with the addressed channel to perform transducing operation starting at the first character position in the selected section of the selected storage channel and continuing at succeeding character positions in the selected section and if necessary at succeeding character positions in succeeding sections of the selected storage channel including means responsive to the signals identifying the last character position in each of the storage channels for advancing the address in the channel means of the address input register to values corresponding to the succeeding storage channels thereby causing the channel means to provide successive channel signals to successively condition the read/write means associated with the succeeding storage channels so that transducing operations may continue if necessary at succeeding character positions in succeeding sections of the succeeding storage channels.

Accordingly, another object of the invention is to provide a magnetic storage unit capable of storing variable length records.

Still another object of the invention is to provide novel section addressing for selectively choosing the first character position in a predetermined section of the drum at which transducing operations may commence.

A further object is to provide a novel plural channel drum lay-out with each channel being divided into a predetermined number of sections, in combination with means for selectively enabling reading or writing to commence in a pre-chosen channel of the drum and to continue if necessary in succeeding channels.

Another object of the invention is the provision of novel means for producing an index signal identifying a pre-chosen rotative position of the drum.

A further object is to provide precessing means whereby transducing operations are precessed when stepping from odd numbered sections to the next succeeding even numbered sections but not when stepping from one channel to the next succeeding channel.

Still another object is the provision of a novel timing means for producing position identifying signals.

A further object of the invention is to provide a selectively controllable counting circuit.

Still another object is the provision of a novel arrangement for signalling a data processing machine after the storage unit performs each transducing operation and disabling the operation of the unit at the end of a record.

A further object is the provision of a novel arrangement whereby when the end of a record is detected a character is written on the drum identifying the end of a record.

Still another object is to provide a novel arrangement for signalling the data processing machine when the character identifying the end of a record is read from the drum.

A further object is to provide a novel arrangement for blocking the operation of the storage unit if addressed to a channel value which is greater than the number of existing channels.

A feature of the invention is means for checking the timing operation of the storage unit.

Another feature of the invention is means for detecting whether an attempt is being made to read or write off the end of the drum.

Other objects and features of the invention will be pointed out in the following description and claims and illustrated in the accompanying drawings, which disclose, by way of examples, the principles of the invention and the best mode, which has been contemplated of applying that principle.

In the drawings:

FIG. 5C shows the breakdown, in logical block form, of the READ/WRITE CONTROL CIRCUITS.

Figure 1:
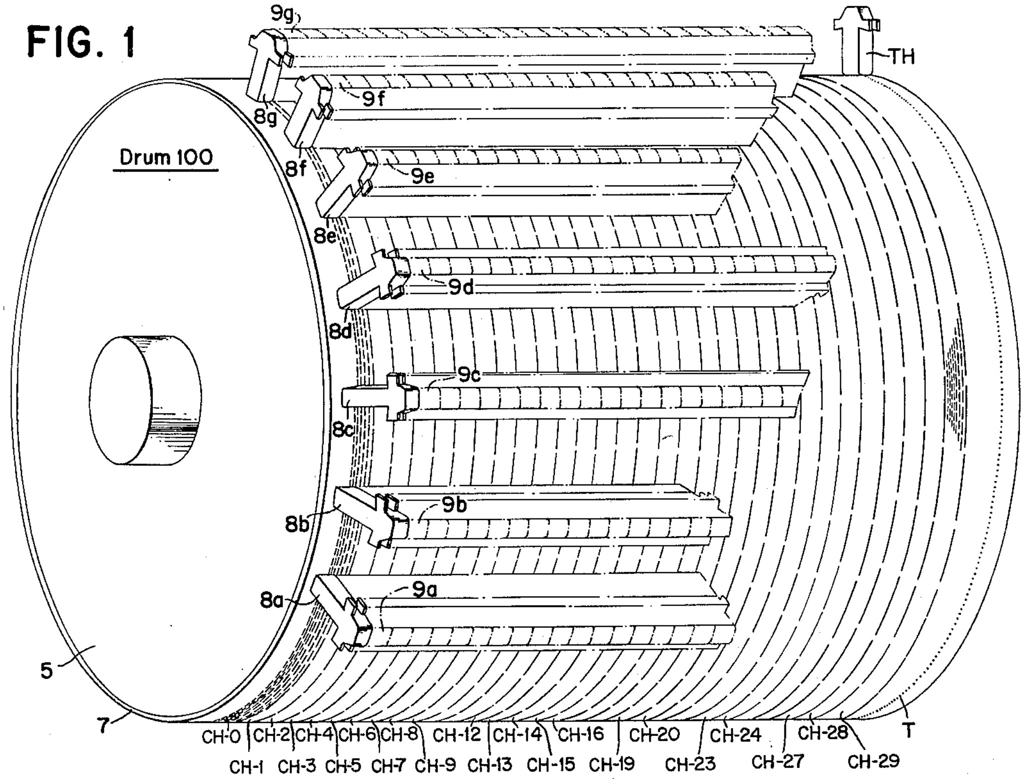
FIG. 1 illustrates the relationship between a magnetic DRUM, a TIMING head and associated READ/WRITE heads, as well as the theoretical CHANNEL division of the magnetic DRUM, the track division within a CHANNEL and the TIMING track T.
Figures 4, 5:
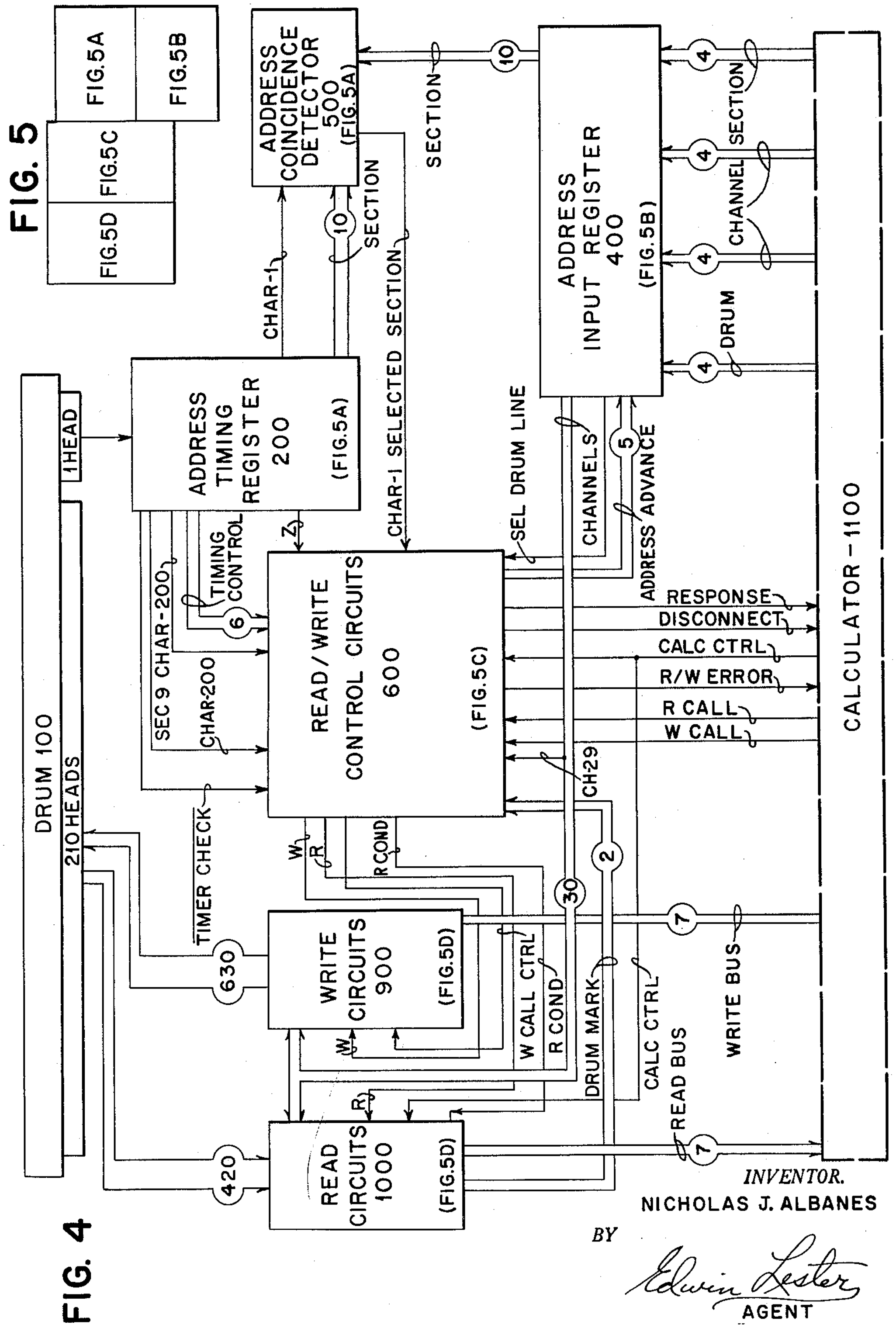
FIG. 4 is an overall block diagram illustrating the general arrangement and interconnections of the major components comprising the DRUM STORAGE UNIT.
FIG. 5 illustrates how FIGS. 5A to 5D, inclusive, may be placed to form a composite block diagram showing a breakdown, in logical block form, of the major components of the DRUM STORAGE UNIT.
Figure 5A:
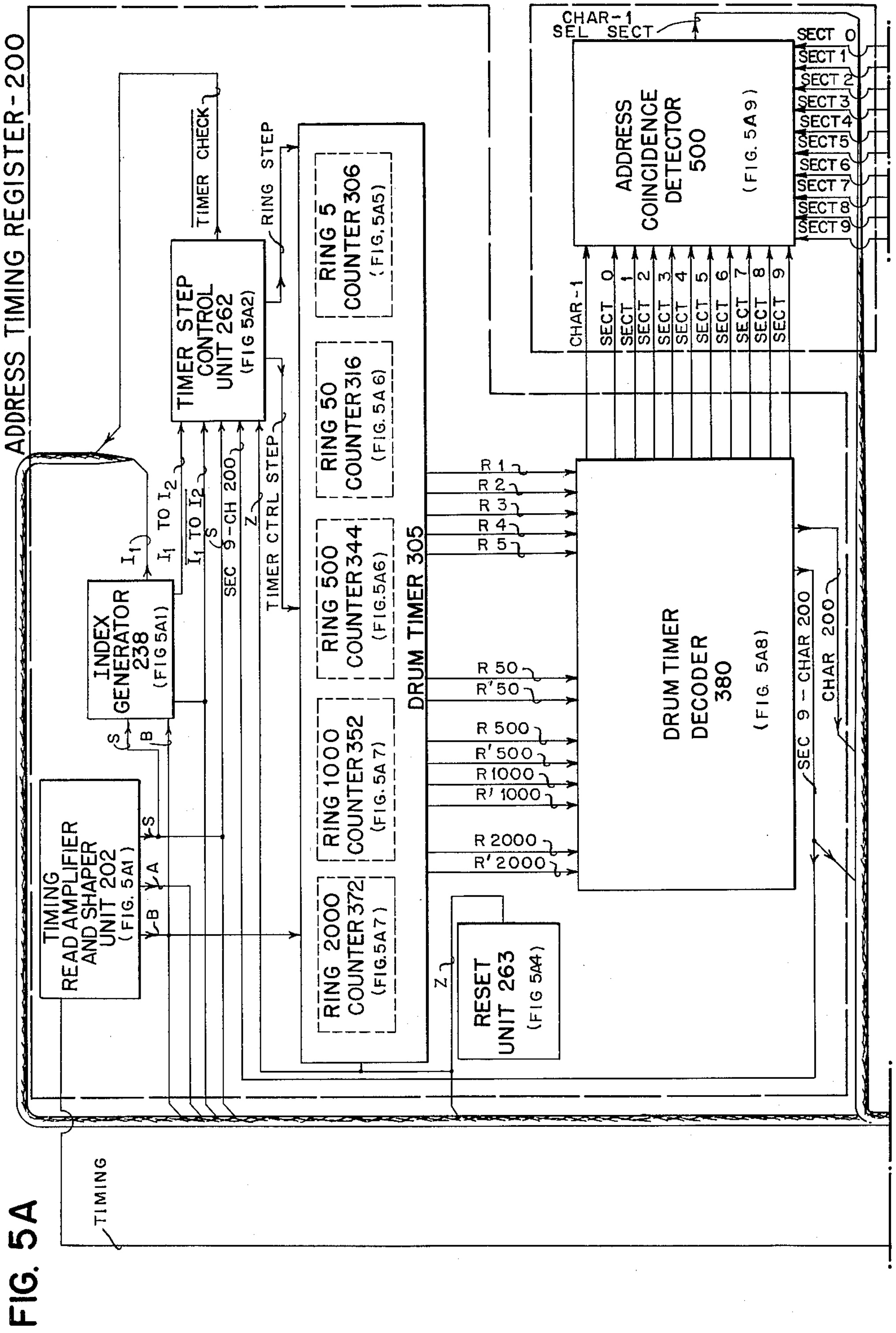
FIG. 5A shows the breakdown, in logical block form, of the ADDRESS TIMING REGISTER and the ADDRESS COINCIDENCE DETECTOR.

FIG. 5A1 illustrates in logical block form, the details of the TIMING READ AMPLIFIER and SHAPER UNIT and the INDEX GENERATOR of the ADDRESS TIMING REGISTER shown in FIG. 5A.

Figure 2:
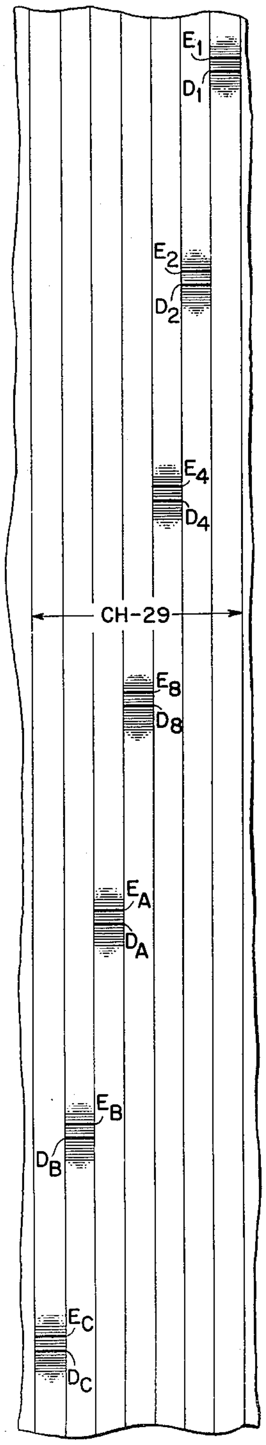
FIG. 2 illustrates the physical arrangement of DATA on a portion of a CHANNEL of the magnetic DRUM.

FIG. 5A2 shows in logical block form, the details of the TIMER STEP CONTROL UNIT of the ADDRESS TIMING REGISTER shown in FIG. 5A.

Figure 3:
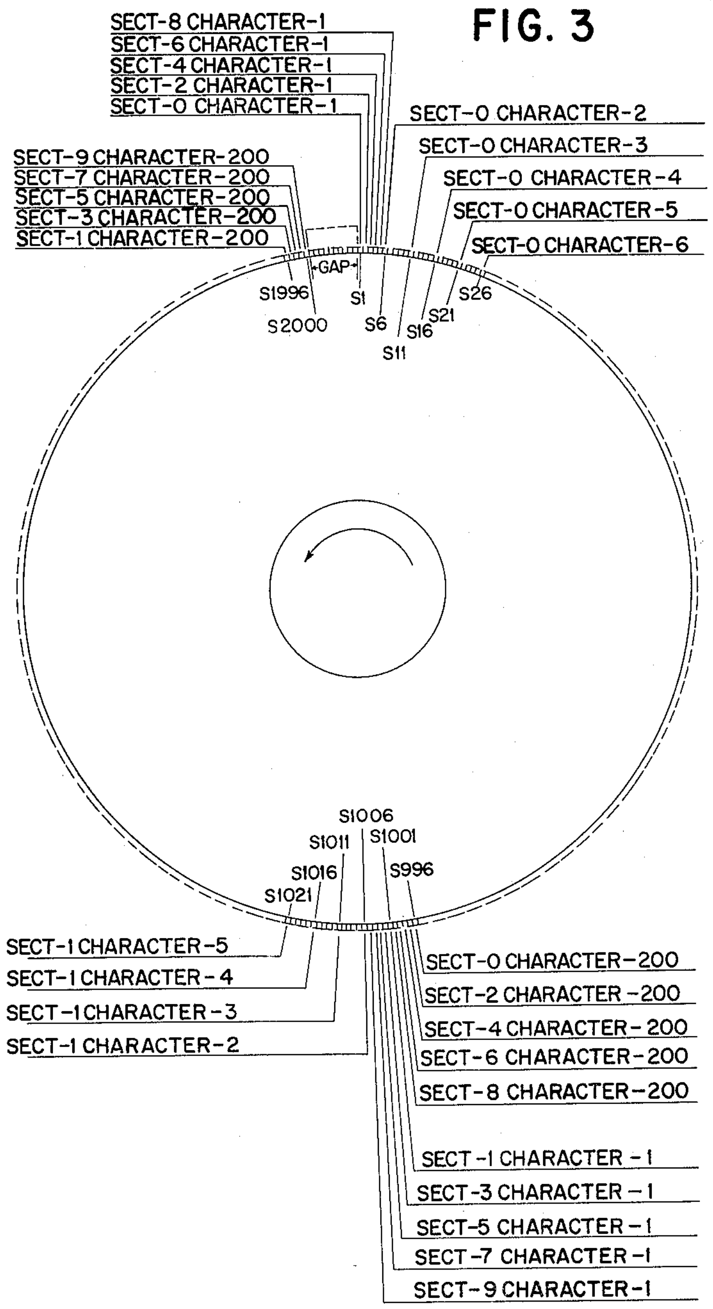
FIG. 3 illustrates the SECTIONAL and CHARACTER division of a CHANNEL of the magnetic DRUM.

FIG. 5A3 is a diagrammatic representation of various waveforms produced during the checking operation of the TIMER STEP CONTROL UNIT shown in FIG. 5A2.

FIG. 5A4 illustrates in logical block form the details of the RESET UNIT of the ADDRESS TIMING REGISTER shown in FIG. 5A.

FIG. 5A5 shows in logical block form the details of the RING 5 COUNTER of the ADDRESS TIMING REGISTER shown in FIG. 5A.

Figure 6:
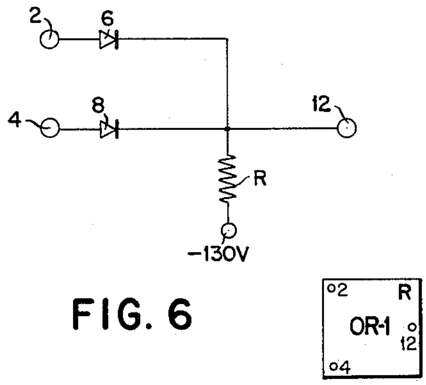

FIG. 5A6 illustrates in logical block form, the details of the RING 50 COUNTER and the RING 500 COUNTER of the ADDRESS TIMING REGISTER shown in FIG. 5A.

Figure 7:
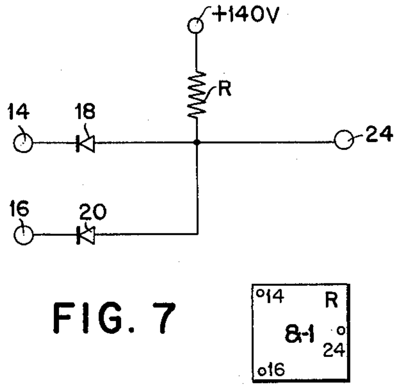

FIG. 5A7 shows in logical block form the details of the RING 1000 COUNTER and the RING 2000 COUNTER of the ADDRESS TIMING REGISTER shown in FIG. 5A.

Figure 8:
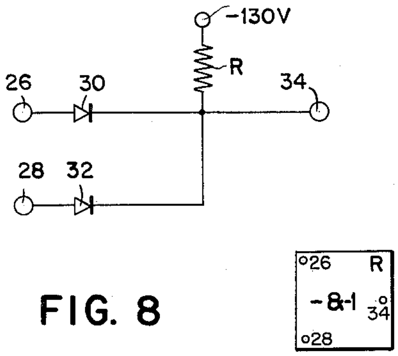

FIG. 5A8 shows in logical block form, the details of the DRUM TIMER DECODER of the ADDRESS TIMING REGISTER shown in FIG. 5A.

Figure 9:
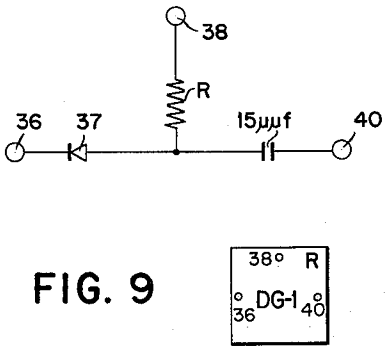

FIG. 5A9 illustrates in logical block form, the details of the ADDRESS COINCIDENCE DETECTOR shown in FIG. 5A.

Figure 5B:
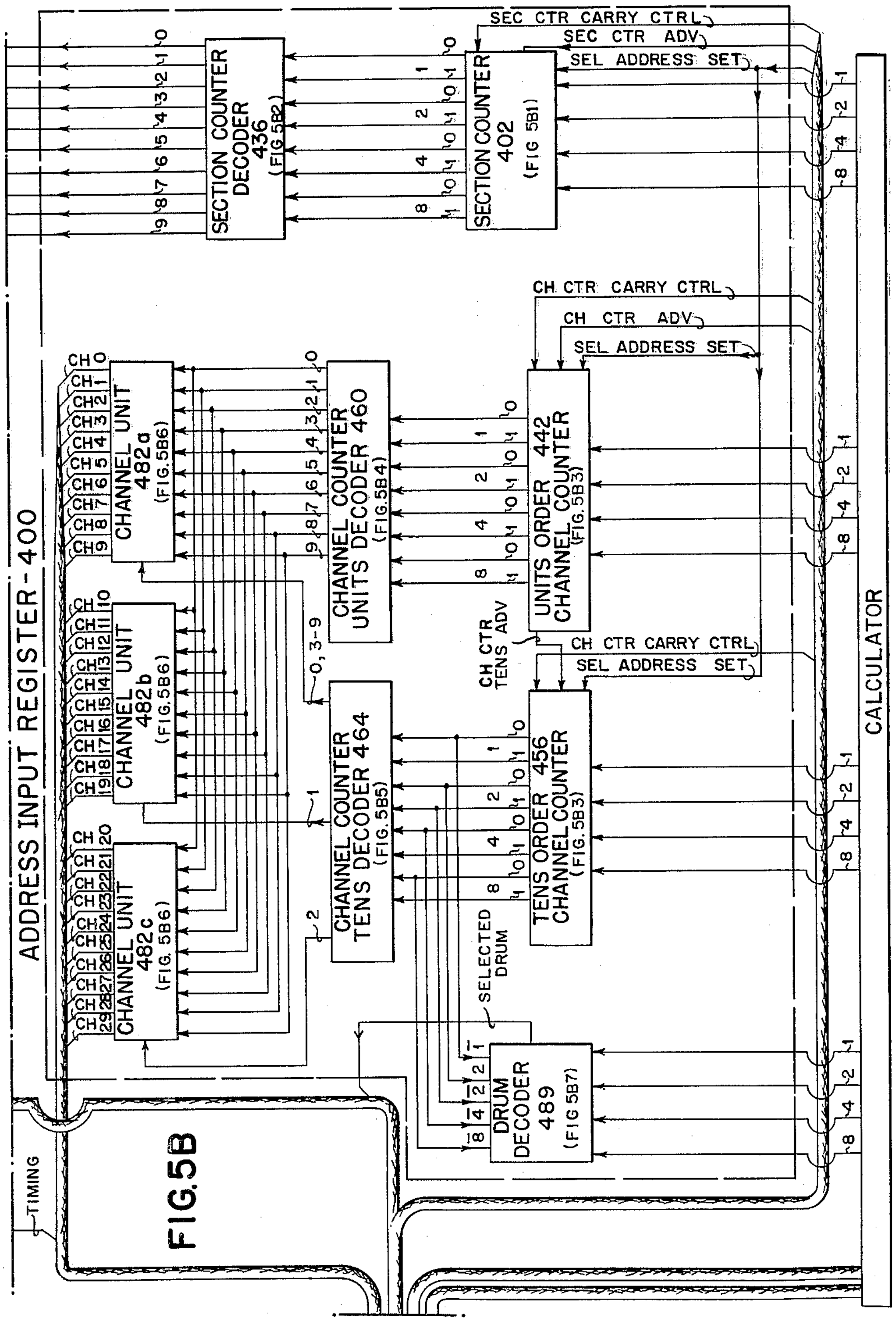
FIG. 5B illustrates the breakdown, in logical block form, of the ADDRESS INPUT REGISTER.

FIG. 5B1 shows in block form, the details of the SECTION COUNTER of the ADDRESS INPUT REGISTER shown in FIG. 5B.

FIG. 5B2 illustrates in logical block form, the details of the SECTION COUNTER DECODER of the ADDRESS INPUT REGISTER shown in FIG. 5B.

FIG. 5B3 shows in logical block form, the details of the CHANNEL COUNTER of the ADDRESS INPUT REGISTER shown in FIG. 5B.

FIG. 5B4 illustrates in logical block form the details of the CHANNEL COUNTER UNITS DECODER of the ADDRESS INPUT REGISTER shown in FIG. 5B.

FIG. 5B5 shows in logical block form the details of the CHANNEL COUNTER TENS DECODER of the ADDRESS INPUT REGISTER shown in FIG. 5B.

FIG. 5B6 illustrates in logical block form the details of the CHANNEL UNITS of the ADDRESS INPUT REGISTER shown in FIG. 5B.

FIG. 5B7 shows in logical block form, the details of the DRUM DECODER of the ADDRESS INPUT REGISTER shown in FIG. 5B.

FIG. 5C1 illustrates in logical block form, the details of the READ/WRITE CONDITION GENERATOR of the READ/WRITE CONTROL CIRCUITS shown in FIG. 5C.

FIG. 5C2 shows in logical block form, the details of the PRECESS RING COUNTER of the READ/WRITE CONTROL CIRCUITS shown in FIG. 5C.

FIG. 5C3 illustrates in logical block form the details of READ/WRITE SAMPLE GENERATOR of the READ/WRITE CONTROL CIRCUITS shown in FIG. 5C.

FIG. 5C4 shows in logical block form, the details of the RESPONSE DISCONNECT GENERATOR of the READ/WRITE CONTROL CIRCUITS shown in FIG. 5C.

FIG. 5C5 illustrates in logical block form the details of the END OPERATION CONTROL UNIT and the DISCONNECT RESET UNIT of the READ/WRITE CONTROL CIRCUITS shown in FIG. 5C.

FIG. 5C6 shows in logical block form the details of the END OF DRUM CHECK CONTROL UNIT of the READ/WRITE CONTROL CIRCUITS shown in FIG. 5C.

FIG. 5C7 shows in logical block form the details of the ADDRESS REGISTER COUNTER CONTROL UNIT of the READ/WRITE CONTROL CIRCUITS shown in FIG. 5C.

Figure 5D:
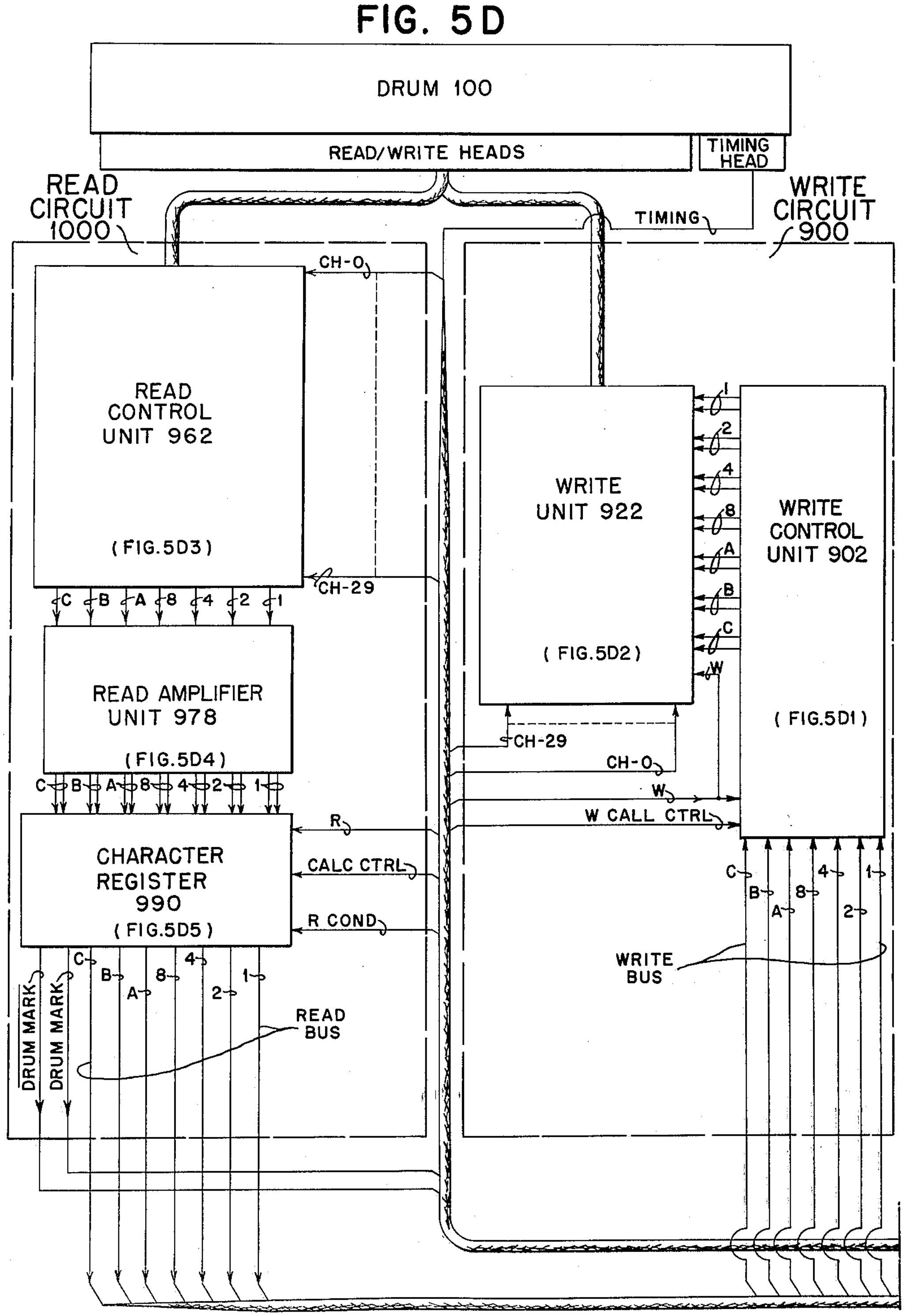
FIG. 5D illustrates the breakdown, in logical block form, of the WRITE CIRCUITS and READ CIRCUITS.

FIG. 5D1 illustrates in logical block form, the details of the WRITE CONTROL UNIT of the WRITE CIRCUITS shown in FIG. 5D.

FIG. 5D2 shows in logical block form the details of the WRITE UNIT of the WRITE CIRCUITS shown in FIG. 5D.

FIG. 5D3 illustrates in logical block form the details of the READ CONTROL UNIT of the READ CIRCUITS shown in FIG. 5D.

FIG. 5D4 shows in logical block form the details of the READ AMPLIFIER UNIT of the READ CIRCUITS shown in FIG. 5D.

FIG. 5D5 illustrates in logical block form the details of the CHARACTERS REGISTER of the READ CIRCUITS shown in FIG. 5D.

FIG. 6 shows both the block symbol and the schematic circuit of a standard positive OR circuit used in the invention.

FIG. 7 illustrates both the block symbol and the schematic circuit of a standard positive AND circuit used in the invention.

FIG. 8 illustrates both the block symbol and the schematic circuit of a negative AND circuit used in the invention.

FIG. 9 shows both the block symbol and the schematic circuit of a standard diode gate DG used in the invention.

Figure 10:
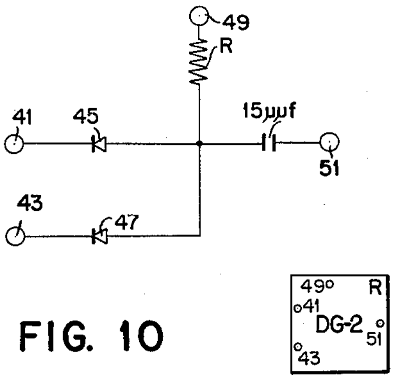

FIG. 10 illustrates both the block symbol and the schematic circuit of another type of diode gate DG used in the invention.

Figure 11:
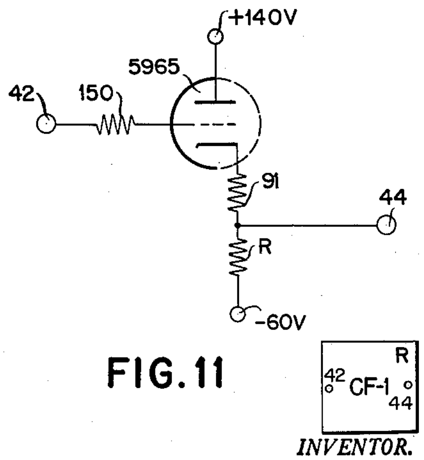

FIG. 11 shows both the block symbol and the schematic circuit of a standard cathode follower CF used in the invention.

FIGS. 12 to 21 illustrate both the block symbols and the schematic circuits of other types of cathode followers CF used in the invention.

Figure 22:
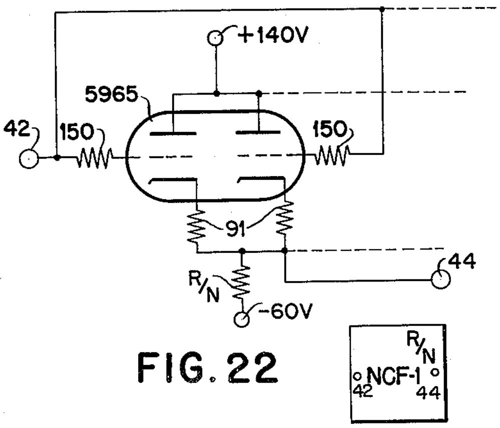
Figure 23:
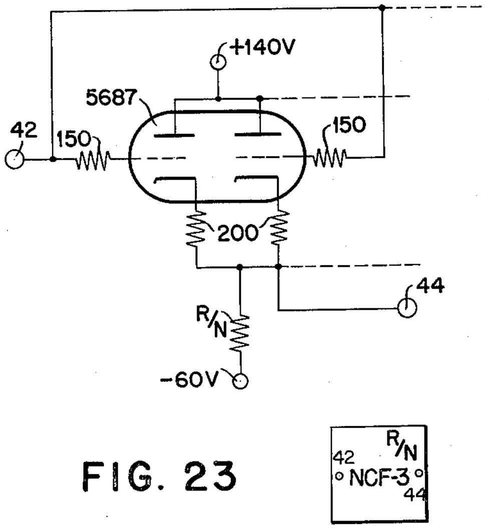
Figure 24:
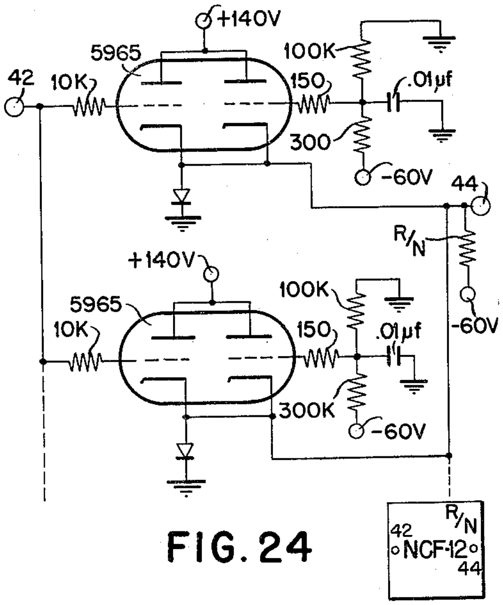

FIGS. 22 to 24 show both the block symbols and the schematic circuits of various parallel connected cathode followers NCF used in the invention.

Figure 25:
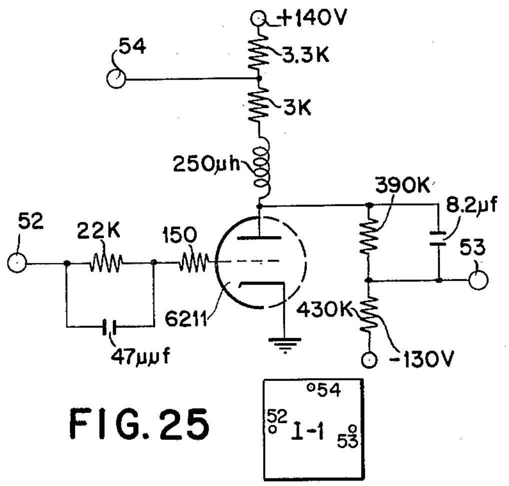

FIG. 25 illustrates both the block symbol and the schematic circuit of a standard inverter I used in the invention.

Figure 26:
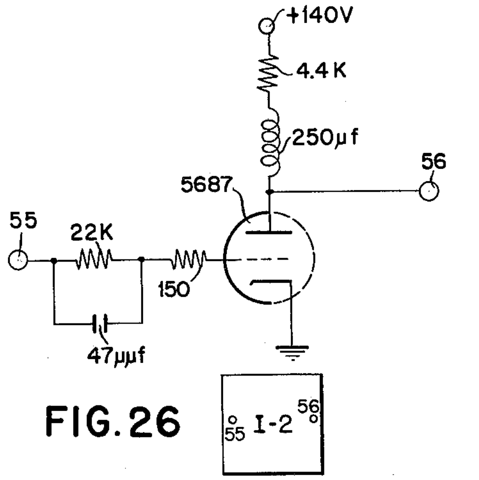
Figure 27:
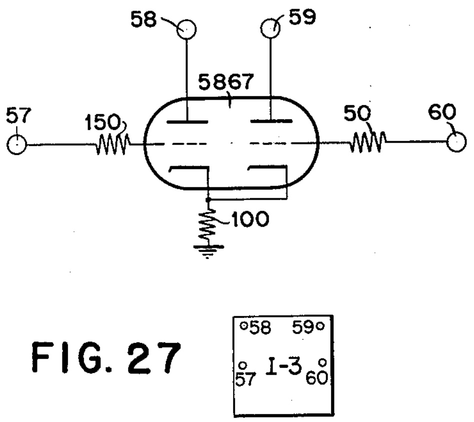
Figure 28:
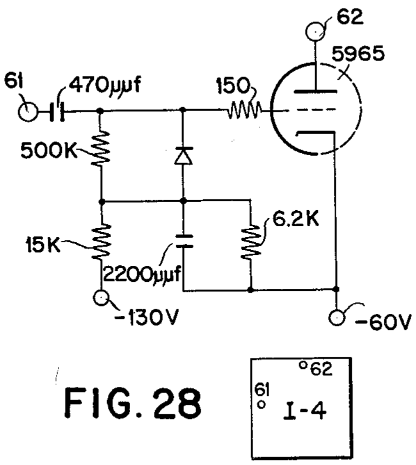

FIGS. 26 to 28 show both the block symbols and the schematic circuits of other types of inverters I used in the invention.

Figure 29:
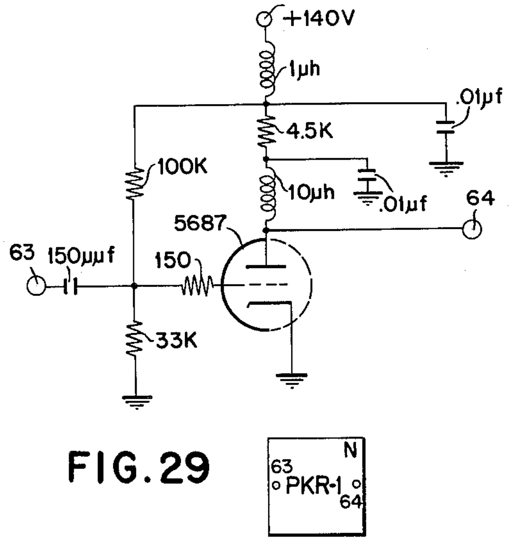

FIG 29 illustrates both the block symbol and the schematic circuit of a standard peaker PKR used in the invention.

Figure 30:
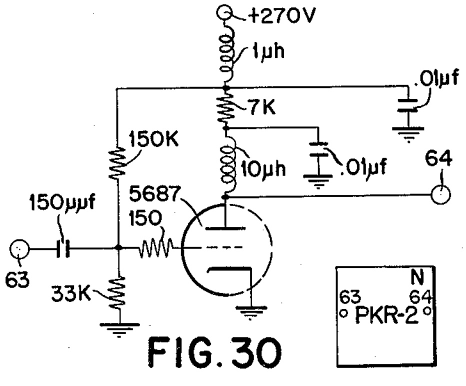

FIGS. 30 and 31 show both the block symbols and the schematic circuits of other types of peakers PKR used in the invention.

FIG. 32 illustrates both the block symbol and the schematic circuit of a pre-amplifier PA used in the invention.

FIG. 33 illustrates both the block symbol and the schematic circuit of a standard drum amplifier DA used in the invention.

FIG. 34 shows both the block symbol and the schematic circuit of another type of drum amplifier DA used in the invention.

Figures 35, 36, 37:
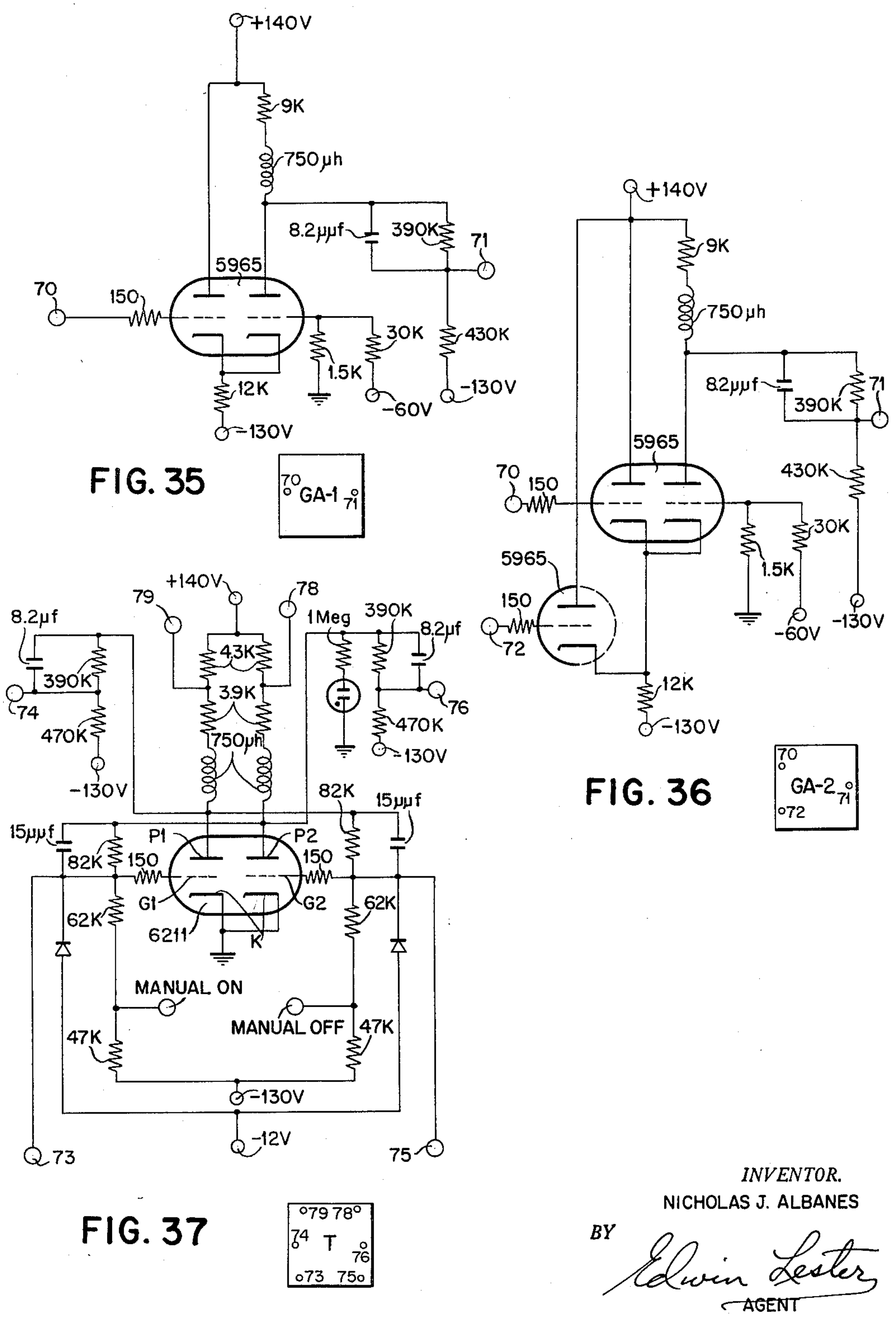

FIG. 35 illustrates both the block symbol and the schematic circuit of a standard grounded grid amplifier GA used in the invention.

FIG. 36 shows both the block symbol and the schematic circuit of another type of grounded grid amplifier GA used in the invention.

FIG. 37 illustrates both the block symbol and the schematic circuit of a standard trigger T used in the invention.

FIGS. 38 to 42 show both the block symbols and the schematic circuits of the standard trigger T connected with various types of input circuits used in the invention.

Figure 43:
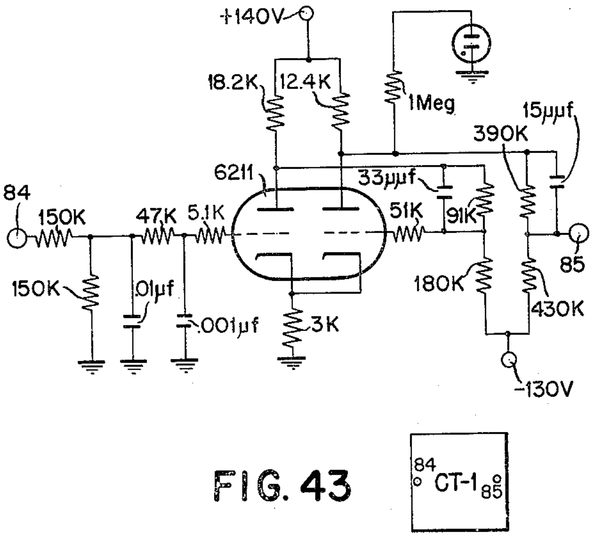

FIG. 43 illustrates both the block symbol and the schematic circuit of a standard contact operated trigger CT used in the invention.

Figure 44:
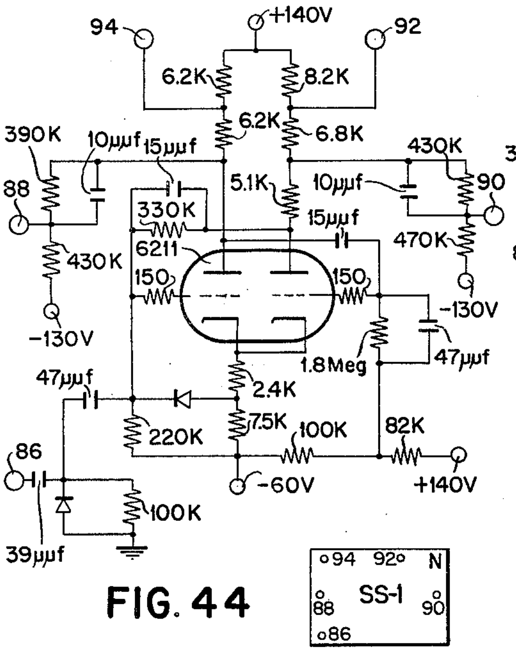

FIG. 44 illustrates both the block symbol and the schematic circuit of a standard single shot multivibrator SS used in the invention.

Figure 45:
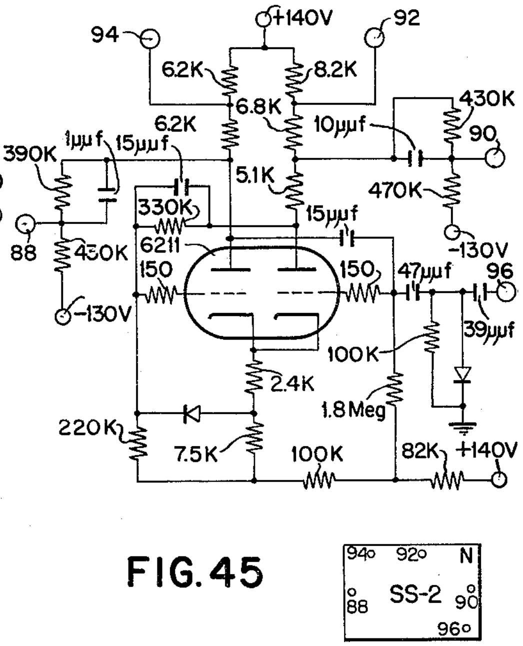
Figure 46:
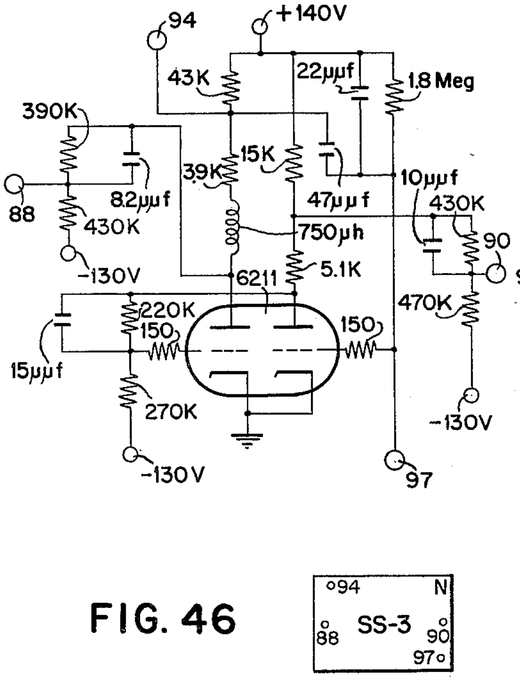

FIGS. 45 to 46 show both the block symbols and the schematic circuits of other types of single shot multivibrators SS used in the invention.

Figure 47:
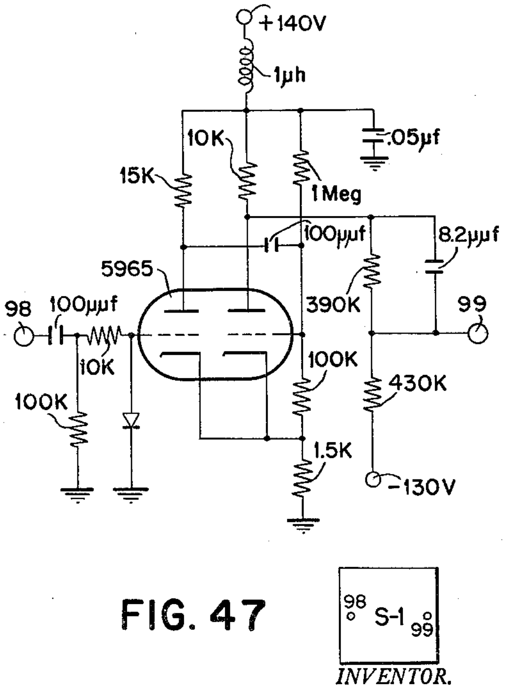

FIG. 47 illustrates both the block symbol and the schematic circuit of a standard shaper S used in the invention.

Figure 48:
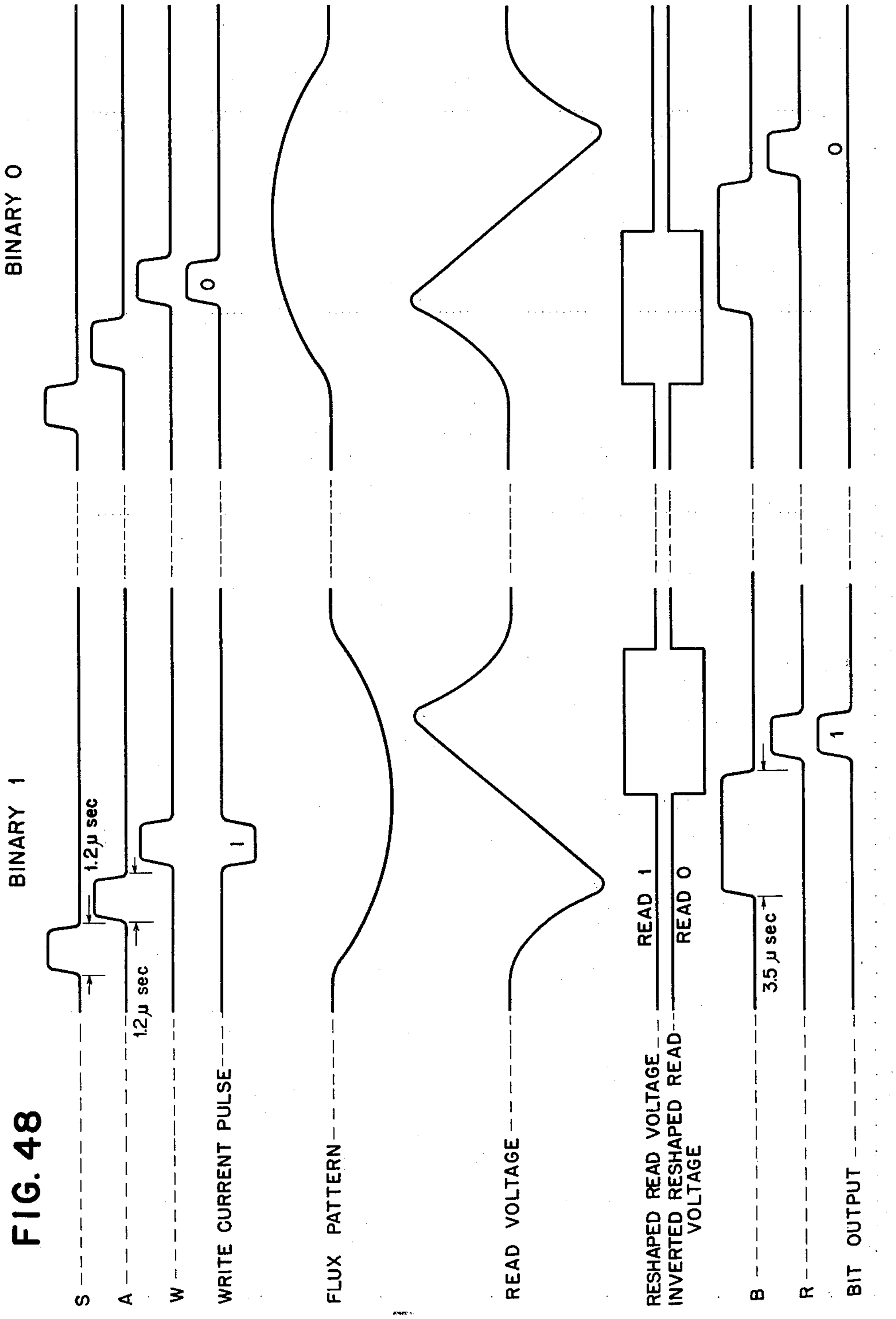

FIG. 48 is a diagrammatic representation of various timing waveforms and flux distribution patterns produced during a WRITING and READING of a binary 1 or a binary 0.

Figure 49A:
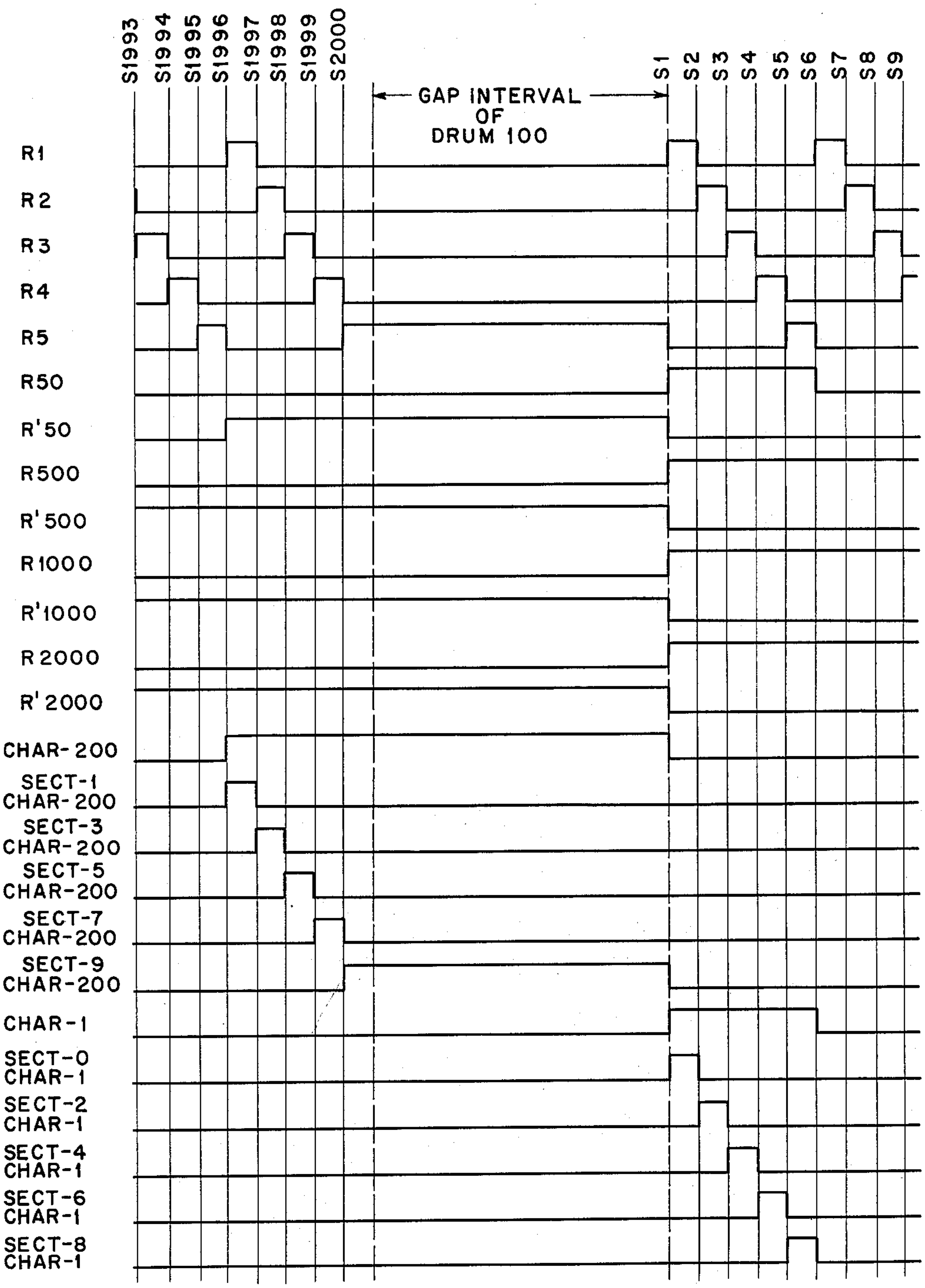
Figure 49B:
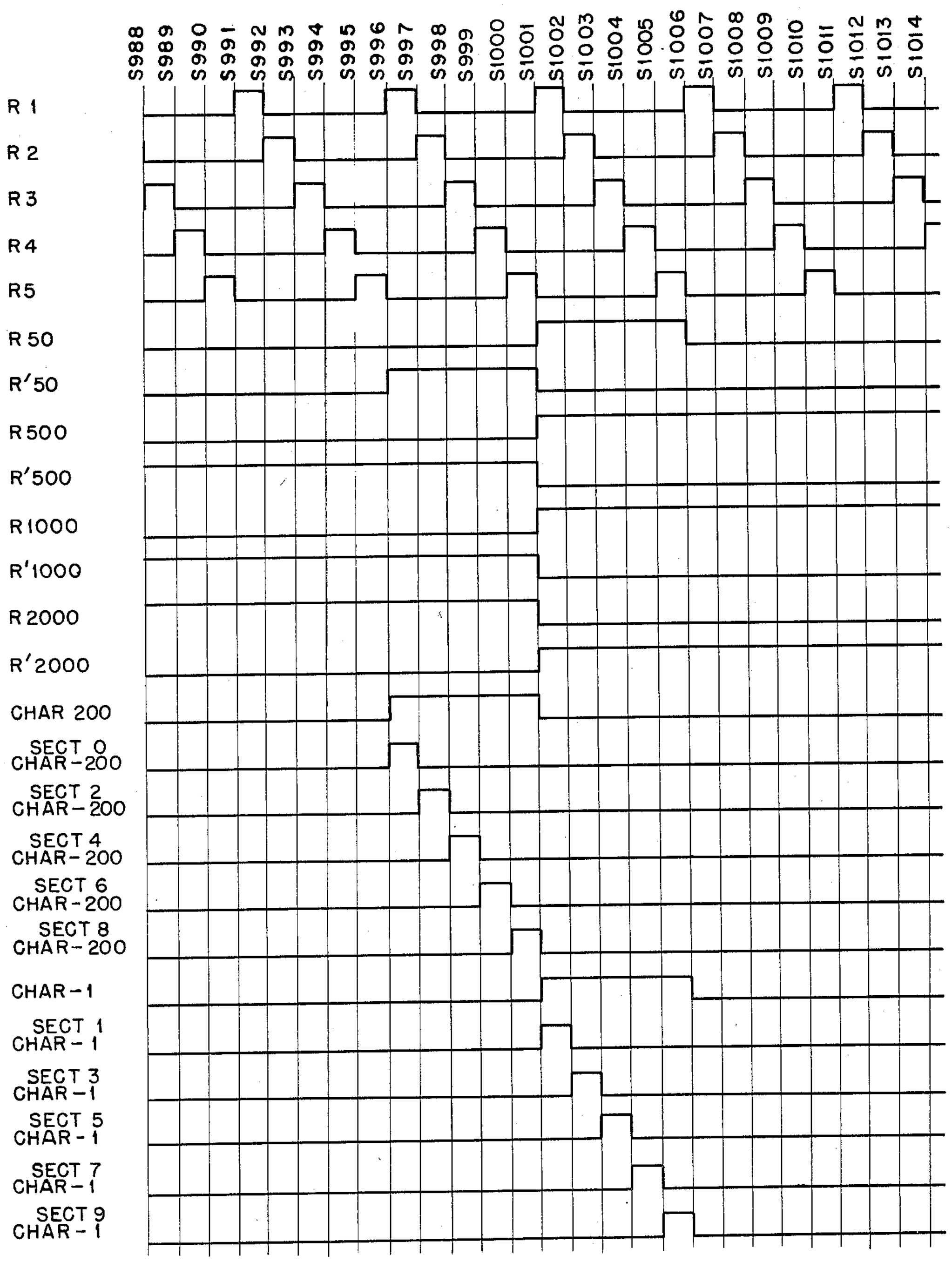

FIGS. 49A and 49B are diagrammatic representations of various waveforms produced, during certain portions of each DRUM revolution, by the DRUM TIMER and the DRUM TIMER DECODER of the ADDRESS TIMING REGISTER shown in FIG. 5A.

FIGS. 50A to 50D are diagrammatic representations of various waveforms produced during a WRITE operation of the DRUM STORAGE UNIT.

Figure 51A:
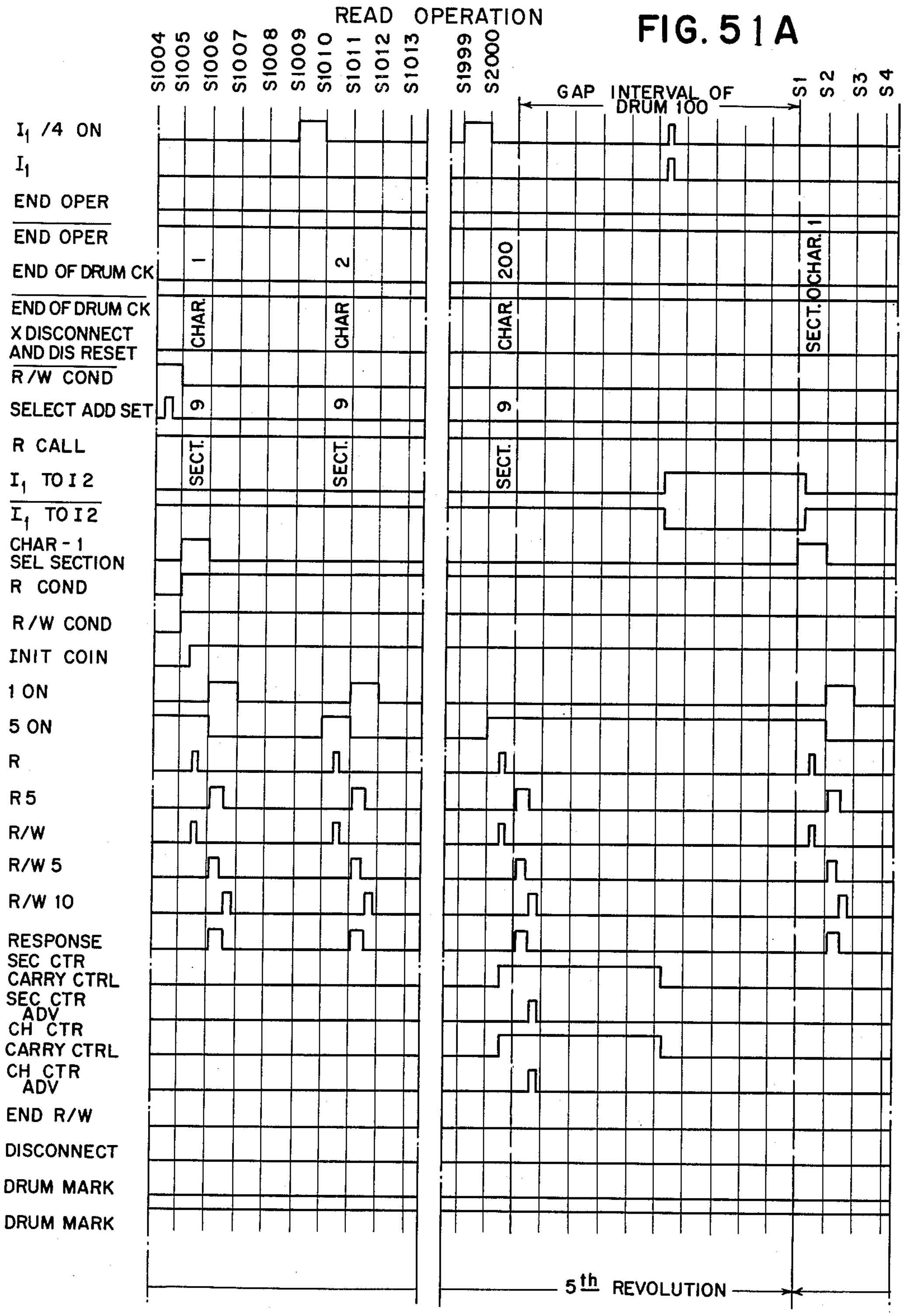
Figure 51B:
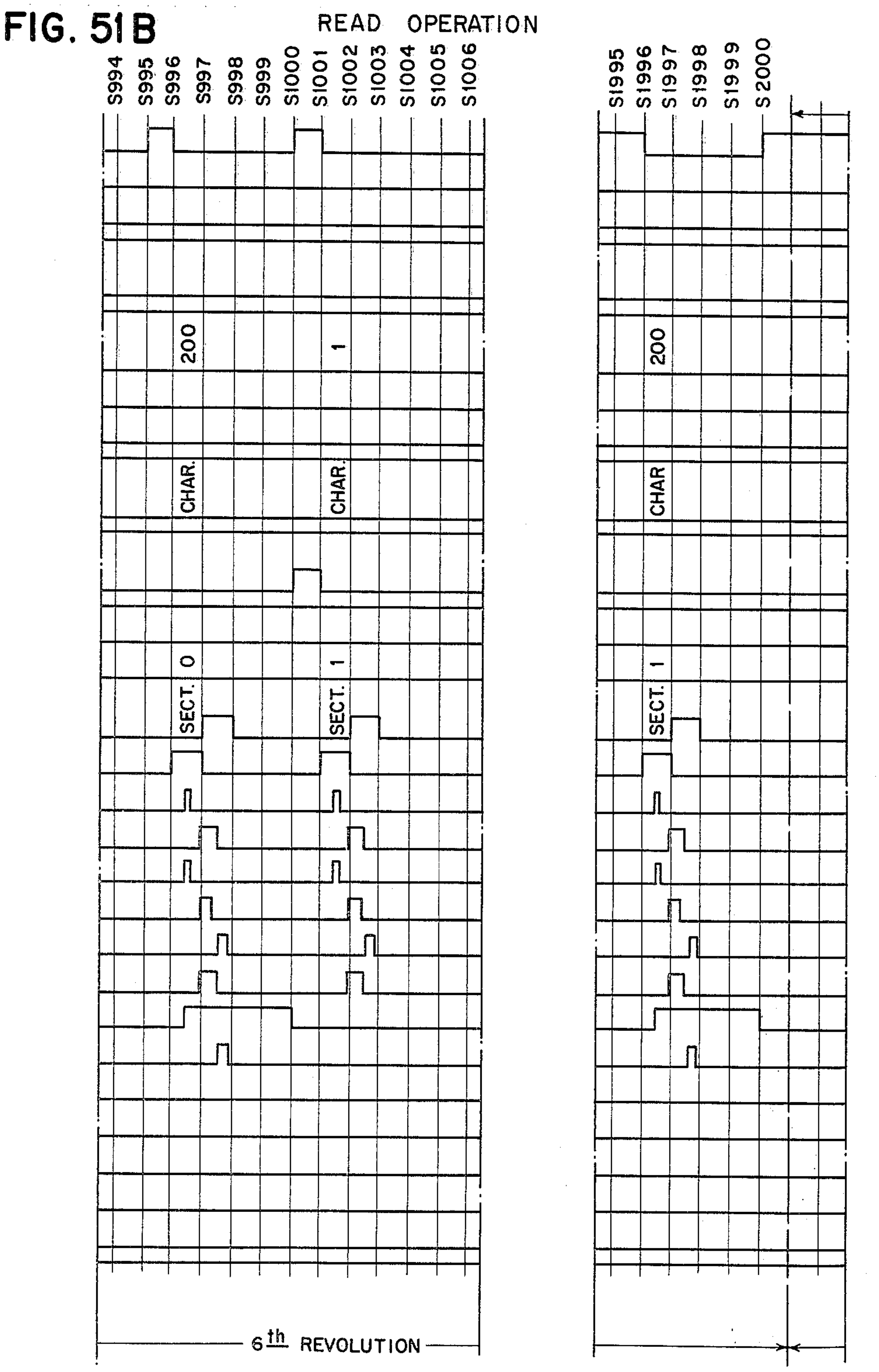
Figure 51C:
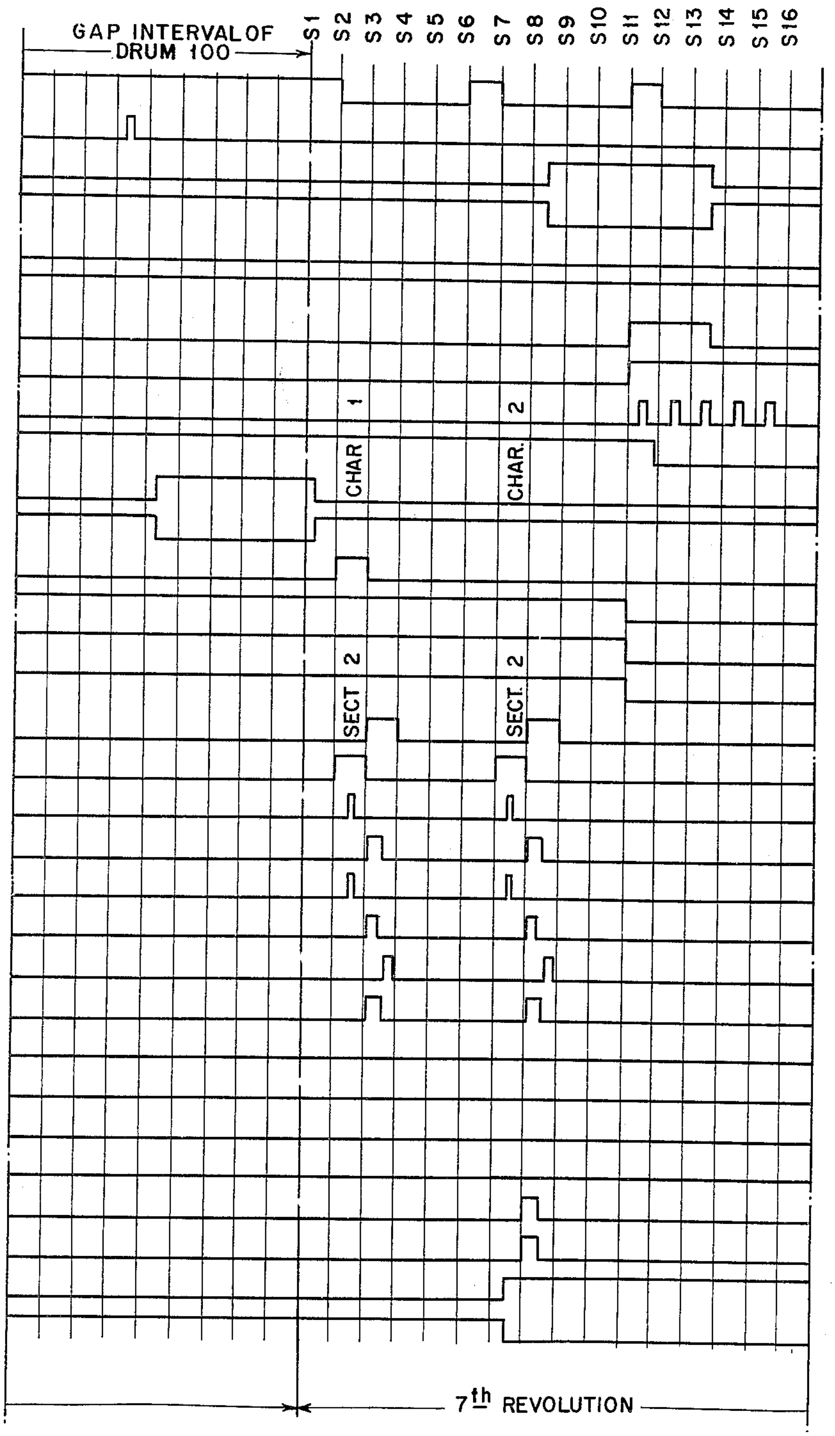

FIGS. 51A to 51C are diagrammatic representations of various waveforms produced during a READ operation of the DRUM STORAGE UNIT.

*Introduction*

The essential element of the DATA STORAGE UNIT of the present invention is a precision-built DRUM 100 shown schematically in FIG. 1

Certain materials have the property of retaining a given magnetization even after the magnetizing source is removed. Consequently, the DRUM 100 is coated with a cobalt and nickel composition 7 to provide a magnetic surface, which, because of its retentive property, may be utilized for storing large blocks of DATA. Thus, the magnetically coated DRUM 100 provides a desirable STORAGE UNIT for a DATA PROCESSING MACHINE.

Physically, the DRUM 100 has an axial length of 12.5 inches, a diameter of 10.7 inches. Additionally, the DRUM 100 has a circumference of 33.6 inches and a surface speed of 2090 inches per second so that it rotates at 3730 r.p.m., with one DRUM revolution requiring 16.08 milliseconds.

*Form and coding of data*

The basic unit of DATA is a CHARACTER which may be a decimal digit, an alphabetic letter or a symbol, as for example, the decimal digit 7, the letter A, or the symbol #. The next larger grouping of DATA is a WORD which may be comprised of any desired number of CHARACTERS. Further, a WORD may be composed solely of numerical CHARACTERS, as for example, the date 09 27 54, or solely of alphabetic CHARACTERS, as for example, the name JOHN JONES, or an alphanumeric mixture of CHARACTERS, as for example, the address 1701 SMITH STREET, or a numeric and symbolic mixture of CHARACTERS, as for example, a specific quantity of items +702. The next larger grouping of DATA is a RECORD which may be comprised of any desired number of related words containing an alphanumeric and symbolic mixture of CHARACTERS. Thus, for example, a RECORD may contain an order as follows, 092754 JOHN JONES 1701 SMITH STREET +702.

In the unit of the present invention, DATA is coded according to the binary system of notation as many of the basic circuits of the unit assume two stable states and therefore, are well suited to such a system of notation. Consequently, each CHARACTER of DATA, whether it be alphabetic, numeric or symbolic, is represented in binary form by a code consisting of seven binary digits or bits labeled CBA8421 as for example:

| | C | B | A | 8 | 4 | 2 | 1 |
|---|---|---|---|---|---|---|---|
| A= | 1 | 1 | 1 | 0 | 0 | 0 | 1 |
| 7= | 1 | 0 | 0 | 0 | 1 | 1 | 1 |
| #= | 1 | 0 | 0 | 1 | 0 | 1 | 1 |

The four bits corresponding to the decimal digits 8421 are the digit part of the CHARACTER. The two bits corresponding to the alphabetic CHARACTERS BA are the zone part of the CHARACTER and are used to identify the significance of the digit part of the CHARACTER. Thus, since two bits can have four possible combinations, namely, 00, 01, 10 and 11, they may be used with the same digit part to designate four different CHARACTERS, as for example:

| | C | B | A | 8 | 4 | 2 | 1 |
|---|---|---|---|---|---|---|---|
| 2= | 1 | 0 | 0 | 0 | 0 | 1 | 0 |
| S= | 0 | 0 | 1 | 0 | 0 | 1 | 0 |
| K= | 0 | 1 | 0 | 0 | 0 | 1 | 0 |
| B= | 1 | 1 | 1 | 0 | 0 | 1 | 0 |

The seventh bit corresponding to the alphabetic CHARACTER C is the redundancy check bit which is made 0 or 1 so as to give an even number of 1 bits for every CHARACTER of DATA. In other words, if any one of the seven bits of a CHARACTER should be changed by some disturbance or machine failure the count of 1 bits would no longer be even and the error would be detected by the machine. Thus, with this coding arrangement, the 26 CHARACTERS of the alphabet, the 10 decimal digits and a predetermined number of symbols may be represented by the seven bit system of notation. Additionally, each RECORD of DATA is followed by a specific CHARACTER code, hereinafter referred to as either a RECORD MARK CHARACTER or a DRUM MARK CHARACTER, as for example:

RECORD MARK CHARACTER—1011010
DRUM MARK CHARACTER—0000000

The RECORD MARK CHARACTER always follows the last CHARACTER of a RECORD stored in the CALCULATOR, while the DRUM MARK CHARACTER always follows the last CHARACTER of a RECORD stored on the DRUM 100. Since these CHARACTERS always follow the last CHARACTER of a RECORD they are utilized to indicate the END of a RECORD of DATA. Thus, the RECORD MARK CHARACTER occurring at the end of a WRITE operation, that is, after a RECORD of DATA has been transferred from the CALCULATOR to the DRUM 100, is not WRITTEN on the DRUM 100 but instead causes the CALCULATOR to signal the DRUM STORAGE UNIT to write a DRUM MARK CHARACTER. Likewise, the DRUM MARK CHARACTER occurring at the end of a READ operation, that is, after a RECORD of DATA has been transferred from the DRUM 100 to the CALCULATOR, is not READ by the CALCULATOR but instead causes the DRUM STORAGE UNIT to signal the CALCULATOR to store a RECORD MARK CHARACTER.

The DRUM STORAGE UNIT of the present invention operates in a parallel-by-bit, serial-by-character fashion, in other words, CHARACTERS are read or written sequentially, while all the bits of each CHARACTER are read or written simultaneously.

*Logical division of the drum*

Referring again to FIG. 1, the DRUM 100 is theoretically divided into 30 informaion CHANNELS CH–0 to CH–29, each of which extends circumferentially about the DRUM 100 and parallel to each other. Each CHANNEL, in turn, is divided into 7 tracks, with a track-to-track spacing of .050 inch, corresponding to the seven bit code being used by the unit, as shown by the partial division of CHANNELS 0 and 29. Each CHANNEL is theoretically divided in a similar fashion such that the DRUM 100 is provided with a total of 210 information tracks. An additional track, namely, the timing track T also extends circumferentially about the DRUM 100 and is parallel to the other tracks. The timing track T is produced by electro etching teeth in the cobalt-nickel composition 7 so as to provide 2000 equally alternate magnetic and nonmagnetic surfaces as shown by the magnified cross section in FIG. 1A.

Referring again to FIG.1, 210 READ/WRITE heads are provided, corresponding to the 210 information tracks of the DRUM 100. However, since the track-to-track spacing is .050 inch, the READ/WRITE heads of each CHANNEL are physically offset from one another. Thus, the READ/WRITE heads are arranged into 7 lines of 30 READ/WRITE heads, each line extending axially of the DRUM 100 and spaced 18° apart. Each READ/WRITE head, in any one particular line, corresponds to one track in each of the 30 CHANNELS CH–0 to CH–29. More particularly, READ/WRITE head 8*a* is associated with the first track of CHANNEL CH–0, while READ/WRITE head 9*a* is associated with the first track of CHANNEL CH–1, READ/WRITE head 8*b* is associated with the second track of CHANNEL CH–0, while READ/WRITE head 9*b* is associated with the second track of CHANNEL CH–1; READ/WRITE heads 8*c*, 8*d*, 8*e*, 8*f* and 8*g* are associated with the third, fourth, fifth, sixth and seventh tracks of CHANNEL CH–0, while READ/WRITE heads 9*c*, 9*d*, 9*e*, 9*f* and 9*g* are associated with the third, fourth, fifth, sixth and seventh tracks of CHANNEL CH–1. Thus, the READ/WRITE heads may be thought of as being arranged in the form of a helix extending approximately 108° of the DRUM circumference. An addiitonal timing head TH is associated with the timing track T.

Referring again to FIG. 1A, a READ/WRITE head is composed of the READ/WRITE coils 20, which are wound on a laminated core 22. The laminated core 22 is provided with a pivot 18 and is forced toward the DRUM 100 by the spring 14. Additionally, an adjusting screw 12 is provided such that when it is desired to maintain a clearance between the READ/WRITE head and the DRUM 100, the adjusting screw 12 is turned in and pushes against the right end of the laminated core 22 forcing the laminated core 22 to rotate about the pivot 18 and away from the DRUM 100. A housing 24 is provided in which the entire READ/WRITE head assembly is mounted. The READ/WRITE head to DRUM spacing is approximately .0005 inch to .001 inch.

Referring now to FIG. 2, a portion of CHANNEL CH–29 is shown to illustrate the physical arrangement of DATA on the DRUM 100. Each track of the CHANNEL is divided along its peripheral dimension into 2010 rectangular shaped areas termed cell areas, each of which stores a bit of information expressed as the presence of a given direction of magnetic polarization. Only 2000 cell areas, corresponding to the 2000 timing track areas, are utilized for storing bits of DATA while the period of the remaining ten cell areas is used for switching between DRUM CHANNELS and for precessing, as will be explained hereinafter. Thus, each CHANNEL of the DRUM 100 is capable of storing 2000 CHARACTERS and since there are 30 CHANNELS the DRUM 100 has a capacity of 60,000 CHARACTERS. Further, since the 7 READ/WRITE heads associated with each CHANNEL of the DRUM 100, is physically offset from each other, the 7 bits of each CHARACTER of DATA is likewise physically offset from each other as indicated by the CHARACTERS D and E in the tracks of CHANNEL CH–29. However, it should be remembered, that, though the 7 cell areas corresponding to the 7 bits of each CHARACTER of DATA are physically offset from each other, the 7 bits are read or written simultaneously.

The DRUM STORAGE UNIT of the present invention may be utilized as an INPUT/OUTPUT UNIT of a CALCULATOR, both of which combined form a DATA PROCESSING MACHINE. The CALCULATOR may have a basic character cycle of approximately 23 to 35 microseconds whereas the DRUM STORAGE UNIT of the present invention has a basic cycle of 8 microseconds (it being remembered that the DRUM 100 makes one revolution every 16.08 milliseconds and the peripheral dimension being divided into 2,010 cell areas such that each cell area has a period of 8 microseconds) such that they are asynchronous. However, this presents no problem as it is only necessary to provide a DRUM CHARACTER reading or writing rate having a period long enough to permit the CALCULATOR to process each CHARACTER transmitted thereto by the DRUM STORAGE UNIT. Thus, if the CALCULATOR operates with a basic cycle of 23 to 35 microseconds, a DRUM CHARACTER rate of 40 microseconds may be selected for the DRUM STORAGE UNIT, permitting a reading or writing operation every fifth cell area position inasmuch as the DRUM STORAGE UNIT has a basic cycle of 8 microseconds.

Referring now to FIG. 3, a lay-out is illustrated, which in simplified form illustrates the basic principle of operation in ADDRESS SELECTION, as employed in the novel means of the present invention, in which the DRUM 100 provides storage space for 60,000 CHARACTERS. The numbers within the circumference are cell area numbers corresponding to any one track and identifying physically adjacent CHARACTER locations. Additionally, each CHANNEL is divided into 10 SECTIONS, each SECTION containing 200 CHARACTERS. Hence, with a basic cycle of 8 microseconds and a selected DRUM CHARACTER rate of 40 microseconds, the bits of each succeeding CHARACTER of a RECORD of DATA are read from or written into each succeeding fifth areas. For example, during a WRITE operation, the first CHARACTER of a RECORD may be stored in the first cell areas, designated S1, which corresponds to the first CHARACTER position of SECTION 0; thereafter each succeeding CHARACTER of the RECORD is stored in each succeeding fifth cell areas, so that the second CHARACTER of the RECORD is stored in the sixth cell areas S6 or the second CHARACTER position of SECTION 0, the third CHARACTER of the RECORD is stored in the eleventh cell areas S11 or the third CHARACTER position of SECTION 0; the fourth CHARACTER is stored in the sixteenth cell areas S16 or the fourth CHARACTER position of SECTION 0; the fifth CHARACTER is stored in the twenty-first cell areas S21 or the fifth CHARACTER position of SECTION 0, etc. The 200th CHARACTER of the RECORD is stored in the nine hundred and ninety-sixth cell areas S996 or the two hundredth and last CHARACTER position of SECTION 0. The next CHARACTER of the RECORD is stored in the S1001 cell areas or the first CHARACTER position of SECTION 1. Thus, in a similar fashion the second group of 200 CHARACTERS are stored in the 200 CHARACTER positions of SECTION 1 with the last CHARACTER being stored in the S1996 cell areas. The next CHARACTER of the RECORD would normally be stored in the next succeeding fifth cell areas, however, it is noted that the next succeeding fifth cell areas falls within the gap area which is not used for DATA STORAGE. The next useful group of cell areas is that corresponding to S1 in which the first CHARACTER of the RECORD is presently stored. By a novel precessing arrangement of the present system reading or writing is suppressed during the period S1 so that the next CHARACTER is stored in S2 or the first CHARACTER position of SECTION 2. In a manner as previously described, the next two groups of 200 CHARACTERS each, are stored in SECTIONS 2 and 3. After the last CHARACTER is stored in SECTION 3, another precession operation occurs and the next CHARACTER of the RECORD is stored in the S3 cell areas or the first CHARACTER position of SECTION 4. This process continues, with the odd SECTIONS filling one half of the CHANNEL and the even SECTIONS filling the other half, until the S2000 cell areas or the two hundredth CHARACTER position of SECTION 9, the last SECTION of the CHANNEL. During the period of the 10 cell areas, corresponding to S2001 to S2010, the precessing operation is suppressed, as will be explained hereinafter, and the CHANNELS are switched from CHANNEL CH–$n$ to CH–$n+1$ with the next CHARACTER of the RECORD being stored in the cell areas S1, corresponding to the first CHARACTER position of SECTION 0 of CHANNEL CH–$n+1$.

Each SECTION of the 300 SECTIONS of the DRUM 100 has its own ADDRESS, and the ADDRESS may arbitrarily range from 1000 to 1299. The thousand digit of the ADDRESS designates a particular INPUT/OUTPUT UNIT, such as the DRUM STORAGE UNIT of the present invention; the hundreds and tens digit of the ADDRESS designates a particular CHANNEL of the DRUM in the selected DRUM STORAGE UNIT, while the units digit of the ADDRESS designates a particular SECTION of the previously designated CHANNEL of the DRUM in the selected DRUM STORAGE UNIT. Thus, for example, the ADDRESS 1017 is the location of the SECTION 7 in CHANNEL 1 of the first DRUM STORAGE UNIT. The succeeding addressing system is illustrated in the following for CHANNEL CH–0 and CH–1.

| | | | | | | | | | | |
|---|---|---|---|---|---|---|---|---|---|---|
| ADDRESS | 1000 | 1001 | 1002 | 1003 | 1004 | 1005 | 1006 | 1007 | 1008 | 1009 |
| CH–0 | Sec. 0 | Sec. 1 | Sec. 2 | Sec. 3 | Sec. 4 | Sec. 5 | Sec. 6 | Sec. 7 | Sec. 8 | Sec. 9 |
| ADDRESS | 1010 | 1011 | 1012 | 1013 | 1014 | 1015 | 1016 | 1017 | 1018 | 1019 |
| CH–1 | Sec. 0 | Sec. 1 | Sec. 2 | Sec. 3 | Sec. 4 | Sec. 5 | Sec. 6 | Sec. 7 | Sec. 8 | Sec. 9 |

Since there are 10 SECTIONS per CHANNEL and 30 CHANNELS on the DRUM 100, only 300 ADDRESSES, namely, ADDRESSES 1000 to 1299, need be assigned to locate any particular SECTION of the DRUM 100.

*Form and coding of instructions*

A DATA PROCESSING MACHINE generally operates according to a PROGRAM consisting of a series of instructions, which may be ARITHMETIC instructions, TRANSFER instructions, SHIFT instructions, INPUT/OUTPUT instructions, etc. An instruction, whether it be an INPUT/OUTPUT instruction or otherwise, consists of five characters divided into two specific parts. The first part is a single CHARACTER, called the OPERATION part, while the other part, consisting of the remaining four CHARACTERS is called the ADDRESS part. INPUT/OUTPUT instructions are a two step process. Assuming that the DATA PROCESSING MACHINE has several DRUM STORAGE UNITS associated with it: ADDRESSES 1000 to 1299 pertain to the SECTIONS of the first UNIT; ADDRESSES 1300 to 1599 pertain to the SECTIONS of the second UNIT; ADDRESSES 1600 to 1899 pertain to the SECTIONS of the third UNIT, etc. The first step is to provide a SELECT instruction which selects a particular INPUT/OUTPUT UNIT.

The SELECT instruction may be in the following form:

| | C | B | A | 8 | 4 | 2 | 1 |
|---|---|---|---|---|---|---|---|
| 2= | 1 | 0 | 0 | 0 | 0 | 1 | 0 |
| 1= | 1 | 0 | 0 | 0 | 0 | 0 | 1 |
| 1= | 1 | 0 | 0 | 0 | 0 | 0 | 1 |
| 2= | 1 | 0 | 0 | 0 | 0 | 1 | 0 |
| 7= | 1 | 0 | 0 | 0 | 1 | 1 | 1 |

The first CHARACTER, namely, 2 is the OPERATION part and is the code for a SELECT operation, that is, select a particular INPUT/OUTPUT UNIT. The remaining four CHARACTERS is the ADDRESS part of the instruction and designates a desired INPUT/OUTPUT UNIT and an ADDRESS therein. Thus, the thousands digit of the SELECT instruction is a binary coded 1, indicating that the first DRUM STORAGE UNIT is the selected unit; the hundreds and tens digits of the SELECT instruction are a binary coded 1 and 2, indicating that CHANNEL 12 is the selected CHANNEL in the DRUM of the selected DRUM STORAGE UNIT; the units digit of the SELECT instruction is a binary coded 7, indicating that SECTION 7 is the selected SECTION in the selected CHANNEL of the DRUM in the selected DRUM STORAGE UNIT.

In the next step of the process, either a READ instruction or a WRITE instruction is given to either READ a RECORD from the DRUM of the selected DRUM STORAGE UNIT, starting at the SECTION of the CHANNEL selected by the previous instruction and transferring it to the CALCULATOR and storing it therein, starting at the ADDRESS designated by the ADDRESS part of the READ instruction or to READ a RECORD from the CALCULATOR, starting at the ADDRESS designated by the address part of the WRITE instruction, and transferring it to the DRUM of the selected DRUM STORAGE UNIT, writing the RECORD therein, starting at the SECTION of the CHANNEL selected by the previous instruction. An example of a READ instruction is as follows:

| | C | B | A | 8 | 4 | 2 | 1 |
|---|---|---|---|---|---|---|---|
| Y= | 0 | 0 | 1 | 1 | 0 | 0 | 0 |
| 0= | 0 | 0 | 0 | 1 | 0 | 1 | 0 |
| 0= | 0 | 0 | 0 | 1 | 0 | 1 | 0 |
| 2= | 1 | 0 | 0 | 0 | 0 | 1 | 0 |
| 6= | 0 | 0 | 0 | 0 | 1 | 1 | 0 |

The first CHARACTER, namely, Y is the OPERATION part of the instruction and is the code for a READ operation. It initiates the generation of a signal, hereinafter termed the R call signal, which is transferred to signal the selected DRUM STORAGE UNIT that a READ operation is called for. The digit parts of the remaining four CHARACTERS of the instruction designates the ADDRESS 0026 in the CALCULATOR so that the RECORD, starting at the SECTION of the CHANNEL selected by the previous instruction, is transferred from the DRUM STORAGE UNIT to the ADDRESS in the CALCULATOR.

An example of a WRITE instruction is as follows:

| | C | B | A | 8 | 4 | 2 | 1 |
|---|---|---|---|---|---|---|---|
| R=1 | 1 | 0 | 1 | 0 | 0 | 1 | |
| 0=0 | 0 | 0 | 1 | 0 | 1 | 0 | |
| 1=1 | 0 | 0 | 0 | 0 | 0 | 1 | |
| 7=1 | 0 | 0 | 0 | 1 | 1 | 1 | |
| 3=0 | 0 | 0 | 0 | 0 | 1 | 1 | |

The first CHARACTER, namely, R is the OPERATION part of the instruction and is the code for a WRITE operation. It initiates the generation of a signal, hereinafter termed the W CALL signal, which is transferred to signal the selected DRUM STORAGE UNIT that a WRITE operation is called for. The digit parts of the remaining four CHARACTERS of the instruction designates the ADDRESS 0173 in the CALCULATOR so that the RECORD starting at that ADDRESS in the CALCULATOR is transferred to the DRUM STORAGE UNIT and written therein, starting at the SECTION of the CHANNEL selected by the previous instruction.

In summary, by a process of two instructions, namely, a SELECT instruction and a READ or WRITE instruction, it is possible to control the flow of DATA in a DATA PROCESSING MACHINE, that is, between an INPUT/OUTPUT UNIT, such as the DRUM STORAGE UNIT of the present invention, and a CALCULATOR.

*General organization*

To facilitate the understanding of the invention, resort has been had to four levels of drawings. The first level shows in simplified block form the general arrangement and interconnections of the major components comprising the DRUM STORAGE UNIT and also serves as an index to the next lower level. The second level is a composite block diagram showing a break down, in logical block form, of the major components of the DRUM STORAGE UNIT and the intra-connections between the logical block diagrams in each major component as well as the interconnections between the logical block diagrams of each major component. This second level also serves as an index to the next lower level. The third level shows, in symbolic block form, the break down of the logical block diagrams in each of the major components of the DRUM STORAGE UNIT and also serves as an index for the next lower level. The fourth level shows the individual block symbols and their schematic circuit equivalent.

Before proceeding to a detailed description of the major components of the DRUM STORAGE UNIT, a general description of the overall system will be given which will then be followed by a detailed description of the major components and then, in turn, by a description of an exemplary WRITE and READ operation.

Referring now to FIG. 4, there is shown in block form the general arrangement and interconnections between the major components comprising the DRUM STORAGE UNIT. The single and multiple lines connecting the several major components indicate paths through which DATA, TIMING and CONTROL SIGNALS will flow. The multiple lines are shown as two lines, with a partially circled number between them, indicating the actual number of lines connecting the components. Also, the direction of flow is indicated by arrow heads on the interconnecting lines.

The organization of the DRUM STORAGE UNIT will now be described with reference being made to the overall block diagram of FIG. 4 and the composite block diagram of FIG. 5.

Referring now to FIG. 4, the DRUM STORAGE UNIT of the present invention is shown as including a DRUM 100, of the type previously described, an ADDRESS TIMING REGISTER 200, an ADDRESS INPUT REGISTER 400, an ADDRESS COINCIDENCE DETECTOR 500. READ/WRITE CONTROL CIRCUITS 600, WRITE CIRCUITS 900 and READ CIRCUITS 1000.

Referring now to FIG. 5A, the ADDRESS TIMING REGISTER 200 is shown as including a TIMING READ AMPLIFIER and SHAPER UNIT 202 (see FIG. 5A1); an INDEX GENERATOR 238 (see FIG. 5A1); a TIMER STEP CONTROL UNIT 262 (see FIG. 5A2); a RESET UNIT 264 (see FIG. 5A4); a DRUM TIMER 305 consisting of RING 5 COUNTER 306 (see FIG. 5A5); RING 50 COUNTER 316; RING 500 COUNTER 344 (see FIG. 5A6); RING 1000 COUNTER 352 and RING 2000 COUNTER 372 (see FIG. 5A7); and a DRUM TIMER DECODER 380 (see FIG. 5A8).

The timing head TH, associated with the timing track of the DRUM 100, has 2000 timing signals induced therein during every revolution of the DRUM 100. These signals are amplified and reshaped in the TIMING READ AMPLIFIER and SHAPER UNIT 202 (see FIG. 5A1) to produce an S, A and B pulse corresponding to each one of the 2000 timing signals. The INDEX GENERATOR 238 responds to the S and B pulses and remains deconditioned so long as the S pulses are being applied thereto. However, 50 microseconds after the S2000 pulse is applied to the INDEX GENERATOR 238, it is rendered effective to produce an INDEX pulse $I_1$ which occurs during the GAP INTERVAL of the DRUM 100, and remains effective until the next B1 pulse is applied thereto. The time during which the INDEX GENERATOR 238 is effective is designated as the $I_1$ to $I_2$ time, $I_2$ time being the time when the B1 pulse deconditions the INDEX GENERATOR 238. During the $I_1$ to $I_2$ time, positive and negative signals are maintained on the $I_1$ to $I_2$ line and the $\overline{I_1 \text{ to } I_2}$ line, respectively, while at all other times their conditions are reversed. The $I_1$ to $I_2$ signal is used to control the TIMER STEP CONTROL UNIT 262 (see FIG. 5A2), while the $\overline{I_1 \text{ to } I_2}$ signal is used to control the PRECESS RING COUNTER 636 (see FIG. 5C2).

The RESET UNIT 263 (see FIG. 5A4) includes a RESET key which when actuated, produces a Z pulse which is effective to set and reset various triggers in the ADDRESS TIMING REGISTER 200 and in the READ/WRITE CONTROL CIRCUITS 600 in preparation for either a WRITE or READ operation.

The TIMER STEP CONTROL UNIT 262 (see FIG. 5A2) responds to the S pulses and produces TIMER CONTROL STEP pulses and RING STEP pulses for advancing the DRUM TIMER 305 during each revolution of the DRUM 100, thereby keeping track of each CHARACTER position of the DRUM 100. The TIMER STEP CONTROL UNIT 262 also includes a checking circuit which is effective to check that 2000 and only 2000 S pulses have occurred during each revolution of the DRUM 100. If an error occurs due, for example, to the occurrence of noise pulses so that more than 2000 S pulses are passed to the TIMER STEP CONTROL UNIT 262 or, if an error occurs due, for example to the failure to count one or more S pulses so that less than 2000 S pulses are passed to the TIMER STEP CONTROL UNIT 262, the checking circuit is rendered effective and provides a visual indication that a timing error has occurred. Also, when an error occurs, the checking circuit effectively deconditions the TIMER STEP CONTROL UNIT 262 so that no further TIMER CONTROL STEP pulses and RING STEP pulses are produced to advance the DRUM TIMER 305. Additionally, a signal is caused to be applied via the $\overline{\text{TIMER CHECK}}$ line to decondition the READ/WRITE SAMPLE GENERATOR 656 (see FIG. 5C3) of the READ/WRITE CONTROL CIRCUITS 600 and thereby prevent any further READ or WRITE operation from proceeding.

The DRUM TIMER 305 (see FIG. 5A) consists of five RING COUNTERS 306, 316, 344, 352 and 372. The RING 5 COUNTER 306 (see FIG. 5A5) is a five stage closed ring counter, which is advanced by the RING step pulses from the TIMER STEP CONTROL UNIT 262. Consequently, the RING 5 COUNTER is advanced every stepping pulse and since it is a 5 stage counter, is effective to emit a carry pulse every 5 stepping pulses. The outputs of the RING 5 COUNTER 306 are used to condition the DRUM TIMER DECODER 380 (see FIG. 5A8) and to condition the other four RING COUNTERS in the DRUM TIMER 305. The RING 50 COUNTER 316 and the RING 500 COUNTER 344 (see FIG. 5A6) are identical in construction, each comprising a ten stage closed RING COUNTER, and have the same principle of operation. The RING 50 COUNTER 316 is conditioned by a B pulse and a carry pulse from the RING 5 COUNTER 306 so that it may be advanced by the next succeeding RING STEP pulse from the TIMER STEP CONTROL UNIT 262. Consequently, the RING 50 COUNTER 316 is advanced every 5 stepping pulses and, since it is a ten stage counter, is effective to emit a carry pulse every 50 stepping pulses. Likewise, the RING 500 COUNTER 344 is conditioned by a B pulse and carry pulses from the RING 5 COUNTER 306 and the RING 50 COUNTER 316 so that it may be advanced by the next succeeding RING STEP pulse from the TIMER STEP CONTROL UNIT 262. Consequently, the RING 500 COUNTER 344 is advanced every 50 stepping pulses and since it is a ten stage counter, is effective to emit a carry pulse every 500 stepping pulses. The outputs of the RING 50 COUNTER 316 and the RING 500 COUNTER 344 are used to control the operation of the DRUM TIMER DECODER 380 and the remaining RING COUNTERS of the DRUM TIMER 305. The RING 1000 COUNTER 352 and the RING 2000 COUNTER 372 are identical in construction, each being a two stage closed RING COUNTER, and have the same principle of operation as the preceding two RING COUNTERS. The RING 1000 COUNTER 352 is conditioned by a B pulse and carry pulses from the RING 5 COUNTER 306, the RING 50 COUNTER 316 and the RING 500 COUNTER 344 so that it may be advanced by the next succeeding RING STEP pulse from the TIMER STEP CONTROL UNIT 262. Consequently, the RING 1000 COUNTER 352 is advanced every 500 stepping pulses and, since it is a two stage counter, is effective to emit a carry pulse every 1000 stepping pulses. The RING 2000 COUNTER 372 is conditioned by a B pulse and carry pulses from the RING 5 COUNTER 306, the RING 50 COUNTER 316, the RING 500 COUNTER 344 and the RING 1000 COUNTER 352 so that it may be advanced by the next succeeding RING STEP pulse from the TIMER STEP CONTROL UNIT 262. Consequently, the RING 2000 COUNTER 372 is advanced every 1000 stepping pulses and, since it is a two stage counter, is effective to emit a carry pulse every 2000 stepping pulses. The outputs of the RING 1000 COUNTER 352 and the RING 2000 COUNTER 372 are used to control the operation of the DRUM TIMER DECODER 380.

The DRUM TIMER DECODER 380 (see FIG. 5A8) decodes the outputs of the DRUM TIMER 305 and produces different voltage patterns corresponding to the different SECTIONS of the CHANNELS of the DRUM 100. Additionally, during each first half revolution of the DRUM 100, a positive signal is maintained on the CHARACTER 1 line during the time that the first CHARACTERS OF SECTIONS 0, 2, 4, 6 and 8 are being READ from or WRITTEN on the DRUM 100, and a positive signal is maintained on the CHARACTER 200 line during the time that the 200th CHARACTERS of SECTIONS 0, 2, 4, 6 and 8 are being READ from or WRITTEN on the DRUM 100. Likewise, during the second half revolution of the DRUM 100, a positive signal is again maintained on the CHARACTER 1 line during the time that the first CHARACTERS of SECTIONS 1, 3, 5, 7 and 9 are being READ from or WRITTEN on the DRUM 100, and a positive signal is again maintained on the CHARACTER 200 line during the time that the 200th CHARACTERS of SECTIONS 1, 3, 5, 7 and 9 are being READ from or WRITTEN on the DRUM 100.

Referring now to FIG. 5B, the ADDRESS INPUT REGISTER 400 is shown as including a SECTION COUNTER 402 (see FIG. 5B1), a SECTION COUNTER DECODER 436 (see FIG. 5B2), a CHANNEL COUNTER having a UNITS ORDER 442 and a TENS ORDER 456 (see FIG. 5B3), a CHANNEL COUNTER UNITS DECODER 460 (see FIG. 5B4), a CHANNEL COUNTER TENS DECODER 464 (see FIG. 5B5), CHANNEL UNITS 482a to 482c (see FIG. 5B6) and a DRUM DECODER 489 (see FIG. 5B7).

The SECTION COUNTER 402 (see FIG. 5B1) is a four stage binary decade counter which is set in parallel, under control of a SELECT ADDRESS SET signal, by a binary coded signal representing the units digit of the SELECT ADDRESS. The UNITS ORDER 442 and the TENS ORDER 456 of the CHANNEL COUNTER (see FIG. 5B3) are similar in construction and principle of operation as the SECTION COUNTER 402 and are set, under control of the SELECT ADDRESS SET signal, by binary codes signals representing the tens and hundreds digits, respectively, of the SELECT ADDRESS. The SECTION COUNTER DECODER 436 (see FIG. 5B2) decodes the outputs of the SECTION COUNTER 402 and produces a voltage pattern at the output thereof corresponding to the SELECTED SECTION. The CHANNEL COUNTER UNITS DECODER 460 (see FIG. 5B4) decodes the outputs of the UNITS ORDER 442 of the CHANNEL COUNTER to condition the CHANNEL UNITS 482a to 482c in accordance with the tens digit of the SELECT ADDRESS which represents the units digit of the SELECTED CHANNEL. The CHANNEL COUNTER TENS DECODER 464 (see FIG. 5B5) decodes the outputs of the TENS ORDER 464 of the CHANNEL COUNTER and produces signals on the 0, 3 to 9 line, 1 line or 2 line in accordance with the hundredths digit of the SELECT ADDRESS which represents the tens digit of the SELECTED CHANNEL. Thus, a positive signal is produced on the 0, 3 to 9 line when the tens digit of the CHANNEL number is 0, corresponding to CHANNELS 0 to 9 or a positive signal is produced on the 1 line when the tens digit of the CHANNEL number is 1, corresponding to CHANNELS 10 to 19 or a positive signal is produced on the 2 line when the tens digit of the CHANNEL number is 2, corresponding to CHANNELS 20 to 29. The signal on the selected one of the output lines from the CHANNEL COUNTER TENS DECODER 464 renders one of the conditioned CHANNEL UNITS 482a to 482c effective to produce a positive signal on the selected one of the 30 CHANNEL lines. The positive signal on the selected one of the CHANNEL lines is routed to the READ and WRITE CIRCUITS 900 and 1000, respectively, to condition either the writing circuits or the reading circuits associated with the selected CHANNEL. Additionally, since the TENS ORDER 456 of the CHANNEL COUNTER is a binary decade counter it may, in addition to the setting to the values 0, 1 and 2, be set to the values 3 to 9, representing CHANNEL numbers above 29. However, the DRUM DECODER 489 responds to a binary-coded signal, representing the thousands digit of the SELECT ADDRESS and is so connected to the TENS ORDER 456 of the CHANNEL COUNTER that the DRUM DECODER 489 is rendered effective to produce a SELECTED DRUM signal only if the thousands digit of the SELECT ADDRESS is 1 and the tens digit of the CHANNEL number is 0, 1 or 2. The SELECTED DRUM signal is used to control the READ/WRITE CONDITION GENERATOR 602 (see FIG. 5C1) so that if the DRUM STORAGE UNIT is the selected INPUT/OUTPUT UNIT, the SELECTED DRUM signal at the READ/WRITE CONDITION GENERATOR 602 permits a READ or WRITE operation to proceed.

Each time the last CHARACTER of a SECTION is being READ from or WRITTEN on the DRUM 100, a SECTION COUNTER CARRY CONTROL signal is applied to condition the SECTION COUNTER 402 (see FIG. 5B1) so that after the last CHARACTER of the SECTION is either READ from or WRITTEN on the DRUM 100, a SECTION COUNTER ADVANCE pulse is applied to advance the setting of the SECTION COUNTER 402 to the next value corresponding to the next SECTION. Likewise, when the last CHARACTER of the last SECTION of a CHANNEL is being READ from or WRITTEN on the DRUM 100, a CHANNEL COUNTER CARRY CONTROL signal is applied to condition the UNITS ORDER 442 and the TENS ORDER 456 of the CHANNEL COUNTER so that after the last CHARACTER of the last SECTION of the CHANNEL is READ from or WRITTEN on the DRUM 100, a CHANNEL COUNTER ADVANCE pulse is applied to advance the setting of the UNITS ORDER 442 of the CHANNEL COUNTER to the next value corresponding to the units digit of the next CHANNEL number. Additionally, there is a TENS CARRY from the UNITS ORDER 442 of the CHANNEL COUNTER to the TENS ORDER 456 of the CHANNEL COUNTER so that if the setting of the UNITS ORDER 442 of the CHANNEL COUNTER is advanced from 9 to 0 a CARRY is applied to advance the setting of the TENS ORDER 456 of the CHANNEL COUNTER to the tens digit of the next CHANNEL number.

Referring again to FIG. 5A, the ADDRESS COINCIDENCE DETECTOR 500 (see FIG. 5A9) is shown being controlled by the outputs of the SECTION COUNTER DECODER 436 and the DRUM TIMER DECODER 380. It will be remembered that during the time corresponding to the CHARACTER 1 position of SECTIONS 0, 2, 4, 6 and 8 and during the time corresponding to the CHARACTER 1 positions of SECTIONS 1, 3, 5, 7 and 9, a positive signal is applied via the CHARACTER 1 line to condition the ADDRESS COINCIDENCE DETECTOR 500. Also, it will be remembered that the SECTION COUNTER 402 is set to a selected value, in accordance with the units digit of a SELECT ADDRESS and will remain at the selected value until a READ or WRITE operation proceeds to permit SECTION COUNTER advancing. Consequently, the SECTION COUNTER DECODER 436 (see FIG. 5B2) produces a voltage pattern indicative of the SELECTED SECTION. Additionally, it will be remembered that the DRUM TIMER DECODER 380 produces different voltage patterns corresponding to the different SECTIONS of the DRUM 100. Hence, the ADDRESS COINCIDENCE DETECTOR 500 compares the voltage pattern produced by the SECTION COUNTER DECODER 436 with the continuously changing voltage pattern produced by the DRUM TIMER DECODER 380 and though the voltage pattern from the DRUM TIMER DECODER 380 and the SECTION COUNTER DECODER 436 are identical for each CHARACTER position of the SELECTED SECTION, only the coincidence during the CHARACTER 1 position of the SELECTED SECTION causes the ADDRESS COINCIDENCE DETECTOR 500 to produce a CHARACTER 1 SELECTED SECTION signal indicating that the CHARACTER 1 position of the SELECTED SECTION has been reached on the DRUM 100.

Referring now to FIG. 5C, the READ/WRITE CONTROL CIRCUITS 600 is shown as including a READ/WRITE CONDITION GENERATOR 602 (see FIG. 5C1), a PRECESS RING COUNTER 636 (see FIG. 5C2), a READ/WRITE SAMPLE GENERATOR 656 (see FIG. 5C3), a RESPONSE DISCONNECT GENERATOR 740 (see FIG. 5C4), and END OPERATION CONTROL UNIT 776 (see FIG. 5C5), a DISCONNECT RESET UNIT 790 (see FIG. 5C5), and END OF DRUM CHECK CONTROL UNIT 806 (see FIG. 5C6) and an ADDRESS REGISTER COUNTER CONTROL UNIT 850 (see FIG. 5C7).

The READ/WRITE CONDITION GENERATOR 602 (see FIG. 5C1) includes circuitry which is conditioned by a B pulse combined with positive signals on the CALCULATOR CONTROL line, the SELECTED DRUM line, and the W CALL line or R CALL line depending upon whether a WRITE or a READ operation is proceeding. When the CHARACTER 1 position of the SELECTED SECTION is reached, the READ/WRITE CONDITION GENERATOR 602 is rendered effective by the CHARACTER 1 SELECTED SECTION signal to cause a positive W CONDITION signal or R CONDITION signal to be produced, depending upon which operation was called for, and a negative $\overline{\text{R/W CONDITION}}$ signal regardless of which operation is called for. The W CONDITION and R CONDITION signals are used for conditioning the READ/WRITE SAMPLE GENERATOR (see FIG. 5C3) and the END OF DRUM CHECK CONTROL UNIT 806 (see FIG. 5C6). Additionally, the R CONDITION signal is used for conditioning the CHARACTER REGISTER 990 (see FIG. 5D5), while the $\overline{\text{R/W CONDITION}}$ signal is used to control circuitry in the ADDRESS REGISTER COUNTER CONTROL UNIT 850 (see FIG. 5C7). The W CALL signal is also effective in the READ/WRITE CONDITION GENERATOR 602 for controlling the W CALL CONTROL signal produced at the output thereof. The W CALL CONTROL signal is used to control the operation of the RESPONSE DISCONNECT GENERATOR 740 (see FIG. 5C4), the END OF DRUM CHECK CONTROL UNIT 806 (see FIG. 5C6) and the WRITE CONTROL UNIT 902 (see FIG. 5D1).

The PRECESS RING COUNTER 636 (see FIG. 5C2) includes a five stage closed ring counter which may be set to five conditions ranging from a 1 ON condition, when the first trigger of the ring is set to its ON state, to a 5 ON condition, when the last trigger of the ring is set to its ON state. After INITIAL COINCIDENCE the PRECESS RING COUNTER 636 is controlled by the $\overline{I_1 \text{ to } I_2}$ signal during each revolution of the DRUM 100 to permit the S pulses to step the PRECESS RING COUNTER 636. It will be remembered that the $\overline{I_1 \text{ to } I_2}$ signal is negative during the $I_1$ to $I_2$ time. Consequently, the PRECESS RING COUNTER 636 is deconditioned during the $I_1$ to $I_2$ time, and since $I_2$ time corresponds to B1 time, the S1 pulse is prevented from stepping the PRECESS RING COUNTER 636 each revolution of the DRUM 100. Assume that the PRECESS RING COUNTER 636 is initially set to the 5 ON condition and that SECTION 0 is the SELECTED SECTION. Consequently, INITIAL COINCIDENCE occurs during the S1 time, corresponding to the CHARACTER 1 position of the SELECTED SECTION, and the first S pulse to step the PRECESS RING COUNTER 636 is the S2 pulse. Hence, the PRECESS RING COUNTER 636 remains in the 5 ON condition during the S1 time, and every fifth S time thereafter during the first revolution of the DRUM 100. At the end of the first revolution of the DRUM 100, when stepping from SECTION 1 to SECTION 2, the PRECESS RING COUNTER 636 is blocked by the negative $\overline{I_1 \text{ to } I_2}$ signal and the S1 pulse is ineffective to step the PRECESS RING COUNTER 636 to the 5 ON condition. However, the S2 pulse is effective to step the PRECESS RING COUNTER 636 to the 5 ON condition so that it remains in the 5 ON condition during the S2 time and every fifth S time thereafter during the second revolution of the DRUM 100. Hence, there is a CHARACTER position delay in time before the PRECESS RING COUNTER 636 is in the 5 ON condition in comparison to when it was in the 5 ON condition at INITIAL COINCIDENCE. Hence, in a similar manner, a precession of one CHARACTER position occurs each revolution of the DRUM 100 in going from an odd numbered SECTION to an even numbered SECTION of the same CHANNEL. When the last CHARACTER position of SECTION 9 of a CHANNEL is reached, the S2000 pulse sets the PRECESS RING COUNTER 636 to the 5 ON condition. Since no further S pulses are produced during the GAP INTERVAL of the DRUM 100 and since the S1 pulse is blocked, the PRECESS RING COUNTER 636 remains in the 5 ON condition during the GAP INTERVAL of the DRUM 100 and the S1 time. Hence, there is no CHARACTER position delay in time before the PRECESS RING COUNTER 636 is in the 5 ON condition in stepping from SECTION 9 of a CHANNEL to SECTION 0 of the next succeeding CHANNEL or, in other words, there is no precession when switching from one CHANNEL to the next succeeding CHANNEL. The outputs of the PRECESS RING COUNTER are used to control the operation of the READ/WRITE SAMPLE GENERATOR 656 (see FIG. 5C3), the RESPONSE DISCONNECT GENERATOR 740 (see FIG. 5C4), the DISCONNECT RESET UNIT 790 (see FIG. 5C5), the END OF DRUM CHECK CONTROL UNIT 806 (see FIG. 5C6) and the ADDRESS REGISTER COUNTER CONTROL UNIT 850 (see FIG. 5C7).

During a WRITE operation the READ/WRITE SAMPLE GENERATOR 656 (see FIG. 5C3) includes circuitry which is conditioned by positive signals on the END OPERATION line, the W CONDITION line, the TIMER CHECK line and the 5 ON line so that the first A pulse produced after a W CONDITION (which occurs as soon as coincidence is made in the ADDRESS COINCIDENCE DETECTOR 500 indicating that the CHARACTER 1 position of the SELECTED SECTION has been reached) renders this circuitry effective to produce an INITIAL COINCIDENCE signal and a W pulse followed five microseconds thereafter by a W5 pulse. Since the READ/WRITE SAMPLE GENERATOR 656 is controlled by the 5 ON signal, the W and W5 pulses occur every five S pulses after INITIAL COINCIDENCE. Thus, during each succeeding 5 ON condition of the PRECESS RING COUNTER 636, the READ/WRITE SAMPLE GENERATOR 656 is rendered effective to produce a W pulse followed thereafter by a W5 pulse. The INITIAL COINCIDENCE signal is used to control the operation of the PRECESS RING COUNTER 636 as described hereinbefore. The W pulse is used to control the WRITE CONTROL UNIT 902 (see FIG. 5D1) and the WRITE UNIT 922 (see FIG. 5D2) of the WRITE CIRCUITS 900 to permit a CHARACTER to be written on the DRUM 100. The W5 pulse is used to control the RESPONSE DISCONNECT GENERATOR 740 (see FIG. 5C4) to produce a RESPONSE signal which signals the CALCULATOR 1100 that a CHARACTER has been written on the DRUM 100 and that the DRUM STORAGE UNIT is ready to receive the next succeeding CHARACTER. The W5 pulse is also used to control the RESPONSE DISCONNECT GENERATOR 740 to produce a DISCONNECT signal which signals the CALCULATOR 1100 that a DRUM MARK CHARACTER has been written, indicating that the END of the RECORD has been reached, and that the CALCULATOR may now logically be disconnected from the DRUM STORAGE UNIT.

During a READ operation the READ/WRITE SAMPLE GENERATOR 656 also includes circuitry which is conditioned by positive signals on the END OPERATION line, the R CONDITION line, the TIMER CHECK line and the 5 ON line so that the first B pulse produced after an R CONDITION (which occurs as soon as coincidence is made in the ADDRESS COINCIDENCE DETECTOR 500 indicating that the CHARACTER 1 position of the SELECTED SECTION has been reached) renders this circuitry effective to produce an INITIAL COINCIDENCE signal and an R pulse, followed five microseconds thereafter by an R5 pulse. Since the READ/WRITE SAMPLE GENERATOR 656 is controlled by the 5 ON signal, the R and R5 pulses occur every five S pulses after INITIAL COINCIDENCE. Thus, each time that the PRECESS RING COUNTER 636 steps to a 5 ON condition, the READ/WRITE SAMPLE GENERATOR 656 is rendered effective to produce an R pulse followed by an R5 pulse. The INITIAL COINCIDENCE signal is used to control the operation of the PRECESS RING COUNTER 636 as described hereinbefore. The R pulse is used to control the CHARACTER REGISTER 990 (see FIG. 5D5) of the READ CIRCUIT 1000 to permit a CHARACTER read from the DRUM 100 to be applied to the READ BUS. The R5 pulse is used to control the RESPONSE DISCONNECT GENERATOR 740 (see FIG. 5C4) to produce a RESPONSE signal which signals the CALCULATOR 1100 to commence a CHARACTER cycle to cause the CHARACTER on the READ BUS to be transferred to the CALCULATOR 1100. The R5 pulse is also used to control the RESPONSE DISCONNECT GENERATOR 740 to produce a DISCONNECT signal which signals the CALCULATOR that a DRUM MARK CHARACTER has been READ, indicating that the END of the RECORD has been reached, and that a RECORD MARK CHARACTER may be stored in the CALCULATOR 1100 and the CALCULATOR 1100 may be logically disconnected from the DRUM STORAGE UNIT. Additionally, if either a WRITE or READ operation is proceeding, the READ/WRITE SAMPLE GENERATOR 656 includes circuitry which is rendered effective to produce an R/W pulse, followed five microseconds thereafter by an R5 pulse, followed ten microseconds after the R/W pulse by an R/W10 pulse. The R/W pulse is used in controlling the ADDRESS REGISTER COUNTER CONTROL UNIT 850 (see FIG. 5C7) to produce a SECTION COUNTER CARRY CONTROL signal when writing or reading is advancing from one SECTION to the next succeeding SECTION of the DRUM 100 or to produce a CHANNEL COUNTER CARRY CONTROL signal when writing or reading is advancing from one CHANNEL to the next succeeding CHANNEL of the DRUM 100. The R/W5 pulse is used to control the END OF DRUM CHECK CONTROL UNIT 806 (see FIG. 5C6). The R/W10 pulse is used in controlling the ADDRESS REGISTER COUNTER CONTROL UNIT 850 (see FIG. 5C7) to produce a SECTION COUNTER ADVANCE pulse or a CHANNEL COUNTER ADVANCE pulse. Additionally, if an error is sensed in the TIMER STEP CONTROL UNIT 262 (see FIG. 5A2), a negative TIMER CHECK signal is applied to block the READ/WRITE SAMPLE GENERATOR 656 (see FIG. 5C3) and prevent any further W, W5 or R, R5 and R/W, R/W5 and R/W10 pulses from being produced. Further, if an END OF OPERATION occurs, a negative END OPERATION signal is also applied to block the READ/WRITE SAMPLE GENERATOR 656.

The RESPONSE DISCONNECT GENERATOR 740 (see FIG. 5C4) includes circuitry for producing the RESPONSE and DISCONNECT signals, each of which may occur as the result of three separate conditions. During a WRITE operation a positive W CALL CONTROL signal in combination with each succeeding W5 pulse renders circuitry in the RESPONSE DISCONNECT GENERATOR 740 effective to produce a RESPONSE signal five microseconds after each CHARACTER is written on the DRUM 100. Shortly after a RECORD MARK CHARACTER is READ in the CALCULATOR 1100, a negative W CALL CONTROL signal occurs which in combination with the next succeeding W5 pulse renders circuitry in the RESPONSE DISCONNECT GENERATOR 740 effective to produce a DISCONNECT signal five microseconds after a DRUM MARK CHARACTER is written on the DRUM 100. During a READ operation so long as a DRUM MARK CHARACTER is not READ from the DRUM 100, a positive $\overline{\text{DRUM MARK}}$ signal in combination with each succeeding R5 pulse renders circuitry in the RESPONSE DISCONNECT GENERATOR 740 effective to produce a RESPONSE signal five microseconds after each CHARACTER has been READ from the DRUM 100 and transferred to the READ BUS. When a DRUM MARK CHARACTER is READ from the DRUM 100 a DRUM MARK signal occurs which in combination with the next succeeding R5 pulse, renders circuitry in the RESPONSE DISCONNECT GENERATOR effective to produce a DISCONNECT signal. If a RECORD MARK CHARACTER is not sensed at the time when the END OF THE DRUM 100 is reached, so that an attempt is made to write past the END OF THE DRUM 100, a positive END OF DRUM CHECK signal in combination with each succeeding 1 ON pulse renders circuitry in the RESPONSE DISCONNECT GENERATOR 740 effective to produce succeeding RESPONSE signals. When the RECORD MARK CHARACTER is READ in the CALCULATOR 1100, a negative W CALL CONTROL signal occurs which in combination with the END OF DRUM CHECK signal conditions circuitry in the RESPONSE DISCONNECT GENERATOR 740 so that the next succeeding 1 ON pulse renders such circuitry effective to produce a DISCONNECT signal. Each time that a DISCONNECT signal occurs during a WRITE or READ operation, the RESPONSE DISCONNECT GENERATOR 740 also produces an END R/W signal which is used to control the END OPERATION CONTROL UNIT 776 (see FIG. 5C5). Also, after the END of the DRUM occurs, when a DISCONNECT signal occurs, the RESPONSE DISCONNECT GENERATOR 740 produces an END OF DRUM DISCONNECT signal which is used to control the DISCONNECT RESET UNIT 790 (see FIG. 5C5).

The END OPERATION CONTROL UNIT 776 (see FIG. 5C5) includes circuitry which, at the end of a WRITE or READ operation, is rendered effective by the END R/W signal or, if an attempt is made to WRITE off the END OF THE DRUM 100, is rendered effective by an $\overline{\text{END OF DRUM CHECK}}$ signal to produce a positive END OPERATION signal and a negative $\overline{\text{END OPERATION}}$ signal. The END OPERATION signal is used to control the DISCONNECT RESET UNIT 790 (see FIG. 5C5), while the $\overline{\text{END OPERATION}}$ signal, when rendered negative, is used to decondition the READ/WRITE SAMPLE GENERATOR 656 (see FIG. 5C3) to prevent any further sample pulses from being produced by the READ/WRITE SAMPLE GENERATOR.

The DISCONNECT RESET UNIT 790 (see FIG. 5C5) includes circuitry which, as long as the END OF THE DRUM 100 is not reached, is conditioned by positive $\overline{\text{END OF DRUM CHECK}}$ and END OPERATION signals so that the next positive pulse on the $I_{1/4}$ ON line, due to an INDEX pulse $I_1$ or due to the 4 ON condition of the PRECESS RING GENERATOR 636, depending upon the position of the DRUM 100, renders the DISCONNECT UNIT 790 effective to produce a DISCONNECT RESET signal, which is effective to reset the END OPERATION CONTROL UNIT 776 in preparation for another operation, and an X DISCONNECT RESET signal, which is effective to reset various triggers in various units of the READ/WRITE CONTROL CIRCUITS 600 in preparation for the next operation. Additionally, if a RECORD is still being transferred from the CALCULATOR 1100 after the END OF THE DRUM 100 is reached, the DISCONNECT RESET UNIT 790 includes circuitry which, when the END OF THE RECORD is reached, responds to the END OF DRUM DISCONNECT signal in combination with a B pulse to produce a DISCONNECT RESET signal and an X DISCONNECT RESET signal.

The END OF DRUM CHECK CONTROL UNIT 806 (see FIG. 5C6) is conditioned by positive signals on the CHANNEL 29 line, the CALCULATOR CONTROL line, the SECTION 9 CHARACTER 200 line, the W CONDITION line, the W CALL CONTROL line and the 5 ON line. If the CALCULATOR 1100 does not sense a RECORD MARK CHARACTER when the END OF THE DRUM 100 is reached, the W CALL CONTROL signal remains positive to maintain the conditioning of the END OF DRUM CHECK CONTROL UNIT 806 so that the next following R/W5 pulse renders the END OF DRUM CHECK CONTROL UNIT 806 effective to produce a positive END OF DRUM CHECK signal which is used to control the RESPONSE DISCONNECT GENERATOR 740 (see FIG. 5C4) as described hereinbefore, and a negative $\overline{\text{END OF DRUM CHECK}}$ signal which is used to control the DISCONNECT RESET UNIT 790 (see FIG. 5C5), as described hereinbefore. The END OF DRUM CHECK CONTROL UNIT 806 also includes circuitry which is conditioned by the SELECTED DRUM signal and is rendered effective by the END OF DRUM CHECK signal to produce an R/W ERROR signal which signals the CALCULATOR 1100 that an R/W ERROR has occurred. If the CALCULATOR 1100 does sense a RECORD MARK CHARACTER when the END OF THE DRUM 100 is reached, the W CALL CONTROL signal becomes negative to decondition the END OF DRUM CHECK CONTROL UNIT 806 and prevent an END OF DRUM CHECK signal and an R/W ERROR signal from being produced.

The ADDRESS REGISTER COUNTER CONTROL UNIT 850 (see FIG. 5C7) includes circuitry which is initially conditioned by positive signals on the CALCULATOR CONTROL line and the $\overline{\text{R/W CONDITION}}$ line so that, depending upon the position of the DRUM 100, the next following INDEX pulse $I_1$ or B pulse renders such circuitry effective to produce a SELECT ADDRESS SET signal which is used to control the SECTION counter 402 (see FIG. 5B1) the CHANNEL COUNTER (see FIG. 5B3) and the DRUM DECODER 489 (see FIG. 5B7). The ADDRESS REGISTER COUNTER CONTROL UNIT 850 also includes circuitry which is conditioned by positive signals on the CHARACTER 200 line and the CALCULATOR CONTROL line so that an R/W pulse, which occurs after the CHARACTER 200 signal, renders a portion of such circuitry effective to produce a SECTION COUNTER CARRY CONTROL signal, followed ten microseconds thereafter by an R/W10 pulse which renders the remaining portion of the circuitry effective to produce a SECTION COUNTER ADVANCE pulse, which in combination with the SECTION COUNTER CARRY CONTROL signal is used to control the SECTION COUNTER 402 (see FIG. 5B1), as described hereinbefore. The ADDRESS REGISTER COUNTER CONTROL UNIT 850 also includes circuitry which is conditioned by positive signals on the SECTION 9 CHARACTER 200 line, the CALCULATOR CONTROL line and the 5 ON line so that an R/W pulse, which occurs after the SECTION 9 CHARACTER 200 signal, renders a portion of such circuitry effective to produce a CHANNEL COUNTER CARRY CONTROL signal, followed ten microseconds thereafter by an R/W10 pulse which renders the remaining portion of the circuitry effective to produce a CHANNEL COUNTER ADVANCE pulse, which in combination with the CHANNEL COUNTER CARRY CONTROL signal is used to control the CHANNEL COUNTER (see FIG. 5B3), as described hereinbefore.

Referring nowto FIG. 5D, the WRITE CIRCUIT 900 is shown as including a WRITE CONTROL UNIT 902 (see FIG. 5D1) and a WRITE UNIT 922 (see FIG. 5D2).

The WRITE CONTROL UNIT 902 (see FIG. 5D1) includes circuitry which is successively conditioned by successive binary coded signals on the seven lines of the WRITE BUS, representing successive CHARACTERS of the RECORD, in combination with a positive W CALL CONTROL signal so that after INITIAL COINCIDENCE successive W pulses successively render the WRITE CONTROL UNIT 902 effective to transfer the successive binary coded signals to the WRITE UNIT 902.

The WRITE UNIT 922 (see FIG. 5D2) includes writing circuitry associated with each CHANNEL of the DRUM 100. The selected one of the 30 CHANNEL lines conditions the writing circuits associated with the selected CHANNEL so that each successive W pulse which renders the WRITE CONTROL UNIT 902 effective, also renders the WRITE UNIT 922 effective to WRITE a binary 1 in a bit position on the DRUM 100 if the signal on the corresponding line of the WRITE BUS is positive or to write a binary 0 in the bit position if the signal on the corresponding line of the WRITE BUS is negative. At the END OF A RECORD when a RECORD MARK CHARACTER is READ in the CALCULATOR 1100, the W CALL CONTROL signal becomes negative to decondition the WRITE CONTROL UNIT 902 before the next succeeding W pulse so that the RECORD MARK CHARACTER is not written on the DRUM 100. However, the next succeeding W pulse renders the WRITE UNIT 922 effective to cause a DRUM MARK CHARACTER to be written on the DRUM 100 as a series of binary 0's. It will be remembered that succeeding CHARACTERS of a RECORD are WRITTEN in every fifth CHARACTER position of the DRUM 100, starting with the CHARACTER 1 position of the SELECTED SECTION. Additionally, it will be remembered, that each time the PRECESS RING COUNTER 636 steps to the 5 ON condition, which occurs every fifth S time after INITIAL COINCIDENCE, it conditions the READ/WRITE SAMPLE GENERATOR 656 to produce a W pulse. Consequently, a W pulse occurs every fifth S time after INITIAL COINCIDENCE to permit succeeding CHARACTERS of the RECORD to be written in the correct positions on the DRUM 100.

Referring now to FIG. 5D, the READ CIRCUIT 1000 is shown as including a READ CONTROL UNIT 962 (see 5D3), a READ AMPLIFIER UNIT 978 (see FIG. 5D4) and a CHARACTER REGISTER 990 (see FIG. 5D5). The READ CONTROL UNIT 962 (see FIG. 5D3) includes reading circuitry associated with each CHANNEL of the DRUM 100. The selected one of the 30 CHANNEL lines renders the reading circuits associated with the selected CHANNEL effective. Consequently, binary coded signals, representing succeeding physically adjacent CHARACTERS stored in the selected CHANNEL of the DRUM 100, are sensed by the reading circuits associated with the selected CHANNEL and applied to the READ AMPLIFIER UNIT 978.

The READ AMPLIFIER 978 (see FIG. 5D4) includes circuitry which amplifies and reshapes the binary coded signals, representing the succeeding physically adjacent CHARACTERS stored in the selected CHANNEL of the DRUM 100, and transfers them to the CHARACTER REGISTER 990.

The CHARACTER REGISTER 990 (see FIG. 5D5) includes circuitry conditioned by positive signals on the CALCULATOR CONTROL line and the R CONDITION line. It will be remembered that succeeding CHARACTERS of a RECORD are WRITTEN in every fifth CHARACTER position of the DRUM 100, starting with the CHARACTER 1 position of the SELECTED SECTION. Additionally, it will be remembered that each time the PRECESS RING COUNTER 636 steps to the 5 ON condition, which occurs every fifth S time after INITIAL COINCIDENCE, it conditions the READ/WRITE SAMPLE GENERATOR 656 to produce an R pulse. Consequently, R pulses occur every fifth S time atfer INITIAL COINCIDENCE to render the CHARACTER REGISTER 990 effective so that even though binary coded signals, representing succeeding physically adjacent CHARACTERS stored in the selected CHANNEL of the DRUM 100, are applied to the CHARACTER REGISTER 990, only the binary coded signals, representing the CHARACTERS of the RECORD, which are stored in succeeding fifth CHARACTER positions of the selected CHANNEL of the DRUM 100, are effectively transferred to the READ BUS. The CHARACTER REGISTER 990 also includes circuitry which is rendered effective when a DRUM MARK CHARACTER is sensed to produce a positive DRUM MARK signal which is used to control the RESPONSE DISCONNECT GENERATOR 740 (see FIG. 5C4) in producing a DISCONNECT signal, as previously described, and a negative $\overline{\text{DRUM MARK}}$ signal which is used to control the END OF CHECK CONTROL UNIT 806 (see FIG. 5C6), as previously described.

*Block symbols*

The schematic equivalents of the block symbols which are hereinafter employed to simplify the detailed description of the logical block diagrams of the DRUM STORAGE UNIT are shown in FIGS. 6 to 47. For convenient reference, all positive and negative supply sources are identified by a number corresponding to their potential, for example, a supply terminal labeled 140, indicates a 140 volt supply source. Further, the terminals in the schematic diagrams which correspond to the same terminals in the corresponding block symbol diagrams are identified by the same reference numbers. Also, hereinafter, where the terms positive and/or negative potentials or shift of potentials are used, the terms refer to relative values, rather than values with respect to ground.

*OR circuit—OR*

Referring first to FIG. 6, there is illustrated a block symbol of a standard positive OR circuit and also the details of the circuit within the block.

A positive OR circuit functions to isolate two or more positive input signals from each other and to produce a positive output signal in response to a positive input signal at any or all of the input terminals thereof.

The positive OR circuit employs at least two diodes, the anodes of which are connected to the input terminals thereof, while the cathodes of which are connected to the output terminal thereof and via a common resistor R to a negative voltage source. The input terminals are normally biased so that the diodes are in conductive states. If a positive signal is applied to either or both of the input terminals, the potential at the anode or anodes, to which the input signal or signals are applied, becomes more positive causing an increased flow of current through the common resistor R. Consequently, since during conduction the resistance of a diode is negligible in comparison to that of the common resistor R, the potential at the cathodes, of those diodes to which the positive input signals are applied, follows more nearly that of their respective anodes. Also, since the output terminal is connected to the cathodes of the diodes, the rise in potential at the cathodes is effectively applied to the output terminal so that the potential at the output terminal is raised to approximately that existing at any or all of he input terminals to which the positive input signals are applied.

A standard positive OR circuit is composed of at least two diodes 6 and 8, the anodes of which are connected to the input terminals 2 and 4, respectively, while the cathodes of which are connected to the output terminal 12 and via a common resistor R to a —130 volt source. While only two input terminals have been shown in FIG. 8 it is to be understood that a positive OR circuit may have any number of input terminals so long as a diode is provided between each input terminal and the output terminal.

The standard positive OR circuit is hereinafter represented by a block symbol containing the alphabetic characters OR and a numeric designation i.e. OR–1. The ohmic value of the common resistor R may vary depending upon circuit requirements. Consequently, the ohmic value of the common resistor R is indicated in the upper right-hand corner of the block symbol.

*AND circuit—AND*

Referring to FIG. 7, there is illustrated a block symbol of a standard positive AND circuit and also the details of the circuit within the block.

A positive AND circuit functions to produce a positive output signal only when there is a coincidence of positive signals at all of the input terminals thereof.

The positive AND circuit employs at least two diodes, the cathodes of which are connected to the input terminals thereof, while the anodes of which are connected to the output terminal thereof and via a common resistor R to a positive voltage source. The input terminals are normally biased so that the diodes are in conductive states. It will be remembered that during conduction the resistance of a diode is negligible compared to that of the common resistor R. Consequently, the anodes are at potentials more nearly that of their respective cathodes. If a positive signal is applied to any of the input terminals, the diode to which the signal is applied, is cut off as the cathode is now at a more positive potential than the corresponding anode. However, the remaining diode or diodes are still in a conductive state or states, so that the same amount of current flows through the common resistor R and the potential at the anode of the diode, to which the positive input signal is applied, does not follow the change at the corresponding cathode but remains at relatively the same potential. Therefore, since the output terminal is connected to the anodes of the diodes, no change in potential is effectively passed to the output terminal when a positive signal is applied to any or all but one of the input terminals. If positive signals are coincidently applied to all of the input terminals, all of the diodes are cut off and the potential at the anodes starts to rise toward that of the positive voltage source connected at the other end of the common resistor R. When the potential reaches a value approximately that at the input terminals, all of the diodes start to conduct, whereupon the potential at the anodes stops rising and is maintained at approximately that at the input terminals. Therefore, since the output terminal is connected to the anodes of the diodes, the rise in potential at the anodes is effectively passed to the output terminal so that the potential at the output terminal is raised to approximately that existing at all of the input terminals. It should be noted at this point that that the positive input signals are not necessarily applied simultaneously to the input terminals of the positive AND circuit. Hence, in instances where positive signals are applied to all but one of the input terminals thereof, the circuit is said to be conditioned so that when a positive signal is applied to the remaining input terminal there is a coincidence of positive input signals causing the production of a positive output signal in a manner as previously described.

A standard positive AND circuit is composed of at least two diodes 18 and 20, the cathodes of which are connected to the input terminals 14 and 16, respectively, while the anodes of which are connected to the output terminal 24 and via a common resistor R to a +140 volt source.

Referring now to FIG. 8, there is illustrated a block symbol of a standard negative AND circuit and also the details of the circuit within the block.

A negative AND circuit is identical in circuitry to the positive OR circuit but functions to produce a negative output signal only when there is a coincidence of negative signals at all of the input terminals thereof.

The negative AND circuit employs at least two diodes, the anodes of which are connected to the input terminals thereof, while the cathodes of which are connected to the output terminal thereof and via a common resistor R to a negative voltage source. The input terminals are normally biased so that the diodes are in conductive states. Consequently, the cathodes are at potentials more nearly that of their respective anodes. If a negative signal is applied to any of the input terminals the diode to which the signal is applied is cut off as the anode is now at a more negative potential than the corresponding cathode. However, the remaining diode or diodes are still in a conductive state or states so that the same amount of curren flows through the common resistor R. Consequently, the potential at the cathode of the diode, to which the negative input signal is applied, does not follow the change at the corresponding anode but remains at relatively the same potential and since the output terminal is connected to the cathodes of the diodes, no change in potential is effectively passed to the output terminal when a negative signal is applied to any but not all of the input terminals. If negative signals are coincidentally applied to all of the input terminals, all of the diodes are cut off and the potential at the cathodes starts to fall toward that of the negative voltage source connected at the other end of the common resistor R. When the potential reaches the value approximately that at the input terminals, all of the diodes start to conduct whereupon the potential at the cathodes stops falling and is maintained at approximately that at the input terminals. Therefore, since the output terminal is connected to the cathodes of the diodes, the fall in potential at the cathodes is effectively passed to the output terminal so that the potential at the output terminal falls to approximately that exising at all of the input terminals. It should be noted at this point, that the negative input signals are not necessarily applied simultaneously to the input terminals of the negative AND circuit. Hence, in intsances where negative signals are applied to all but one of the input terminals thereof, the circuit is said to be conditioned so that when a negative signal is applied to the remaining input terminal, there is a coincidence of negative input signals causing the production of a negative output signal in a manner as previously described.

A standard negative AND circuit is composed of at least two diodes 30 and 32, the anodes of which are connected to the input terminals 26 and 28, respectively, while the cathodes of which are connected to the output terminal 34 and via a common resistor R to a —130 volt source. While only two input terminals have been shown in FIGS. 7 and 8, it is to be understood that a positive and a negative AND circuit may have any number of input terminals so long as a diode is provided between each input terminal and the output terminal.

The standard positive AND circuit is hereinafter represented by a block symbol containing an ampersand symbol and a numerical designation i.e. &–1, while the standard negative AND circuit is hereinafter represented by a block symbol containing a minus sign, an ampersand symbol and a numerical designation i.e. —&–1. The ohmic value of the common resistor R in an AND circuit may vary depending upon circuit requirements. Consequently, the ohmic value of the common resistor R is indicated in the upper right-hand corner of the block symbols of the positive and negative AND circuits.

*Diode gate—DG*

Referring now to FIG. 9, there is illustrated a block symbol of a standard diode gate and also the details of the circuit within the block.

A diode gate, if properly conditioned, functions to produce a sharp negative output pulse or spike in response to a negative shift of potential.

The diode gate is composed of a diode, the cathode of which is connected to the input terminal thereof, while the anode of which is connected via a capacitor to the output terminal thereof and via a resistor R to a supply terminal thereof. The supply and input terminals are normally biased so that the diode is cut off and the output terminal is at a potential determined by the circuit to which it is connected. If a positive pulse is applied to the input terminal, the potential at the cathode is driven more positive thereby maintaining the diode in a cut off condition. If a positive signal is applied to the supply terminal, the potential at the anode is raised to a more positive value causing the diode to conduct and the gate is said to be conditioned. Now, if a positive pulse is applied to the input terminal, the positive shift of potential at the leading edge of the pulse raises the potential at the cathode to a more positive potential than that exciting at the anode and the diode is cut off. The potential at the anode then rises exponentially to approximately that value existing at the input terminal, whereupon the diode again conducts and the potential at the anode stops rising and is maintained at the value existing at the input terminal. When the negative shift of potential at the trailing edge of the positive input pulse appears at the input terminal, it instantaneously appears at the anode of the diode as the resistance across a conducting diode is negligible. Further, since the potential across a capacitor cannot change instantaneously, the potential at the output terminal has the same instantaneous negative shift of potential and then rises rapidly to its quiecsent state. Thus, it is apparent that if the diode gate is properly conditioned, it will generate a sharply negative pulse or spike in response to a negative shift in potential.

A standard diode gate is composed of a diode 37, the cathode of which is connected to the input terminal 36 and the anode of which is connected via a 15 micromicrofarad capacitor to the output terminal 40 and via the resistor R to the supply terminal 38.

The standard diode gate is hereinafter represented by a block symbol containing the alphabetic characters DG and a numeric designation i.e. DG–1. The value of the resistor R is indicated in the upper right-hand corner of the block symbol.

Referring now to FIG. 10, there is illustrated a block symbol of another type of diode gate and also the details of the circuit within the block.

The diode gate of the type shown in FIG. 10 is similar to that shown in FIG. 9 except that it requires two conditioning signals before it will generate a sharp negative pulse or spike in response to a negative shift of potential.

This type of diode gate employs two diodes, the cathodes of which are connected to the input terminals thereof, while the anodes of which are connected via a resistor R to a supply terminal and via a capacitor to the output terminal. The supply terminal and the input terminals are normally biased so that the diodes are in a cut off condition and the output terminal is at a potential determined by the circuit to which it is connected. If a positive pulse is applied to either or both of the input terminals, the potentials at the cathodes are driven more positive thereby maintaining the diodes in cut off condition. If, however, a positive signal is applied to the supply terminal, the potential at the anodes is raised to a more positive value causing the diodes to conduct. If a positive signal is then applied to either of the input terminals, the diode to which the signal is applied is cut off as the potential at its cathode is now more positive than the potential at its anode. But, the potential at the output terminal remains relatively the same since the other diode is still conducting. However, under these conditions, that is, with a positive signal at the supply terminal and a positive signal at one of the input terminals, the diode gate is said to be conditioned. Now, if a positive pulse is applied to the other input terminal, the positive shift of potential at the leading edge of the pulse raises the potential at the cathode to a more positive value than that existing at the corresponding anode and the diode is cut off. The potential at the anodes then rises exponentially to approximately that value existing at the input terminal to which the positive input pulse is applied, whereupon the diodes again conduct and the potential at the anodes stops rising and is maintained at approximately that value existing at the input terminals. When the negative shift of potential at the trailing edge of the pulse appears at the input terminal, it instantly appears at the anodes of the diodes as the resistance across the conducting diode to which the positive input pulse is applied is virtually a short circuit. Further, since the potential across a capacitor cannot change instantaneously, the potential at the output terminal has the same instantaneous negative shift of potential and then rises rapidly to its quiescent state. Therefore, it is again apparent that if the diode gate is properly conditioned, it will generate a sharp negative output pulse or spike in response to a negative shift of potential.

This type of diode gate is composed of two diodes 45 and 47, the cathodes of which are connected to the input terminals 41 and 43, respectively, while the anodes of which are connected via the resistor R to the supply terminal 49 and via a 15 micromicrofarad capacitor to the output terminal 51.

This type of diode gate is hereinafter represented by a block symbol containing the alphabetic character DG and a numeric designation i.e. DG–2. The value of the resistor R is indicated in the upper right-hand corner of the block symbol.

*Cathode follower—CF*

Referring now to FIG. 11, there is illustrated a block symbol of a standard cathode follower and also the details of the circuit within the block.

A cathode follower functions to produce an output signal having greater power than the input signal, but of the same polarity and substantially the same wave shape and with no appreciable time delay between the input signal and the output signal.

The cathode follower may employ, for example, a triode tube, the plate of which is directly connected to a positive voltage source and the cathode of which is connected to an output terminal and via cathode circuit resistance to a negative voltage source. A positive signal applied to the grid of the triode causes an increased flow of current through the tube and the cathode circuit resistance. Consequently, due to the increased current flow, a positive shift of potential occurs at the cathode. The potential of the output signal at the output terminal remains substantially the same as that of the input signal but due to the increased current flow, the power of the signal is increased proportionately. Likewise, it is obvious that a negative signal applied to the grid of the triode tube will cause the potential at the cathode to shift relatively negative.

A standard cathode follower, which may comprise a 5965 half tube as indicated in FIG. 11 by a solid semicircle and a dotted semicircle around the tube elements, has its plate connected to a +140 volt source, a grid connected via a 150 ohm resistor to the input terminal 42 and a cathode connected via cathode circuit resistance, comprising a series connected 91 ohm resistor and a resistor R, to a —60 volt source. The output terminal 44 is connected to the junction of the 91 ohm resistor and the resistor R.

The standard cathode follower is hereinafter represented by a block symbol containing the alphabetic characters CF and a numerical designation i.e. CF–1. The ohmic value of the resistor R in the standard cathode follower CF–1 may vary depending upon circuit requirements. Consequently, all standard cathode followers are distinguished from each other by the ohmic value of the resistor R shown in the upper right-hand corner of the block.

Cathode followers CF–2 through NCF–12, shown in FIGS. 12 through 24, operate basically in the same manner as the standard cathode follower CF–1. The changes in the cathode followers are obvious from the respective figures and are well known to those skilled in the art. Consequently, no detailed description of these units is believed necessary.

Figure 12:
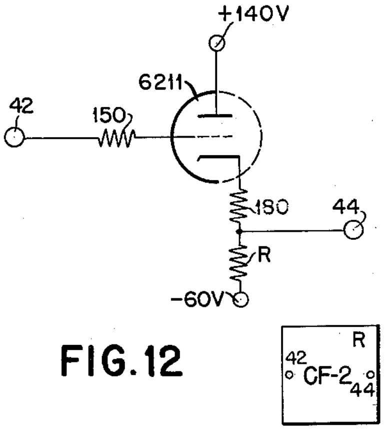

Cathode follower CF–2, shown in FIG. 12, is similar in circuitry to the standard cathode follower CF–1, except that a 6211 half tube is employed rather than the 5965 half tube, with the resulting saving in power since the filament current is smaller.

Figure 13:
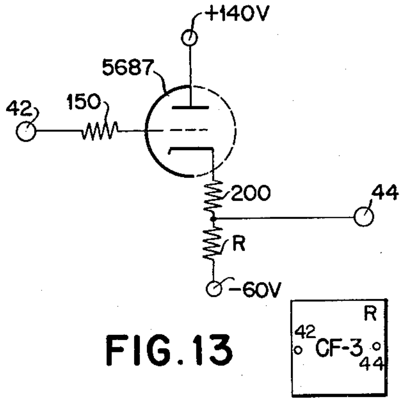
Figure 14:
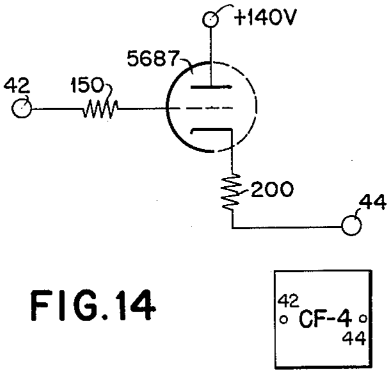

Cathode followers CF–3 and CF–4, shown in FIGS. 13 and 14, are power cathode followers which employ a 5687 half tube rather than the 5965 half tube so as to obtain greater power output without going to parallel cathode followers with the accompanying danger of parasitic oscillations. The principal difference between these two circuits is that the cathode resistor R of the power cathode follower CF–4 is always found in the circuit to which it is connected.

Figure 15:
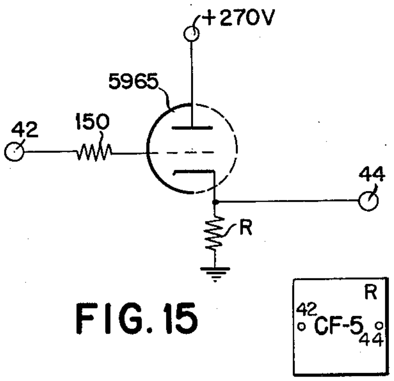

Cathode follower CF–5, shown in FIG. 15, is a plate level cathode follower as it is operated from the plate level of a trigger, to be described hereinafter. The plate level cathode follower CF–5 operates in the same manner as the standard cathode follower CF–1 with the exception that the voltage swing is larger.

Figure 16:
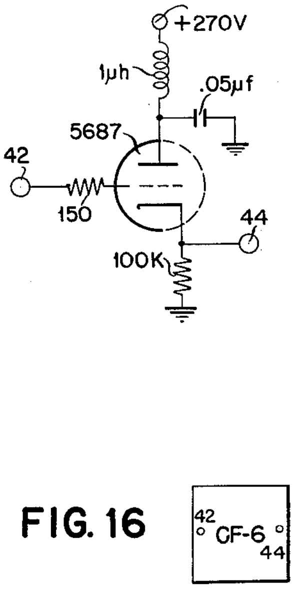

Cathode follower CF–6, shown in FIG. 16, is a write control cathode follower which functions to control the midpoint potential of the write coils associated with each of the READ/WRITE heads.

Figure 17:
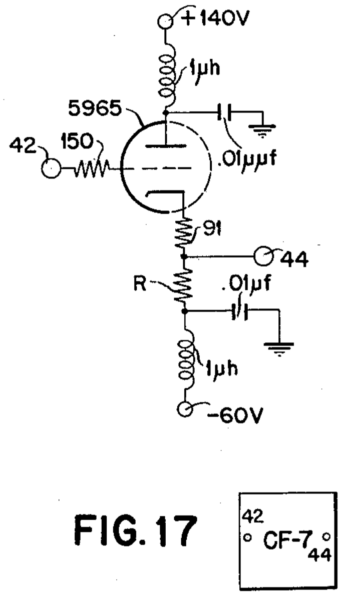

Cathode follower CF–7, shown in FIG. 17, is identical in circuitry to the standard cathode follower CF–1 except that an inductive-capacitive combination is connected in both the plate and cathode circuits to provide additional filtering and decoupling for undesired internally generated noise signals.

Figure 18:
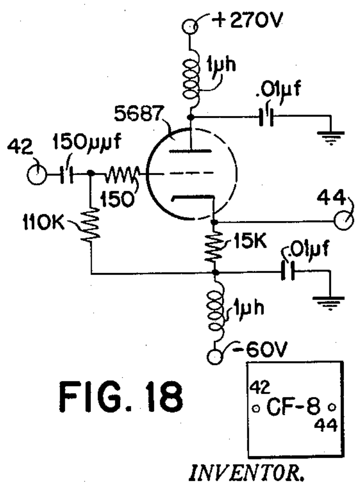
Figure 19:
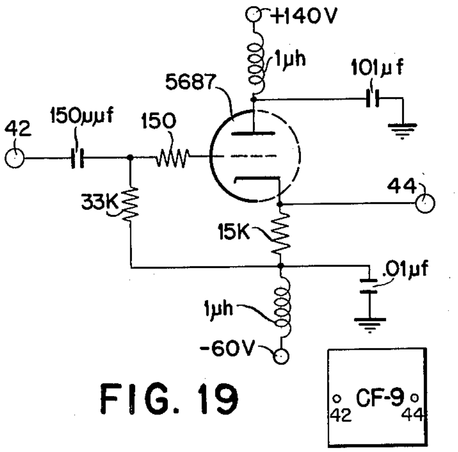

Cathode followers CF–8 and CF–9, shown in FIGS. 18 and 19, are other types of write control cathode followers utilized during a WRITE operation and are driven by various types of peakers, to be described hereinafter.

Figure 20:
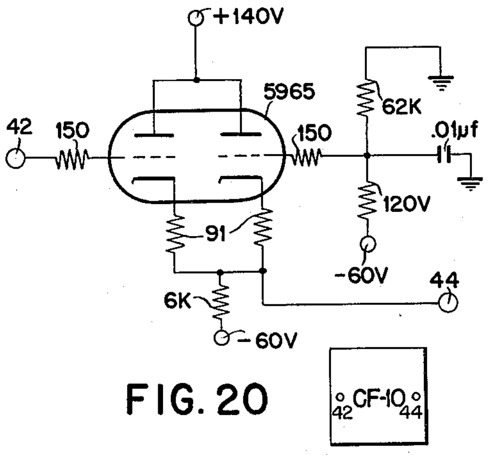
Figure 21:
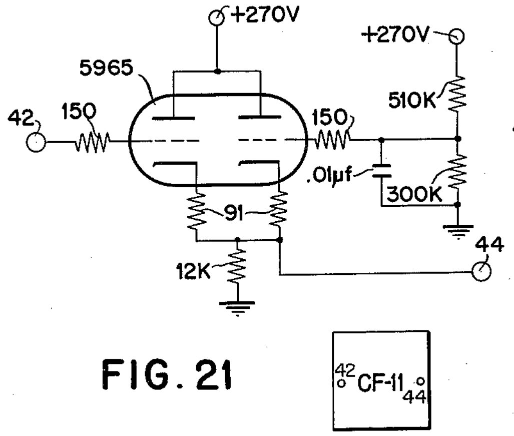

Cathode followers CF–10 and CF–11, shown in FIGS. 20 and 21, are resistance gated diode drivers as they are generally used to drive one or more diode gates heretofore described. The right tube is normally in a conductive state while the left tube is in a non-conductive state. When a positive shift of potential is applied to the input terminal, the left tube is placed in a conductive state and a positive shift of potential occurs at the interconnected cathodes and the output terminal to which they are connected, which, in turn, causes the right tube to be placed in a non-conductive state. Likewise, when the left tube is in a conductive state and a negative shift of potential is applied to the input terminal, the left tube is placed in a non-conductive state and a negative shift of potential occurs at the interconnected cathodes and the output terminal to which they are connected, which, in turn, causes the right tube to be placed in a conductive state. The principal difference between these two circuits is their level of operation.

Referring now to FIG. 22, there is illustrated a block symbol of a plurality of standard cathode followers connected in parallel and also the details of the circuit within the block.

Parallelling cathode followers functions to speed output shifts of potential and, since the effective cathode circuit resistance is lowered, it allows faster discharging of line capacitance.

When standard cathode followers CF–1 are connected in parallel, the number of cathode followers so connected is indicated by the number N preceding the symbol CF in the block symbol. For example, if there are four standard cathode followers connected in parallel the block is identified by the symbol 4CF–1.

Referring now to FIG. 23, there is illustrated a block symbol of parallel connected power cathode followers CF–3 and also the details of the circuit within the block.

As in the previous unit the number of power cathode followers connected in parallel is indicated by the number N preceding the symbol CF in the block diagram.

Referring now to FIG. 24, there is illustrated a block symbol of parallel connected reset cathode followers CF–12 and also the details of the circuit within the block.

Parallel connected reset cathode followers CF–12 are used during reset operations to clamp and reset various triggers, hereinafter described, to their ON or OFF states.

As in the previous two units the number of reset cathode followers connected in parallel is indicated by the number N preceding the symbol CF in the block diagram. Further, the value of the effective cathode circuit resistance R/N in each case is indicated in the upper right-hand corner of the block symbol.

*Inverter—I*

Referring now to FIG. 25, there is illustrated a block symbol of a standard inverter and also the details of the circuit within the block.

An inverter functions to produce an output signal having substantially the same wave shape as the input signal but of opposite polarity and with no appreciable time difference between the input signal and the output signal.

The inverter may employ, for example, a triode tube, the plate of which is connected via plate circuit resistance to a positive voltage source and the output of which is taken from the plate circuit of the triode. A positive input signal applied to the grid of the triode causes an increased flow of current through the tube and the plate circuit resistance with a resulting negative shift of potential occurring at the plate. Consequently, since the output is taken from the plate circuit of the triode, a negative output signal is produced in response to the positive input signal. Likewise, a negative input signal applied to the grid of the triode causes a decreased flow of current through the tube and the plate circuit resistance with a resulting positive shift of potential at the plate. Consequently, a positive output signal is produced in response to the negative input signal.

A standard inverter, which may comprise a 6211 half tube, as indicated in FIG. 25, has its plate connected via a series circuit, comprising a 250 microhenry inductor, a 3K ohm resistor and a 3.3K ohm resistor, to a +140 volt source. The plate is also connected via a voltage divider network, comprising a 390K ohm resistor and a 430K ohm resistor, to a —130 volt source. Additionally, a compensating 8.2 micro-microfarad capacitor is connected in parallel with the 390K ohm resistor. The triode also includes a grid coupled via a 150 ohm resistor and a current limiting 22K ohm resistor, having a compensating 47 micro-microfarad capacitor connected in parallel therewith, to the input terminal 52 and a cathode connected directly to ground. An output terminal 53 is tapped from the voltage divider network and another output terminal 54 is tapped from the junction of the 3K ohm resistor and the 3.3K ohm resistor in the plate circuit.

The standard inverter is hereinafter represented by a block symbol containing the alphabetic character I and a numeric designation i.e. I–1. Further, it should be noted that when the resistor of an AND circuit feeding the standard inverter has a value greater than 270K ohms, the 22K resistor and the 47 micro-microfarad capacitor are omitted, since the purpose of the resistor was current limiting and this function is now fulfilled by the input impedance.

Inverters I–2 through I–4, shown in FIGS. 26 through 28, respectively, operate in basically the same manner as the standard inverter I–1. The changes in the inverters I–2 through I–4 are obvious from the respective figures and are well understood in the art. Consequently, no detailed description of the operation of these inverters is believed necessary.

Inverter I–2, shown in FIG. 26, is similar in circuitry to the standard inverter I–1, except that a 5687 half tube is employed rather than the 6211 half tube, and the voltage divider network is omitted so that the output is taken from the plate of the tube. The inverter I–2 is a write inverter which functions to drive a peaker, to be described hereinafter, during a WRITE operation.

Inverter I–3, shown in FIG. 27, is another type of write inverter which functions to cause a binary 1 or a binary 0 to be written on the drum 100, depending upon whether the right tube or the left tube, respectively, of the dual triode 5867 is rendered conductive.

Inverter I–4, shown in FIG. 28, is a pull over inverter which functions to pull a hold over single shot multivibrator, to be described hereinafter. over to its ON state.

*Peaker—PKR*

Referring now to FIG. 29, there is illustrated the block diagram of a standard peaker and also the details of the circuit within the block.

A peaker functions to produce a positive output pulse having a very short duration but an extremely sharp leading edge.

The peaker may employ, for example, a triode tube, the plate of which is connected to a parallel RLC network and the output of which is taken from the plate of the triode. The grid is maintained at a slightly positive potential so that the triode is normally conducting a heavy current thereby maintaining the plate and the output terminal to which it is connected at a relatively negative potential. When a negative pulse or a negative shift of potential is applied to the grid of the triode, the triode is cut off and the plate current drops to zero with a resulting collapse of the magnetic field around the inductance in the plate circuit. However, in so doing, the change in magnetic field induces a voltage in the plate circuit inductance which tends to keep the current flowing. The induced voltage is of such a polarity that a sharp positive shift of potential appears at the plate of the triode and at the output thereof. The width of the pulse is dependent upon the inductance and the capacitance in the plate circuit while the amplitude of the pulse is largely dependent upon the amount of inductance in the plate circuit and the rate of change in current through the tube when it is cut off. The induced current in the plate circuit inductance begins to oscillate between the inductance and the capacitance in the plate circuit of the triode, but the triode itself provides sufficient damping so that the energy is damped out in the first period of the signal and only a single sharp positive pulse appears at the output thereof.

A standard peaker may employ a 5687 half tube having a plate connected via a series circuit, comprising a 10 microhenry inductor, a 4.5K ohm resistor and a 1 microhenry inductor, to a +140 volt source. Each end of the 4.5K ohm resistor is connected via a .01 microfarad capacitor to ground. The triode also includes a grid connected via a 150 ohm resistor and a 150 micro-microfarad capacitor to an input terminal 63. The junction of the 150 ohm resistor and the 150 micro-microfarad capacitor is connected via a 33K ohm resistor to ground and via a 100K ohm resistor to the junction of the 4.5K ohm resistor and the 1 microhenry inductor. Additionally, the triode includes a cathode which is connected directly to ground, while an output terminal 64 is connected directly to the plate of the triode.

The standard peaker is hereinafter represented by a block symbol containing the alphabetic characters PKR and a numerical designation i.e. PKR–1. Additionally, the pulse width, in microseconds, of the output pulse is indicated in the upper right-hand corner of the block symbol.

Peakers PKR–2 and PKR–3, shown in FIGS. 30 and 31, operate basically in the same manner as the standard peaker PKR–1. The changes in the peakers PKR–2 and PKR–3 are obvious from the respective figures and are well known to those skilled in the art. Consequently, no detailed description thereof is believed necessary.

Peaker PKR–2, shown in FIG. 30, is a write peaker which responds during a WRITE operation, to a negative shift of potential from the write inverter I–2, heretofore described, to produce a positive output pulse which is fed to the write cathode follower CF–8 heretofore described.

Peaker PKR–3, shown in FIG. 31, is a pulse forming peaker which is used to generate pulses at various points in the unit. Additionally, positive shifts of potential at the input are clamped out by the diode to ground and by the diode to the grid resistor. The pulse forming peaker PKR–3 responds to a negative shift of potential to produce a positive output signal. The pulse width, in microseconds, of the output pulse from each of the above units is indicated in the upper right-hand corner of the block symbol.

*Preamplifier—PA*

Referring now to Fig. 32, there is illustrated a block symbol of a standard preamplifier and also the details of the circuit within the block.

A preamplifier is a device which functions to increase the power of the signal applied thereto.

The preamplifier employs a cathode follower circuit in which the cathode resistor is found in the circuit to which it is connected. The characteristics of a cathode follower has been described heretofore and it will be remembered that it produces an output signal having greater power than the input signal, but of the same polarity and substantially the same wave shape and with no appreciable time delay between the input signal and the output signal.

A standard preamplifier, which may comprise a 6072 half tube, has its plate connected to a supply terminal 67, a grid connected via a 4.7K ohm resistor to an input terminal 65 and a cathode connected to the output terminal 66. The average input signal to the preamplifier is approximately 40 millivolts and since the standard preamplifier has a gain of .6, the output signal of the standard preamplifier is approximately 24 millivolts.

The standard preamplifier is hereinafter represented by a block symbol containing the alphabetic characters PA and a numerical designation i.e. PA–1.

*Drum amplifier—DA*

Referring now to FIG. 33, there is illustrated a block symbol of a standard drum amplifier and also the details of the circuit within the block.

An amplifier is a device which functions to increase the magnitude of a signal applied thereto.

The well known inherent characteristics of certain vacuum tubes cause an input signal, applied to the grid, to be amplified so as to produce a signal of greater magnitude at the plate thereof. The amplified signal may, when desired, be fed through successive amplifier stages for further magnification.

A standard drum amplifier is composed of three stages. The first stage comprises a dual triode of the 5965 type. The plate of the right-hand tube is connected via a series circuit, comprising a 12K ohm resistor, a 2.7K ohm resistor and a 1 microhenry inductor, to a +140 volt source. The junction of the 12K ohm resistor and the 2.7K ohm resistor and the junction of the 2.7K ohm resistor and the 1 microhenry inductor are each connected via a .05 microfarad capacitor to ground. The plate of the left-hand tube is connected to the upper junction in the plate circuit of the right-hand tube. The grid of the right-hand tube is connected to ground while the grid of the left-hand tube is connected via a 4.7K ohm resistor and a 1.5K ohm resistor to ground. The junction of the 4.7K ohm resistor and the 1.5K ohm resistor is connected to the input terminal 68. The cathodes of the dual triode are interconnected and coupled via a series circuit, comprising a 6.8K ohm resistor and a 1 microhenry inductor, to a −60 volt source. The junction of the 6.8K ohm resistor and the 1 microhenry inductor is connected via a .05 microfarad capacitor to ground. The first stage of the standard drum amplifier is coupled from the plate of the right-hand tube via a 3300 microfarad capacitor to the grid resistor of the left-hand tube of the second stage. The second stage of the ground amplifier is similar in design to that of the first stage and is coupled from the plate of the right-hand tube thereof via a 560 micro-microfarad capacitor to the grid of the left-hand tube of the third stage. The third stage of the standard drum amplifier is similar in design to that of the previous stages and the output terminal 69 of the drum amplifier is taken from the plate of the right-hand tube of the last stage. Each stage has a gain of approximately 10 so that the overall gain of the three stage standard drum amplifier is 1000. Further, since there are three stages, the signal at the input terminal 68 is not only amplified but also appears inverted at the output terminal 69. The 1.5K ohm resistor at the input terminal 57 also functions as the cathode resistor of the preamplifier heretofore described. The output of the preamplifier has a magnitude of approximately 24 millivolts and since the three stage drum amplifier has an overall gain of 1000, the output signal of the drum amplifier has a magnitude of approximately 24 volts.

The standard drum amplifier is hereinafter represented by a block symbol containing the alphabetic characters DA and a numerical designation i.e. DA–1.

Drum amplifier DA–2, shown in FIG. 34, operates basically in the same manner as the standard drum amplifier DA–1. The changes in the drum amplifier DA–2 is obvious from the figure and is well understood in the art. Consequently, no detailed description of the operation of this unit is believed necessary.

Drum amplifier DA–2, shown in FIG. 34, is also composed of three stages and functions to amplify the signals induced in the timing read head associated with the timing track of the DRUM 100. The drum amplifier RA–2 has an overall gain of 1500 and with an average input signal of approximately 40 millivolts the output signal will have a magnitude of approximately 60 volts.

*Grounded grid amplifier—GA*

Referring now to FIG. 35, there is illustrated a block symbol of a standard grounded grid amplifier and also the details of the circuit within the block.

A grounded grid amplifier functions to amplify and reshape the input signal applied thereto, but when the output signal reaches a predetermined level of potential it remains set at this level regardless of any further positive shift in potential of the input signal.

The grounded grid amplifier may employ, for example, a dual triode, the cathodes of which are interconnected and coupled via cathode circuit resistance to a negative voltage source. The input signal is applied to the grid of the left-hand tube, while the output is taken from a voltage divider network connected to the plate of the right-hand tube. The grid of the right-hand tube is held at a slightly negative potential so that with no input signal applied to the grid of the left-hand tube, the right-hand tube will be in a conductive state while the left-hand tube will be in a non-conductive state. When a positive shift of potential is applied to the input of the grounded grid amplifier, the potential at the grid of the left-hand tube starts to rise, and when the cut off potential is reached, the left-hand tube starts to conduct. Consequently, more current is drawn through the cathode circuit resistance with a resulting positive shift of potential at the interconnected cathodes, which tends to cut off the right-hand tube. The tube characteristics of the dual triode are such that when the positive shift of potential at the input of the grounded grid amplifier reaches a slightly positive potential the right-hand tube is completely cut off and any further rise in potential at the input of the grounded grid amplifier has no effect on the output signal. Thus, the signal at the output of the grounded grid amplifier remains set at a predetermined level until a negative shift of potential is applied to the ground grid amplifier whereupon a similar operation as described above occurs to cut off the left-hand tube and cause the right-hand tube to conduct.

A standard grounded grid amplifier, which may comprise a dual triode of the 5965 type, as indicated in FIG. 35, has the plate of the right-hand tube connected via a series circuit, comprising a 750 microhenry inductor and a 9K ohm resistor, to a +140 volt source. The plate of the right-hand tube is also connected via a voltage divider network, comprising a 390K ohm resistor and a 430K ohm resistor, to a −130 volt source. Also an 8.2 micro-microfarad capacitor is connected in parallel with the 390K ohm resistor. The grid of the right-hand tube is connected via a 1.5K ohm resistor to ground and via a 30K ohm resistor to a −60 volt source, while the grid of the left-hand tube is connected via a 150 ohm resistor to the input terminal 70. The cathodes of the dual triode are interconnected and coupled via a 12K ohm resistor to a −130 volt source. An output terminal 71 is connected to the junction of the 390K ohm resistor and the 430K ohm resistor of the voltage divider network.

The standard grounded grid amplifier is hereinafter represented by a block diagram containing the alphabetic characters GA and a numeric designation i.e. GA–1. Additionally, it should be noted that when the standard grounded grid amplifier is feeding two successive cathode followers the voltage divider is composed of a 270K ohm resistor and a 560K ohm resistor while the capacitor in parallel with the upper resistor has a value of 15 micro-microfarads.

It should be noted that the left-hand tube of the standard grounded grid amplifier GA–1 is actually a cathode follower. Consequently, by adding another cathode follower and using the cathode circuit resistance of the grounded grid amplifier as a common cathode resistor, a two way OR circuit is provided to drive the grounded grid amplifier, as shown in FIG. 36. Additionally, any number of triodes may be connected in this manner to provide a multiple OR circuit driving the grounded grid amplifier. Hence, hereinafter, when a grounded grid amplifier is provided with a multiple OR circuit input it is designated as GA–2 and will be distinguished from each other by the number of input lines at the left side of the block diagram.

*Trigger—T*

Referring now to FIG. 37, there is illustrated a block symbol of a standard trigger and also the details of the circuit within the block.

A trigger, commonly known as the Eccles-Jordan trigger, functions as a storage or control device inasmuch as it is a bistable device, that is, one that remains in either one of two stable states until it is forced or triggered by an input signal to assume the other state and each subsequent input signal being effective to turn the trigger to the opposite state.

The trigger may comprise a cross coupled dual triode, that is, the plate of the right-hand tube is resistively coupled via a voltage divider network to the grid of the left-hand tube, while the plate of the left-hand tube is resistively coupled via a voltage divider network to the grid of the right-hand tube. Therefore, any changes in potential at the plates of the dual triode are coupled to the grids of the opposite tubes. One stable state of the trigger is termed the OFF or reset state and exists when the right-hand tube is in a conductive state while the left-hand tube is in a non-conductive state. In this state, the plate of the right-hand tube is at a relatively negative potential while the plate of the left-hand tube is at a relatively positive potential. If a negative pulse or negative shift of potential is applied to the grid of the right-hand tube, the right-hand tube is forced or triggered to a non-conductive state with a resulting positive shift of potential occurring at the plate thereof which is coupled via the voltage divider cross coupling to the grid of the left-hand tube so that the left-hand tube is triggered to a conductive state with a resulting negative shift of potential occurring at the plate thereof. This is the other stable state of the trigger and is termed the ON or SET state. The trigger may also be set to the ON state by applying a positive pulse or positive shift of potential to the grid of the non-conducting left-hand tube. This causes the left-hand tube to be triggered to a conductive state with a resulting negative shift of potential occurring at the plate thereof, which is coupled via the voltage divider cross coupling to the grid of the conducting right-hand tube so that the right-hand tube is triggered to a non-conductive state. In a similar manner when the trigger is in the ON state it may be reset back to the OFF state by the application of a negative pulse or a negative shift of potential at the grid of the left-hand tube or a positive pulse or a positive shift of potential at the grid of the right-hand tube. Outputs are tapped from the plate circuit resistance of both tubes and from other voltage divider networks connected to the plates of the dual triode. Consequently, upon setting the trigger to the ON state, positive shifts of potential occur at the outputs associated with the right-hand tube while negative shifts of potential occur at the outputs associated with the left-hand tube and vice versa when the trigger is reset back to the OFF state.

A standard trigger may comprise a dual triode of the 6211 type having each plate connected via a voltage divider network compirsing an 82K ohm resistor, a 62K ohm resistor and a 47K ohm resistor, to a —130 volt source. The junction of the 82K ohm resistor and the 62K ohm resistor in each voltage divider network is connected via a 150 ohm resistor to the respective grids of the dual triode and via respective clamping diodes to a —12 volt source so that the potential at the grids cannot fall appreciably below —12 volts. Additionally, a 15 micro-microfarad capacitor is connected in parallel with each of the 82K ohm resistors. Also a set terminal 75 is connected to the right-hand junction while a reset terminal 73 is connected to the left-hand junction. Each plate of the dual triode is connected via a series circuit, comprising a 750 microhenry inductor, a 3.9K ohm resistor and a 4.3K ohm resistor, to a +140 volt source. Output terminal 78 is tapped from the junction of the 4.3K ohm resistor and the 3.9K ohm resistor associated with the right-hand tube, while output terminal 79 is tapped from the junction of the 4.3K ohm resistor and the 3.9K ohm resistor associated with the left-hand tube. Each plate of the dual triode is also connected via a voltage divider network, comprising a 390K ohm resistor and a 470K ohm resistor, to a —130 volt source. An 8.2 microfarad capacitor is connected in parallel with the 390K ohm resistor in each voltage divider network. Additionally, output terminals 74 and 76 are connected to the junction of the 390K ohm resistor and the 470K ohm resistor in each voltage divider network. The plate of the right-hand tube is also connected via a 1 megohm resistor to a neon tube indicator which is caused to glow when the trigger is set to the ON state and thereby indicate that the trigger is in the ON state.

The standard trigger is hereinafter represented by a block symbol diagram containing alphabetic character T.

*Standard trigger inputs*

In order to increase the versatility of the standard trigger T, a variety of input circuits have been devised to be utilized with the standard trigger T. In general, an input circuit may be described as being either a positive D.C. input circuit or a negative shift input circuit. Further, there are two types of positive D.C. input circuits utilized with the standard trigger T, namely, a single input circuit and a +AND input circuit.

A positive D.C. input circuit functions to pass a positive shift of potential to an input terminal of the standard trigger T, while a negative shift input circuit functions to pass a negative shift of potential to an input terminal of the standard trigger T, either shift of potential being effective to shift the standard trigger T from its present state to its opposite state.

Figure 38:
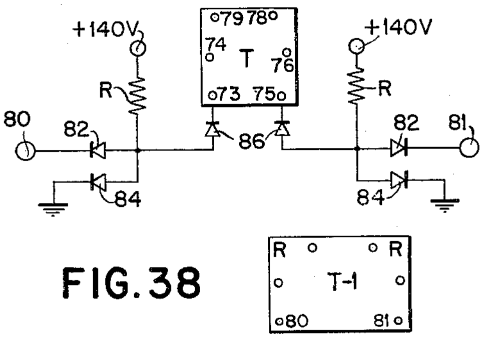

Referring now to FIG. 38, there is illustrated a block symbol of a standard trigger having single input circuits connected to the set and reset terminals thereof and also the details of the circuit within the block.

A single input circuit is composed of a one-way AND circuit which is clamped to ground and an isolating diode. The input terminal of the single input circuit is normally at a negative potential and, therefore, the diode to which it is connected is in a conductive state. If a negative shift of potential is applied to the one-way AND circuit, conduction through the diode increases causing the potential at the output of the one-way AND circuit to drop, which drop in potential is applied to the anode of the isolating diode and is of such a magnitude as to maintain the isolating diode cut off, thereby isolating the input terminal of the standard trigger T from negative shifts of potential. However, if a positive shift of potential is applied to the one-way AND circuit, its diode is cut off and the potential at the output of the one-way AND circuit and at the anode of the isolating diode starts to rise toward ground potential. When the potential reaches a value corresponding to that existing at the cathode of the isolating diode, the isolating diode conducts and the potential at the input terminal of the standard trigger T, which is connected to the cathode of the isolating diode, then follows the rise in potential occurring at the anode of the isolating diode. If the input circuit is connected to the conductive side of the standard trigger T, the rise in potential has no effect thereon as the tube associated therewith is in a conductive state. However, if the input circuit is connected to the non-conductive side of the standard trigger T, the rise in potential causes the trigger to shift to the opposite state from which it is presently set.

A single input circuit is composed of two diodes 82 and 84, the anode of the diode 82 being connected to either the input terminal 80 or 81, while the anode of the diode 84 is connected directly to ground. The cathodes are coupled via a common resistor R to a +140 volt source and via an isolating diode 86 to either the reset or set terminals of the standard trigger T.

A standard trigger T having single input circuits connected to either or both the reset and set terminals thereof is hereinafter represented by a block symbol containing the alphabetic character T and a numerical designation i.e. T–1. The ohmic value of the common resistors in the input circuits is indicated in the upper right and/or left-hand corners of the block symbol. Additionally, the input terminal of an input circuit, connected to the reset terminal of the standard trigger T, is hereinafter termed the reset input, while the input terminal of an input circuit, connected to the set terminal of the standard trigger T, is hereinafter termed the set input.

Figure 39:
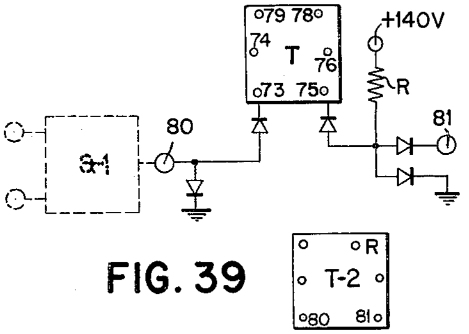

Referring now to FIG. 39, there is illustrated a block symbol of a standard trigger having a +AND input circuit and a single input circuit connected to the reset and set terminals thereof, respectively, and also the details of the circuit within the block.

A +AND input circuit consists of a two-way positive AND circuit which is clamped to ground and an isolating diode. It operates in a similar manner as the single input circuit except that it requires a coincidence of positive signals at the inputs of the two-way positive AND circuit before it passes a positive shift of potential to cause the standard trigger T to shift from its present state to its opposite state.

A standard trigger T having a +AND input circuit connected to the reset terminal thereof and a single input circuit connected to the set terminal thereof is hereinafter represented by a block symbol containing the designation T–2. The ohmic value of the common resistor in the single input circuit is indicated in the upper right-hand corner of the block symbol. Further, the two-way positive AND circuit is shown in dotted outline in FIG. 39 inasmuch as it is hereinafter indicated externally to the block symbol diagram.

Figure 40:
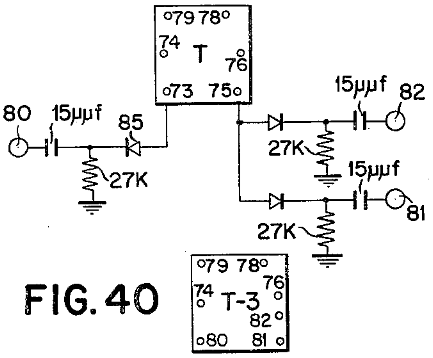

Referring now to FIG. 40, there is illustrated a block symbol of a standard trigger having negative shift input circuits connected to either or both the set and reset terminals thereof and also the details of the circuit within the block.

A negative shift input circuit consists of a differentiating circuit and an isolating diode. If a positive shift of potential is applied to the differentiating circuit a sharp positive pulse occurs at the output thereof which is applied to the cathode of the isolating diode and is of such a magnitude as to maintain the isolating diode cut off, thereby isolating the input terminal of the standard trigger T from positive shifts of potential. However, if a negative shift of potential is applied to the differentiating circuit a sharp negative pulse, occurring at the output thereof, is applied to the cathode of the isolating diode. When the potential at the cathode drops to a value corresponding to that existing at the anode of the isolating diode, the isolating diode conducts and the potential at the input terminal of the standard trigger T, which is connected to the anode of the isolating diode, then follows the drop in potential occurring at the cathode of the isolating diode. If the input circuit is connected to the non-conductive side of the standard trigger T, the drop in potential has no effect thereon as the tube associated therewith is in a non-conductive state. However, if the input circuit is connected to the conductive side of the standard trigger T, the drop in potential causes the trigger to shift to the opposite state from which it is presently set.

A negative shift input circuit is composed of a differentiating circuit, including a 15 micro-microfarad capacitor and a 27K ohm resistor, and an isolating diode 85. It should be noted that in instances where a diode gate is coupled to a trigger, the capacitor associated with the diode gate functions as part of the differentiating circuit of the negative shift input circuit.

A standard trigger having negative shift input circuits connected to either or both the reset and set terminals thereof or having a two-way negative shift input circuit connected to the set terminal thereof is hereinafter represented by a block symbol containing the designation T–3.

Figure 41:
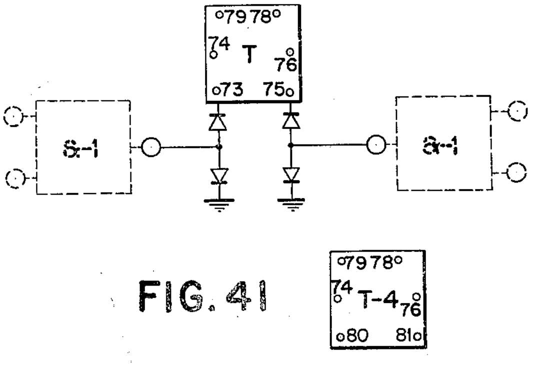

Referring now to FIG. 41, there is illustrated a block symbol of a standard trigger having +AND input circuits connected to both the reset and set terminals thereof and also the details of the circuit within the block. A +AND input circuit has been described heretofore and, consequently, no detailed description thereof is believed necessary. A standard trigger having such input circuits is hereinafter represented by a block symbol containing the designation T–4. Further, the two-way positive AND circuits are shown in dotted outline in FIG. 41 inasmuch as they are hereinafter indicated externally to the block symbol diagram.

Figure 42:
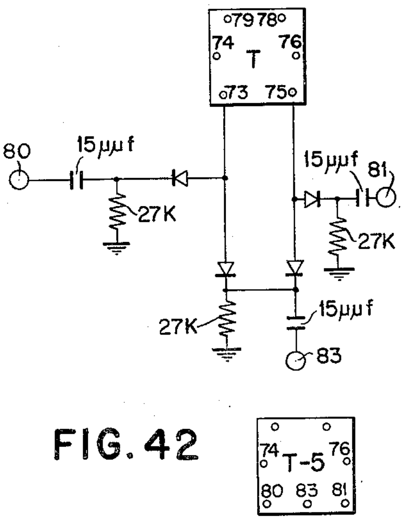

Referring now to FIG. 42, there is illustrated a block symbol of a standard trigger having a pair of negative shift input circuits connected to the set and reset terminals thereof and another pair of negative shift input circuits, using a common differentiating circuit, connected to the set and reset terminals thereof and also the details of the circuit within the block. Negative shift input circuits have been described heretofore and, consequently, no detailed description thereof is believed necessary. A standard trigger having such an input circuit arrangement is hereinafter represented by a block symbol containing the designation T–5.

*Contact operated trigger—CT*

Referring now to FIG. 43, there is illustrated a block symbol of a standard contact operated trigger and also the details of the circuit within the block.

A contact operated trigger functions as a control device inasmuch as it has two states of stability and is operated from a mechanical device such as a key, relay or a cam. Since mechanical devices, when actuated, can bounce, that is, can close and open several times, it is necessary to safeguard against multple operation of the trigger since only the first actuation of the mechanical device is to operate the trigger. Consequently, an integrating input circuit is provided to safeguard against spurious settings of the trigger.

The control operated trigger resembles the standard trigger T in that it is a bistable device, but differs therefrom in that the switching from one state to the other is always controlled by a shift in potential at the grid of the left-hand tube.

The contact operated trigger may comprise a dual triode and is essentially a two-stage resistively coupled amplifier which is so biased that the trigger is normally in the OFF state, that is, with the left-hand tube in a non-conductive state and the right-hand tube in a conductive state so that the output of the trigger, which is connected to the plate of the right-hand tube, is at a relatively negative potential. The contact operated trigger remains in the OFF state until the mechanical device is actuated whereupon a positive shift of potential is applied to the grid of the left-hand tube. When the potential at the grid of the left-hand tube reaches a particular value, switching action takes place and the trigger is set to the ON state, that is, with the left-hand tube in a conductive state and the right-hand tube in a non-conductive state so that the potential at the output of the trigger is switched to a relatively positive value. The contact operated trigger remains in this state until the mechanical device is de-actuated whereupon a negative shift of potential is applied to the grid of the left-hand tube causing the trigger to be reset back to the OFF state.

A standard contact operated trigger may comprise a dual triode of the 6211 type. The plate of the left-hand tube is connected via an 18.2K ohm resistor to a +140 volt source and via a voltage divider network, comprising a 91K ohm resistor and a 180K ohm resistor, to a −130 volt source. A 33 micro-microfarad compensating capacitor is connected in parallel with the 91K ohm resistor and the junction of the 91K ohm resistor and the 180K ohm resistor is coupled via a 150 ohm grid resistor to the grid of the right-hand tube. The grid of the left-hand tube is coupled via a series circuit, comprising a 5.1K ohm resistor, a 47K ohm resistor and a 150K ohm resistor to an input terminal 84. The junction of the 47K ohm resistor and the 5.1K ohm resistor is coupled via a .001 microfarad capacitor to ground, while the junction of the 47K ohm resistor and the 150K ohm resistor is coupled via a parallel circuit, comprising a 150K ohm resistor and a .01 microfarad capacitor, to ground. The cathodes of the dual triode are connected via a common 3K ohm resistor to ground. The plate of the right-hand tube is connected via a 12.4K ohm resistor to a +140 volt source, via a 1 megohm resistor and a neon tube to ground and via a voltage divider network, comprising a 390K ohm resistor and a 430K ohm resistor, to the −130 volt source. A 15 micro-microfarad compensating capacitor is connected in parallel with the 390K ohm resistor and an output terminal 85 is connected to the junction of the voltage divider network.

The standard contact operated trigger is hereinafter represented by a block symbol containing the alphabetic characters CT and a numeric designation i.e. CT–1.

*Single shot multivibrator—SS*

Referring now to Fig. 44, there is illustrated a block symbol of a standard single shot multivibrator and also the details of the circuit within the block.

A single shot multivibrator functions to produce positive and/or negative rectangular wave shaped signals of predetermined time duration.

The single shot multivibrator resembles the standard trigger T in that it may be triggered to the ON state by an input signal, but differs therefrom in that it automatically returns to the OFF state after a predetermined period of time without requiring a subsequent input signal.

The single shot multivibrator may comprise a cross-coupled dual triode, that is, the plate of the right-hand tube is resistively coupled via a voltage divider network to the grid of the left-hand tube, while the plate of the left-hand tube is capacitively coupled to the grid of the right-hand tube. Additionally, an RC network is connected to the grid of the right-hand tube which is used to control the time duration of the ON state of the single shot multivibrator and an input circuit is connected to the grid of the left-hand tube. The grids of the dual triode are so biased that the single shot multivibrator is normally in the OFF state, that is, with the left-hand tube in a non-conductive state and the right-hand tube in a conductive state. If a positive shift of potential is applied via the input circuit to the grid of the left-hand tube, switching action occurs, as in the standard trigger T, and the single shot multivibrator is set to the ON state with a resulting negative shift of potential occurring at the plate of the left-hand tube and a positive shift of potential occurring at the plate of the right-hand tube. The single shot multivibrator remains in the ON state for a period of time dependent upon the time constant of the RC network associated with the grid of the right-hand tube. The capacitance of the RC network, connected to the grid of the right-hand tube, starts to charge through its associated resistance causing the potential at the grid of the right-hand tube to rise toward a relatively positive value. When the potential reaches a slightly positive value the right-hand tube begins to conduct once more and switching action takes place causing the single shot multivibrator to be reset back to the OFF state. The time duration of the ON state of the single shot multivibrator can be varied by varying the values of the resistance and capacitance in the RC network connected to the grid of the right-hand tube. Outputs are tapped from the plate circuit resistance of both tubes and from other voltage divider networks connected to the plates of the dual triode. Consequently, as with the standard trigger T, upon setting the single shot multivibrator to the ON state, positive shifts of potential occur at the outputs associated with the right-hand tube, while negative shifts of potential occur at the outputs associated with the left-hand tube and vice versa when the single shot multivibrator is reset back to the OFF state.

A standard single shot multivibrator may comprise a dual triode of the 6211 type. The plate of the left-hand tube is connected via a series circuit, comprising two 6.2K ohm resistors, to a +140 volt source and via a voltage divider network, comprising a 390K ohm resistor and a 430K ohm resistor, to a −130 volt source. An output terminal 94 is tapped from the junction of the two 6.2K ohm resistors. A 10 micro-microfarad capacitor is connected in parallel with the 390K ohm resistor and an output terminal 88 is connected to the junction of the voltage divider network. The plate of the left-hand tube is also cross-coupled via a 15 micro-microfarad capacitor and a 150 ohm grid resistor to the grid of the right-hand tube. The plate of the right-hand tube is connected via a series circuit, comprising a 5.1K ohm resistor, a 6.8K ohm resistor and an 8.2K ohm resistor, to a +140 volt source. An output terminal 92 is tapped from the junction of the 8.2K ohm resistor and the 6.8K ohm resistor. The junction of the 6.8K ohm resistor and the 5.1K ohm resistor is connected via a voltage divider network, comprising a 430K ohm resistor and a 470K ohm resistor, to a −130 volt source. A 10 micro-microfarad capacitor is connected in parallel with the 430K ohm resistor and an output terminal 90 is connected to the junction of the voltage divider network. The plate of the right-hand tube is also cross-coupled via a parallel network, comprising a 330K ohm resistor and a 15 micro-microfarad capacitor, and a 150 ohm grid resistor to the grid of the left-hand tube. The cathodes of the dual triode are interconnected and coupled via a series circuit, comprising a 2.4K ohm resistor and a 7.5K ohm resistor, to a −60 volt source. The grid resistor of the left-hand tube is connected via a 220K ohm resistor to the −60 volt source, while the grid resistor of the right-hand tube is connected via a parallel circuit, comprising a 1.8 megohm resistor and a 47 micro-microfarad capacitor, to the junction of a voltage divider network, comprising a 100K ohm resistor connected to the −60 volt source and an 82K ohm resistor connected to a +140 volt source. The junction of the left-hand grid resistor and the 220K ohm resistor is connected via a diode to the junction of the 2.4K ohm resistor and the 7.5K ohm resistor in the cathode circuit and via a 47 micro-microfarad capacitor and a 38 micro-microfarad capacitor to the input terminal 86. The junction of the 39 micro-microfarad capacitor and the 47 micro-microfarad capacitor is connected via a parallel circuit comprising a diode and a 100K ohm resistor to ground. Although almost all of the elements in the circuit effect the timing to a greater or less extent, the 1.8 megohm resistor and the 47 micro-microfarad capacitor associated with the grid of the right-hand tube are the components used to vary the timing.

The single shot multivibrator is hereinafter represented by a block symbol containing the alphabetic characters SS and a numeric designation i.e. SS–1. Additionally, the time duration of the output pulses, in microseconds, from the single shot multivibrator is indicated in the upper right-hand corner of the block.

Single shot multivibrators SS–2 and SS–3, shown in FIGS. 45 and 46, operate basically in the same manner as the standard single shot multivibrator SS–1. The changes are obvious from the respective figures and, consequently, no further description thereof is believed necessary.

Single shot multivibrator SS–2, shown in FIG. 45, is similar in circuitry to the standard single shot multivibrator SS–1, except that the 47 micro-microfarad capacitor, associated with the grid of the right-hand tube, is not connected in parallel with the 1.8 megohm resistor but via an input circuit to an input terminal 96, with the result that the single shot multivibrator SS–2 may be triggered by negative input pulses.

Single shot multivibrator SS–3, shown in FIG. 46, is a hold over single shot multivibrator which is driven by a pull over inverter I–4, heretofore described. Generally, a series of input pulses are applied to the hold over single shot multivibrator SS–3, having a pulse repetition rate which is greater than the time duration of the multivibrator. Thus, when the first pulse is applied thereto, the multivibrator is switched to the ON state and remains in such state as long as the series of pulses is applied thereto. When the input pulses cease, the capacitance in the RC network, associated with the grid of the right-hand tube, starts to charge up until the right-hand tube conducts whereupon the multivibrator SS-3 is switched back to the OFF state.

*Shaper—S*

Referring now to FIG. 47, there is illustrated a block symbol of a standard shaper and also the details of the circuit within the block.

A shaper functions to reshape an AC signal into a square wave shaped signal.

The shaper may comprise a dual triode and is essentially a double inverter. It operates in a similar manner as the standard contact operated trigger CT, that is, it is switched to an ON state when the potential at the grid of the left-hand tube rises above a certain level and is switched back to an OFF state when the potential at the grid of the left-hand tube drops below the same level. Thus, it is apparent that the shaper is, so to speak, triggered to an ON state by the leading edge of the positive half of an AC signal and is triggered back to an OFF state by the trailing edge of the positive half of the AC signal so as to produce a square wave shaped output signal.

A standard shaper may comprise a dual triode of the 5965 type. The plate of the left-hand tube is connected via a 15K ohm resistor and a 1 microhenry inductor to a +140 volt source. The grid of the left-hand tube is connected via a clamping diode to ground and via a 10K ohm resistor and a 100 micro-microfarad capacitor to the input terminal 98. The junction of the 100 micro-microfarad capacitor and the 10K ohm resistor is connected via a 100K ohm resistor to ground. The plate of the left-hand tube is also capacitively coupled via a 100 micro-microfarad capacitor to the grid of the right-hand tube. The plate of the right-hand tube is connected via a 10K ohm resistor and the 1 microhenry inductor, in the left-hand plate circuit, to the +140 volt source. The plate of the right-hand tube is also connected via a voltage divider network, comprising a 390K ohm resistor and a 430K ohm resistor, to a −130 volt source. An 8.2 micro-microfarad compensating capacitor is connected in parallel with the 390K ohm resistor and an output terminal 99 is connected to the junction of the voltage divider network. Additionally, the junction of the 15K ohm resistor and the 1 microhenry inductor in the left-hand plate circuit is connected via a voltage divider network, comprising a 1 megohm resistor, a 100K ohm resistor, and a 1.5K ohm resistor to ground. A .05 microfarad capacitor is connected in parallel with the voltage divider network. The cathodes of the dual triode are interconnected and coupled to the junction of the 100K ohm resistor and the 1.5K ohm resistor, while the grid of the right-hand tube is connected to the junction of the 1 megohm resistor and the 100K ohm resistor.

The standard shaper is hereinafter represented by a block symbol containing the alphabetic character S and a numerical designation i.e. S-1.

*Detailed description*

Referring again to FIG. 4, it is noted that the DRUM STORAGE UNIT of the present invention is shown as including a DRUM 100, an ADDRESS TIMING REGISTER 200, an ADDRESS INPUT REGISTER 400, an ADDRESS COINCIDENCE DETECTOR 500, READ/WRITE CONTROL CIRCUITS 600, WRITE CIRCUITS 900 and READ CIRCUITS 1000.

A general description of the major components of the DRUM STORAGE UNIT, including the general arrangement and operation of the logical block diagrams which comprise the major components, has been given hereinbefore. Likewise, a detailed description of the block symbols, which comprises the logical block diagrams of the major components, has also been fully covered hereinbefore.

Now, a detailed description will be given of the logical block diagrams which comprise the major components of the DRUM STORAGE UNIT, starting with the ADDRESS TIMING REGISTER 200, and their inter as well as intra connections that have been disclosed generally hereinabove.

*Address timing register*

Referring now to FIG. 5A1, there is shown in block form the components of the ADDRESS TIMING REGISTER 200.

The ADDRESS TIMING REGISTER 200 includes a TIMING READ AMPLIFIER and SHAPER UNIT 202, an INDEX GENERATOR 238, a TIMER STEP CONTROL UNIT 262, a DRUM TIMER 305 consisting of a series of five RING COUNTERS 306, 316, 344, 352 and 372 and a DRUM TIMER DECODER 380.

Refer now to FIG. 5A1, which shows the details of the TIMING READ AMPLIFER and SHAPER UNIT 202 and the INDEX GENERATOR 238. One end of the TIMING HEAD coil 204 is connected via a shielded lead to ground while the other end is connected to the drum amplifier 206 and to the upper right-hand terminal of the double-pole double-throw switch 212. The middle right-hand contact of the switch 212 is connected to the WRITE key 214. The WRITE key contact 214a is connected via a 390 ohm resistor to the lower left-head terminal of the switch 212, which, in turn, is connected to a −33 volt source. The output of the drum timing amplifier 206 is connected via a shaper 208 to a cathode follower 210. The shielded output of the cathode follower 210 is connected in a series circuit, comprising an inverter 218, a cathode follower 220, a peaker 222, and cathode followers 224, to the S line. The S line, in turn, is connected via a series circuit, comprising a cathode follower 226, a peaker 228 and a cathode follower 230 to the A line. The A line, in turn, is coupled via a series circuit, comprising a cathode follower 232, a peaker 234 and cathode followers 236 to the B line. The B line, in turn, is connected to the set input of the INDEX trigger 246. Additionally the S line is connected via a series circuit, comprising an inverter 248, a single shot multivibrator 250, a cathode follower 252, a peaker 254, and a cathode follower 256 to the reset input of the INDEX trigger 246 and to the $I_1$ line. The right-hand divider output of the INDEX trigger 246 is connected via a cathode follower 247 to the $I_1$ to $I_2$ line while the left-hand divider output of the INDEX trigger 246 is coupled via cathode followers 260 to the $\overline{I_1 \text{ to } I_2}$ line.

Assuming that the DRUM 100 has been erased, if the double-pole double-throw switch 212 is shifted to the WRITE position and the WRITE key 214 is depressed for writing on the timing track, a series circuit, comprising the −33 volt source and the 390 ohm resistor is connected via the WRITE key 214 to the TIMING HEAD coil 204. This causes a current to be passed through the TIMING HEAD coil 204 as the DRUM 100 rotates, thereby saturating or magnetizing each magnetic surface of the timing track. After this operation the switch 212 is returned to the normal position and the WRITE key 214 is released. Thus, the TIMING HEAD TH, associated with the timing track T of the DRUM 100, responds to the 2000 magnetized surfaces of the timing track T to generate a timing signal corresponding to each magnetized surface (it being remembered that the timing track areas correspond to 2000 utilized cell areas of each track of the DRUM 100). The timing signals are sine wave shaped with the positive peak occurring during the first halfcycle. These timing signals, which occur every 8 microseconds, are amplified and inverted by the drum amplifier 206 and passed to the shaper 208. Since each timing signal is inverted by the drum amplifier 206, inasmuch as the drum amplifier 206 is a three stage amplifier, the shaper 208 is triggered ON by the leading edge of the positive going portion of each signal, which now because of the inversion, occurs during the second half cycle of each signal, and is triggered OFF by the trailing edge of the positive portion of each signal, so as to provide square wave shaped pulses, corresponding to each timing signal. The square wave shaped pulses from the shaper 208 are passed via the cathode follower 210 to the inverter 218, where they are inverted to negative pulses and passed via the cathode follower 220 to trip the peaker 222, which, in response thereto emits positive 1.2 microsecond pulses which are passed via the cathode followers 224 to the S line. The positive 1.2 microsecond pulses, which occur on the SS line every 8 microseconds (see FIG. 48), are hereinafter referred to as S pulses and the period between S pulses is hereinafter termed the S time. The S pulses are fed via the cathode follower 226 to the peaker 228. The trailing edge of each S pulse trips the peaker 228, which then emits a positive 1.2 microsecond pulse which is passed via the cathode follower 230 to the A line. The positive 1.2 microsecond pulses, which occur every 8 microseconds on the A line at the trailing edge of each S pulse (see FIG. 48), are hereinafter referred to as A pulses. The A pulses are passed via the cathode follower 232 to the peaker 234. The trailing edge of each A pulse trips the peaker 234, which then emits a positive 3.5 microsecond pulse, which is passed via the cathode followers 236 to the B line. The 3.5 microsecond pulses, which occur every 8 microseconds on the B line at the trailing edge of each A pulse (see FIG. 48), are hereinafter referred to as B pulses. Each S pulse is inverted by the inverter 248 in the INDEX GENERATOR 238 to a negative pulse and applied to the single shot multivibrator 250. The negative shift of potential at the leading edge of the first inverted S pulse is effective to trip the single shot multivibrator 250, but since the S pulses occur every 8 microseconds and since the period of the single shot multivibrator 250 is 50 microseconds, the single shot multivibrator 250 is kept in its ON state until such time as the S pulses fail to arrive. This occurs, of course, when the DRUM 100 is at the GAP INTERVAL. Consequently, 50 microseconds after the inverted S2000 pulse is applied to the single shot multivibrator 250, it returns to its quiescent or OFF state and emits a negative shift of potential via the cathode follower 252 to the peaker 254. This negative shift of potential trips the peaker 254, which then emits a positive 2 microsecond pulse which is passed via the cathode follower 256 to the $I_1$ line and to set the INDEX trigger 246 to its ON state. The time at which the INDEX trigger 246 is set to its ON state is hereinafter referred to as the $I_1$ time. The positive 2 microsecond pulse, which occurs on the $I_1$ line at the time that the GAP INTERVAL of the DRUM 100 is passing under the TIMING HEAD TH, is hereinafter referred to as the INDEX pulse, as it serves as a position INDEX for the DRUM 100. The INDEX trigger 246 remains ON until the next B pulse occurs, which occurs after the next S1 pulse. Therefore, since the B1 pulse occurs subsequent in time to the S1 pulse but prior in time to the S2 pulse, the INDEX trigger 246 is turned OFF between S1 and S2 times. The time at which the INDEX trigger 246 goes OFF is hereinafter termed the $I_2$ time so that the INDEX trigger 246 is maintained ON from $I_1$ to $I_2$ time. Consequently, the INDEX trigger 246 emits a positive signal via the cathode follower 247 to the $I_1$ to $I_2$ line and a negative signal via the cathode followers 260 to the $\overline{I_1 \text{ to } I_2}$ line from $I_1$ to $I_2$ time. At all other times the signals on these lines are reversed.

Refer now to FIG. 5A2, which shows the details of the TIMER STEP CONTROL UNIT 262. The $\overline{I_1 \text{ to } I_2}$ line from the INDEX GENERATOR 238 is connected to the reset input of a TIMER RESET CONTROL trigger 296. The left-hand divider output of the TIMER RESET CONTROL trigger 296 is coupled via a cathode follower 298 to one input of an AND circuit 300. The S line from the TIMING READ AMPLIFIER and SHAPER UNIT 202 is connected to a second input of the AND circuit 300. A SECTION 9 CHARACTER 200 line from a DRUM TIMER DECODER 380 (see FIG. 5A8) is coupled via a series circuit, consisting of a cathode follower 282, a peaker 284 and a cathode follower 286 to one input of an AND circuit 288. The $\overline{I_1 \text{ to } I_2}$ line from the INDEX GENERATOR 238 is connected to the other input of the AND circuit 288, whose output is connected to the reset input of a TIMER CHECK trigger 290. The left-hand divider output of the TIMER CHECK trigger 290 is coupled via cathode followers 295 to a $\overline{\text{timer check}}$ line and to the remaining input of the AND circuit 300. The output of the AND circuit 300 is connected via cathode followers 302 to a TIMER CONTROL STEP line and via an inverter 304 to a RING STEP line. The operation of the TIMER STEP CONTROL UNIT 262 will be described after the description of the RESET UNIT 263 which now follows.

Referring to FIG. 5A4, the details of the RESET UNIT 263 is shown. A +140 volt source is connected to a contact arm 264a of a RESET key 264. The RESET key 264 is connected to a series circuit, comprising a trigger 266, a grounded grid amplifier 268, a cathode follower 270, a peaker 272, a cathode follower 274 and cathode followers 278 to a Z line. The RESET key 264 may be manually depressed to initiate a RESET operation of the ADDRESS TIMING REGISTER 200. The application of a positive signal via the RESET key 264 is effective to set the trigger 266 to its ON state. When the key 264 is released the trigger 266 is reset to its OFF state causing a negative shift of potential to be emitted and amplified by the grounded grid amplifier 268 and then passed via the cathode follower 270 to trip the peaker 272. The peaker 272, in response thereto, emits a positive 2 microsecond pulse which is passed to the Z line via the cathode follower 274 and the cathode followers 280. The positive pulse on the Z line is applied to the grids of all the triggers in the ADDRESS TIMING REGISTER 200 having a Z within the respective blocks, turning them ON or OFF as the case may be. (Additionally the Z pulse sets and resets certain triggers in the READ/WRITE CONTROL CIRCUITS 600—see FIGS. *5c5* and *5c6*.) For example, the TIMER RESET CONTROL trigger 296 is set to its ON state while the TIMER CHECK trigger 290 is reset to its OFF state. The TIMER CHECK trigger 290 in being reset to its OFF state produces a positive signal which is passed via the cathode followers 295 to the upper input terminal of the AND circuit 300. The TIMER RESET CONTROL trigger 296 in being set to its ON state produces a negative signal which is passed via the cathode follower 298 to decondition the AND circuit 300, thereby preventing any S pulses from passing therethrough. When the DRUM 100 reaches the GAP INTERVAL a positive signal is applied to the $I_1$ to $I_2$ line in a manner as previously described, the negative trailing edge of which being effective to reset the TIMER RESET CONTROL trigger 296 to its OFF state. The TIMER RESET CONTROL trigger 296 in being reset applies a positive signal via the cathode follower 298 to condition the AND circuit 300 to pass S pulses. However, it should be remembered that the negative trailing edge of the $I_1$ to $I_2$ signal occurs at B1 time which is subsequent in time to the S1 pulse. Thus, the first effective S pulse to pass via the now conditioned AND circuit 300 is the S2 pulse. If the ADDRESS TIMING REGISTER 200 is operating properly, then, in succeeding revolutions of the DRUM 100, the TIMER CHECK trigger 290 and the TIMER RESET CONTROL trigger 296 are maintained in their OFF states so that the AND circuit 300 is continuously conditioned and passes each succeeding S pulse including each succeeding S1 pulse.

The timing check will now be described in conjunction with the waveforms of FIG. 5A3. During each succeeding revolution of the DRUM 100 and at the S2000 time, a positive signal is applied to the SECTION 9 CHARACTER 200 line for a period from the leading edge of the S2000 pulse to the leading edge of the S1 pulse or, in other words, from the S2000 time to the start of S1 time. The negative trailing edge of the signal on the SECTION 9 CHARACTER 200 line, which occurs at a time corresponding to the S1 pulse, is effective to trip the peaker 284 which then emits a positive 2 microsecond pulse to the AND circuit 288 via the cathode follower 286. It will be remembered that a negative signal is maintained on the $\overline{I_1 \text{ to } I_2}$ line form $I_1$ to $I_2$ time, while a positive signal is maintained thereon at all other times. Consequently, the AND circuit 288 is conditioned at all times except during the $I_1$ to $I_2$ time. Therefore, the positive pulse, which is applied to the upper input of the AND circuit 288 and which occurs during the $I_1$ to $I_2$ time, cannot pass through the AND circuit 288 to set the TIMER CHECK trigger 290 to its ON state. Hence, so long as the ADDRESS TIMING REGISTER 200 is operating properly, the TIMER CHECK trigger 290 remains in its OFF state and is effective to condition the AND circuit 300 to pass the S pulses via the cathode followers 302 to the TIMER CONTROL STEP line. Also, the S pulses are inverted to negative pulses by the inverter 304 and passed to the RING STEP line.

If the ADDRESS TIMING REGISTER 200 is operating improperly due to the occurrence of a noise pulse, which has advanced the count so that the negative trailing edge of the positive signal on the SECTION 9 CHARACTER 200 line occurs at a time preceding the $I_1$ to $I_2$ time, and since the AND circuit 288 is conditioned at all times other than during the $I_1$ to $I_2$ time, the positive 2 microsecond pulse emitted by the peaker 284 now effectively passes via the cathode follower 286 and the conditioned AND circuit 288 to set the TIMER CHECK trigger 290 to its ON state. In being set to its ON state, the TIMER CHECK trigger 290 emits a negative signal via the cathode followers 295 to the $\overline{\text{timer check}}$ line and to decondition the AND circuit 300, thereby preventing any further S pulses from passing therethrough (the negative signal on the $\overline{\text{timer check}}$ line is effective to block the READ/WRITE SAMPLE GENERATOR 656—see FIG. 5C3—to prevent any further READ or WRITE operation in a manner as will be explained hereinafter). It is possible that a noise pulse may occur during the $I_1$ $I_2$ time. Consequently, when the noise pulse occurs the count is advanced and the positive signal on the SECTION 9 CHARACTER 200 line is terminated (see dotted waveform in FIG. 5A3). The negative shift of potential on the SECTION 9 CHARACTER 200 line is effective to initiate the positive pulse at the upper input of the AND circuit 288 (see dotted waveform in FIG. 5A3). However, since this now occurs during $I_1$ to $I_2$ time, during which time the AND circuit 288 is deconditioned, the positive pulse cannot pass through the AND circuit 288 to set the TIMER CHECK TRIGGER 290 ON, but at the end of the next revolution of the DRUM 100, since the count has been advanced by one, the positive signal on the SECTION 9 CHARACTER 200 line is terminated at a time prior to the $I_1$ to $I_2$ time. Consequently, the positive pulse which is initiated by the negative trailing edge of the SECTION CHARACTER 200 signal is applied to the upper input of the AND circuit 288 at a time when the AND circuit 288 is conditioned. Therefore, it renders the AND circuit 288 effective to set the TIMER CHECK trigger 290 ON and thereby prevent any further S pulses from passing through the AND circuit 300. Thus, it is apparent, that in all situations where the count is advanced by noise pulses or otherwise the TIMER CHECK trigger 290 is set to its ON state to block any further operation of the ADDRESS TIMING REGISTER 200.

If the ADDRESS TIMING REGISTER 200 is operating improperly due to the failure to count one or more pulses so that the negative trailing edge of the positive signal on the SECTION 9 CHARACTER 200 line occurs at a time after the $I_1$ to $I_2$ time. For example, let it be assumed that there is a failure to count two pulses. Consequently, a positive signal is applied to the SECTION 9 CHARACTER 200 line at a time corresponding to the S2 pulse and which is terminated at a time corresponding to the S3 pulse (see dotted waveform in FIG. 5A3). Therefore, since the AND circuit 288 is conditioned at all times other than during the $I_1$ to $I_2$ time, the positive 2 microsecond pulse emitted by the peaker 284 is applied to the upper input of the AND circuit 288 (see the dotted waveform of FIG. 5A3) to render the AND circuit 288 effective to set the TIMER CHECK trigger 290 to its ON state and thereby block any further operation as previously described.

Thus, it is apparent that the TIMER CHECK trigger 290 is effective to check that 2000 and only 2000 pulses have occurred during each revolution of the DRUM 100. Further, the neon tube associated with the TIMER CHECK trigger 290 is effective to provide a visual indication whenever an error has occurred in the ADDRESS TIMING REGISTER 200. After such error has been noted and corrected, the RESET key 264 of the RESET UNIT 263 may be operated to provide a reset operation of the ADDRESS TIMING REGISTER 200 in preparation for a new cycle of operation.

Refer now to FIG. 5A5, which shows the RING 5 COUNTER 306 of the DRUM TIMER 305. The RING 5 COUNTER 306 is a five stage ring counter composed of triggers 310, diode gates 312 and cathode followers 308 and 314. The RING STEP line from the TIMER STEP CONTROL UNIT 262 is connected via a cathode follower 308 to each of the inputs of the diode gates 312. The right-hand tapped output of each of the triggers 310 is respectively connected to the supply terminals of each of the diode gates 312. The output of the diode gate **312*a* is connected to the reset input of the trigger 310*a* and the set input of the trigger 310*b*; the output of the diode gate 312*b* is connected to the reset input of the trigger 310*b* and to the set input of the trigger 310*c*; the output of the diode gate 312*c* is connected to the reset input of the trigger 310*c* and to the set input of the trigger 310*d*; the output of the diode gate 312*d* is connected to the reset input of the trigger 310*d* and to the set input of the trigger 310*e*; the output of the diode gate 312*e* is connected to the reset input of the trigger 310*e* and to the set input of the trigger 310*a* to complete the ring. The right-hand divider of each of the respective triggers 310 is coupled via a corresponding cathode follower 314** to the R1, R2, R3, R4 and R5 lines, respectively.

The trigger **310*a* is initially set to its ON state, while the remaining triggers 310*b* to 310*e* are initially reset to their OFF states by the Z signal. The reason for this is that since the initial S1 pulse can not pass through the AND circuit 300 of the TIMER STEP CONTROL UNIT 262 the RING 5 counter 306 is initially in such a state as it would be if the S1 pulse had been applied to the RING STEP line. Thus, the right-hand tapped output of the first trigger applies a positive signal to condition the diode gate 312*a*, while the remaining triggers 310*b* to 310*e* apply negative signals to decondition the corresponding diode gates 312*b* to 312*e*. Additionally, the trigger 310*a* maintains a positive signal, via the cathode follower 314*a*, on the R1 line. The first stepping pulse, corresponding to the S2 pulse, applied via the RING STEP line to the RING 5 COUNTER 306, passes via the cathode follower 308 to the diode gates 312. The diode gate 312*a* being the only conditioned gate, responds thereto and generates a sharp negative spike which is applied to reset the trigger 310a to its OFF state and to set the trigger 310b to its ON state. The trigger 310a, in being reset to its OFF state applies a negative signal to decondition the diode gate 312a, and a negative shift of potential, via the cathode follower 314a to the R1 line thereby terminating the positive signal on the R1 line. The trigger 310b in being set to its ON state causes a positive going signal to be applied to the R2 line, via the cathode follower 314b, and to be applied to condition the diode gate 312b. The next stepping pulse, corersponding to the S3 pulse, which occurs on the RING STEP line again passes via the cathode follower 308 to the diode gates 312. The diode gate 312b now being the only conditioned gate responds thereto and generates a sharp negative spike to reset the trigger 310b to its OFF state and to set the trigger 310c to its ON state. The trigger 310b in being reset to its OFF state terminates the positive signal on the R2 line, whereas the trigger 310c in being set to its ON state applies a positive going signal on the R3 line. Thus, in a similar manner, the next two stepping pulses, corresponding to the S4 and S5 pulses, step the ON state from trigger 310c to trigger 310d and then to trigger 310e. Likewise, the positive signal on the R3 line is terminated and succeeding positive signals are applied to the R4 and R5 lines. Hence, it is apparent that the RING 5 COUNTER 306 of the DRUM TIMER 305 receives stepping pulses corresponding to every S pulse and is effective to apply succeeding positive signals on the R1 to R5 lines, corresponding to every 5 S pulses, starting at S1 to S5 times, respectively. In other words, positive signals are applied on the R1 line starting at times S1, S6, S11, S16, etc.; positive signals are applied on the R2 line starting at times S2, S7, S12, S17, etc.; positive signals are applied on the R3 line starting at times S3, S8, S13, S18, etc.; positive signals are applied on the R4 line starting at times S4, S9, S14, S19, etc.; and positive signals are applied on the R5 line starting at times S5, S10, S15, S20, etc. Further, since the RING 5 COUNTER 306 is stepped every S pulse the signals appearing of the R1 to R5 lines each have a period corersponding to one S pulse. FIGS. 49 show the waveforms of the signals on the R1 to R5 lines at various S times during a revolution of the DRUM 100**.

Refer now to FIG. 5A6, which shows the details of the RING 50 COUNTER 316 and the RING 500 COUNTER 344 of the DRUM TIMER 305. Both of these counters are ten stage counters and operate in a similar fashion as the RING 5 COUNTER 306, consequently, no detailed description is believed necessary. The input of the RING 50 COUNTER 316 is composed of an AND circuit 318, a control trigger 324 and a diode gate 328. The B line from the TIMING READ AMPLIFIER and SHAPER UNIT 202 and the R5 line from the RING 5 COUNTER 306 are connected to the inputs of the AND circuit 318, whose output is connected to the reset input of the control trigger 324. The TIMER CONTROL STEP line from the TIMING STEP CONTROL UNIT 262 is connected to the set input of the control trigger 324. The right-hand tapped output of the control trigger 324 is connected to the supply terminal of the diode gates 328, while the RING STEP line is connected to the input of the diode gate 328.

The trigger 332a is initially set to its ON state, while the remaining triggers 332b to 332j and the control trigger 324 are initially reset to their OFF states by the Z signal. Therefore, the first trigger 332a initially maintains a positive signal, via the cathode follower 340, on the R50 line, while the trigger 332j maintains a negative signal, via the cathode followers 342, on the R'50 line. Also, the control trigger 324 in being reset to its OFF state deconditions the diode gate 328. It will be remembered that a B pulse occurs 2.4 microseconds after an S pulse and since an R5 signal occurs in time with the S pulse the B pulse occurs 2.4 microseconds after an R5 signal. Consequently, at S5 time a positive signal is applied via the R5 line to condition the AND circuit 318. At the same time, namely S5 time, a positive S pulse is applied via the TIMER CONTROL STEP line to the set input of the control trigger 328 while a negative S pulse is applied via the RING STEP line to the diode gate 328. However, since the control trigger 324 is already in the OFF state, the positive S5 pulse, on the TIMER CONTROL STEP line, has no effect on the control trigger 324 and since the diode gate 328 is deconditioned, the negative S5 pulse, on the RING STEP line, has no effect on the diode gate 328. At S5 time+2.4 microseconds a positive pulse is applied via the B line and through the now conditioned AND circuit 318 to set the control trigger 324 to its ON state, thereby conditioning the diode gate 328 so that the next negative S pulse on the RING STEP line, which occurs at S6 time, causes the diode gate 328 to generate a negative spike to step the ON state of the RING 50 COUNTER 316 to the next stage. At the same time, namely, S6 time, a positive S pulse is applied via the TIMER CONTROL STEP line to reset the control trigger 328 to its OFF state in preparation for another B pulse.

At the time that a B pulse renders the AND circuit 318 effective to set the control trigger 324 to its ON state, the RING 50 COUNTER 316 is hereinafter referred to as being conditioned, while the succeeding negative S pulse on the RING STEP line which initiates the stepping of the ON state to the next stage is hereinafter referred to as the stepping pulse.

Thus, at S10 time another positive signal is applied via the R5 line to condition the AND circuit 318. At S10 time+2.4 microseconds another B pulse is applied to condition the RING 50 COUNTER 316 so that the next stepping pulse, which occurs at a time corresponding to S11 time and 5 S pulses after the first stepping pulse, causes the ON state of the RING 50 COUNTER 316 to step to the next stage. Thus, it is apparent that the RING 50 COUNTER 316 receives a stepping pulse every 5 S pulses. Further, since the RING 50 COUNTER 316 is a ten stage counter it is effective to emit a pulse on the R50 and R'50 lines, corresponding to every 50 S pulses starting with the S1 and S46 pulses, respectively. In other words, positive signals are applied on the R50 line starting at times S1, S51, S101 . . . S901, S951, S1001, S1051 . . . S1901 and S1951 while positive signals are applied on the R'50 line starting at times S46, S96, S146 . . . S946, S996, S1046 . . . S1946, and S1996. Also, since a stepping pulse is applied to the RING 50 COUNTER 316 every 5 S pulses, each of the signals on these lines have a period corresponding to 5 S pulses. FIGS. 49 show the waveforms of the signals on the R50 and R'50 lines at various S times during a revolution of the DRUM 100. RING 500 COUNTER 344 of the DRUM TIMER 305 is identical in circuitry to the RING 50 COUNTER 316, except that the R'50 line, from the RING 50 COUNTER 316, is connected to a third input of the AND circuit 346, thus adding another requirement to condition the RING 500 COUNTER 344, namely, a positive signal on the R'50 line. Hence, it should be apparent that the RING 500 COUNTER 344 receives a stepping pulse corresponding to every 50 S pulses, starting with S51. Thus, at S46 time a positive signal is applied via the R'50 line to one input of the AND circuit 346; at S50 time a positive signal is applied via the R5 line to condition the AND circuit 346 and at S50 time+24 microseconds a B pulse passes through the conditioned AND circuit 346 to set the control trigger 347 to its ON state, thereby conditioning the diode gate 349 so that the next negative S pulse on the RING STEP line, which occurs at S51 time, causes the diode gate 349 to generate a negative spike to step the ON state of the RING 500 COUNTER 344 to the next stage. At the same time, namely, S51 time a positive pulse is applied via the TIMER CONTROL STEP line to reset the control trigger 347 to its OFF state in preparation for the next B pulse. At the time that a B pulse renders the AND circuit 346 effective to set the control trigger 324 to its ON state, the RING 500 COUNTER 344 is hereinafter referred to as being conditioned, while the next negative S pulse on the RING STEP line which initiates the stepping of the ON state to the next stage is hereinafter referred to as the stepping pulse.

At S96 time another positive signal is applied via the R'50 line to one input of the AND circuit 346. At S100 time another positive signal is applied via the R5 line to condition the AND circuit 346. At S100 time+2.4 microseconds another B pulse is applied to condition the RING 500 COUNTER 344 so that the next stepping pulse, which occurs at a time corresponding to S101 time and 50 S pulses after the first stepping pulse, causes the ON state of the RING 500 COUNTER 344 to step to the next stage. Thus, it is apparent that the RING 500 COUNTER 344 receives a stepping pulse every 50 S pulses. Further, since the RING 500 COUNTER 344 is a ten stage counter, it is effective to emit a pulse on the R500 and R'500 lines, corresponding to every 500 S pulses, starting with the S1 and S451 pulses, respectively. In other words, positive signals are applied on the R500 line, starting at times S1, S501, S1001 and S1501, while positive signals are applied on the S'500 line, starting at times S451, S951, S1451 and S1951. Also, since a stepping pulse is applied to the RING 500 COUNTER 344 every 50 S pulses, each of the signals on these lines have a period corresponding to 50 S pulses. FIGS. 49 show the waveforms of the signals on the R500 and R'500 lines at various S times during a revolution of the DRUM 100.

Refer now to FIG. 5A7, which shows the details of the RING 1000 COUNTER 352 and the RING 2000 COUNTER 372 of the DRUM TIMER 305. Both of these counters are two stage counters and operate in a similar fashion, consequently, only the details of RING 1000 COUNTER 352 is hereinafter described. The B line, R5 line, R'50 line and R'500 line are connected to the inputs of the AND circuit 354 whose output is connected to the reset input of the control trigger 358. The TIMER CONTROL STEP line is connected to the set input of the control trigger 358 while the right-hand tapped output of the control trigger 358 is connected to the supply terminal of the diode gate 362. The RING STEP line is connected to the input of the diode gate 362, while the output thereof is coupled via a cathode follower 364 to the respective inputs of the diode gates 368. The output of the diode gate **368*a* is connected to the reset input of the trigger 366*a* and to the set input of the trigger 366*b*. The output of the diode gate 368*b* is connected to the set input of the trigger 366*a* and to the reset input of the trigger 366*b*. The right-hand tapped outputs of the triggers 366 are connected, respectively, to the supply terminals of the diode gates 368. The right-hand divider output of the trigger 366*a* is coupled via the cathode followers 370*a* to the R1000 line, while the right-hand divider output of the trigger 366*b* is coupled via the cathode followers 370*b*** to the R'1000 line.

The control trigger 358 is initially reset to its OFF state by a Z signal, thereby causing the diode gate 362 to be in a deconditioned state. Likewise, the trigger **366*b* is reset to its OFF state by a Z signal, thereby causing the corresponding diode gate 368*b* to be initially in a deconditioned state, whereas the trigger 366*a* is initially set to its ON state by a Z signal, thereby causing its corresponding diode gate 368*a* to be in a conditioned state. Therefore, the trigger 366*a* initially maintains a positive signal, via the cathode followers 370*a*, on the R1000 line. At S451 time a positive signal is applied via the R'500 line to one input of AND circuit 354. At S496 time a positive signal is applied via the R'50 line to a second input of the AND circuit 354. At S500 time a positive signal is applied via the R5 line to condition the AND circuit 354. At S500 time+2.4 microseconds a positive pulse is applied via the B line and through the conditioned AND circuit 354 to set the trigger 358 to its ON state thereby conditioning the diode gate 362 so that the next negative S pulse on the RING STEP line, which occurs at S501 time, causes the diode gate 362 to generate a negative spike which is passed via a cathode follower 364 to the diode gates 368. The diode gate 368*a* being conditioned responds to the negative spike to reset the trigger 366*a* to its OFF state and to set the trigger 366*b* to its ON state. At the same time the positive S501 pulse on the TIMER CONTROL STEP line causes the control trigger 358 to be reset to its OFF state in preparation for another B pulse. The trigger 366*a* in being reset to its OFF state effectively terminates the positive signal on the R1000 line while the trigger 366*b* in being set to its ON state effectively initiates the production of a positive signal on the R1000 line. At the time that a B pulse renders the AND circuit 354 effective to set the control trigger 324** to its ON state, the RING 1000 COUNTER is hereinafter referred to as being conditioned, while the next negative S pulse on the RING STEP line which initiates the stepping of the ON state to the next stage is hereinafter referred to as the stepping pulse.

At S951 time another positive signal is applied via the R'500 line to one input of the AND circuit 354. At S996 time another positive signal is applied via the R'50 line to a second input of the AND circuit 354. At S1000 time another positive signal is applied via the R5 line to condition the AND circuit 354. At S1000 time+2.4 microseconds another B pulse is applied to condition the RING 1000 COUNTER 352 so that the next stepping pulse, which occurs at S1001 time and 500 S pulses after the first stepping pulse, causes the ON state of the RING 1000 COUNTER 352 to step to the next stage. Thus, it is apparent that the RING 1000 COUNTER 352 receives a stepping pulse every 500 S pulses. Further, since the RING 1000 COUNTER 352 is a two stage counter it is effective to emit a pulse on the R1000 and R'1000 lines corresponding to every 1000 S pulses starting with the S1 and S501 pulses, respectively. In other words, positive signals are applied on the R1000 line starting at times S1 and S1001, while positive signals are applied on the R'1000 line starting at times S501 and S1501. Also, since a stepping pulse is applied to the RING 1000 COUNTER 352 every 500 S pulses each of the signal on these lines have a period corresponding to 500 S pulses. FIGS. 49 show the waveforms of the signals on the R1000 and R'1000 lines at various S times during a revolution of the DRUM 100.

RING 2000 COUNTER 372 is identical in circuitry to the RING 1000 COUNTER 352 except that the R'1000 line, from the RING 1000 COUNTER 352, is connected to a fifth input of the AND circuit 374, thus adding another requirement to condition the RING 2000 COUNTER 372, namely, a positive signal on the R'1000 line. Hence, it should be apparent that the RING 2000 COUNTER 372 receives a stepping pulse corresponding to every 1000 S pulses starting with S1001. Thus, at S501 time a positive signal is applied via the R'1000 line to one input of the AND circuit 374. At S951 time another positive signal is applied via the R'500 line to a second input of the AND circuit 374. At S996 time another positive signal is applied via the R'50 line to a third input of the AND circuit 374. At S1000 time another positive signal is applied via the R5 line to condition the AND circuit 374. At S1000 time+2.4 microseconds, a positive B pulse passes via the now conditioned AND circuit 374 to set the control trigger 375 to its ON state thereby conditioning the diode gate 377 so that the next negative S pulse on the RING STEP line, which occurs at S1001 time, causes the diode gate 377 to generate a negative spike to step the ON state of the RING 2000 COUNTER 372 to the next stage. At S2000 time+2.4 microseconds the RING 2000 COUNTER 372 is again conditioned so that the next stepping pulse, which occurs at a time corresponding to S1 time and 1000 S pulses after the first stepping pulse, causes the ON state of the RING 2000 COUNTER 372 to step to the next stage. Thus, it is apparent that the RING 2000 COUNTER 372 receives a stepping pulse every 1000 S pulses. Further, since the RING 2000 COUNTER 372 is a two stage counter it is effective to emit a pulse on the R2000 and R'2000 lines, corresponding to every 1000 S pulses, starting with the S1 and S1001 pulses, respectively. Also, since a stepping pulse is applied to the RING 2000 COUNTER 372 every 1000 S pulses, each of the signals on these lines have a period corresponding to 1000 S. pulses. FIGS 49 show the waveforms of the signals on the R2000 and R'2000 lines at various S times during a revolution of a DRUM 100. Additionally, since the RING 2000 COUNTER 372 is stepped one stage for each 1000 S pulses it enables the DRUM 100 to be divided in such a manner that the odd SECTIONS of a CHANNEL occur on one side of the DRUM 100 while the even SECTIONS of a CHANNEL occur on the other side of the DRUM 100 (see FIG. 4) as will be explained hereinafter.

Refer now to FIG. 5A8, which shows the details of DRUM TIMER DECODER 380. The DRUM TIMER DECODER 380 functions to mix the outputs of the RING COUNTERS of the DRUM TIMER 305 so as to provide output signals indicative of the SECTION which corresponds to each CHARACTER position passing under the READ/WRITE heads associated with the DRUM 100, to provide output signals indicative of certain of the CHARACTERS, such as CHARACTER 1 and CHARACTER 200, when the CHARACTER positions corresponding to such CHARACTERS in each section of the CHANNEL is passing under the READ/WRITE heads associated with the DRUM 100 and to provide an output signal indicative of the CHARACTER 200 position in SECTION 9 of each CHANNEL.

The R50 line, R500 line and R1000 line are connected to the inputs of the AND circuit **382*a* whose output is connected to the grounded grid amplifier 384*a*. The output of the grounded grid amplifier 384*a* is coupled via a cathode follower 386*a* to the CHARACTER 1 line. The R'50 line, R'500 line and the R'1000 line are connected to the inputs of the AND circuit 382*b* whose output is coupled to the grounded grid amplifier 384*b*. The output of the grounded grid amplifier 384*b* is connected via a cathode follower 386*b* to the CHARACTER 200 line and to one input of the AND circuit 382*c*. The R1 to R5 lines are connected to one input of each of the AND circuits 388*a* to 388*e*, respectively, while the R2000 line is connected to the remaining inputs of each of the AND circuits 388*a* to 388*e*, respectively. The outputs of the AND circuits 388*a* to 388*e* are coupled via cathode followers 390*a* to 390*e*, respectively, to the SECTION 0 line, SECTION 2 line, SECTION 4 line, SECTION 6 line and SECTION 8 line, respectively. The R1 to R5 lines are also connected to one input of each of the AND circuits 388*f* to 388*j*, respectively, while the R'2000 line is connected to the remaining inputs of each of the AND circuits 388*f* to 388*j*, respectively. The outputs of the AND circuits 388*f* to 388*j* are coupled via cathode followers 390*f* to 390*j*, respectively, to the SECTION 1 line, SECTION 3 line, SECTION 5 line, SECTION 7 line and SECTION 9 line, respectively. The SECTION 9 line is additionally connected to the remaining input of the AND circuit 382*c* whose output is coupled via a grounded grid amplifier 384*c* to a cathode follower 386*c*. The output of the cathode follower 386*c* is connected to the SECTION 9 CHARACTER 200** line.

It will be remembered that a positive signal is maintained on the R2000 line during every odd 1000 S pulses or, in other words, during each first half-revolution of the DRUM 100 while a positive signal is maintained on the R'2000 line during every even 1000 S pulses or, in other words, during each second half revolution of the DRUM 100. Consequently, during the first half revolution of the DRUM 100, the AND circuits **388*a* to 388*e* are conditioned while during the second half revolution of the DRUM 100 the AND circuits 388*f* to 388*j* are conditioned. Also, it will be remembered that positive signals are applied to the R1 to R5 lines every five S pulses starting with the S1 to S5 pulses, respectively. Thus, during the first half revolution of the DRUM 100, positive signals are applied to the SECTION 0, 2, 4, 6 and 8 lines, corresponding to each group of the R1 to R5 signals. For example, at S1 time, a positive signal is applied to the R1 line which is passed via the conditioned AND circuit 388*a* and the cathode follower 390*a* to the SECTION 0 line corresponding to the CHARACTER 1 position of SECTION 0** (see FIG. 49*a*); at S2 time, a positive signal is applied to the R2 line which is passed via the conditioned AND circuit **388*b* and cathode follower 390*b* to the SECTION 2 line corresponding to the CHARACTER 1 position of SECTION 2** (see FIG. 49*a*). In a similar manner, succeeding positive signals on the R3 to R5 lines initiate the production of positive signals on the SECTIONS 4, 6, and 8 lines corresponding to the CHARACTER 1 positions of SECTIONS 4, 6 and 8, respectively (see FIG. 49*a*). At S6 time, corresponding to the CHARACTER 2 position of SECTION 0, another positive signal is applied to the R1 line which is passed via the now conditioned AND circuit **388*a* and the cathode follower 390*a* to the SECTION 0 line. Thus, it is apparent that a positive signal is produced on each of these SECTION lines, corresponding to every 5 S pulses, starting with the S1 to S5 pulses. Similarly, during the second half revolution of the DRUM 100, the SECTION 1, 3, 5, 7 and 9 lines have positive signals applied thereto, corresponding to the R1 to R5 signals. For example at S1001 time, a positive signal is applied to the R1 line which is passed via the now conditioned AND circuit 388*f* and the cathode follower 390*f* to the SECTION 1 line corresponding to the CHARACTER 1 position of SECTION 1** (see FIG. 49*b*). At succeeding S1002 to S1005 times, positive signals are produced successively on the SECTION 3, 5, 7, and 9 lines, corresponding to the CHARACTER 1 positions of SECTIONS 3, 5, 7 and 9 (see FIG. 49*b*). At S1006 times, corresponding to the CHARACTER 2 position of SECTION 1, another positive signal is applied to the R1 line which is passed via the AND circuit **388*f* and the cathode follower 390*f* to the SECTION 1** line. Thus, it is apparent that a positive signal is produced on each of these SECTION lines corresponding to every 5 S pulses starting with the S1001 to S1005 pulses.

Initially, positve signals are maintained on the R50, R500, and R1000 lines such that a positive signal is passed via the AND circuit **382*a* and amplified by the grounded grid amplifier 384*a* and coupled via the cathode follower 386*a* to the CHARACTER 1 line. Since the RING 1000 COUNTER 352 is stepped every 500 S pulses and the RING 500 COUNTER 344 is stepped every 50 S pulses and the RING 50 COUNTER 316 is stepped every 5 S pulses, the AND circuit 382*a* remains conditioned during the intervals from S1 to S6 time and from S1001 to S1006 time. Consequently, a positive signal is maintained on the CHARACTER 1** line during the interval from S1 to S6 time (see FIG. 49*a*), corresponding to the first CHARACTER positions of SECTIONS 0, 2, 4, 6, and 8 and during the interval from S1001 to S1006 time (see FIG. 49*b*), corresponding to the first CHARACTER positions of SECTIONS 1, 3, 5, 7 and 9.

During the interval from S996 to S1000, of the first half revolution of the DRUM 100, and during the interval from S1996 to S2000, of the second half revolution of the DRUM 100, positive signals are maintained on the R'50, R'500 and R'1000 lines. Consequently, during these intervals a positive signal is passed via the AND circuit 382*b* and amplified by the grounded grid amplifier 384*b* and coupled via the cathode follower 386*a* to the CHARACTER 200 line and to condititon the AND circuit 382*e*. Therefore, during these intervals, corresponding to the CHARACTER 200 positions of SECTIONS 0, 2, 4, 6, and 8 in the first half revolution of the DRUM 100, and corresponding to the CHARACTER 200 positions of the SECTIONS 1, 3, 5, 7, and 9 during the second half revolution of the DRUM 100, a positive signal is maintained on the CHARACTER 200 line (see FIGS. 49*a* and 49*b*). Also, when the CHARACTER 200 position of SECTION 9 is reached a positive signal is applied to the SECTION 9 line and passed via the conditioned AND circuit 382*e*, amplified by the grounded grid amplifier 384*c* and coupled via the cathode follower 386*c* to the SECTION 9 CHARACTER 200 line (see FIG. 49*a*). Thus, during the interval of time that the CHARACTER 200 position of SECTION 9 of a channel is passing under the READ/WRITE heads associated with the DRUM 100 a positive signal is mantained on the SECTION 9 CHARACTER 200 line.

*Address input register*

Referring now to FIG. 5B, there is shown in block form the components of the ADDRRESS INPUT REGISTER 400.

The ADDRESS INPUT REGISTER 400 includes a SECTION COUNTER 402, a SECTION COUNTER DECODER 436, a CHANNEL COUNTER having a UNITS ORDER 442 and a TENS ORDER 456, a CHANNEL COUNTER UNITS DECODER 460, a CHANNEL COUNTER TENS DECODER 464, a CHANNEL UNIT 482*a*, a CHANNEL UNIT 482*b*, a CHANNEL UNIT 482*c* and a DRUM DECODER 489.

Refer now to FIG. 5B1 which shows the details of the SECTION COUNTER 402. Input terminals 404 are connected via grounded grid amplifiers 408, respectively, and cathode followers 410, respectively, to the supply terminals of diode gates 412, respectively, and to the input terminals of inverters 414, respectively. The output of the inverters 414 are coupled via cathode followers 416, respectively, to the supply terminals of diode gates 418, respectively. A SELECT ADDRESS SET line (from the ADDRESS REGISTER COUNTER CONTROL UNIT 850) is connected via a cathode follower 406 to the input terminals of the diode gates 412 and 418, respectively. The outputs of the diode gates 412 and 418 are respectively coupled to the set and reset inputs of the triggers 422, respectively. A SECTION CARRY CONTROL line (from the ADDRESS REGISTER COUNTER CONTROL UNIT 850) is connected to the supply terminals of diode gates 432. A SECTION COUNTER ADVANCE line (from the ADDRESS REGISTER COUNTER CONTROL UNIT 850) is connected to the input terminal of the diode gate 432*a*, whose output is coupled to the set and reset inputs of the trigger 422*a*. The right divider output of the trigger 422*a* is coupled via a cathode follower 426*a* to the binary 1 line, corresponding to the 1 bit position, to one input terminal of the diode gate 432*b* and to the input terminal of diode gate 432*d'*. The left divider output of the trigger 422*a* is coupled via a cathode follower 428*a* to the binary 0 line, corresponding to the 1 bit position. The output of the diode gate 432*b* is connected to the set and reset inputs of the trigger 422*b*. The right divider output of the trigger 422*b* is coupled via a cathode follower 426*b* to the binary 1 line, corresponding to the 2 bit position and to the input terminal of the diode gate 432*c*. The left divider output of the trigger 422*b* is coupled via a cathode follower 428*b* to the binary 0 line, corresponding to the 2 bit position. The output of the diode gate 432*c* is connected to the set and reset inputs of the trigger 422*c*. The right divider output of the trigger 422*c* is coupled via a cathode follower 426*c* to the binary 1 line, corresponding to the 4 bit position, and to the input terminal of the diode gate 432*d*. The left divider output of the trigger 422*c* is coupled via a cathode follower 428*c* to the binary 0 line, corresponding to the 4 bit position. The output of the diode gate 432*d* is connected to the set input of the trigger 422*d* while the output of the diode gate 432*d'* is connected to the reset input of the trigger 422*d*. The right divider output of the trigger 422*d* is coupled via a cathode follower 426*d* to the binary 1 line, corresponding to the 8 bit position, and to the carry terminal 430. The left divider output of the trigger 422*d* is coupled via a cathode follower 428*d* to the binary 0 line, corresponding to the 8 bit position, and to the remaining input terminal of the diode gate 432*b*.

It will be remembered that the units digit of a SELECT instruction designates a SECTION of the DRUM 100 in which it is desired to start writing or reading a RECORD. Hence, the units digit of the SELECT instruction is applied as a binary-coded signal to the input terminals 404.

Let it be assumed that the second SECTION, namely, SECTION 1 is the selected SECTION. Consequently, a positive signal is applied to the input terminal 404*a*, while the remaining input terminals are maintained at negative potentials. The positive signal applied to the input terminal 404*a* is amplified and reshaped by the grounded grid amplifier 408*a* and coupled via the cathode follower 410*a* to condition the diode gate 412*a*. The negative signals on the remaining input terminals 404*b* to 404*d* are amplified by their corresponding grounded grid amplifiers 408*b* to 408*d* and passed via their corresponding cathode followers 410*b* to 410*d* to the inverters 414*b* to 414*d*, respectively, where they are inverted to positive signals so as to condition the diode gates 418*b* to 418*d*, respectively. A positive pulse is applied to the SELECT ADDRESS SET line during every B pulse time and at each $I_1$ time so long as no R/W CONDITION exists (see FIG. 5C7). This positive pulse is passed via the cathode follower 406 and is applied to the inputs of the conditioned diode gates 412*a* and 418*b* to 418*d*, each of which in response to the negative trailing edge thereof, generates a negative spike which sets the trigger 422*a* to its ON state and resets the triggers 422*b* to 422*d* to their OFF state so that the COUNTER stands a value of 1 corresponding to the selected SECTION, namely, SECTION 1. The trigger 422*a* in being set to its ON state, passes a positive and negative signal via the cathode followers 426*a* and 428*a*, respectively, to the binary 1 and binary 0 lines corresponding to the 1 bit position. The triggers 422*b* to 422*d* in being reset to their OFF state, pass positive signals via the cathode followers 428*b* to 428*d*, respectively, to the binary 0 lines corresponding to the 2, 4 and 8 bit positions and negative signals via the cathode followers 426*b* to 426*d* to the binary 1 lines corresponding to the 2, 4 and 8 bit positions. Additionally, the positive signal passed by the cathode follower 428*d* is applied to condition the diode gate 432*b*. Thus, the SECTION COUNTER 402 produces a combination of signals which represent, in binary form (0001) the selected SECTION as designated by the units digit of the SELECT instruction.

During the period when the CHARACTER 200 position of a SECTION is being read from or written into, for example, the CHARACTER 200 position of SECTION 1, a positive signal is applied via the SECTION COUNTER CARRY CONTROL line to condition all of the diode gates 432 except the diode gate 432*d*. Ten microseconds after this signal is generated a positive 2 microsecond pulse is applied via the SECTION COUNTER ADVANCE line to the input of the conditioned diode gate 432*a*. The conditioned diode gate 432*a* responds to the negative trailing edge of the positive pulse by applying a negative spike to the set and reset inputs of the trigger 422*a*. The negative spike at the set input of trigger 422a has no effect thereon as the trigger 422a is already in the ON state. However, the negative spike at the reset input thereof causes the trigger to be reset to its OFF state with a resulting negative shift of potential being applied to the inputs of the diode gates 432b and 432d'. The now conditioned diode gates 432b and 432d' respond thereto by applying negative spikes to the set and reset inputs of the trigger 422b and to the reset input of the trigger 422d, respectively. The negative spike at the reset inputs of the triggers 422b and 422d have no effect thereon as they are already in their OFF state. However, the negative spike at the set input of the trigger 422b causes the trigger 422b to be set to its ON state. As a consequence of this operation, negative signals are applied, respectively, to the binary 1 and binary 0 lines, corresponding to the 1 and 2 bit positions, while positive signals are applied, respectively, to the binary 0 and binary 1 lines, corresponding to the 1 and 2 bit positions. Consequently, the combination of output signals from the SECTION COUNTER 402 now represent, in binary form (0010) the next SECTION, namely, SECTION 2. In a similar fashion, after each SECTION has been completely written into or read from the count in the SECTION COUNTER 402 is advanced to a value corresponding to the next SECTION. When the last SECTION, namely, SECTION 9, of a channel is reached, the SECTION COUNTER 402 stands at a count of nine, corresponding to the binary number 1001, so that the triggers 422a and 422d are in the ON state, while triggers 422b and 422c are in the OFF state. Previously, at the count of 8, corresponding to SECTION 8, a negative signal was applied from the trigger 422d via the cathode follower 428d to decondition the diode gate 432b. Now, after the SECTION COUNTER 402 has reached the count of nine, the next positive signal applied to the SECTION CARRY CONTROL line conditions the diode gates 432a and 432d'. Therefore, the diode gate 432a responds to the negative trailing edge of the next following positive pulse on the SECTION COUNTER ADVANCE line and applies a negative spike to reset the trigger 422a to its OFF state. The trigger 422a in being reset back to its OFF state, applies a negative shift of potential via the cathode follower 426a to the conditioned diode gate 432d' and the deconditioned diode gate 432b. The diode gate 432b, which would normally be conditioned to respond to the resetting of the trigger 422a, is now deconditioned and, therefore, does not respond to the negative shift of potential produced by the trigger 422a. However, the conditioned diode gate 432d' responds to the negative shift of potential and applies a negative spike to reset the trigger 422d to its OFF state. Thus, all of the triggers 422 are now in their OFF state corresponding to a count of 0 and representing the next SECTION, namely, SECTION 0 of the next channel. Hence, it is apparent that various combinations of signals appear on the binary 1 and 0 output lines of the SECTION COUNTER 402 indicative of the ten SECTIONS in any particular CHANNEL.

Refer now to FIG. 5B2, which shows the details of the SECTION COUNTER DECODER 436. The output lines of the SECTION COUNTER 402 is connected in various combinations to the AND circuits 438, whose outputs are coupled via cathode followers 440, respectively, to the ten lines corresponding to SECTIONS 0 to 9 of any CHANNEL on the DRUM 100.

If the selected SECTION is SECTION 2, for example, then, a coincidence of positive signals is applied via the binary 0, 1 and 0 lines corresponding to the 1, 2, and 4 bit positions, respectively, to the AND circuit 438c which in response thereto applies a positive signal via the cathode follower 440c to the SECTION 2 line. In a similar fashion, the SECTION COUNTER DECODER 436 decodes the combinations of output signals from the SECTION COUNTER 402 and applies a positive signal to one of the ten SECTION lines in accordance with the units digit of the SELECT instruction.

Refer now to FIG. 5B3, which shows the details of the UNITS ORDER 442 and TENS ORDER 456 of the CHANNEL COUNTER. Each of these units are identical in circuitry to that of the SECTION COUNTER, consequently, no detailed discussion is deemed necessary. However, a slightly different output arrangement is used in the UNITS ORDER 442 of the CHANNEL COUNTER. Thus, the binary 0 lines, corresponding to the 1, 2 and 4 bit positions, are connected to the inverters 444, respectively, each of whose output is coupled via cathode followers 446, respectively, to the binary 1 lines, corresponding to the 1, 2 and 4 bit positions. The binary 0 line, corresponding to the 8 bit position, is coupled via a grounded grid amplifier 448 and a cathode follower 450 to the binary 0 line corresponding to the 8 bit position, and to the inverter 452. The output of the inverter 452 is coupled via a cathode follower 454 to the binary 1 line, corresponding to the 8 bit position.

It will be remembered that the tends and hundreds digits of a SELECT instruction designate to a selected CHANNEL of the DRUM 100. Binary-coded signals, corresponding to the tens and hundreds digits of a SELECT instruction are applied to the input terminals 441 and 460, respectively. Upon the occurrence of a positive pulse on the SELECT ADDRESS SET line the signals at the input terminal 441 and 460 enter the UNIT ORDER 442 and the TENS ORDER 456 of the CHANNEL COUNTER to set or reset the various triggers therein according to the input signals being applied thereto which in turn, causes various combinations of signals to appear at the outputs thereof. For example, assume that the SELECT instruction 21129 is given. Consequently, a positive signal is applied to the input terminal 441b while negative signals are maintained on the input terminals 441a, 441c and 441d thereby representing, in binary form (0010), the tends digit 2 of the SELECT instruction. Likewise, a positive signal is applied to the input terminal 460a, while negative signals are maintained on the input terminals 460b to 460d thereby representing in binary form (0001), the hundreds digit 1 of the SELECT instruction. The UNITS ORDER 442 of the CHANNEL COUNTER provides a combination of signals at the output thereof representing the tens digit 2, so that the binary 0, 1, 0 and 0 lines, corresponding to the 1, 2, 4 and 8 bit positions, respectively, have positive signals maintained thereon while the binary 1, 0, 1 and 1 lines, corresponding to the 1, 2, 4 and 8 bit positions, respectively have negative signals maintained thereon. Likewise, the TENS ORDER 456 of the CHANNEL COUNTER provides a combination of signals representing the hundreds digit 1, so that the binary 1, 0, 0 and 0 lines, corresponding to the 1, 2, 4 and 8 bit positions, respectively, have positive signals maintained thereon, while the binary 0, 1, 1 and 1 lines, corresponding to the 1, 2, 4 and 8 bit positions, respectively, have negative signals maintained thereon. During the period corresponding to the CHARACTER 200 position of SECTION 9 in CHANNEL 12, a positive signal is maintained on the CHANNEL COUNTER CONTROL line (see FIG. 5C7). Ten microseconds after this signal is applied to the CHANNEL COUNTER CONTROL line, a positive 2 microsecond pulse is applied to the CHANNEL COUNTER ADVANCE line. The positive signal on the CHANNEL COUNTER CARRY CONTROL line conditions the UNITS ORDER 442 and the TENS ORDER 456 of the CHANNEL COUNTER so that when the positive pulse is applied to the CHANNEL COUNTER ADVANCE line it causes the count in the UNITS ORDER 442 of the CHANNEL COUNTER to advance from a value of 2 to a value of 3, so that the CHANNEL COUNTER stands with a count which corresponds to the next CHANNEL, namely, CHANNEL 13.

If the UNITS ORDER 442 of the CHANNEL COUNT-

ER is standing with a count of 9, it will be advanced to a count of 0 and produce a carry pulse at the output terminal 430 to advance the count of the TENS ORDER 456 of the CHANNEL COUNTER. For example, if the CHANNEL COUNTER stands with a count of 19 therein, the positive pulse on the CHANNEL COUNTER ADVANCE line advances the count of the UNITS ORDER 442 to 0 causing a carry pulse to be applied to the TENS ORDER 456 to advance the count in the TENS ORDER 456 from a value of 1 to a value of 2, so that the CHANNEL COUNTER now stands with a count of 20, corresponding to the next CHANNEL, namely, CHANNEL 20.

Refer now to FIG. 5B4, which shows the details of the CHANNEL COUNTER UNITS DECODER 460. The output lines from the UNITS ORDER 442 of the CHANNEL COUNTER are connected in various combinations to the AND circuits 462 whose outputs are connected to the 0 to 9 lines. Hence, depending upon the outputs of the UNITS ORDER 442, one and only one of the 10 lines, representing the units digit of the channel number, is selected. For example, if the units digit of the channel number is 7, then positive signals are applied via the binary 1 lines, corresponding to the 1, 2 and 4 bit positions, respectively, to the inputs of the AND circuit **462*h* which in response thereto, applies a positive signal to the 7 line. In a similar fashion, the CHANNEL COUNTER UNITS DECODER 460 decodes the combinations of signals from the UNITS ORDER 442** of the CHANNEL COUNTER and applies a positive signal to a selected one of the ten output lines.

Refer now to Fig. 5B5, which shows the details of the CHANNEL COUNTER TENS DECODER 464. The output lines from the TENS ORDER 456 of the CHANNEL COUNTER are connected in various combinations to the AND circuits 466 and to the OR circuit 468. The output of the AND circuit **466*a* is coupled via a grounded grid amplifier 478 and a cathode follower 480 to the CHANNEL TENS 2 line. The output of the AND circuit 466*b* is coupled via a grounded grid amplifier 474 and a cathode follower 476 to the CHANNEL TENS 1 line. The output of the AND circuits 466*c* and 466*d* are connected to the remaining inputs of the OR circuit 468 whose output is coupled via a grounded grid amplifier 470 and a cathode follower 472** to the CHANNEL TENS 0 and 3 to 9 lines.

It will be remembered that there are 30 CHANNELS on the DRUM 100, ranging from CHANNEL 0 to CHANNEL 29. Consequently, the tens digit of the channel number may be either 0, 1 or 2. Thus, the output of the TENS ORDER 456 of the CHANNEL COUNTER is decoded to provide a positive signal on the CHANNEL TENS 0, 3–9 line when the tens digit of the channel number is 0, corresponding to CHANNELS 0 to 9, or to provide a positive signal on the CHANNEL TENS 1 line when the tens digit of the CHANNEL number is 1, corresponding to CHANNELS 10 to 19, or to provide a positive signal on the CHANNEL TENS 2 line when the tens digit of the CHANNEL number is 2, corresponding to CHANNELS 20 to 29. Additionally, the TENS ORDER 456 of the CHANNEL COUNTER may be set to values corresponding to the digits 3 to 9 causing positive signals to be applied to the CHANNEL TENS 0, 3 to 9 line. Circuits are provided, as will be explained hereinafter, so that when the setting of the CHANNEL COUNTER reaches values above 29 no READ or WRITE operation is permitted.

Refer now to FIG. 5B6, which shows the details of the CHANNEL UNITS **482*a*, 482*b*, and 482*c*. Since the circuitry of each of these units is identical, only that of CHANNEL UNIT 482*a* will be described in detail. The 0 to 9 lines from the CHANNEL COUNTER UNITS DECODER 460 are respectively connected to one input terminal of each of the AND circuits 484*a* to 484*j*, respectively, while the CHANNEL TENS 0 and 3 to 9 line is connected to the remaining input terminal of each of the AND circuits 484*a* to 484*j*. The outputs of the AND circuits 484*a* to 484*j* are coupled via cathode followers 486*a* to 486*j*, respectively, to the CHANNELS 0 to 9 lines, respectively. Thus, if CHANNEL 5 is the selected CHANNEL, a positive signal on the 5 line and on the CHANNEL TENS 0 and 3 to 9 line are applied to render the AND circuit 484*f* effective to pass a positive signal via the cathode follower 486*f* to the CHANNEL 5 line. If CHANNEL 17 were the SELECTED channel, a positive signal on the 7 line and a positive signal on the CHANNEL TENS 1 line is applied to the CHANNEL UNIT 482*b* causing the production of a positive signal on the CHANNEL 17 line. In a similar manner, if CHANNEL 29 were the selected CHANNEL then a positive signal on the 9 line and a positive signal on the CHANNEL TENS 2 line is applied to the CHANNEL UNIT 482*c* causing the production of a positive signal on the CHANNEL 29 line. If the CHANNEL COUNTER stands at a count greater than 29, then, depending upon the count, one of the ten CHANNELS 0 to 9** lines has a positive signal applied thereto. However, as previously mentioned, circuits are available, which will be described hereinafter, so that no READ or WRITE operation can be done during that time.

Refer now to FIG. 5B7, which shows the details of the DRUM DECODER 489. An input terminal **490*a* is coupled via a cathode follower 491*a* to one input terminal of an AND circuit 494. The remaining input terminals 490*b* to 490*d* are coupled via cathode followers 491*b* to 491*d* to the inverters 492*b* to 492*d*, respectively. The outputs of the inverters 492*b* to 492*d* are coupled via cathode followers 493*b* to 493*d*, respectively, to the remaining inputs of the AND circuit 494, whose output is connected to one input of an AND circuit 495. The binary 0, 1, 0, 0 and 0 lines, corresponding to the 1, 2, 2, 4 and 8 bit positions, designated as $\bar{1}$, 2, $\bar{2}$, $\bar{4}$ and $\bar{8}$ lines from the TENS ORDER 456 of the CHANNEL COUNTER are connected in various combinations to the AND circuits 496, the outputs of which are coupled via cathode followers 497, respectively, to the remaining input of the AND circuit 495. The output of the AND circuit 495 is coupled via a grounded grid amplifier 498 and a cathode follower 499** to the SELECTED DRUM line.

It will be remembered that the thousands digit of a SELECT instruction designates a particular INPUT/OUTPUT UNIT as for example, the DRUM STORAGE UNIT of the present invention. Hence, the DRUM DECODER 489 is so designed that the AND circuit 494 passes a positive signal if, and only if, the thousands digit of the SELECT instruction has a value of 1. Hence, the thousands digit 1 of the SELECT instruction is applied as a binary-coded signal to the input terminals 490. Thus, if the DRUM STORAGE UNIT is the selected INPUT/OUTPUT UNIT, a positive signal is applied to the input terminal **490*a* while negative signals are applied to the input terminals 490*b* to 490*d*. The positive signal on the input terminal 490*a* is passed via the cathode follower 491*a* to one input of the AND circuit 494. The negative signals on the remaining input terminal are passed via the respective cathode followers 491 and are inverted to positive signals by the inverters 492, respectively. These positive signals are then passed via the cathode followers 493, respectively, to the remaining inputs of the AND circuit 494, which in response to the coincidence of positive signals, applies a positive signal to one input of the AND circuit 495. If the tens digit of the channel number is 0, corresponding to one of the CHANNELS 0 to 9, then positive signals are applied via the $\bar{2}$, $\bar{4}$ and $\bar{8}$ lines to render the AND circuit 496*b* effective to apply a positive signal via the cathode follower 497*b* to the other input of the AND circuit 495. Also, if the tens digit of the channel number is 1, corresponding to one of the CHANNELS 10 to 19, positive signals are again applied via the $\overline{2}$, $\overline{4}$ and $\overline{8}$ lines to render the AND circuit 496b effective to apply a positive signal via the cathode follower 497b to the other input of the AND circuit 495. Likewise, if the tens digit of the channel number is 2, corresponding to one of the CHANNELS 20 to 29, then, positive signals are also applied via the $\overline{1}$, 2 and $\overline{4}$ lines to render the AND circuit 496a effective to apply a positive signal via the cathode follower 497a to the other input of the AND circuit 495. Thus, in each of these situations there is a coincidence of positive signals at the inputs of the AND circuit 495 which in response thereto applies a positive signal via the grounded grid amplifier 498 and the cathode follower 499 to the SELECTED DRUM line. The signal on the SELECTED DRUM line permits a READ or WRITE operation to proceed, in a manner as will be described hereinafter. However, in instances when the channel number has a tens digit greater than 2, or in other words, channel numbers greater than 29, the AND circuits 496 remain deconditioned and no positive signal is applied to the SELECTED DRUM line to permit a READ or WRITE operation to proceed. Consequently, as indicated before, if the CHANNEL COUNTER stands at a count greater than 29, no READ or WRITE operation can proceed due to the absence of the positive signal on the SELECTED DRUM line. It should also be understood that if a plurality of DRUM STORAGE UNITS were being used with the CALCULATOR 1100**, a corresponding number of DRUM DECODERS would be provided, each having a different decoding arrangement. Thus, a positive signal would be applied to the SELECTED DRUM line of the first DRUM STORAGE UNIT corresponding to addresses 1000 to 1299; a positive signal would be applied to the SELECTED DRUM line of the second DRUM STORAGE UNIT corresponding to addresses 1300 to 1599 etc.

In summary, it will be remembered that the ADDRESS part of a SELECT instruction designates a particular INPUT/OUTPUT UNIT and an ADDRESS therein. Each INPUT/OUTPUT UNIT receives the ADDRESS part of the SELECT instruction, but the designated UNIT and only the designated UNIT permits a READ or WRITE operation to proceed from the designated ADDRESS therein. In other words, if the DRUM STORAGE UNIT of the present invention is the selected INPUT/OUTPUT UNIT, the ADDRESS INPUT REGISTER 400 provides a signal on the SELECTED DRUM line permitting a READ or WRITE operation to proceed, a signal on a selected one of the 10 SECTIONS lines and a signal on a selected one of the 30 CHANNEL lines.

*Address coincidence detector*

Refer now to FIG. 5A9, which shows the details of the ADDRESS COINCIDENCE DETECTOR 500. The SECTION 0 to 9 lines from the DRUM TIMER DECODER 380 are respectively connected to the upper input terminal of each of the AND circuits 502a to 502j, while the SECTION 0 to 9 lines from the SECTION COUNTER DECODER 436 are respectively connected to the remaining lower input terminals of each of the AND circuits 502a to 502j. The outputs of the AND circuits 502a, 502b, and 502c, are connected to an OR circuit 504 whose output is connected to one input of a grounded grid amplifier 510. The outputs of the AND circuits 502d, 502e, and 502f are connected to the inputs of an OR circuit 506, whose output is connected to a second input of the grounded grid amplifier 510. The outputs of the AND circuits 502g, 502h, 502i, and 502j, are connected to the inputs of an OR circuit 508 whose output is connected to the remaining input of the grounded grid amplifier 510. The output of the grounded grid amplifier 510, is coupled via a cathode follower 512 to one input of an AND circuit 514. The CHARACTER 1 line from the DRUM TIMER DECODER 380 is connected to the remaining input of the AND circuit 514, whose output is coupled via a cathode follower 516 to the CHARACTER 1 SELECTED SECTION line.

It will be remembered that the SECTION COUNTER 402 is set to a selected value by the CALCULATOR 1100 in accordance with the units digit of a SELECT instruction. Initially, the ADDRESS REGISTER COUNTER CONTROL UNIT 850, which is a component of the READ/WRITE CONTROL CIRCUITS 600 and which produces the SECTION COUNTER ADVANCE pulse, is inoperative and remains inoperative until a positive signal is applied via the CHARACTER 1 SELECTED SECTION line to initiate operation of the READ/WRITE CONTROL CIRCUITS 600, in a manner as will be described hereinafter. Consequently, so long as no SECTION COUNTER ADVANCE pulse is produced, the SECTION COUNTER 402 stands at the count to which it is initially set by the CALCULATOR 1100 and the SECTION COUNTER DECODER 436 produces a voltage pattern indicative of the SELECTED SECTION. Additionally, it will be remembered that the DRUM TIMER DECODER 380, of the ADDRESS TIMING REGISTER 200, produces a different voltage pattern corresponding to each CHARACTER position of the SECTIONS of the DRUM 100. Hence, the ADDRESS COINCIDENCE DETECTOR 500 compares the voltage pattern produced by the SECTION COUNTER DECODER 436 of the ADDRESS INPUT REGISTER 400 with the continuously changing voltage patterns produced by the DRUM TIMER DECODER 380, of the ADDRESS TIMING REGISTER 200. When these voltage patterns are identical, there is a coincidence of positive signals at one of the AND circuits 502, indicating that the SELECTED SECTION of the DRUM 100 has been reached. Consequently, a positive signal is passed from the selected AND circuit 502 and through one of the OR circuits 504, 506, 508 to the grounded grid amplifier 510, where the signal is amplified and passed via the cathode follower 512 to one input of the AND circuit 514. It will be remembered that during the S1 to S5 time, corresponding to the first CHARACTER positions of SECTIONS 0, 2, 4, 6 and 8 (see FIG. 4) and during the S1001 to S1006 time corresponding to the first CHARACTER positions of SECTIONS 1, 3, 5, 7 and 9, a positive signal is maintained on the CHARACTER 1 line, in a manner as described heretofore. The signal on the CHARACTER 1 line is effective to condition the AND circuit 514 so that when the CHARACTER 1 position of the SELECTED SECTION on the DRUM 100 is reached, the AND circuit 514 is rendered effective to cause a positive signal to be produced on the CHARACTER 1 SELECTED SECTION line to initiate operation of the READ/WRITE CONTROL CIRCUITS 600.

It should be noted at this point that it is possible, except that precautions are taken, to get a false coincidence in the ADDRESS COINCIDENCE DETECTOR 500. For example, assume that the SECTION COUNTER 402 is set to a value corresponding to SECTION 9 during the second half revolution of the DRUM 100 or, in other words, after the CHARACTER 1 position of SECTION 9. As each CHARACTER position of SECTION 9 is reached, a coincidence of voltage patterns from the ADDRESS TIMING REGISTER 200 and the ADDRESS INPUT REGISTER 400 occurs causing a positive signal to be applied to the AND circuit 514. Thus, when the CHARACTER 200 position of SECTION 9 is reached, corresponding to the S2000 pulse, a coincidence of voltage patterns again occurs causing a positive signal to condition the AND circuit 514. Since no further timing pulses are produced during the GAP INTERVAL of the DRUM 100, the voltage pattern from the ADDRESS TIMING REGISTER 200 remains the same during the GAP INTERVAL of the DRUM 100 and the AND circuit 514 remains conditioned until S1 time when the coincidence is terminated by a change in the voltage pattern from the DRUM TIMER DECODER 380. However, at S1 time, corresponding to the CHARACTER 1 position of SECTION 0 a positive signal is applied to the CHARACTER 1 line which would render the AND circuit 514 effective to produce a false signal on the CHARACTER 1 SELECTED SECTION line. However, this is prevented by using component values in the DRUM TIMER DECODER 380 and in the AND circuit 514 to delay the operation of the AND circuit 514 sufficiently so that the coincidence is terminated before the AND circuit 514 can effectively produce the false signal on the CHARACTER 1 SELECTED SECTION line.

*Read/write control circuits*

Referring now to FIG. 5C, there is shown in block form the components of the READ/WRITE CONTROL CIRCUITS 600.

The READ/WRITE CONTROL CIRCUITS 600, include a READ/WRITE CONDITION GENERATOR 602, a PRECESS RING COUNTER 636, a READ/WRITE SAMPLE GENERATOR 656, a RESPONSE DISCONNECT GENERATOR 740, an END OPERATION CONTROL UNIT 776, a DISCONNECT RESET UNIT 790, an END OF DRUM CHECK CONTROL UNIT 806 and an ADDRESS REGISTER COUNTER CONTROL UNIT 850.

Refer now to FIG. 5C1, which shows the details of the READ/WRITE CONDITION GENERATOR 602. The CALCULATOR CONTROL line from the CALCULATOR 1100 is connected to one input of each of the AND circuits 606. The W CALL line, from the CALCULATOR 1100, is connected via a cathode follower 604*a* to the remaining input of the AND circuit 606*a*, while the R CALL line, from the CALCULATOR 1100, is connected via a cathode follower 604*b* to the remaining input of the AND circuit 606*b*. The outputs of the AND circuits 606 are coupled via grounded grid amplifiers 608 and parallel connected cathode followers 610, respectively, to one input each of the AND circuits 612, respectively. The SELECTED DRUM line, from the DRUM DECODER 489, and the B line, from the TIMING READ AMPLIFIER and SHAPER UNIT 202, are connected to the remaining inputs of the AND circuits 612, respectively. The output of the AND circuit 612*a* is coupled via a cathode follower 614*a* to the reset input of the W CONDITION CONTROL trigger 620*a*. Likewise, the output of the AND circuit 612*b* is coupled via a cathode follower 614*b* to the reset input of the R CONDITION CONTROL trigger 620*b*. The CHARACTER 1 SELECTED SECTION line is connected to the set inputs of the W CONDITION CONTROL trigger 620*a* and the R CONDITION CONTROL trigger 620*b*, respectively. The right-tapped output of the W CONDITION CONTROL trigger 620*a* is connected to the set input of the W CONDITION trigger 622*a*, while the right-tapped output of the R CONDITION CONTROL trigger 620*b* is connected to the set input of the R CONDITION trigger 622*b*. The right-divider output of the W CONDITION trigger 622*a* is connected via a cathode follower 626*a* to the W CONDITION line and to one input of an OR circuit 628. Likewise, the right-divider output of the R CONDITION trigger is connected via a cathode follower 626*b* to the R CONDITION line and to the remaining input of the OR circuit 628. The output of the OR circuit 628 is coupled via a cathode follower 630 to the R/W CONDITION line and via an inverter 632 and a cathode follower 634 to the $\overline{\text{R/W CONDITION}}$ line.

Assume that the CALCULATOR is in control so that a positive signal is maintained on the CALCULATOR CONTROL line to condition the AND circuits 606. It will be remembered that when a WRITE instruction is given a WRITE CALL signal is emitted by the CALCULATOR. Consequently, a positive signal is applied to the W CALL line which passes via the cathode follower 604*a* to render the conditioned AND circuit 606*a* effective to produce a positive signal which is reshaped and amplified by the grounded grid amplifier 608*a*, and passed via cathode followers 610*a* to one input of the AND circuit 612*a* and to the W CALL CONTROL line. Assuming that the DRUM STORAGE UNIT is the selected INPUT/OUTPUT UNIT, a positive signal is applied via the SELECTED DRUM line to condition the AND circuit 612*a*. The next B pulse occurring passes via the now conditioned AND circuit 612*a* and the cathode follower 614*a* to set the W CONDITION CONTROL trigger 620*a* to its ON state. The W CONDITION CONTROL trigger 620*a* remains in its ON state until such time as the CHARACTER 1 position of the SELECTED SECTION is reached, at which time a positive signal is applied to the CHARACTER 1 SELECTED SECTION line to reset the W CONDITION CONTROL trigger 620*a* to its OFF state thereby applying a negative going signal to set the W CONDITION trigger 622*a* to its ON state. The W CONDITION trigger 622*a* in being set to its ON state causes a positive signal to pass via the cathode follower 626*a* to the W CONDITION line and via the OR circuit 628 and the cathode follower 630 to the R/W CONDITION line. The positive signal on the R/W CONDITION line is inverted by the inverter 632 to a negative signal and passed via the cathode follower 634 to the $\overline{\text{R/W CONDITION}}$ line. Thus, as the CHARACTER 1 position of the SELECTED SECTION is reached, the W CONDITION line and the R/W CONDITION line have positive signals applied thereto which are maintained thereon until an END OF OPERATION occurs, causing the W CONDITION CONTROL trigger 620*a* and the W CONDITION trigger 622*a* to be reset to their respective OFF states by an X DISCONNECT RESET signal, in a manner as will be described hereinafter. Similar circuits are used for generating an R CONDITION signal. Additionally, it should be noted that both the W CONDITION and R CONDITION signals pass via the OR circuit 628 and the cathode follower 630 to the R/W CONDITION line. Hence, a positive signal is applied to the R/W CONDITION line whenever a READ or WRITE operation is called for. Further, since the W CALL signal or the R CALL signal effectively permits a B pulse to set either the W CONDITION CONTROL trigger 620*a* or the R CONDITION CONTROL trigger 620*b* to their respective ON state and the CHARACTER 1 SELECTED SECTION signal resets either of these triggers back to their OFF state, if the W CALL signal or the R CALL signal should occur shortly after the leading edge of the CHARACTER 1 SELECTED SECTION signal then these triggers must wait a complete revolution of the DRUM 100 before being reset to their respective OFF states by the leading edge of the CHARACTER 1 SELECTED SECTION signal.

Refer now to FIG. 5C2 which shows the details of PRECESS RING COUNTER 636. An INITIAL COINCIDENCE line from the READ/WRITE SAMPLE GENERATOR 656 (see FIG. 5C3), the S line from the TIMING READ AMPLIFIER and SHAPER UNIT 202 and the $\overline{I_1 \text{ to } I_2}$ line from the INDEX GENERATOR 238 (see FIG. 5A1) are connected to the inputs of the AND circuit 538. The output of the AND circuit 638 is coupled via a series circuit, comprising an inverter 640 and a cathode follower 642, to the input of each of the diode gates 644, respectively. The output of each of the diode gates 644*a* to 644*d* is connected to the reset input of corresponding triggers 646*a* to 646*d*, respectively, and to the set input of each of the next following triggers 646*b* to 646*e*, respectively. The output of the diode gate 644*e* is connected to the reset input of the corresponding trigger 646*e* and to the set input of the first trigger 646*a* to complete the ring. The right-tapped output of each of the triggers 646 is connected to the supply terminal of the corresponding diode gates 644, respectively. The right divider output of the trigger 646*a* is coupled via a cathode follower 648 to the 1 ON line. The right divider output of the trigger 646*d* is connected to one input of the grounded grid amplifier 650, while the $I_1$ line from the INDEX GENERATOR 238 is connected to the remaining input of the grounded grid amplifier 650. The output of the grounded grid amplifier 650 is coupled via a cathode follower 652 to the $I_{1/4}$ ON line. The right divider output of the fifth trigger 646*e* is coupled via cathode followers 654 to the 5 ON line.

Initially, the triggers 646*a* to 646*d* are in their OFF state, while the trigger 646*e* is in its ON state. Consequently, the right divider output of the trigger 646*e* emits a positive signal which is passed via the cathode followers 654 to the 5 ON line. At the same time a positive signal is emitted from the right-tapped output of the trigger 646*e* to condition the diode gate 644*e*. A positive signal is applied to the INITIAL COINCIDENCE line at a time corresponding to the leading edge of the first A pulse produced after a positive W CONDITION signal is generated if a WRITE operation is to proceed or at a time corresponding to the leading edge of the first B pulse produced after the positive R CONDITION signal is generated if a READ operation is to proceed, as will be explained hereinafter.

It will be remembered, in connection with the description of the INDEX GENERATOR 238, that a negative signal is applied on the $\overline{I_1 \text{ to } I_2}$ line starting at $I_2$ time and terminating at $I_2$ time which corresponds to B1 time. Since $I_1$ time occurs during the GAP INTERVAL of the DRUM 100, and the B1 time occurs subsequent to the S1 pulse, the negative signal on the $\overline{I_1 \text{ to } I_2}$ line deconditions the AND circuit 638 during a period of each DRUM revolution which engulfs a portion of the GAP INTERVAL and each S1 pulse, while a positive signal is maintained on the $\overline{I_1 \text{ to } I_2}$ line during the remaining portion of each DRUM revolution. Let it be assumed that SECTION 1 is the SELECTED SECTION and that a WRITE instruction has been given. Now as the DRUM 100 reaches the S1001 position, corresponding to the CHARACTER 1 position of the SELECTED SECTION (see FIG. 3) circuits in the READ/WRITE SAMPLE GENERATOR 656 are conditioned so that at B1001 time the READ/WRITE SAMPLE GENERATOR 656 in response to the B1001 pulse, applies a positive signal to the INITIAL COINCIDENCE line which in combination with the positive signal on the $\overline{I_1 \text{ to } I_2}$ line condtions the AND circuit 638 of the PRECESS RING COUNTER 636. Consequently, at S1002 time, the S1002 pulse passes via the conditioned AND circuit 638 and is inverted to a negative pulse by the inverter 640. The negative pulse passes via the cathode follower 642 and is applied to the diode gate 644. Since the diode gate 644*e* is the only conditioned gate, it responds to the negative pulse and causes the trigger 646*e* to be reset to its OFF state and the trigger 646*a* to be set to its ON state. The trigger 646*e* in being reset to its OFF state, terminates the positive signal on the 5 ON line whereas the trigger 646*e* in being set to its ON state, effectively causes a positive signal to be produced on the 1 ON line or, in other words, the S1002 pulse effectively steps the PRECESS RING COUNTER 636 to the 1 ON condition. Three S pulses later, corresponding to the fourth S pulse applied to the PRECESS RING COUNTER 636, the S1005 pulse steps the PRECESS RING COUNTER 636 to the 4 ON condition and a positive pulse is effectively passed to the $I_{2/4}$ ON line. The next S pulse, corresponding to the fifth S pulse applied to the PRECESS RING COUNTER 636, namely, the S1006 pulse, steps the PRECESS RING COUNTER 636 to the 5 ON condition causing a positive pulse to be passed via the cathode followers 654 to the 5 ON line. It should be noted that S1006 time corresponds to the CHARACTER 2 position of SECTION 1. Hence, this process continues so that every fifth S pulse, corresponding to succeeding CHARACTER positions of SECTION 1, a positive pulse is applied to the 5 ON line permitting the writing of a CHARACTER (or the reading of a CHARACTER if this had been a READ operation) in succeeding CHARACTER positions of the SELECTED SECTION, in a manner which will be described in detail hereinafter. After the CHARACTER 200 position of the SELECTED SECTION has been reached, the PRECESS RING COUNTER 636 is stepped four more times by the S1997, S1998, S1999 and S2000 pulses to the 4 ON condition before the GAP INTERVAL of the DRUM 100 is reached (see FIG. 3). During the GAP INTERVAL a positive pulse is applied to the $I_1$ line which is amplified and reshaped by the grounded grid amplifier 650 and passed via the cathode follower 652 to the $I_{1/4}$ ON line. At the same time, a negative signal is applied to the $\overline{I_1 \text{ to } I_2}$ line to decondition and AND circuit 638 and prevent further stepping of the PRESS RING COUNTER 636. It will be remembered that this negative signal is maintained on the $\overline{I_1 \text{ to } I_2}$ line until after the generation of the S1 pulse. Consequently, the PRECESS RING COUNTER 636 does not respond to the S1 pulse but rather to the S2 pulse which steps the PRECESS RING COUNTER 636 to the 5 ON condition, the S2 pulse corresponding to the CHARACTER 1 position of the next SECTION, namely, SECTION 2 in the above example. Therefore, it is noted that the 5 ON condition occurs during S2 time rather than during S1 time as at INITIAL COINCIDENCE. Hence, there is a CHARACTER position delay in time before the 5 ON condition occurs in comparison to when it occurred at INITIAL COINCIDENCE or in other words, a precession of one character position occurs when writing (or reading) is carried over from the odd SECTION, SECTION 1, to the event SECTION, SECTION 2. In a similar manner, the PRECESS RING COUNTER 636 is precessed each revolution of the DRUM 100 whenever writing (or reading) is carried over from an odd numbered SECTION to an even numbered SECTION of the same CHANNEL so that no two CHARACTERS will occupy the same physical bit location on the DRUM 100, as would occur without precession. If the SELECTED SECTION had been the last SECTION of a CHANNEL, namely, SECTION 9, the PRECESS RING COUNTER 636 would be stepped by the S2000 pulse to the 5 ON condition and would remain in this condition until S2 time. Consequently, the PRECESS RING COUNTER 636 would be in the 5 ON condition during the interval of the CHARACTER 1 position of SECTION 0, and every succeeding fifth S pulse, namely, S6, S11, S16, etc. would step the PRECESS RING COUNTER 636 to the 5 ON condition, corresponding to successive CHARACTER positions of SECTION 0. Hence it should be apparent that no precession occurs when writing (or reading) is carried over from one CHANNEL to the next succeding CHANNEL.

Refer now to FIG. 5C3 which shows the details of the READ/WRITE SAMPLE GENERATOR 656. The $\overline{\text{TIMER CHECK}}$ line from the TIMER STEP CONTROL UNIT 262 (see FIG. 5A2) and the 5 ON line from the PRECESS RING COUNTER 636 (see FIG. 5C2) are connected to the inputs of an AND circuit 734. The output of the AND circuit 734 is coupled via a series circuit, comprising a grounded grid amplifier 736 and a cathode follower 738, and the 5 ON CONTROL line to one input of each of the AND circuits 658 and 702. The $\overline{\text{END OPERATION}}$ line from the END OPERATION CONTROL UNIT 776 (see FIG. 5C5) is connected to a second input of each of the AND circuits 658 and 702. The W CONDITION line is connected to a third input of the AND circuit 658, while the R CONDITION line is connected to the third input of the AND circuit 702. The A line is connected to the remaining input of the AND circuit 658, while the B line is connected to the remaining input of the AND circuit 702. The output of the AND circuit 658 is connected to a grounded grid amplifier 660 and to input of an OR circuit 724. The output of the grounded grid amplifier 660 is connected via a series circuit, comprising a cathode follower 662, a peaker 664, a grounded grid amplifier 666, cathode followers 668 and cathode followers 670, to a single shot multivibrator 672, to one input of an OR circuit 680 and to a W line. The output of the single shot multivibrator 672 is coupled via a series circuit, comprising a cathode follower 674, a peaker 676 and a cathode follower 678 to a W5 line. The output of the OR circuit 680 is coupled via a grounded grid amplifier 682 and a cathode follower 684 to a single shot multivibrator 686 and to a R/W line, the right divider output of the single shot multivibrator 686 is coupled via a series circuit, comprising a cathode follower 688, a peaker 690 and a cathode follower 692, to a R/W5 line. The tapped output of the single shot multivibrator 686 is connected via a series circuit, comprising a single shot multivibrator 694, a cathode follower 696, a peaker 698 and a cathode follower 700 to the R/W10 line. The output of the AND circuit 702 is connected to the grounded grid amplifier 704 to the remaining input of the OR circuit 724. The output of the grounded grid amplifier 704 is connected via a series circuit, comprising a cathode follower 706, a peaker 708, a cathode follower 710 and cathode followers 712, to a single shot multivibrator 714, to an R line and to the remaining input of the OR circuit 680. The right divider output of the single shot multivibrator 714 is coupled via a series circuit, comprising a cathode follower 716, a peaker 718 and cathode followers 720, to an R5 line. The output of the OR circuit 724, is coupled via a cathode follower 726 to the reset input of the INITIAL COINCIDENCE trigger 730. The right-divider output of the INITIAL COINCIDENCE trigger 730 is coupled via a cathode follower 732 to the INITIAL COINCIDENCE line.

The PRECESS RING COUNTER 636 in being initially set to the 5 ON condition causes a positive signal to be maintained on the 5 ON line and assuming that the ADDRESS TIMING REGISTER 200 is functioning properly a positive signal is maintained on the $\overline{\text{TIMER CHECK}}$ line, and since the unit is not at the END OF OPERATION, a positive signal is maintained on the $\overline{\text{END OPERATION}}$ line. Consequently, the AND circuit 734 is rendered effective to produce a positive signal which is amplified and reshaped by the grounded grid amplifier 736 and passed via the cathode follower 738 to the 5 ON CONTROL line from which it is applied to one input of each of the AND circuits 658 and 702. A second input of each of the AND circuits 658 and 702 is maintained positive by the positive signal on the $\overline{\text{END OPERATION}}$ line. Now let it be further assumed that a WRITE operation is to be performed. Consequently, when the CHARACTER 1 position of the SELECTED SECTION is reached, a positive signal is applied via the W CONDITION line to condition the AND circuit 658. Therefore, the next A pulse that occurs is passed via the conditioned AND circuit 658 to the grounded grid amplifier 660 and to the OR circuit 724. The A pulse is passed via the OR circuit 724 and the cathode follower 726 to set the INITIAL COINCIDENCE trigger 730 to its ON state with a resulting positive signal being applied via the cathode follower 732 to the INITIAL COINCIDENCE line. Thus, a positive signal is applied to the INITIAL COINCIDENCE line at a time corresponding to the leading edge of the first A pulse produced after a positive W CONDITION signal is generated. The A pulse is also amplified and reshaped by the grounded grid amplifier 660 and passed via the cathode follower 662 to the peaker 664. The trailing edge of the A pulse is effective to trip the peaker 664 which, in response thereto, emits a positive 1.2 microsecond pulse which is amplified and reshaped by the grounded grid amplifier 666 and passed via the cathode followers 668 to 670 to the W line. Thus, a positive 1.2 microsecond W pulse is generated approximately at the trailing edge of the A pulse. The trailing edge of the W pulse is effective to trip the single shot multivibrator 672 which, in response thereto, emits a positive 3.8 microsecond pulse which is passed via the cathode follower 674 to the peaker 676. The trailing edge of this pulse is effective to trip the peaker 676 which, in response thereto, emits a positive 3.5 microsecond pulse which is passed via the cathode follower 678 to the W5 line. Thus, a positive 3.5 microsecond W5 pulse is generated approximately 5 microseconds after the leading edge of the W pulse. It should be noted that the 5 microseconds period is made up of the 1.2 microsecond duration of the W pulse and the 3.8 microsecond period of the single shot multivibrator 672. Additionally, the positive W pulse is passed via the OR circuit 680 and is amplified and reshaped by the grounded grid amplifier 682 and then passed via the cathode follower 684 to the R/W line. Thus, a positive 1.2 microsecond R/W pulse is generated approximately in time with the W pulse.

If the selected operation had been a READ operation rather than a WRITE operation, then, when the CHARACTER 1 position of the SELECTED SECTION is reached, a positive signal is applied via the R CONDITION line to condition the AND circuit 702. The next following B pulse is passed by the AND circuit 702 to the grounded grid amplifier 704 and to the OR circuit 724 which initiates the production of a positive signal on the INITIAL COINCIDENCE line, in a manner as previously described. The B pulse is also amplified and reshaped by the grounded grid amplifier 704 and passed via the cathode follower 706 to the peaker 708. The trailing edge of the B pulse is effective to trip the peaker 708 which, in response thereto, emits a positive 1.2 microsecond pulse which is passed via the cathode follower 710 and 712 to the single shot multivibrator 714, to the OR circuit 680 and to the R line. Thus, a positive 1.2 microsecond R pulse is generated approximately at the trailing edge of the B pulse. The trailing edge of the R pulse is effective to trip the single shot multivibrator 714 which, in response thereto, emits a positive 3.8 microsecond pulse which is passed via the cathode follower 716 to the peaker 718. The trailing edge of this pulse is effective to trip the peaker 718, which in response thereto, emits a positive 3.5 microsecond pulse which is passed via the cathode followers 720 to the R5 line. Thus, a positive 3.5 microsecond R5 pulse is generated approximately 5 microseconds after the leading edge of the R pulse. Additionally, the R pulse is passed via the OR circuit 680 to initiate the production of a positive pulse on the R/W line, in a manner as previously described. The R/W pulse, whether it be generated by a W pulse or by a R pulse, is applied to the single shot multivibrator 686. The trailing edge of either of these pulses is effective to trip the single shot multivibrator 686 which, in response thereto, emits a 3.8 microsecond positive pulse from the right-divider output thereof, which is passed via the cathode follower 688 to the peaker 690. The trailing edge of this pulse is effective to trip the peaker 690 which, in response thereto, emits a positive 2 microsecond pulse which is passed via the cathode follower 692 to the R/W5 line. Thus, a positive 2 microsecond R/W5 pulse is generated approximately 5 microseconds after the leading edge of the R/W pulse. Additionally, a positive 3.8 microsecond pulse is emitted from the right-tapped output of the single shot multivibrator 686 and is applied to the single shot multivibrator 694. The trailing edge of this pulse is effective to trip the single shot multivibrator 694 which, in response thereto, emits a positive 5 microsecond pulse which is passed via the cathode follower 696 to the peaker 698. The trailing edge of this pulse is effective to trip the peaker 698, which, in response thereto, emits a positive 2 microsecond pulse which is passed via the cathode follower 700 to the R/W10 line. Thus, a positive 2 microsecond R/W10 pulse is generated approximately 10 microseconds after the leading edge of the R/W pulse.

Hence, it is apparent that every time the PRECESS RING COUNTER 636 steps to the 5 ON condition, a W pulse followed by a W5 pulse is produced during a WRITE operation or an R pulse followed by an R5 pulse is produced during a READ operation. Additionally, if the unit is in either a READ or WRITE operation an R/W pulse is produced, followed by a R/W5 pulse, followed by a R/W10 pulse and as soon as the CHARACTER 1 position of the SELECTED SECTION is reached, the next following A or B pulse is effective to cause a positive signal to be produced on the INITIAL COINCIDENCE line.

Refer now to FIG. 5C4, which shows the details of the RESPONSE DISCONNECT GENERATOR 740. The W CALL CONTROL line, from the READ/WRITE CONDITION GENERATOR 602, is connected to an inverter 750 and to one input of each of the AND circuits 762 and 764. The W5 line from the READ/WRITE SAMPLE GENERATOR 656 is applied to the remaining input of the AND circuit 762 and to one input of the AND circuit 754. The output of the AND circuit 762 is connected to one input of a grounded grid amplifier 744. The 1 ON line from the PRECESS RING COUNTER 636 is connected to a second input of the AND circuit 764 and to one input of the AND circuit 766. The END OF DRUM CHECK line from the END OF DRUM CHECK CONTROL UNIT 806 (see FIG. 5C6) is connected to a second input of the AND circuit 766 and to the remaining input of the AND circuit 764. The output of the AND circuit 764 is connected to a second input of the grounded grid amplifier 744. The R5 line from the READ/WRITE SAMPLE GENERATOR 656 is connected to one input of each of the AND circuits 742 and 748. The $\overline{\text{DRUM MARK}}$ line from the CHARACTER REGISTER 990 (see FIG. 5D5) is connected to the remaining input of the AND circuit 742. The output of the AND circuit 742 is connected to the remaining input of the grounded grid amplifier 744, whose output is coupled via a 100K ohm resistor and a cathode follower 746 to a RESPONSE line. The DRUM MARK line from the CHARACTER REGISTER 990 is connected to a second input of the AND circuit 748, while the CALCULATOR CONTROL line is connected to a second input of the AND circuit 754 and to the remaining input of the AND circuit 748. The output of the AND circuit 748 is connected to one input of a grounded grid amplifier 756. The output of the inverter 750 is coupled via a cathode follower 752 to the remaining inputs of each of the AND circuits 754 and 766. The output of the AND circuit 754 is connected to the remaining input of the grounded grid amplifier 756. The output of the grounded grid amplifier 756 is connected via a 100K ohm resistor and a cathode follower 760 to a DISCONNECT line and via a cathode follower 758 to the END R/W line. The output of the AND circuit 766 is connected to a grounded grid amplifier 770 whose output is coupled via a cathode follower 774 to an END OF DRUM DISCONNECT line and via a 100K ohm resistor and a cathode follower 772 to the DISCONNECT line.

If a WRITE operation is to proceed, then a positive signal is maintained on the W CALL CONTROL line to condition the AND circuit 762 so that when a positive W5 pulse is passed via the conditioned AND circuit 762 it is amplified and reshaped by the grounded grid amplifier 744 and passed via the cathode follower 746 to the RESPONSE line. This pulse signals the CALCULATOR that a CHARACTER has been written and the DRUM STORAGE UNIT is ready for another character. The CALCULATOR 1100 goes through another CHARACTER cycle and puts a binary-coded signal on the WRITE BUS corresponding to the next CHARACTER. At the next W time, the DRUM STORAGE UNIT samples the next CHARACTER now on the WRITE-BUS and causes it to be written on the DRUM 100. Five microseconds later, another W5 pulse initiates production of another positive signal on the RESPONSE line which again signals the CALCULATOR that this next CHARACTER has been written and the DRUM STORAGE UNIT is ready for another CHARACTER. The CALCULATOR 1100 goes through another CHARACTER cycle and puts a binary-coded signal on the WRITE BUS corresponding to the next CHARACTER so that it may be written in the next succeeding CHARACTER position. This process continues and succeeding CHARACTERS of the RECORD are transferred from the CALCULATOR to the DRUM STORAGE UNIT until a RECORD MARK CHARACTER signal is placed on the WRITE BUS. Recognition of the RECORD MARK CHARACTER in the CALCULATOR 1100 causes the positive W CALL SIGNAL to be terminated which in turn, effectively causes the positive signal on the W CALL CONTROL line to be terminated so that a negative signal is now maintained on the W CALL CONTROL line before the next W5 pulse occurs. The negative signal is inverted to a positive signal by the inverter 750 and is applied to condition the AND circuit 754. Since the W CONDITION trigger 622*a* of the READ/WRITE CONDITION GENERATOR 602 is still set to the ON state, a positive signal is still maintained on the W CONDITION line. Consequently, the READ/WRITE SAMPLE GENERATOR 656 is still effective to generate a W pulse followed by a W5 pulse. The negative signal on the W CALL CONTROL line is effective to decondition the WRITE CONTROL UNIT 902 so that the W pulse is ineffective to sample the RECORD MARK CHARACTER and cause it to be written on the DRUM 100. (However, it should be noted that since a W pulse is produced a DRUM MARK CHARACTER, corresponding to the RECORD MARK CHARACTER, is written on the DRUM 100 in a manner as will be explained hereinafter.) The W5 pulse is now passed via the conditioned AND circuit 754 and is amplified and reshaped by the grounded grid amplifier 756. The pulse is then passed via the cathode follower 758 to the END R/W line and the cathode follower 760 to the DISCONNECT line. The pulse on the DISCONNECT line signals the CALCULATOR that the END OF RECORD has been reached and the DRUM STORAGE UNIT is to be disconnected from the CALCULATOR. A positive pulse on the END R/W line causes an END OPERATION signal to be emitted which deconditions the READ/WRITE SAMPLE GENERATOR 656 (see FIG. 5C3) to prevent any further W pulses from being produced.

If the DRUM STORAGE UNIT has been in a READ operation, then a positive signal is maintained on the $\overline{\text{DRUM MARK}}$ line until a DRUM MARK CHARACTER is READ from the DRUM 100. Hence, so long as a DRUM MARK CHARACTER is not read, the positive signal on the $\overline{\text{DRUM MARK}}$ line conditions the AND circuit 742 so that when a positive R5 pulse is produced it is passed via the conditioned AND circuit 742 to effect the production of a positive pulse on the RESPONSE line, in a manner previously described. The positive pulse on the RESPONSE line signals the CALCULATOR 1100 to commence a CHARACTER cycle and cause the CHARACTER standing on the READ BUS to be routed to the CALCULATOR 1100. At the next R time, the DRUM STORAGE UNIT samples the next succeeding CHARACTER read from the DRUM 100 and causes it to be applied to the READ BUS. Five microseconds later another R5 pulse initiates production of another positive signal on the RESPONSE line which again signals the CALCULATOR 1100 to commence a CHARACTER cycle and cause this next CHARACTER standing on the READ BUS to be routed to the next higher ADDRESS in the CALCULATOR 1100. This process continues until a DRUM MARK CHARACTER is read indicating the END OF RECORD. When the DRUM MARK CHARACTER is read from the CHARACTER REGISTER 990, a positive signal is applied via the DRUM MARK line to the AND circuit 748 and, in conjunction with the positive signal on the CALCULATOR CONTROL line, conditions the AND circuit 748. When the next positive R5 pulse occurs it passes via the AND circuit 748 to the grounded grid amplifier 756 where it is amplified and reshaped and then passed via the cathode follower 758 to the END R/W line and via the cathode follower 760 to the DISCONNECT line. The pulse on the END R/W line causes an END OPERATION to occur, in a manner as will be explained hereinafter, while the pulse on the DISCONNECT line signals the CALCULATOR to commence another CHARACTER cycle during which time a RECORD MARK CHARACTER is generated indicating the END of that particular RECORD and stored in the next succeeding ADDRESS in the CALCULATOR 1100. The operation of the RESPONSE DISCONNECT GENERATOR 740 when the END OF THE DRUM 100 is reached will be described hereinafter in conjunction with the description of the END OF DRUM CHECK CONTROL UNIT 806.

Refer now to FIG. 5C5 which shows the details of the END OPERATION CONTROL UNIT 776 and the DISCONNECT RESET UNIT 790. The END OPERATION line from the END OPERATION CONTROL UNIT 776, the $\overline{\text{END OF DRUM CHECK}}$ line from the END OF DRUM CHECK CONTROL UNIT 806 and the $I_{1/4}$ ON line from the PRECESS RING COUNTER 636 are connected to the inputs of the AND circuit 794, whose output is coupled to one input of the OR circuit 796. The END OF DRUM DISCONNECT line from the RESPONSE DISCONNECT GENERATOR 740 and the B line from the TIMING READ AMPLIFIER and SHAPER UNIT 202 are connected to the input of the AND circuit 792 whose output is coupled to the remaining input of the OR circuit 796. The output of the OR circuit 796 is coupled via a series circuit, comprising a cathode follower 798, a single shot multivibrator 800 and a cathode follower 802, to the DISCONNECT RESET line and via the cathode followers 804 to the X DISCONNECT RESET line. The END R/W line and $\overline{\text{END OF DRUM CHECK}}$ line are connected to the set inputs of the END OPERATION trigger 784. The DISCONNECT RESET line is coupled to the reset input of the END OPERATION trigger 784. The right divider output of the END OPERATION trigger 784 is coupled via a cathode follower 788 to the END OPERATION line, while the left divider output of the END OPERATION trigger is coupled via a cathode follower 786 to the $\overline{\text{END OPERATION}}$ line.

The END OPERATION trigger 784 is initially set to its ON state, by a Z pulse from the RESET UNIT 263, with a resulting positive signal being passed via the cathode follower 788 and the END OPERATION line to one input of the AND circuit 794. As long as the DRUM 100 has not reached the last CHARACTER position of the last SECTION of the last CHANNEL on the DRUM 100, namely, CHARACTER 200 in SECTION 9 of CHANNEL 29, a positive signal is maintained on the $\overline{\text{END OF DRUM CHECK}}$ line, in a manner as will be described hereinafter, to condition the AND circuit 794. It will be remembered that every time the GAP INTERVAL of the DRUM 100 passes under the READ/WRITE heads, an INDEX pulse $I_1$ is generated. Consequently, the first $I_1$ pulse, generated after the END OPERATION trigger 784 is set to its ON state, passes via the AND circuit 794 and the OR circuit 796 and via the cathode follower 798 to the single shot multivibrator 800. The trailing edge of the $I_1$ pulse is effective to trip the single shot multivibrator 800, which, in response thereto, emits a positive 20 microsecond pulse via the cathode follower 802 to the DISCONNECT RESET line and via the cathode followers 804 to the X DISCONNECT RESET line. The leading edge of the pulse on the X DISCONNECT RESET line is effective to switch those triggers in the READ/WRITE CONTROL UNIT 600 having an X within their representative blocks. Thus, if the X is at the left-hand side of the block it indicates that the trigger is set to its ON state whereas if the X is found at the right-hand side of the block it indicates that the trigger is reset to its OFF state. The trailing edge of the positive pulse on the DISCONNECT RESET line is effective to reset the END OPERATION trigger 784 to its OFF state in preparation for another READ or WRITE operation. It will be remembered that at the END of a READ or WRITE operation a positive pulse is applied to the END R/W line, the trailing edge of which is effective to set the END OPERATION trigger 784 to its ON state to initiate the production of a positive signal on the END OPERATION line and a negative signal on the $\overline{\text{END OPERATION}}$ line. The positive signal on the END OPERATION line conditions the AND circuit 794 of the DISCONNECT RESET UNIT 790 so that the next following $I_1$ pulse or 4 ON pulse on the $I_{1/4}$ ON line renders the AND circuit 794 effective to initiate production of the X DISCONNECT RESET and DISCONNECT RESET signals in a manner as previously described. The negative signal on the $\overline{\text{END OPERATION}}$ line deconditions the READ/WRITE SAMPLE GENERATOR 656 (see FIG. 5C3) to prevent any further W or R pulses from being produced. Additionally, if the END OF THE DRUM 100 had been reached, i.e. that the DRUM 100 had reached the CHARACTER 200 position of SECTION 9 in CHANNEL 29, the positive signal on the $\overline{\text{END OF DRUM CHECK}}$ line will be terminated and a negative signal will be produced thereon, as will be described hereinafter. This negative signal is also effective to set the END OPERATION trigger 784 to its ON state causing the production of a positive signal on the END OPERATION line and a negative signal on the $\overline{\text{END OPERATION}}$ line. Shortly thereafter, a positive signal is applied to the END OF DRUM DISCONNECT line which in combination with a B pulse renders the AND circuit 792 of the DISCONNECT RESET UNIT 790 effective to initiate production of the X DISCONNECT RESET and DISCONNECT RESET signals.

Refer now to FIG. 5C6, which shows the details of the END OF DRUM CHECK CONTROL UNIT 806. The SECTION 9 CHARACTER 200 line from the DRUM TIMER DECODER 380 and the CHANNEL 29 line from the CHANNEL UNIT 482C are connected to the inputs of the AND circuit 808 whose output is coupled via a grounded grid amplifier 810 and a cathode follower 812 to one input of an AND circuit 822. The R CONDITION line from the READ/WRITE CONDITION GENERATOR 602 and the $\overline{\text{DRUM MARK}}$ line from the CHARACTER REGISTER 990 are connected to the inputs of the AND circuit 814 whose output is connected to one input of a grounded grid amplifier 818. The W CALL CONTROL line and the W CONDITION line are connected to the inputs of the AND circuit 816 whose output is connected to the remaining input of the grounded grid amplifier 818. The output of the grounded grid amplifier 818 is coupled via a cathode follower 820 to a second input of the AND circuit 822. The CALCULATOR CONTROL line is connected to a third input of the AND circuit 822. The R/W5 line is connected to a fourth input of the AND circuit 822, while the 5 ON line is connected to the remaining input of the AND circuit 822. The output of the AND circuit 822 is coupled via an inverter 824 to the set input of the END OF DRUM CHECK trigger 826. The SELECTED DRUM line from the DRUM DECODER 489 is connected to one input of the AND circuit 840. The INITIAL COINCIDENCE line from the READ/WRITE SAMPLE GENERATOR 656 is connected via a cathode follower 832 and an inverter 834 to the reset input of the END OF DRUM CHECK trigger 826. A left divider output of the END OF DRUM CHECK trigger 828 is coupled via a cathode follower 836 to the $\overline{\text{END OF DRUM CHECK}}$ line, while the right divider output of the END OF DRUM CHECK trigger 826 is coupled via a cathode follower 838 to the END OF DRUM CHECK line and to the remaining input of the AND circuit 840. The output of the AND circuit 840 is coupled via a 100K ohm resistor and a cathode follower 842 to the R/W ERROR line.

The END OF DRUM CHECK CONTROL Unit 806 is primarily utilized to indicate that a RECORD is not completely written by the time the CHARACTER 200 position in SECTION 9 of CHANNEL 29 is reached, that is, when there is an attempt to write beyond that position which is the END OF the DRUM 100. Assume that a WRITE operation is proceeding and a RECORD is being written in the last SECTION, i.e. SECTION 9 of CHANNEL 29. Consequently, a positive signal is maintained on the CALCULATOR CONTROL line thereby applying one positive input to the AND circuit 822. Likewise, positive signals are maintained on the W CONDITION line and the W CALL CONTROL line so that a positive signal passes via the AND circuit 816 and is amplified by the grounded grid amplifier 818 and passed via the cathode follower 820 to a second input of the AND circuit 822. Likewise, at the start of CHANNEL 29 a positive signal is applied to the CHANNEL 29 line thereby conditioning the AND circuit 808. Now, as the CHARACTER 200 position of SECTION 9 is reached, a positive signal is applied to the 5 ON line and to the SECTION 9 CHARACTER 200 line. The positive signal of the 5 ON line applies a third positive input to the AND circuit 822. The positive signal on the SECTION 9 CHARACTER 200 line passes via the conditioned AND circuit 808 and is amplified by the grounded grid amplifier 810 and passed via the cathode follower 812 to condition the AND circuit 822. Five microseconds later a positive pulse is applied to the R/W5 line and is passed via the now conditioned AND circuit 822 and is inverted to a negative pulse by the inverter 824 and applied to set the END OF DRUM CHECK trigger 826 to its ON state. If the last CHARACTER transferred from the CALCULATOR 1100 is a RECORD MARK, then the CALCULATOR 1100 terminates the positive signal on the W CALL line and, in consequence thereof, the positive signal on the W CALL CONTROL line is effectively terminated and a negative signal is applied thereon to decondition the AND circuit 816. When the AND circuit 816 is deconditioned it effectively deconditions the AND circuit 822 so that the subsequent occurring R/W5 pulse cannot pass therethrough to set the END OF DRUM CHECK trigger to its ON state. Likewise, if a READ operation is proceeding and a RECORD is being READ from the last SECTION of CHANNEL 29, a positive signal is maintained on the R CONDITION line to thereby condition the AND circuit 814. If a DRUM MARK CHARACTER had not been READ from the CHARACTER 200 position in SECTION 9 of CHANNEL 29, then a positive signal is maintained on the $\overline{\text{DRUM MARK}}$ line thereby effectively permitting the AND circuit 822 to remain conditioned so that the subsequent occurring R/W5 pulse passes therethrough and effectively sets the END OF DRUM CHECK trigger 826 to its ON state. However, if a DRUM MARK CHARACTER had been sensed at this $\overline{\text{CHARACTER}}$ position, then the positive signal on the $\overline{\text{DRUM MARK}}$ line would be terminated thereby deconditioning the AND circuit 814 and consequently, deconditioning the AND circuit 822 so that the subsequent occurring R/W5 pulse can not pass therethrough to cause the END OF DRUM CHECK trigger 826 to be set to its ON state. Thus, if the last CHARACTER written or the last CHARACTER read is a DRUM MARK CHARACTER then the END OF DRUM CHECK trigger 826 will remain in its OFF state, but if the last CHARACTER written or the last CHARACTER read is not a DRUM MARK CHARACTER then the END of DRUM CHECK trigger 826 is set to its ON state. The END OF DRUM CHECK trigger 826 in being set to its ON state emits a negative signal from the left divider output which is passed via the cathode follower 836 to the $\overline{\text{END OF DRUM CHECK}}$ line and a positive signal from the right-divider output which is passed via the cathode follower 838 to the END OF DRUM CHECK line and via the conditioned AND circuit 840 and the cathode follower 842 to the R/W ERROR line. The positive signal on the R/W ERROR line due to a READ or WRITE error signals the CALCULATOR that a READ/WITE ERROR has occurred and the neon tube associated with the END OF DRUM CHECK trigger 826, which is turned ON when this trigger is set to its ON state, indicates that the error is an END OF DRUM ERROR. The operator may at this time actuate the reset key 264 in the RESET UNIT 263 to initiate a Z pulse which is effective to reset the END OF DRUM CHECK trigger 826 to its OFF state or it may be accomplished automatically as soon as the next positive signal is applied to the INITIAL COINCIDENCE line. A positive signal on the INITIAL COINCIDENCE line is passed via the cathode follower 832 and is inverted to a negative signal, by the inverter 834, and applied to reset the END OF DRUM CHECK trigger 826 to its OFF state. The negative signal on the $\overline{\text{END OF DRUM CHECK}}$ line effectively sets the END OPERATION trigger 784 of the END OPERATION UNIT 776 (see FIG. 5C5) to its ON state with a resulting negative signal being applied to the $\overline{\text{END OF OPERATION}}$ line to decondition circuits in the READ/WRITE SAMPLE GENERATOR 656 so that no further W or R pulses can be produced. Consequently, no further CHARACTERS can be written on the DRUM 100 nor READ to the CALCULATOR 1100, as the W and R pulses control the writing of CHARACTERS on the DRUM 100 and the transfer of CHARACTERS to the CALCULATOR 1100, as will be described hereinafter.

Referring again to the RESPONSE DISCONNECT GENERATOR 740 shown in FIG. 5C4, let it be assumed that the END OF THE DRUM 100 is reached during a WRITE operation and no RECORD MARK CHARACTER appears. Therefore, a W CALL signal is still transmitted from the CALCULATOR 1100 to the DRUM STORAGE UNIT so that a positive signal is still maintained on the W CALL CONTROL line which with the positive signal now on the END OF DRUM CHECK line conditions the AND circuit 764. When the PRECESS RING COUNTER 636 next reaches the 1 ON condition, a positive pulse is applied to the 1 ON line which passes via the conditioned AND circuit 764 to the grounded grid amplifier 744 where it is amplified and passed via the cathode follower 746 to the RESPONSE line. The signal on the RESPONSE line signals the CACULATOR 1100 to put the next CHARACTER signal on the WRITE BUS. It should be remembered that the CHARACTERS now being applied via the WRITE BUS to the DRUM STORAGE UNIT are not being written on the DRUM 100 since no W pulses are being generated due to the deconditioning of the READ/WRITE SAMPLE GENERA- TOR 656 by the negative signal on the END OPERATION line. This process continues and CHARACTERS are transferred from the CALCULATOR 1100 to the DRUM STORAGE UNIT until such time as a RECORD MARK CHARACTER occurs, at which time the positive W CALL SIGNAL is terminated. As the signal on the W CALL line goes negative, it effectively terminates the positive signal on the W CALL CONTROL line so that a negative signal is now maintained thereon which is inverted to a positive signal by the inverter 750 and applied with the positive signal now on the END OF DRUM CHECK line to condition the AND circuit 766. The next following positive pulse applied to the 1 ON line passes via the conditioned AND circuit 766 to the grounded grid amplifier 770. The pulse is then amplified by the grounded grid amplifier 770 and passed via the cathode follower 772 to the DISCONNECT line, thereby signaling the END OF RECORD, and via the cathode follower 774 to the END OF DRUM DISCONNECT line. The positive pulse on the END OF DRUM DISCONNECT line conditions the AND circuit 792 in the DISCONNECT RESET UNIT 790 (see FIG. 5C5) so that the next B pulse is passed via the conditioned AND circuit 792 and the OR circuit 796 and cathode follower 798 to trip the single shot multivibrator 800 to thereby initiate production of positive pulses on the DISCONNECT RESET line and the X DISCONNECT RESET line as described heretofore. The trailing edge of the pulse on the DISCONNECT RESET line resets the END OPERATION trigger 784 to its OFF state, while the leading edge of the pulse on the X DISCONNECT RESET line triggers all the triggers in the READ/WRITE CONTROL UNIT 600 which have an X in their respective blocks, in preparation for another operation.

If a READ operation had been proceeding then it is obvious that a negative signal is maintained on the WRITE CALL CONTROL line which is inverted to a positive signal by the inverter 750 in the RESPONSE DISCONNECT GENERATOR 740 (see FIG. 5C4) to maintain a positive signal at one input of the AND circuit 766. When the end of the DRUM 100 is reached a positive signal is applied via the END OF DRUM CHECK line to condition the AND circuit 766 so that when the next following positive pulse is applied to the 1 ON line it passes via the conditioned AND circuit 766 and causes a DISCONNECT pules and an END OF DRUM DISCONNECT pulse to be produced, in a manner as previously described.

Refer now to FIG. 5C7, which shows the details of the ADDRESS REGISTER COUNTER CONTROL UNIT 850. The CHARACTER 200 line from the DRUM TIMER DECODER 380 and the R/W line from the READ/WRITE SAMPLE GENERATOR 656 are connected to the inputs of the AND circuit 852, whose output is coupled to the reset input of the R/W AT SECTION END trigger 680. Likewise, the SECTION 9 CHARACTER 200 line from the DRUM TIMER DECODER 380 and the R/W line are connected to the inputs of the AND circuits 854 whose output is coupled to the reset input of the R/W AT CHANNEL END trigger 862. The $I_{1/4}$ ON line from the PRECESS RING COUNTER 636 is connected to the set inputs of the R/W AT SECTION END trigger 860 and the R/W AT CHANNEL END trigger 862, respectively. The right-divider output of the R/W AT SECTION END trigger 860 is coupled via a cathode follower 868 to a grounded grid amplifier 870 and to one input of the AND circuit 874. The plate of the grounded grid amplifier 870 is connected via a 150 micromicrofarad capacitor to ground while the right divider output thereof is coupled via a cathode follower 872 to the SECTION COUNTER CARRY CONTROL line. The CALCULATOR CONTROL line from the CALCULATOR 1100 is connected to a second input of the AND circuit 874 and to a first input of each of the AND circuits 882 and 888. The R/W10 line from the READ/WRITE SAMPLE GENERATOR 656 is connected to the remaining input of the AND circuit 874 and to a second input of the AND circuit 882. The output of AND circuit 874 is coupled via a cathode follower 876 to the SECTION COUNTER ADVANCE line. The right divider output of the R/W AT CHANNEL END trigger 862 is connected to a grounded grid amplifier 878. The plate of the grounded grid amplifier 878 is connected via a 150 micro-microfarad capacitor to ground, while the right-divider output thereof is coupled via a cathode follower 880 to the CHANNEL COUNTER CARRY CONTROL line. The 5 ON line from the PRECESS RING COUNTER 636 is connected to the remaining input of the AND circuit 882 whose output is coupled via a cathode follower 884 to the CHANNEL COUNTER ADVANCE line. The R/W CONDITION line from the READ/WRITE CONDITION GENERATOR 602 is connected to a second input of the AND circuit 888. The $I_1$ line from the INDEX GENERATOR 238 and the B line from the TIMING READ AMPLIFIER and SHAPER UNIT 202 are connected to the OR circuit 886, whose output is connected to the remaining input of the AND circuit 888. The output of the AND circuit 888 is coupled via a grounded grid amplifier 890 and a cathode follower 892 to the SELECT ADDRESS SET line.

Initially, when the CALCULATOR 1100 selects the DRUM STORAGE UNIT as the INPUT/OUTPUT UNIT, a positive signal is applied via the CALCULATOR CONTROL line to one input of each of the AND circuits 874, 882 and 888. Additionally, since no READ or WRITE operation has commenced, a positive signal is maintained on the R/W CONDITION line to thereby condition the AND circuit 888. It should be noted, however, that the conditioning of the AND circuit 888 is removed as soon as a READ or WRITE operation is selected, as a negative signal is then maintained on the R/W CONDITION line. Depending upon the position of the DRUM 100, the next following positive pulse on either the B line of the $I_1$ line passes via the OR circuit 886 and the conditioned AND circuit 888, is amplified by the grounded grid amplifier 890 and passed via the cathode follower 892 to the SELECT ADDRESS SET line. It will be remembered that the trailing edge of the pulse on the SELECT ADDRESS SET line is effective to transfer the ADDRESS part of a SELECT instruction from the CALCULATOR 1100 to the ADDRESS INPUT REGISTER 400. As each CHARACTER 200 position of a SECTION is reached on the DRUM 100, a positive signal is applied via the CHARACTER 200 line to condition the AND circuit 852. However, since R/W pulses cannot occur until the SELECTED SECTION is reached, as described heretofore, the SECTION ADDRESS set into the SECTION COUNTER 402 of the ADDRESS TIMING REGISTER 400 remains set at this value until the SELECTED SECTION is reached. After the CHARACTER 1 position of the SELECTED SECTION is reached, the READ/WRITE SAMPLE GENERATOR 656 is rendered effective to permit R/W pulses to be produced. Now as the CHARACTER 200 position of the SELECTED SECTION is reached on the DRUM 100, a positive signal is applied via the CHARACTER 200 line to condition the AND circuit 852 and the next following positive pulse applied to the R/W line sets the R/W AT SECTION END trigger 860 to its ON state. In being set to its ON state the R/W AT SECTION END trigger 860 passes a positive signal from its right-divider output and the cathode follower 868 to the grounded grid amplifier 870 and to condition the AND circuit 874. The signal is amplified by the grounded grid amplifier 870 and passed via the cathode follower 872 to the SECTION COUNTER CARRY CONTROL line. Ten microseconds after the R/W pulse passes via the AND circuit 852 to trigger the R/W AT SECTION END trigger 860 to its ON state, a positive pulse is applied to the R/W10 line which passes via the now conditioned AND circuit 874 and the cathode follower 876 to the SECTION COUNTER ADVANCE line. The combination of the positive signal on the SECTION COUNTER CARRY CONTROL line and the trailing edge of the pulse on the SECTION COUNTER ADVANCE line causes the count in the SECTION COUNTER 402 to be advanced a value corresponding to the next SECTION, in a manner as previously described. If the SELECTED SECTION is a SECTION other than SECTION 9, the next following positive pulse on the $I_{1/4}$ ON line, due to the 4 ON condition of the PRECESS RING COUNTER 636, is applied to reset the R/W AT SECTION END trigger 860 to its OFF state in preparation for the next SECTION and thereby terminates the positive signal on the SECTION COUNTER CARRY CONTROL line. In a similar manner, when the last CHARACTER position of each succeeding SECTION on the DRUM 100 is reached the combination of a signal on the SECTION COUNTER CARRY CONTROL line and shortly thereafter a pulse on the SECTION COUNTER ADVANCE line is effective to step the SECTION COUNTER 402 to a value corresponding to the next succeeding SECTION. When the CHARACTER 200 position of SECTION 9 of any particular CHANNEL is reached, a positive signal is applied via the SECTION 9 CHARACTER 200 line to condition the AND circuit 854. As the next R/W pulse occurs it passes via the now conditioned AND circuit 854 to set the R/W AT CHANNEL END trigger 862 to its ON state. In so doing, a positive signal is emitted from the right-divider output thereof and amplified by the grounded grid amplifier 878 and passed via the cathode follower 880 to the CHANNEL COUNTER CARRY CONTROL line. At the same time a positive signal is applied to the 5 ON line, which, in combination with the positive signal on the CALCULATOR CONTROL line, is effective to condition the AND circuit 882 so that 10 microseconds after the positive R/W pulse passed via the AND circuit 854 to set the R/W AT CHANNEL END trigger 862 to its ON state, a positive pulse is applied to the R/W10 line which is passed via the conditioned AND circuit 882 and cathode follower 884 to the CHANNEL COUNTER ADVANCE line. The combination of the positive signal on the CHANNEL COUNTER CARRY CONTROL line and the trailing edge of the pulse on the CHANNEL COUNTER ADVANCE line causes the count in the UNITS ORDER 442 of the CHANNEL COUNTER to be advanced to a value corresponding to the units digit of the next CHANNEL number. This stepping occurs during the GAP INTERVAL of the DRUM 100 but before the INDEX pulse $I_1$ is generated. After the CHANNEL COUNTER has been advanced, the INDEX pulse $I_1$ is applied via the $I_{1/4}$ ON line to reset the R/W AT CHANNEL END trigger 862 to its OFF state in preparation for the next CHANNEL.

*Write circuits*

Referring now to FIG. 5D, there is shown in block form the components of the WRITE CIRCUITS 900.

The WRITE CIRCUITS 900 include a WRITE CONTROL UNIT 902 (see FIG. 5D1) and a WRITE UNIT 992 (see FIG. 5D2).

Figure 1A:
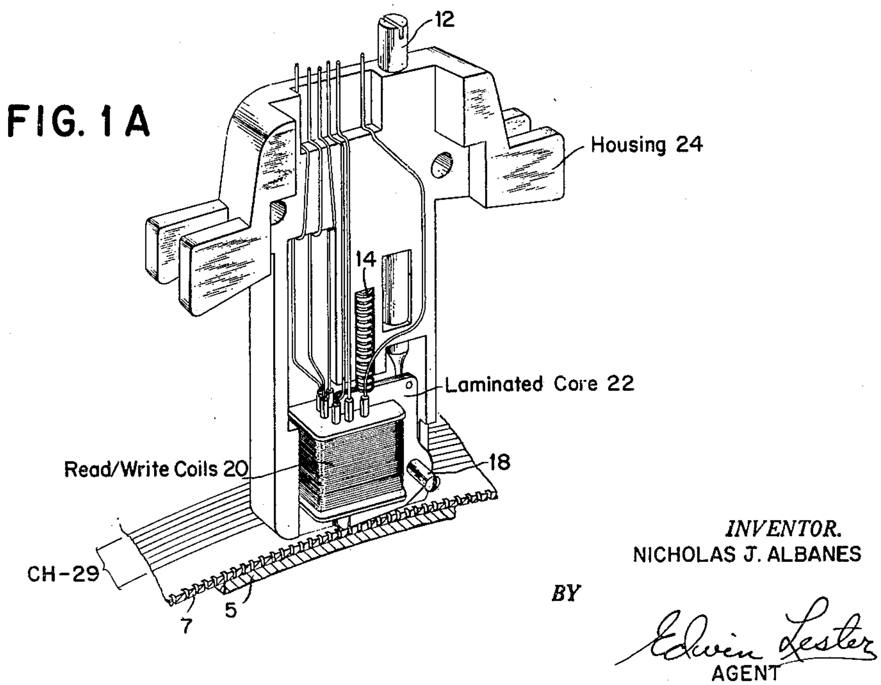
FIG. 1A is a cross-section view, on a greatly enlarged scale with respect to FIG. 1, showing the details of one of the heads of FIG. 1 and the relationship between the head and a portion of the magnetic DRUM.

Refer now to FIGS. 5D1A and 5D1B which show the details of the WRITE CONTROL UNIT 902. The 1, 2, 4, 8, A, B and C bit lines of the WRITE BUS are connected to the inputs of grounded grid amplifiers 904, respectively. The respective outputs of the grounded grid amplifiers 904 are coupled via corresponding cathode followers 906, to one input of each of the AND circuits 908, respectively, while the W CALL CONTROL line from the READ/WRITE CONDITION GENERATOR 602 is connected to the remaining input of each of the AND circuits 908, respectively. The respective outputs of the AND circuits 908 are connected to one input of each of the AND circuits 914, respectively, and via series circuits, comprising inverters 910, and corresponding cathode followers 912 to one input of each of the AND circuits 916, respectively, while the W line is connected to the remaining inputs of the AND circuits 914 and 916, respectively. The respective outputs of the AND circuits 914 are coupled via corresponding cathode followers 918, and binary 1 lines to the inputs of inverters 924, respectively, while the respective outputs of the AND circuits 916 are coupled via corresponding cathode followers 920 and binary 0 lines to the inputs of inverters 926, respectively. The respective outputs of the inverters 924 are coupled via corresponding peakers 928 and cathode followers 932 to the right-hand inputs of inverters 936, respectively, while the respective outputs of the inverters 926 are coupled via corresponding peakers 930 and cathode followers 934 to the left-hand inputs of the inverters 936, respectively. The respective right-hand outputs of the inverters 936 are connected to the binary 0 lines, corresponding to the 1, 2, 4, 8, A, B and C bits, while the respective left-hand outputs of the inverters 936 are connected to the binary 1 lines, corresponding to the 1, 2, 4, 8, A, B and C bits. The operation of the WRITE CONTROL UNIT 902 will be described hereinafter in connection with the WRITE UNIT 922.

Refer now to FIG. 5D2, which shows the details of the WRITE UNIT 922. It should be noted that only the details of the circuit associated with CHANNELS 0 and 1 are shown therein as the circuitry associated with the remaining CHANNELS is identical. The respective channel CH–1 to CH–29 lines from the CHANNEL UNITS 482*a* to 482*c* are connected to one input of each of the AND circuits 940, respectively, while the W line is connected to the other input of each of the AND circuits 940, respectively. The respective outputs of the AND circuits 940 are connected via series circuits, comprising inverters 942, peakers 944, and cathode followers 946, to seven cathode followers 950, corresponding to the seven bits of a CHARACTER of DATA. The respective outputs of the cathode followers 950 are connected to the center taps of the CHANNEL WRITE coils 954, respectively. The binary 1 lines, corresponding to the 1, 2, 4, 8, A, B and C bits, from the WRITE CONTROL UNIT 902, are commonly connected via diodes to the right-hand end of each corresponding CHANNEL WRITE coil 954, while the binary 0 lines, corresponding to the 1, 2, 4, 8, A, B and C bits, are commonly connected via diodes to the left-hand end of each corresponding CHANNEL WRITE coil 954. For example, the binary 1 line, corresponding to the 1 bit, is commonly connected via the diodes 958 to the right-hand end of the CHANNEL WRITE coils associated with the BIT 1 while the binary 0 line, corresponding to the BIT 1, is commonly connected via the diodes 959 to the left-hand end of the CHANNEL WRITE coils associated with the BIT 1.

Refer now to the WRITE CONTROL UNIT 902 shown in FIGS. 5D1A and 5D1B and let it be assumed that a WRITE instruction has been given. Consequently, successive CHARACTERS, represented by various combinations of signals, are applied from the CALCULATOR 1100 via the 1, 2, 4, 8, A, B and C bit lines of the WRITE BUS to the WRITE CONTROL UNIT 902. For example, let it be assumed that the CALCULATOR 1100 is transferring the decimal digit 7 to the WRITE CONTROL UNIT 902. The decimal digit 7, in a seven digit binary code appears as 1000111. Thus, positive signals are applied to the 1, 2, 4 and C bit lines, while negative signals are maintained on the 8, A and B bit lines. It will be remembered that when a WRITE instruction is given, a positive signal is maintained on the W CALL line which, in turn, causes a positive signal to be maintained on the W CALL CONTROL line so that the AND circuits 908 are conditioned to pass positive signals. The positive signals on the 1, 2, 4 and C bit lines are amplified by the grounded grid amplifiers 904*a* to 904*c* and 904*g*, respectively, and passed via the corresponding cathode followers 906*a* to 906*c* and 906*g* and the correspondingly now conditioned AND circuits 908*a* to 908*c* and 908*g*, to the inverters 910*a* to 910*c* and 910*g*, respectively, and to condition the AND circuits 914*a* to 914*c* and 914*g*, respectively. The positive signals are inverted to negative signals by the inverters 910*a* to 910*c* and 910*g*, respectively, and passed via the corresponding cathode followers 912*a* to 912*c* and 912*g* to decondition the AND circuits 916*a* to 916*c* and 916*g*, respectively. Since negative signals are applied to the 8, A and B bit lines, negative signals are maintained at the outputs of the AND circuits 908*d* to 908*f*, respectively, to thereby decondition the AND circuits 914*d* to 914*f*. The negative signals are also inverted to positive signals by the corresponding inverters 910*d* to 910*f*, and are applied via the cathode followers 912*d* to 912*f* to condition the AND circuits 916*d* to 916*f*. Thus, the AND circuits 914*a*, 914*b*, 914*c*, 916*d*, 916*e*, 916*f* and 914*g* are in conditioned states while the AND circuits 916*a*, 916*b*, 916*c*, 914*d*, 914*e*, 914*f* and 914*g* are in deconditioned states.

It will be remembered that a W pulse occurs at times corresponding to each fifth CHARACTER position on the DRUM 100, starting with the first CHARACTER position of the SELECTED SECTION in the selected CHANNEL. Thus, when the first positive pulse is applied to the W line, those AND circuits 914 and 916 which are conditioned pass this positive pulse via their corresponding cathode followers 918 or 920 to the binary 1 or binary 0 lines corresponding to the 1, 2, 4, 8, A, B and C bits of the CHARACTER. Hence, in the assumed example, a positive W pulse is applied to each of the binary 1 lines associated with the 1, 2, 4 and C bits, while negative signals are maintained on each of the corresponding binary 0 lines. Likewise, a positive W pulse is applied to each of the binary 0 lines associated with the 8, A and B bits, while negative signals are maintained on each of the corresponding binary 1 lines.

Initially, the peakers 928 and 930 are conducting heavily so that negative signals are emitted from their outputs and passed to corresponding cathode followers 932 and 934, respectively. These unpulses cathode followers maintain negative levels at the right and left-hand inputs of the inverters 936 thereby cutting off both sides of these inverters. Now, in accordance with the assumed example, the positive W pulse applied to each of the binary 1 lines, corresponding to the 1, 2, 4 and C bits, and the binary 0 lines, corresponding to the 8, A and B bits, is inverted to negative pulses by the inverters 924*a*, 924*b*, 924*c*, 926*d*, 926*e*, 926*f* and 924*g*, respectively. The negative pulses are effective to trip the peakers 928*a*, 928*b*, 928*c*, 930*d*, 930*e*, 930*f* and 930*g* which, in response thereto, generate positive peaked pulses which are passed via the cathode followers 932*a*, 932*b*, 932*c*, 934*d*, 934*e*, 934*f* and 932*g* to the right-hand inputs of the inverters 936*a* to 936*c* and 930*g* to the left-hand inputs of the inverters 936*d* to 936*f*.

Refer now to the WRITE UNIT 922 shown in FIG. 5D2. It will be remembered that the ADDRESS part of a SELECT instruction designates a particular CHANNEL of the DRUM 100 in which DATA is to be WRITTEN or from which DATA is to be READ. After the ADDRESS part of the SELECT instruction is decoded in the ADDRESS INPUT REGISTER 400, a positive signal is applied to a selected one of the 30 CHANNEL lines CH–0 to CH–29, while negative potentials are maintained on the remaining CHANNEL lines. Let it be assumed that CHANNEL 1 is the selected CHANNEL and that the binary coded decimal digit 7 is to be written in the CHARACTER 1 position of the SELECTED SECTION in CHANNEL 1 of the DRUM 100. Consequently, a positive signal is applied to the CH–1 line to condition the AND circuit 940*b* while negative potentials are maintained on the remaining CHANNEL lines so as to decondition the remaining AND circuits 940, respectively. When the DRUM 100 reaches the first CHARACTER position of the SELECTED SECTION in CHANNEL 1, a positive pulse is applied to the W line which is then passed via the now conditioned AND circuit 940*b* but is blocked at the remaining deconditioned AND circuits 940. The positive W pulse is inverted to a negative pulse by the inverter 942*b* and applied to trip the peaker 944*b*, which, in response thereto, emits a positive 2 microsecond pulse which is passed via the cathode follower 946*b* and the seven cathode followers 950*b*, respectively, to the center taps of the CHANNEL WRITE coils 954*b*, respectively, associated with CHANNEL 1. Thus, at a time corresponding to the W pulse, positive pulses are applied to the center taps of the CHANNEL WRITE coils 954*b*, which are of such magnitude, that, in conjunction with the positive pulses applied at the same time to the right-hand inputs of the inverters 936*a* to 936*c* and 936*g* and to the left-hand inputs of the inverters 936*d* to 936*f*, cause the right-hand tubes of the inverters 936*a* to 936*c* and 936*g* and the left-hand tubes of the inverters 936*d* to 936*f* to be rendered conductive. Consequently, WRITING currents flow via the binary 1 lines, corresponding to the 1, 2, 4 and C bits, and through the 1 portions of the 1, 2, 4 and C bit WRITE coils associated with CHANNEL 1. Additionally, WRITING currents flow via the binary 0 lines, corresponding to the 8, A and B bits, and through the 0 portions of the 8, A and B bit WRITE coils associated with CHANNEL 1, thereby WRITING the decimal digit 7 in binary form in the CHARACTER 1 position of the SELECTED SECTION of CHANNEL 1. In a similar manner and at times corresponding to succeeding W pulses, succeeding CHARACTERS of the RECORD are WRITTEN in succeeding CHARACTER positions of the SELECTED SECTION of CHANNEL 1. It should be noted that the conduction of the various right and left-hand tubes of the inverters 936 tend to cause back currents in the WRITE coils associated with the remaining CHANNELS of the DRUM 100. However, the diodes associated with the ends of these WRITE coils are poled in such a manner to prevent back currents from passing therethrough. For example, the anode of the diode 958*a* is connected via the 1 portion of the CHANNEL 0 WRITE coil, corresponding to the BIT 1, to the center tap thereof, while the cathode of the diode 958*a* is connected to the binary 1 line, corresponding to the 1 bit, from the right-hand tube of the inverter 936*a* in the WRITE CONTROL UNIT 902. Thus, in accordance with the previously assumed example, that is, CHANNEL 1 being the selected CHANNEL and the decimal digit 7 being the digit to be written, the center tap of the CHANNEL 0 WRITE coil corresponding to the BIT 1 is maintained at ground potential, while the right-hand tube of the inverter 936*a* is rendered conductive causing a potential to be applied on the common binary 1 line which would tend to cause a back current to flow through the 1 portion of the WRITE coil 954*a*7 except that the diode 958*a* is poled so that it is cut off and prevents the back current from flowing through the 1 portion of the WRITE coil 954*a*7.

FIG. 48 illustrates the wave diagrams of a write current pulse, corresponding to a binary 1 or 0, and the flux patterns produced thereby.

It should be noted that when a RECORD MARK CHARACTER is READ by the CALCULATOR 1100, the positive signal on the W CALL line is terminated which, in turn, causes the positive signal on the W CALL CONTROL line to be terminated before the next occurring W pulse. Therefore, the fall of the W CALL CONTROL line blocks the WRITE CONTROL UNIT 902 to prevent a RECORD MARK CHARACTER from being written on the DRUM 100 and the subsequently occurring W pulse causes a DRUM MARK CHARACTER, indicating the END of the RECORD, to be written as a series of binary 0's.

*Read circuits*

Referring now to FIG. 5D, there is shown in block form the components of the READ CIRCUITS 1000.

The READ CIRCUITS 1000 includes a READ CONTROL UNIT 962, a READ AMPLIFIER UNIT 978 and a CHARACTER REGISTER 990.

Refer now to FIG. 5D3, which shows the details of the READ CONTROL UNIT 962. It should be noted that only the details of the circuit associated with CHANNELS 0 and 1 are shown therein as the circuitry associated with the remaining CHANNELS is identical. The channel CH–0 to CH–29 lines from the CHANNEL UNITS 482*a* to 482*c* (see FIG. 5B6) of the ADDRESS INPUT REGISTER 400 are connected to grounded grid amplifiers 964, whose outputs are coupled via corresponding cathode followers 966 to the supply terminals of corresponding preamplifiers 970, associated with each CHANNEL. One end of each of the seven READ coils 972 associated with each channel is connected to the input of a corresponding preamplifier 970, while the other end of each READ coil 972 is connected to ground. A 4.7K ohm resistor is connected in parallel with each of the READ coils 972. The outputs of corresponding ones of the preamplifiers 970 are common connected to the 1, 2, 4, 8, A, B and C bit lines, respectively. For example, the outputs of the preamplifiers 970*a*1 and 970*b*1 are commonly connected to the 1 bit line.

It will be remembered, with regard to the ADDRESS INPUT REGISTER 400, that after the ADDRESS part of a SELECT instruction is decoded, one of the thirty CHANNELS of the DRUM 100 is selected to have data WRITTEN therein or READ therefrom. Thus, after the decoding operation, one of the thirty channel CH–0 to CH–29 lines has a positive signal applied thereto, while negative potentials are maintained on all of the remaining lines. Assuming that CHANNEL 1 is the selected CHANNEL, a positive signal is applied to the channel CH–1 line. This signal is amplified by the grounded grid amplifier 964*b* and passed via the cathode follower 966*b* to the supply terminals of the seven preamplifiers 970*b*1 to 970*b*7 associated with CHANNEL 1, so as to condition these preamplifiers to respond to any signal induced in the associated READ coils 972*b*1 to 972*b*7. Likewise, since negative potentials are maintained on all of the remaining CHANNEL lines, negative potentials are maintained at the supply terminals of the preamplifiers associated with the remaining CHANNELS to thereby decondition these preamplifiers so that they do not respond to any of the signals induced in their associated READ coils. As each CHARACTER position of the DRUM 100 passes under the READ coils 972*b*1 to 972*b*7 various signals are induced therein, the shape of the signals being proportional to the rate of change of magnetic flux through the READ coils 972*b*1 to 972*b*7. Since binary zeros are written in the opposite sense to binary ones, positive and negative peaks occur in the reverse order for the two cases. Thus, if a binary 1 is WRITTEN in a bit position, a sinusoidal signal is induced in the corresponding READ coil with the positive peak occurring in the second half cycle, whereas if a binary 0 is WRITTEN in a bit position, a sinusoidal signal is induced in the corresponding READ coil with the positive peak occurring in the first half cycle, as illustrated by the READ VOLTAGE wave diagrams in FIG. 48. The various binary 1 and binary 0 signals induced in the READ coils 972*b*1 to 972*b*2 are power amplified by the preamplifiers 970*b*1 to 970*b*2 and passed to the seven bit lines.

Refer now to FIG. 5D4 which shows the READ AMPLIFIER UNIT 978. The seven bit lines from the READ CONTROL UNIT 962 are connected to drum amplifiers 980, respectively, whose outputs are connected to the inputs of shapers 982, respectively. The respective outputs of the shapers 982 are coupled via cathode followers 984, respectively, to the READ 1 lines, corresponding to the 1, 2, 4, 8, A, B, and C bits, and via respective inverters 986 and cathode followers 988 to the READ 0 lines, corresponding to the 1, 2, 4, 8 A, B and C bits.

The various combinations of binary 1 and binary 0 signals, representing each CHARACTER of DATA read are voltage amplified by the drum amplifiers 980, respectively, and reshaped to positive pulses by the shapers 982, respectively. The positive pulses are then passed via the cathode followers 984, respectively, to the READ 1 lines and are inverted to negative pulses by the inverters 986, respectively, and passed via the cathode followers 988, respectively, to the READ 0 lines. Thus, if a binary 1 had been read, a negative signal would be maintained on the READ 1 line and a positive signal on the READ 0 line, during the period corresponding to the first half cycle of the sinusoidal binary 1 signal, whereas a positive signal is maintained on the READ 1 line and a negative signal on the READ 0 line, during the second half cycle of the sinusoidal binary 1 signal as illustrated by the waveform shown in FIG. 48. In a similar manner, if a binary 0 had been READ, a positive signal is maintained on the READ 1 line and a negative signal on the READ 0 line, during the first half cycle of the sinusoidal binary 0 signal, whereas a negative signal is maintained on the READ 1 line and a positive signal on the READ 0 line, during the second half cycle of the sinusoidal binary 0 signal as illustrated by the waveform shown in FIG. 48.

Refer now to FIG. 5D5, which shows the details of the CHARACTER REGISTER 990. The READ 0 lines, corresponding to the 1, 2, 4, 8, A, B and C bits, are connected to one input of each of the AND circuits 992, respectively, while the READ 1 lines, corresponding to the 1, 2, 4, 8, A, B and C bits, are connected to one input of each of the AND circuits 994, respectively. The R line from the READ/WRITE SAMPLE GENERATOR 656 is connected to the remaining inputs of each of the AND circuits 992 and 994, respectively. The respective outputs of the AND circuits 992 are connected to the set inputs of the triggers 996, respectively, while the respective outputs of the AND circuits 994 are connected to the reset inputs of the triggers 996, respectively. The right divider output of the respective triggers 996 are coupled via cathode followers 1002, respectively, to one input of each of the AND circuits 1018, respectively, and to the inputs of the negative AND circuit 1004. The output of the negative AND circuit 1004 is coupled via a cathode follower 1006 to an inverter 1008 and to the $\overline{\text{DRUM MARK}}$ line. The output of the inverter 1008 is coupled via a cathode follower 1010 to the DRUM MARK line. The CALCULATOR CONTROL line from the CALCULATOR 1100 and the R CONDITION line from the READ/WRITE CONDITION GENERATOR 602 are connected to the inputs of the AND circuit 1014 whose output is couplied via a cathode follower 1016 to the remaining inputs of each of the AND circuits 1018, respectively. The outputs of the AND circuits 1018 are coupled via grounded grid amplifiers 1020 and 100K ohm resistors to cathode followers 1022, respectively. The outputs of the cathode followers 1022 are connected to the bit lines of the READ BUS.

When the DRUM STORAGE CIRCUIT is selected by the CALCULATOR 1100 a positive signal is applied via the CALCULATOR CONTROL line to condition the AND circuit 1014. Now, if a READ instruction is given, a positive signal is shortly thereafter applied to the R CONDITION line and passed via the conditioned AND circuit 1014 and the cathode follower 1016 to condition the AND circuits 1018, respectively. Now, as each CHARACTER position of the DRUM 100 passes under the READ coils in the selected CHANNEL, various combinations of signals are induced in the READ coils, as previously described, and, after being amplified and reshaped, appear as various combinations of signals on the READ 1 and READ 0 lines, corresponding to the seven bits of each CHARACTER. The signals on these lines are effective to condition and decondition various ones of the AND circuits 992 and 994, respectively, as each CHARACTER position of the DRUM 100 passes under the READ coils. The conditioned ones of the AND circuits 992 and 994, respectively, are rendered effective by a positive R pulse which occurs every fifth CHARACTER position, starting with the first CHARACTER position of the selected SECTION in the selected CHANNEL, so that only every fifth CHARACTER or, in other words, each succeeding CHARACTER of the selected SECTION is effectively READ, even though each succeeding physically adjacent CHARACTER is sensed by the READ coils. Let it be assumed that the binary coded decimal digit 7, which had previously been WRITTEN, is now being READ by the READ coils in CHANNEL 1. The combination of signals, representing the decimal digit 7, are amplified and reshaped in the READ AMPLIFIER UNIT 978 and amplified via the READ 1 and READ 0 lines to the AND circuits 992 and 994, respectively. During the second half cycle of these signals, the READ 1 lines corresponding to the 8, A and B bits, and the READ 0 lines, corresponding to the 1, 2, 4 and C bits, have negative signals maintained thereon, while the READ 1 lines, corresponding to the 1, 2, 4 and C bits, and the READ 0 lines, corresponding to the 8, A and B bits, have positive signals maintained thereon. Consequently, the AND circuits **994*a* to 994*c*, 994*g* and 992*d* to 992*f* are conditioned while the AND circuits 992*a* to 992*c*, 992*g* and 994*d* to 994*f* are deconditioned. It will be remembered that an R pulse is initiated starting approximately at the termination of a B pulse (see FIG. 48). Consequently, an R pulse occurs during the second half cycle of either a sinusoidal binary 1 signal or a sinusoidal binary 0 signal, as illustrated by the waveforms in FIG. 48. The R pulse then passes via the conditioned ones of the AND circuits 992 and 994, respectively, to set the triggers 996*a* to 996*c* and 996*g* to their ON states and to reset the triggers 996*d* to 996*f* to their OFF state. The triggers 996*a* to 996*c* and 996*g* in being set to their ON state, emit positive signals from their right divider outputs, whereas the triggers 996*d* to 996*f* emit negative signals from their right divider outputs. The combinations of the seven positive and negative signals are passed via the cathode followers 1002, respectively, and applied to the negative AND circuit 1004, but have no effect therein inasmuch as the positive signals decondition the negative AND circuit 1004. The positive signals from the triggers 996*a* to 996*c* and 996*g* are also passed via the cathode followers 1002*a* to 1002*c* and 1002*g*, respectively, and the previously conditioned AND circuits 1018*a* to 1018*c* and 1018*g* to the grounded grid amplifiers 1020*a* to 1020*c* and 1020*g*. These signals are amplified by the grounded grid amplifiers 1020*a* to 1020*c* and 1020*g* and passed via corresponding cathode followers 1022*a* to 1022*c* and 1022*g* to the 1, 2, 4 and C bit lines of the READ BUS, while the negative signals from the triggers 996*d* to 996*f* are passed via the cathode followers 1002*d* to 1002*f*, respectively, to decondition the corresponding AND circuits 1018*d* to 1018*f* so that negative potentials are maintained on the 8, A and B bit lines of the READ BUS. Thus, a combination of signals representing the binary coded decimal digit 7 is applied to the READ BUS. In a similar manner, each succeeding CHARACTER READ from the DRUM 100 is transferred, in time with an R pulse, to the READ BUS. If the CHARACTER being READ from the DRUM 100 is a DRUM MARK CHARACTER, all of the triggers 996 are reset to their OFF state, with the resulting effect that negative signals are applied to the negative AND circuit 1004 to render it effective to apply a negative signal via the cathode follower 1006 to the $\overline{\text{DRUM MARK}}$ line. The negative signal is also inverted to a positive signal by the inverter 1008 and passed via the cathode follower 1010** to the DRUM MARK line. Thus, it is apparent that so long as a DRUM MARK CHARACTER is not read, the $\overline{\text{DRUM MARK}}$ line is maintained at a positive potential while the DRUM MARK line is maintained at a negative potential, but that when a DRUM MARK CHARACTER is READ, the condition existing on these lines are reversed.

*Summary of a write and read operation*

A WRITE operation will now be described with reference being made to the composite block diagram of FIGS. 5A to 5D, inclusive, and the timing diagrams of FIGS. 50 and 51.

A WRITE operation is performed by a process of two instructions, namely, a SELECT instruction and a WRITE instruction. Thus, an exemplary WRITE operation may include the SELECT instruction 21129, followed by the WRITE instruction R0173. Simply interpreted, the OPERATION part 2 of the SELECT instruction designates that an INPUT/OUTPUT UNIT is to be selected, while the ADDRESS part 1129 of the SELECT instruction designates a particular INPUT/OUTPUT UNIT, namely, the DRUM STORAGE UNIT and an ADDRESS therein, namely, SECTION 9 of CHANNEL 12 at which it is desired to start writing. Similarly, the OPERATION part R of the WRITE instruction designates that a WRITE operation is to be performed, while the ADDRESS part 0173 of the WRITE instruction designates an ADDRESS in the CALCULATOR 1100 from which, for example, a 601 CHARACTER RECORD may start being READ and transferred to the DRUM STORAGE UNIT and written therein, starting at SECTION 9 of CHANNEL 12, which is the ADDRESS previously designated by the SELECT INSTRUCTION.

As soon as the CALCULATOR 1100 is rendered effective a positive signal is applied to the CALCULATOR CONTROL line, which is maintained thereon throughout the WRITE operation. The machine operator now actuates the RESET key 264 of the RESET UNIT 263 (see FIG. 5A4) to produce a Z signal which causes the TIMER CHECK trigger 290 and the TIMER RESET CONTROL trigger 296 of the TIMER STEP CONTROL UNIT 262 (see FIG. 5A2) to be reset and set to their respective ON and OFF states; the various triggers of the RING COUNTERS 306, 316, 344, 352 and 372 (see FIGS. 5A5 to 5A7) of the DRUM TIMER 305 to be set and reset to their respective ON and OFF states; the END OPERATION TRIGGER 784 of the END OPERATION CONTROL UNIT 776 (see FIG. 5C5) to be set to its ON state; and the END OF DRUM CHECK trigger 826 of the END OF DRUM CHECK CONTROL UNIT 806 (see FIG. 5C6) to be reset to its OFF state. Hereinafter, the RESET key is only actuated when a timing error occurs.

Now, the ADDRESS part of the SELECT instruction is received by the ADDRESS INPUT REGISTER 400 (see FIG. 5B) in the form of binary-coded signals. The binary-coded signal corresponding to the units digit 9 of the SELECT ADDRESS, is applied to the SECTION COUNTER 402 (see FIG. 5B1); the binary-coded signals corresponding to the tens digit 2 and the hundreds digit 1 of the SELECT ADDRESS are applied to the UNITS ORDER 442 AND TENS ORDER 456, respectively, of the CHANNEL COUNTER (see FIG. 5B3); and the binary-coded signal corresponding to the thousands digit 1 of the SELECT ADDRESS is applied to the DRUM DECODER 489 (see FIG. 5B7). Shortly thereafter, the OPERATION part R of the WRITE instruction causes the CALCULATOR 1100 to issue a positive signal on the W CALL line which is routed to the READ/WRITE CONDITION GENERATOR 602 of the READ/WRITE CONTROL CIRCUITS 600 as one of the preliminary conditions for a WRITE operation to proceed.

It will be remembered that the timing head TH associated with the timing track of the DRUM 100 has 2000 timing signals induced therein during every revolution of the DRUM 100. These signals are amplified and reshaped in the TIMING READ AMPLIFIER and SHAPER UNIT 202 to produce an S, A and B pulse corresponding to each of the 2000 timing signals.

Now, let it be assumed that the S1994 position of the DRUM 100 is passing under the READ/WRITE HEADS. Hence, referring to FIG. 50A, the B1994 pulse produced by the TIMING READ AMPLIFIER and SHAPER UNIT 202 is applied to the ADDRESS REGISTER COUNTER CONTROL UNIT 850 (see FIG. 5C7) to initiate production of a positive pulse on the SELECT ADDRESS SET line which causes the binary-coded signals, representing the SELECT ADDRESS, to set the SECTION COUNTER 402, the UNITS ORDER 442 and TENS ORDER 456 of the CHANNEL COUNTER and the DRUM DECODER 489 in accordance with the SELECT ADDRESS.

The SECTION COUNTER DECODER 436 (see FIG. 5B2) responds to the setting of the SECTION COUNTER 402 by applying a positive signal to the SECTION 9 line, in accordance with the units digit 9 of the SELECT ADDRESS, which is routed to the ADDRESS COINCIDENCE DETECTOR 500 (see FIG. 5A9) where it is to be compared with the output of the DRUM TIMER DECODER 380 (see FIG. 5A8).

The CHANNEL COUNTER UNITS DECODER 460 (see FIG. 5B4) responds to the setting of the UNITS ORDER 442 of the CHANNEL COUNTER by conditioning the CHANNEL UNITS **482*a* to 482*c* (see FIG. 5B6) in accordance with the tens digit 2 of the SELECT ADDRESS. The CHANNEL COUNTER TENS DECODER 464 (see FIG. 5B5) responds to the setting of the TENS ORDER 464 of the CHANNEL COUNTER, by rendering the CHANNEL UNIT 482*b* effective, in accordance with the hundreds digit 1 of the SELECT ADDRESS, to produce a positive signal on the CHANNEL 12 line, which is routed to the WRITE UNIT 922 (see FIG. 5D2) where it is effective to condition the writing circuits associated with CHANNEL 12**.

The DRUM DECODER 489 (see FIG. 5B7) responds to the binary-coded signal representing the thousands digit of the SELECT ADDRESS and is so connected to the TENS ORDER 456 of the CHANNEL COUNTER that it is effective to produce a positive signal on the SELECTED DRUM line only if the thousands digit of the SELECT ADDRESS is 1 and the tens digit of the CHANNEL number is 0, 1 or 2. In the assumed example the thousands digit of the SELECT ADDRESS is 1, while the tens digit of the CHANNEL number is 1. Consequently, a positive signal is applied to the SELECTED DRUM line which is routed to the READ/WRITE CONDITION GENERATOR 602 (see FIG. 5C1) where, in conjunction with the positive signal on the W CALL line, it conditions the READ/WRITE CONDITION GENERATOR 602 to proceed with a WRITE operation.

The DRUM 100 continues to rotate and the GAP INTERVAL of the DRUM 100 now passes under the timing head TH. At a time corresponding to 50 microseconds after the S2000 pulse, the INDEX GENERATOR 238 (see FIG. 5A1) produces a positive INDEX pulse which is routed via the $I_1$ line and the PRESS RING COUNTER 636 (see FIG. 5C2) to the $I_{1/4}$ ON line. Additionally, the INDEX pulse $I_1$ sets the INDEX trigger 246 to its ON state with a resulting positive signal being applied to the $I_1$ to $I_2$ line. Since the END OF DRUM CHECK trigger 826 and the END OPERATION trigger 784 were reset and set to their respective OFF and ON states by the Z signal, the $\overline{\text{END OF DRUM CHECK}}$ line and END OPERATION line have positive signals maintained thereon to condition the AND circuit 794 in the DISCONNECT RESET UNIT 790 (see FIG. 5C5) so that the INDEX pulse on the $I_{1/4}$ ON line now renders the AND circuit 794 effective to initiate production of a positive 20 microsecond signal, the leading edge of which is termed the X DISCONNECT signal while the trailing edge of which is termed the DISCONNECT RESET signal (see FIG. 50A). The X DISCONNECT signal effectively causes the W CONDITION CONTROL trigger **620*a*, and the W CONDITION 622*a* of the READ/WRITE CONDITION GENERATOR 602 (see FIG. 5C1) to be reset to their OFF state; the various triggers of the PRECESS RING COUNTER 636 (see FIG. 5C2) to be set and reset to their ON and OFF states so that the PRECESS RING COUNTER 636 is initially in the 5 ON condition; the INITIAL COINCIDENCE trigger 730 of the READ/WRITE SAMPLE GENERATOR 656 (see FIG. 5C3) to be reset to its OFF state; and the R/W AT SECTION END trigger 860 and the R/W AT CHANNEL END trigger 862 of the ADDRESS REGISTER COUNTER CONTROL UNIT 850 (see FIG. 5C7) to be reset to their OFF states. The DISCONNECT RESET signal effectively resets the END OPERATION trigger 784 of the END OPERATION CONTROL UNIT 776 (see FIG. 5C5) in preparation for the end of the WRITE operation. The DRUM 100 continues to rotate and at B1 time a positive pulse is applied to the B line, from the TIMING READ AMPLIFIER and SHAPER UNIT 202, to reset the INDEX trigger 246 and thereby terminate the positive signal on the $I_1$ to $I_2$ line (see FIG. 50A). The negative trailing edge of this positive signal is effective to reset the TIMER RESET CONTROL trigger 296 of the TIMER STEP CONTROL UNIT 262 (see FIG. 5A2), which then applies a positive signal to condition the AND circuit 300 therein. At the same time, the B1 pulse is passed by the now conditioned READ/WRITE CONDITION GENERATOR 602 to set the W CONDITION CONTROL trigger 620*a* thereof to its ON state. Assuming that the TIMER STEP CONTROL UNIT 262 is functioning properly, the now conditioned AND circuit 300 is rendered effective by the S pulses to initiate production of positive pulses on the TIMER CONTROL STEP line and negative pulses on the RING STEP line corresponding to each S pulse. However, since the AND circuit 300 is conditioned at B1 time, which is subsequent to S1 time, the DRUM TIMER 305 is stepped starting at S2 time and, consequently, only 1999 TIMER CONTROL STEP and RING STEP pulses are produced during the first revolution of the DRUM 100. Since the RING 5 COUNTER 306 of the DRUM TIMER 305 is initially set, by a Z signal, to such a state as it would if the S1 pulse had been passed, the DRUM TIMER 305 operates properly during the first revolution of the DRUM 100. Additionally, it should be noted that the TIMER RESET CONTROL trigger 299 remains reset during the entire WRITE operation and, consequently, 2000 TIMER CONTROL STEP and RING STEP pulses are produced for each revolution thereafter. The DRUM TIMER 305 responds to the pulses on the TIMER CONTROL STEP and RING STEP lines and by virtue of the RING COUNTERS 306, 316, 344, 352 and 372 keeps track of each S position of the DRUM 100 as it passes under the READ/WRITE heads. The DRUM TIMER DECODER 380 see (FIG. 5A8) responds to the outputs of the RING COUNTER 306, 316, 344, 352 and 372 of the DRUM TIMER 305 by producing positive pulses on succeeding even SECTION lines during each first half revolution of the DRUM 100 and positive pulses on succeeding odd SECTION lines during each second half revolution of the DRUM 100. Additionally, the DRUM TIMER DECODER 380 produces positive signals on the CHARACTER 1 and CHARACTER 200 lines, respectively, twice during each revolution of the DRUM 100, once when the CHARACTER 1 and CHARACTER 200 positions, respectively, of SECTIONS 0, 2, 4, 6 and 8 are passing under the READ/WRITE heads (see FIGS. 49), and next when the CHARACTER 1 and CHARACTER 200 positions, respectively, of SECTIONS 1, 3, 5, 7** and 9 are passing under the READ/WRITE heads (see FIG. 49). Also, the DRUM TIMER DECODER 380 produces a positive signal on the SECTION 9 CHARACTER 200 line whenever the CHARACTER 200 position of SECTION 9 is passing under the READ/WRITE heads.

The ADDRESS COINCIDENCE DETECTOR 500 (see FIG. 5A9) compares the output of the SECTION COUNTER DECODER 436 with the constantly changing output of the DRUM TIMER DECODER 380 and applies a positive pulse to the AND circuit 514 thereof every time coincidence is established between the SECTION selected and the SECTION then passing under the READ/WRITE heads. However, the AND circuit 514 of the ADDRESS COINCIDENCE DETECTOR 500 is conditioned only twice during each revolution of the DRUM 100, that is, during the CHARACTER 1 time of SECTIONS 0, 2, 4, 6 and 8 and during the CHARACTER 1 time of SECTIONS 1, 3, 5, 7 and 9. Hence, when the CHARACTER 1 position of the SELECTED SECTION is passing under the READ/WRITE heads the AND circuit 514 is rendered effective to initiate production of a positive pulse on the CHARACTER 1 SELECTED SECTION line which is routed to the READ/WRITE CONDITION GENERATOR 602 (see FIG. 5C1) to initiate operation of READ/WRITE CONTROL CIRCUITS 600.

Referring again to the assumed example, in which SECTION 9 is the selected section, the DRUM 100 continues to rotate and the ADDRESS COINCIDENCE DETECTOR 500 keeps comparing the output of the SECTION COUNTER DECODER 436 with the output of the DRUM TIMER DECODER 380. At S1005 time (see FIG. 50B), corresponding to the CHARACTER 1 position of SECTION 9, coincidence is detected by the ADDRESS COINCIDENCE DETECTOR 500 and a positive pulse is applied via the CHARACTER 1 SELECTED SECTION line to the READ/WRITE CONDITION GENERATOR 602 (see FIG. 5C1). This pulse is effective to reset the W CONDITION CONTROL trigger 620*a* to its OFF state which, in turn, causes the W CONDITION trigger 622*a* to be set to its ON state with a resulting positive signal being applied to the W CONDITION line and a negative signal being applied to the $\overline{\text{R/W CONDITION}}$ line. The positive signals now on the 5 ON CONTROL line, $\overline{\text{END OPERATION}}$ line, and the W CONDITION line condition a four way AND circuit 658 in the READ/WRITE SAMPLE GENERATOR 656 (see FIG. 5C3). Consequently, the A1005 pulse effectively passes via the now conditioned AND circuit 658 to initiate production of positive pulses on the W line and the R/W line, followed 5 microseconds thereafter by positive pulses on the W5 line and the R/W5 line, followed 5 microseconds thereafter by a positive pulse on the R/W10 line (see FIG. 50B). The A1005 pulse is also effective to set the INITIAL COINCIDENCE trigger 730 to its ON state with a resulting positive signal being applied to the INITIAL COINCIDENCE line which is routed to the PRECESS RING COUNTER 636 (see FIG. 5C2) and in conjunction with the positive signal now on the $\overline{I_1 \text{ to } I_2}$ line conditions the PRECESS RING COUNTER 636 to be stepped by S pulses being applied thereto.

As soon as a positive signal is applied to the W CALL line, the READ/WRITE CONDITION GENERATOR 602 (see FIG. 5C1) applies a positive signal to the W CALL CONTROL line which is routed to the WRITE CONTROL UNIT 920 (see FIG. 5D1A) of the WRITE CIRCUITS 900 permitting the first CHARACTER of the RECORD standing on the WRITE BUS to enter and condition the WRITE CONTROL UNIT 902. The positive signal on the W CALL CONTROL LINE is also routed to condition the AND circuit 762 in the RESPONSE DISCONNECT GENERATOR 740 (see FIG. 5C4). The positive pulse produced on the W line (see FIG. 50B) by the READ/WRITE SAMPLE GENERATOR 656 renders the WRITE CONTROL UNIT 902 effective to pass the first CHARACTER of the RECORD as a binary-coded signal to the WRITE UNIT 922. It will be remembered that the positive signal on the CHANNEL 12 line from the CHANNEL UNIT 482*b* (see FIG. 5B6) was effective to condition the writing circuits associated with CHANNEL 2. Thus, the positive pulse on the W line is now also applied to the WRITE UNIT 922 (see FIG. 5D2) to render the WRITE UNIT 922 effective so that the first CHARACTER of the RECORD is stored in the CHARACTER 1 position of SECTION 9 in CHANNEL 12 of the DRUM 100. Five microseconds later, the positive pulse on the W5 line (see FIG. 50B) renders the AND circuit 762 in the RESPONSE DISCONNECT GENERATOR 740 (see FIG. 5C4) effective to initiate production of a positive pulse on the RESPONSE line (see FIG. 50B) which is routed to the CALCULATOR 1100 signalling it to transfer the second CHARACTER of the RECORD via the WRITE BUS to the WRITE CONTROL UNIT 902.

The DRUM 100 now moves to the S1006 position and the S1006 pulse is effective to step the PRECESS RING COUNTER 636 to the 1 ON condition thereby terminating the positive signal on the 5 ON line (see FIG. 50B) which, in turn, deconditions the AND circuit 658 in the READ/WRITE SAMPLE GENERATOR 656 (see FIG. 5C3) so that no further A pulses can pass therethrough to produce positive pulses on the W line, R/W line, W5 line, R/W5 line and R/W10 line. Four S pulses later, the DRUM 100 reaches the S1010 position (see FIG. 50B), corresponding to the CHARACTER 2 position of SECTION 9, and the PRECESS RING COUNTER 636 is stepped again to the 5 ON condition. Consequently, the AND circuit 658 in the READ/WRITE SAMPLE GENERATOR 656 (see FIG. 5C3) is again conditioned to pass the A1010 pulse so that another positive pulse is again applied to the W line (see FIG. 50B) causing the second CHARACTER of the RECORD to be written in a manner as previously described, in the CHARACTER 2 position of SECTION 9 in CHANNEL 12. Five microseconds later, the W5 pulse causes another RESPONSE signal (see FIG. 50B) to be transmitted to the CALCULATOR 1100, calling for the third CHARACTER of the RECORD. Hence, in a similar manner each subsequent CHARACTER of the RECORD is transferred from the CALCULATOR 1100 via the WRITE BUS and written in the correct positions on the DRUM 100.

When the DRUM 100 reaches the S1996 position, the DRUM TIMER DECODER 380 applies a positive signal via the CHARACTER 200 line to condition the AND circuit 852 of the ADDRESS REGISTER COUNTER CONTROL UNIT 850 (see FIG. 5C7). When the DRUM 100 reaches the S2000 position, the DRUM TIMER DECODER 380 applies a positive signal via the SECTION 9 CHARACTER 200 line to condition the AND circuit 854 of the ADDRESS COUNTER CONTROL UNIT 850. At a time corresponding to the trailing edge of the A2000 pulse, a positive pulse is applied via the R/W line (see FIG. 50B) to render the AND circuits 852 and 854 effective, to set the R/W AT SECTION END CONTROL trigger 860 and the R/W CHANNEL END CONTROL trigger 862 to their ON states, respectively, causing positive signals to be effectively produced on the SECTION COUNTER CARRY CONTROL line (see FIG. 50B) to condition the SECTION COUNTER 402 (see FIG. 5B1) and on the CHANNEL COUNTER CARRY CONTROL line (see FIG. 50B) to condition the UNITS ORDER 442 and TENS ORDER 456 CHANNEL COUNTER (see FIG. 5B3). Ten microseconds later, the now conditioned AND circuits 874 and 882 of the ADDRESS REGISTER COUNTER CONTROL UNIT 850 are rendered effective by the positive pulse on the R/W10 line to initiate production of positive pulses on the SECTION COUNTER ADVANCE line and the CHANNEL COUNTER ADVANCE line (see FIG.

50B). The positive pulse on the SECTION COUNTER ADVANCE line effectively steps the SECTION COUNTER 402 to a value corresponding to the next SECTION, namely, SECTION 0. Likewise, the positive pulse on the CHANNEL COUNTER ADVANCE line is effective to step the CHANNEL COUNTER to a value corresponding to the next CHANNEL, namely CHANNEL 13. Hence, it is obvious that the next CHARACTER of the RECORD is to be stored in the CHARACTER 1 position of SECTION 0 in CHANNEL 13.

The DRUM 100 continues to rotate and the GAP INTERVAL of the DRUM 100 again passes under the timing head TH. At a time corresponding to 50 microseconds after the S2000 pulse another INDEX pulse $I_1$ is produced (see FIG. 50B) by the INDEX GENERATOR 238 (see FIG. 5A1) which is routed via the PRECESS RING COUNTER 636 (see FIG. 5C2) and applied to the $I_{1/4}$ ON line (see FIG. 50B). The positive pulse on the $I_{1/4}$ ON line is applied to reset the R/W AT SECTION END trigger 860 and the R/W AT CHANNEL END trigger 862 to their respective OFF states in preparation for the end of the next SECTION or CHANNEL. Previously, at S2000 time, the PRECESS RING COUNTER 636, was set to the 5 ON condition by the S2000 pulse and since no S pulses are generated during the GAP INTERVAL, the PRECESS RING COUNTER 636 remains set in this condition during the entire GAP INTERVAL. The INDEX pulse $I_1$ renders the INDEX GENERATOR 238 (see FIG. 5A1) effective to cause the positive signal on the $\overline{I_1 \text{ to } I_2}$ line (see FIG. 50B) to be terminated and a negative signal applied thereto until the next B pulse namely, the B1 pulse, deconditions the INDEX GENERATOR 238. Since B1 time is subsequent to S1 time, the negative signal on the $\overline{I_1 \text{ to } I_2}$ line during the S1 pulse, is effective to decondition the PRECESS RING COUNTER 636 (see FIG. C2) so that the S1 pulse can not step the PRECESS RING COUNTER 636 from the 5 ON condition to the 1 ON condition. Consequently, during S1 time, a positive signal is maintained on the 5 ON line to condition the AND circuit 658 in the READ/WRITE SAMPLE GENERATOR 656 (see FIG. 5C3) to pass the A1 pulse and initiate production of positive pulses on the W line, R/W line, W5 line, R/W5 line and the R/W10 line (see FIG. 50B). The positive pulse on the W line is effective to cause the next CHARACTER of the RECORD to be written, in a manner as previously described in the CHARACTER 1 position of SECTION 0 in CHANNEL 13.

When the DRUM 100 reaches the S996 position, the 400 CHARACTER of the RECORD is written in the CHARACTER 200 position of SECTION 0 in CHANNEL 13 and the ADDRESS REGISTER COUNTER CONTROL UNIT 850, in response to an R/W pulse produces another positive signal on the SECTION COUNTER CARRY CONTROL line (see FIG. 50C), in a manner as previously described, to condition the SECTION COUNTER 402 (see FIG. 5B1). Ten microseconds later, the ADDRESS REGISTER COUNTER CONTROL UNIT 850, in response to an R/W10 pulse, applies a postive pulse to the SECTION COUNTER ADVANCE line (see FIG. 50C) to step the SECTION COUNTER 402 to a value corresponding to the next section, namely, SECTION 1.

The DRUM 100 continues to rotate and the next 200 CHARACTERS of the RECORD are written in the 200 CHARACTER positions of SECTION 1 in a manner as previously described. When the DRUM 100 reaches the S1996 position, corresponding to the CHARACTER 200 position of SECTION 1, the ADDRESS REGISTER COUNTER CONTROL UNIT 850 again produces a positive signal on the SECTION COUNTER CARRY CONTROL line (see FIG. 50C) to condition the SECTION COUNTER 402, so that ten microseconds later when a positive pulse is applied to the SECTION COUNTER ADVANCE line (see FIG. 50C) from the ADDRESS REGISTER COUNTER CONTROL UNIT 850, the SECTION COUNTER 402 is stepped to a value corresponding to the next section, namely SECTION 2.

The DRUM 100 continues to rotate and at S2000 time, the S2000 pulse is applied to set the PRECESS RING COUNTER 636 (see FIG. 5C2) to the 4 ON condition. Since no S pulses are generated during the GAP INTERVAL of the DRUM 100 the PRECESS RING COUNTER 636 remains in the 4 ON condition during this interval. Further, it will be remembered that a negative signal is maintained on the $\overline{I_1 \text{ to } I_2}$ line to decondition the PRECESS RING COUNTER 636 for a time subsequent to the S1 pulse so that the S1 pulse can not step the PRECESS RING COUNTER 636 from the 4 ON condition to the 5 ON condition. Hence, at the beginning of the third revolution of the DRUM 100, when writing is carried over from an odd numbered section such as SECTION 1, to an even numbered section such as SECTION 2, the first S pulse that steps the PRECESS RING COUNTER 636 from the 4 ON condition to the 5 ON condition, is the S2 pulse. Hence, there is a character position delay in time before a positive signal is applied to the 5 ON line in comparison to when a positive signal was applied to the 5 ON line at INITIAL COINCIDENCE, or in other words, a precession of one CHARACTER position occurs whenever writing is carried over from an odd numbered SECTION to an even numbered SECTION of the same CHANNEL. (However, it should be noted that the PRECESS RING COUNTER 636 remained in the 5 ON condition when the writing was carried over from SECTION 9 of CHANNEL 12 to SECTION 0 of CHANNEL 13.) Hence it should be apparent that no precession occurs when writing is carried over from one CHANNEL to the next succeeding CHANNEL.

Thus, when the DRUM 100 reaches the S2 position (see FIG. 50D), the S2 pulse is applied to step the PRECESS RING COUNTER 636 from the 4 ON condition to the 5 ON condition thereby permitting, in effect, the next and last CHARACTER of the RECORD, being transferred from the CALCULATOR 1100, to be written in the CHARACTER 1 position of SECTION 2. A RESPONSE signal is again transmitted to the CALCULATOR 1100 signalling it to transfer the next CHARACTER which, in the assumed example, is a RECORD MARK CHARACTER. Approximately 15 microseconds after the CALCULATOR 1100 is signalled by the RESPONSE signal and a RECORD MARK CHARACTER is READ by the CALCULATOR 1100, the positive signal on the W CALL line is terminated which, in turn, terminates the positive signal on the W CALL CONTROL line.

Figure 50A:
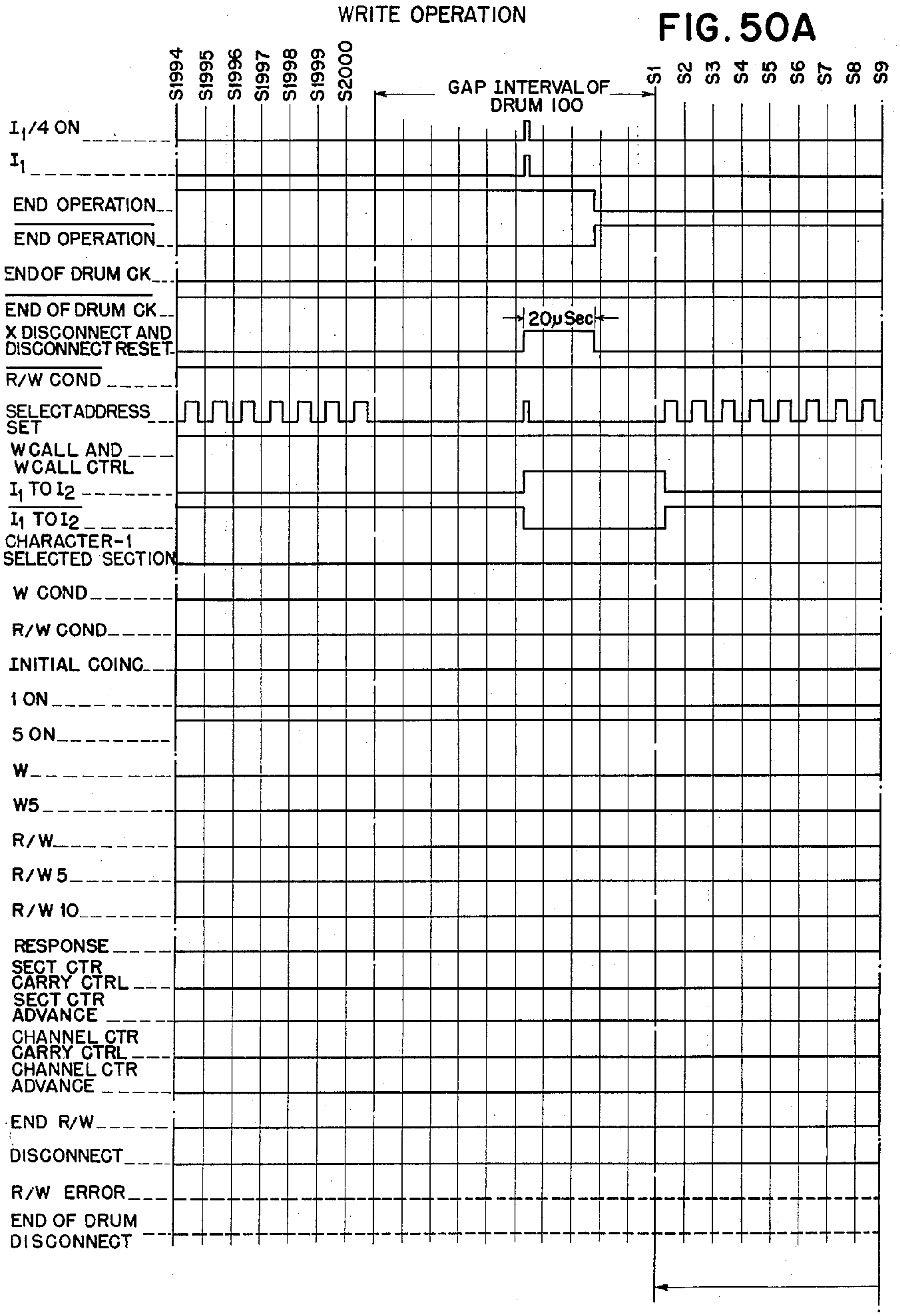
Figure 50B:
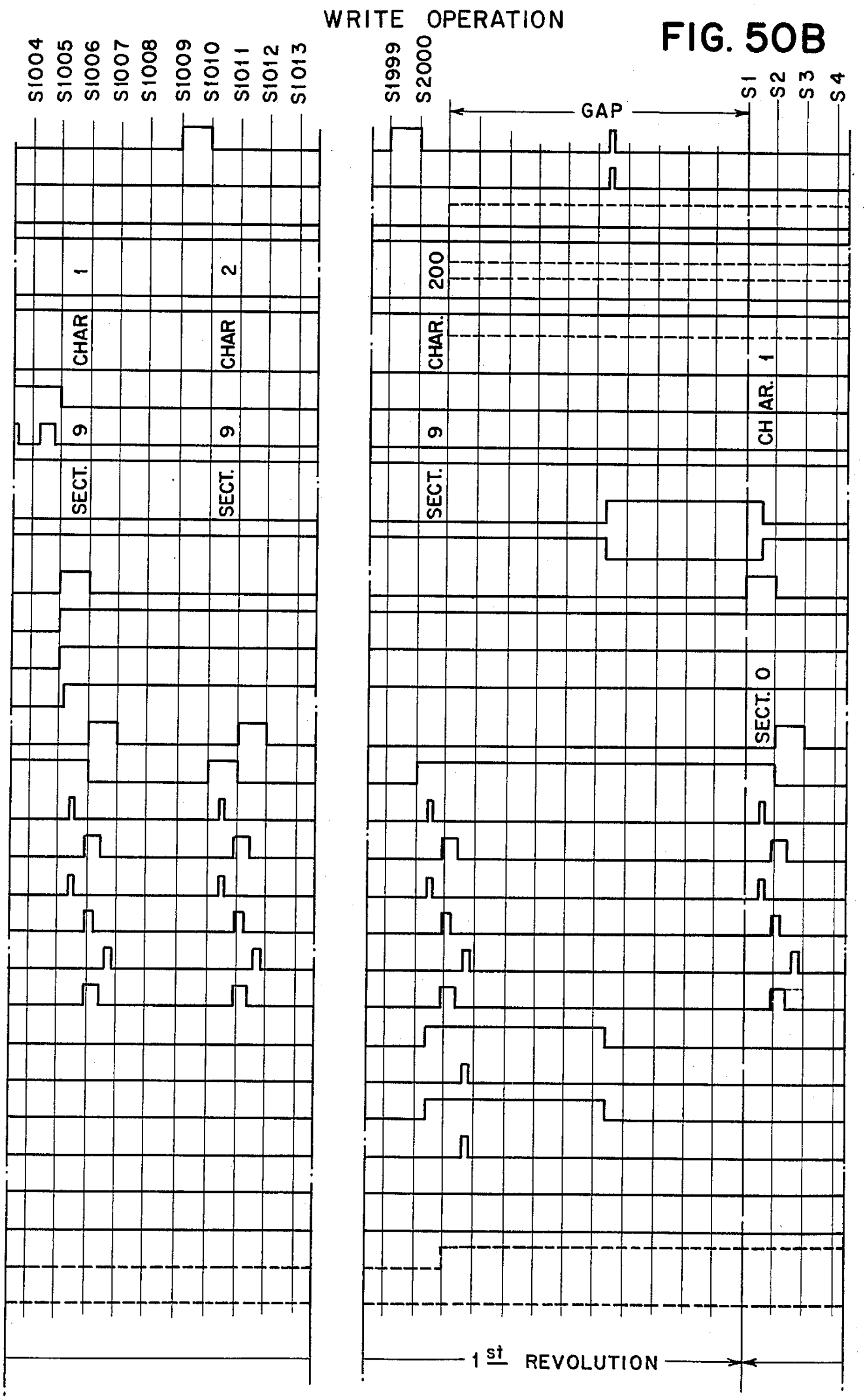
Figure 50C:
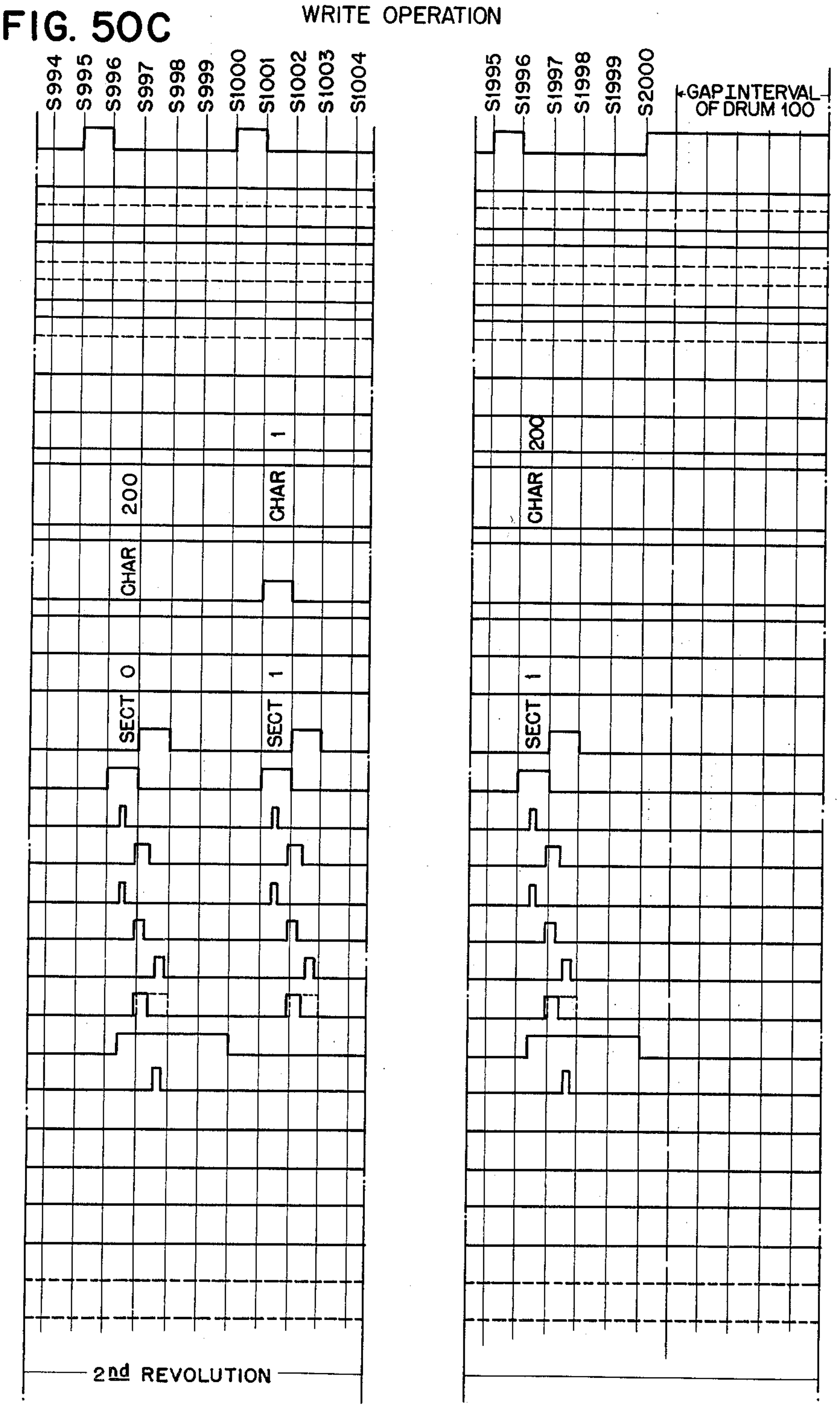
Figure 50D:
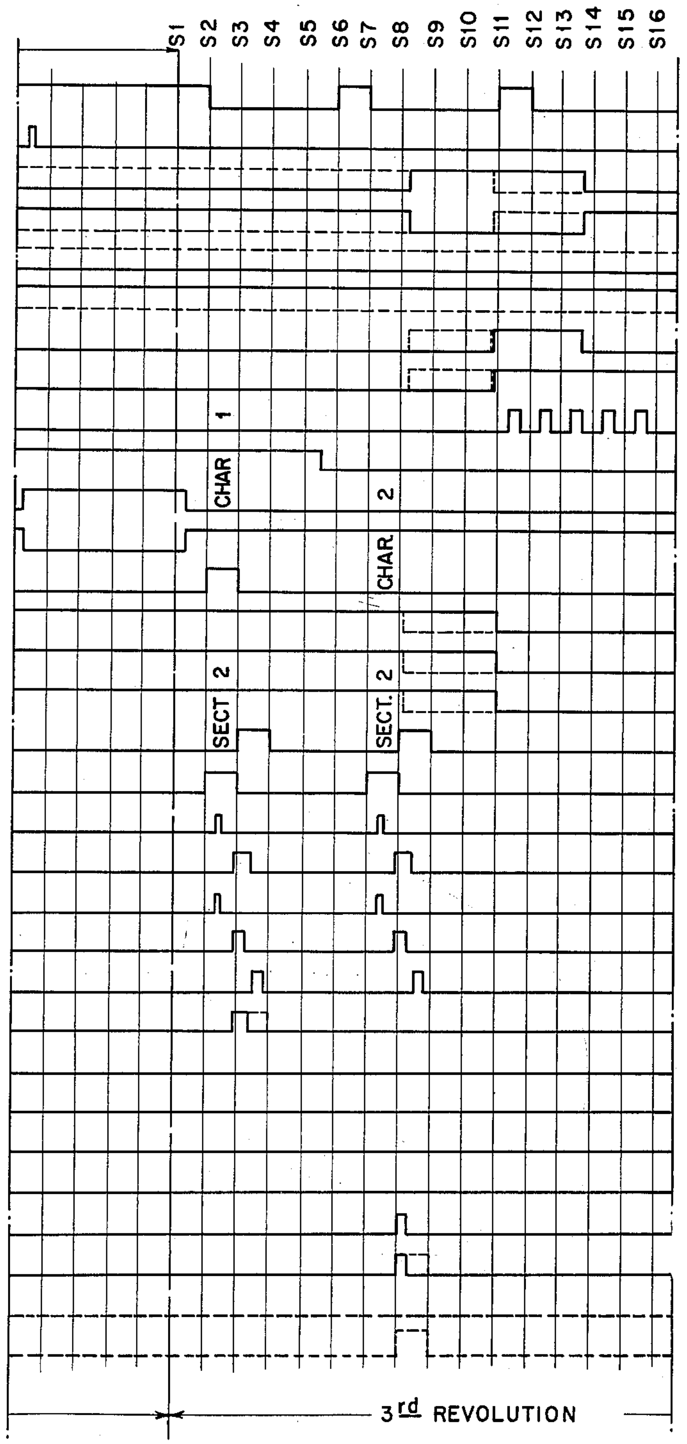

The DRUM 100 continues to rotate and when it reaches the S7 position, the S7 pulse is applied to step the PRECESS RING COUNTER 636 to the 5 ON condition which, in turn, again causes positive pulses to be produced on the W line, W5 line, R/W5 line and R/W10 line (see FIG. 50D).

The positive pulse on the W line is effective to cause a DRUM MARK CHARACTER to be written in the CHARACTER 2 position of SECTION 2 of CHANNEL 13. The negative signal on the W CALL CONTROL LINE is inverted to a positive signal in the RESPONSE DISCONNECT GENERATOR 740 (see FIG. 5C4) and in conjunction with the positive signal on the CALCULATOR CONTROL LINE conditions the AND circuit 754, so that the positive pulse applied to the W5 line renders the AND circuit 754 effective to initiate production of positive pulses on the DISCONNECT line and the END R/W line. The positive pulse on the DISCONNECT line is applied to signal the CALCULATOR 1100 to DISCONNECT and terminate the transfer of CHARACTERS to the DRUM 100. The trailing edge of the positive pulse on the END R/W line is effective to set the END OPERATION trigger 784 of the END OPERATION CONTROL UNIT 776 (see FIG. 5C5) to its ON state with a resulting positive signal being effectively applied to the END OPERATION line and a negative signal being effectively applied to the $\overline{\text{END OPERATION}}$ line (see FIG. 50D). Since, in the assumed example, the DRUM 100 is not at the last CHARACTER position of SECTION 9 of CHANNEL 29 a positive signal is maintained on the $\overline{\text{END OF DRUM CHECK}}$ line which, in conjunction with the positive signal now on the END OPERATION line conditions the AND circuit 794 in the DISCONNECT RESET UNIT 790 (see FIG. 5C5).

The DRUM 100 continues to rotate and when it reaches the S11 position, the S11 pulse is applied to step the PRECESS RING GENERATOR 636 to the 4 ON condition, thereby applying a positive pulse to the $I_{1/4}$ ON line which renders the AND circuit 794 in the DISCONNECT RESET UNIT 790 effective to produce an X DISCONNECT and DISCONNECT RESET signal (see FIG. 50D). The X DISCONNECT signal is applied to reset the WRITE CONDITION CONTROL trigger 620a and the WRITE CONDITION trigger 622a of the READ/WRITE CONDITION GENERATOR 602 (see FIG. 5C1) to their respective OFF states; set and reset the various triggers of the PRECESS RING COUNTER 636 to the 5 ON condition; reset the INITIAL COINCIDENCE trigger 730 of the READ/WRITE SAMPLE GENERATOR 656 (see FIG. 5C3) to its OFF state; and reset the R/W AT SECTION END trigger 860 and the R/W AT CHANNEL END trigger 862 of the ADDRESS REGISTER COUNTER CONTROL UNIT 850 (see FIG. 5C7) to their respective OFF states; in preparation for the next operation. The DISCONNECT RESET signal is effective to reset the END OPERATION trigger 784 of the END OPERATION CONTROL UNIT 776 (see FIG. 5C5) in preparation for another operation.

Thus, it is seen that by a process of two instructions, namely, a SELECT instruction followed by a WRITE instruction, that a RECORD of CHARACTERS may be transferred from the CALCULATOR 1100 and be written on the DRUM 100, starting at a selected SECTION of a selected CHANNEL.

To obtain an understanding of what happens when an attempt is made to write off the end of the DRUM 100, let it be assumed that the RECORD in the previous example is to be stored starting at SECTION 9 of CHANNEL 29 instead of CHANNEL 12. Consequently during the first complete revolution of the DRUM 100, when the DRUM 100 reached the S2000 position corresponding to the CHARACTER 200 position of SECTION 9 in CHANNEL 29, a positive signal is applied to the SECTION 9 CHARACTER 200 line from the DRUM TIMER DECODER 380 (see FIG. 5A8). This signal in conjunction with positive signals on the CHANNEL 29 line, INITIAL COINCIDENCE line, CALCULATOR CONTROL line and 5 ON line is effective to condition the 5 way AND circuit 822 in the END OF DRUM CHECK CONTROL UNIT 806 (see FIG. 5C6) so that a positive pulse applied to the R/W5 line (see FIG. 50B) renders the AND circuit 822 effective to initiate setting of the END OF DRUM CHECK trigger 826 to its ON state with resulting positive signals being effectively applied to the END OF DRUM CHECK line and the R/W ERROR line and a negative signal being effectively applied to the $\overline{\text{END OF DRUM CHECK}}$ line (see the dotted waveforms in FIG. 50B). The positive signal on the R/W ERROR line is transferred to signal the CALCULATOR that an R/W ERROR has occurred and the fact that the neon tube, associated with the END OF DRUM CHECK trigger 826, is actuated indicates that the error is an END OF DRUM ERROR. The negative signal on the $\overline{\text{END OF DRUM CHECK}}$ line is applied to set the END OPERATION trigger 784 in the END OPERATION CONTROL unit 776 (see FIG. 5C5) to its ON state with a resulting positive signal being applied to the END OPERATION line and a negative signal being applied to $\overline{\text{END OPERATION}}$ line (see the dotted waveform of FIG. 50B). The negative signal on the $\overline{\text{END OPERATION}}$ line deconditions the READ/WRITE SAMPLE GENERATOR 656 (see FIG. 5C3) so that no further W pulses are produced to cause writing off the end of the DRUM 100. The positive signal on the END OF DRUM CHECK line in conjunction with the positive signal on the W CALL CONTROL line is effective to condition the AND circuit 764 of the RESPONSE DISCONNECT GENERATOR 740 (see FIG. 5C4) so that each time the PRECESS RING COUNTER 636 steps to the 1 ON condition a positive pulse is applied via the 1 ON line to render the AND circuit 764 effective to initiate production of a positive pulse on the RESPONSE line (see dotted waveforms of FIG. 50B, 50C and 50D) signalling the CALCULATOR 1100 to transfer succeeding CHARACTERS of the RECORD. Thus, though each succeeding CHARACTER of the RECORD is transferred to the WRITE CIRCUITS 900, since no further W pulses are produced no further writing can be done on the DRUM 100.

Approximately 15 microseconds after the RESPONSE signal calls for the RECORD MARK CHARACTER, the CALCULATOR 1100 READS the RECORD MARK CHARACTER and the positive signal on the WRITE call line is terminated, which, in turn, terminates the positive signal on the W CALL CONTROL line. The negative signal now on the W CALL CONTROL line is inverted to a positive signal in the RESPONSE DISCONNECT GENERATOR 740 (see FIG. 5C4) which, in conjunction with the positive signal now on the END OF DRUM CHECK line, is effective to condition the AND circuit 766. The DRUM 100 continues to rotate and when it reaches the S8 time during the third revolution, the S8 pulse is applied to step the PRECESS RING COUNTER 636 to the 1 ON condition with a resulting positive signal being applied via the 1 ON line to render the AND circuit 766 effective to initiate production of a positive signal on the DISCONNECT line and on the END OF DRUM DISCONNECT line (see the dotted waveforms of FIG. 50D). The positive signal on the END OF DRUM DISCONNECT line is applied to condition the AND circuit 792 of the DISCONNECT RESET UNIT 790 (see FIG. 5C5) so that at B8 time, the B8 pulse is applied to render the AND circuit 792 effective to initiate production of the X DISCONNECT RESET and DISCONNECT RESET signals (see dotted waveforms in FIG. 50D). The X DISCONNECT RESET signals reset various triggers in the READ/WRITE CONTROL CIRCUITS 600, while the DISCONNECT RESET signal resets the END OPERATION trigger 784 of the END OPERATION CONTROL UNIT 776 (see FIG. 5C5) in the manner as previously described, in preparation for the next operation.

A READ operation will now be described with reference being made to the composite block diagram of FIGURES 5A to 5D, inclusive, and the timing diagrams of FIG. 51.

A READ operation is performed by a process of two instructions, namely a SELECT instruction and a READ instruction. An exemplary READ operation may include the SELECT instruction 21129 followed by the READ instruction Y0026. Simply interpreted, the SELECT instruction, as in the example of the WRITE operation, designates SECTION 9 of CHANNEL 12 of the DRUM 100, from which it is desired to start reading. The OPERATION part Y of the READ instruction, designates that a READ operation is to be performed while the ADDRESS part 0026 of the READ instruction, designates an ADDRESS in the CALCULATOR 1100. Thus, it is apparent that the RECORD which was previously written on the DRUM 100 during the WRITE operation, in the assumed example, is now to be READ and transferred via the READ BUS to the CALCULATOR 1100 and stored therein starting at the ADDRESS designated by the ADDRESS part of the READ instruction.

Since the CALCULATOR 1100 is still effective a positive signal is still maintained on the CALCULATOR CONTROL line throughout the READ operation. The ADDRESS part of the SELECT instruction, is received by the ADDRESS INPUT REGISTER 400 (see FIG. 5A) from CALCULATOR 1100 in the form of binary-coded signals. Shortly thereafter, as in the WRITE operation, the ADDRESS REGISTER COUNTER CONTROL UNIT 850 (see FIG. 5C6) responds to a B pulse to produce a positive pulse on the SELECT ADDRESS SET line (see FIG. 51A) which causes binary-coded signals, representing the SELECT ADDRESS, to set the SECTION COUNTER 402, the UNITS ORDER 442 and TENS ORDER 456 of the CHANNEL COUNTER and the DRUM DECODER 489 in accordance with the SELECT ADDRESS.

The SECTION COUNTER DECODER 436 (see FIG. 5B2) responds to the setting of the SECTION COUNTER 436 by applying a positive signal to the SECTION 9 line, in accordance with the unit digit 9 of the SELECT ADDRESS, which is routed to the ADDRESS COINCIDENCE DETECTOR 500 (see FIG. 5A9) where it is compared with the output of the DRUM TIMER DECODER 380 (see FIG. 5A8).

The CHANNEL COUNTER UNITS DECODER 460 (see FIG. 5B4) responds to the setting of the UNITS ORDER 442 of the CHANNEL COUNTER by conditioning the CHANNEL UNITS **482*a* to 482*c* (see FIG. 5B6) in accordance with the tens digit 2 of the SELECT ADDRESS. The CHANNEL COUNTER TENS DECODER 464 (see FIG. 5B5) responds to the setting of the TENS ORDER 456 of the CHANNEL COUNTER by rendering the CHANNEL UNIT 482*b* effective, in accordance with the hundreds digit 1 of the SELECT ADDRESS, to produce a positive signal on the CHANNEL 12 line which is routed to the READ CONTROL UNIT 962** (see FIG. 5D3) where it is effective to condition the reading circuits associated with CHANNEL 12.

The DRUM DECODER 489 (see FIG. 5B7) responds to certain of the output signals from the TENS ORDER 456 of the CHANNEL COUNTER and to the binary-coded signal from the CALCULATOR 1100, corresponding to the thousands digit 1 of the SELECT ADDRESS, by producing a positive signal on the SELECTED DRUM line since the combination of the thousands and hundreds digit of the SELECT ADDRESS is 11 for the assumed example. The positive signal on the SELECTED DRUM line is routed to the READ/WRITE CONDITION GENERATOR 602 (see FIG. 5C1) as one of the preliminary conditions for a READ operation to proceed. Shortly, thereafter, the OPERATION part Y of the READ instruction causes the CALCULATOR 1100 to issue a positive signal on the R CALL line which, in conjunction with the positive signal on the SELECTED DRUM line conditions the AND circuit **612*b* of the READ/WRITE CONDITION GENERATOR 602 so that the next B pulse applied to the AND circuit 612*b* renders it effective to cause the R CONDITION CONTROL trigger 620*b*** to be set to its ON state.

The DRUM 100 continues to rotate and the ADDRESS COINCIDENCE DETECTOR 500 keeps comparing the output of the SECTION COUNTER DECODER 436 with the output of the DRUM TIMER DECODER 380. When the DRUM 100 reaches the S1005 position, corresponding to the CHARACTER 1 position of SECTION 9, coincidence is detected by the ADDRESS COINCIDENCE DETECTOR 500 and a positive pulse is applied via the CHARACTER 1 SELECTED SECTION line (see FIG. 51A) to the READ/WRITE CONDITION GENERATOR 602. This pulse is effective to reset the R CONDITION CONTROL trigger **620*b* to its OFF state which, in turn, causes the R CONDITION trigger 622*b* to be set to its ON state with resulting positive signals being applied to the R CONDITION line and terminating the positive signal on the $\overline{\text{R/W CONDITION}}$ line (see FIG. 51A). The positive signal on the R CONDITION line in conjunction with the positive signal on the CALCULATOR CONTROL line effectively conditions the CHARACTER REGISTER 990 (see FIG. 5D5) so that the RECORD to be read from the DRUM 100 may pass to the READ BUS. The positive signals now on the 5 ON CONTROL line, $\overline{\text{END OPERATION}}$ line and the R CONDITION line condition the four-way AND circuit 702 in the READ/WRITE SAMPLE GENERATOR 656 (see FIG. 5C3) so that when the B1005 pulse occurs, it renders the now conditioned AND circuit 702 effective to initiate production of positive pulses on the R line and R/W line, followed five microseconds thereafter by positive pulses on the R5 line and R/W5 line; followed ten microseconds after the R pulse by a positive pulse on the R/W10 line (see FIG. 51A). The B1005 pulse is also effective to set the INITIAL COINCIDENCE trigger 730 to its ON state with a resulting positive signal being applied to the INITIAL COINCIDENCE line (see FIG. 51A) which is routed to the PRECESS RING COUNTER 636 (see FIG. 5C2) and in conjunction with the positive signal now on the $\overline{I_1 \text{ to } I_2}$ line conditions the PRECESS RING COUNTER 636 to now step with the S pulses being applied thereto. Signals corresponding to the first CHARACTER of the RECORD which was previously WRITTEN in the CHARACTER 1 position of SECTION 9 are induced in the READ coils 972 associated with CHANNEL 12 in the READ CONTROL UNIT 962 (see FIG. 5D3) and amplified and reshaped in the READ AMPLIFIER UNIT 978 (see FIG. 5D4) and applied as binary-coded signals to the CHARACTER REGISTER 990 (see FIG. 5D5). The positive pulse produced on the R line by the READ/WRITE SAMPLE GENERATOR 656 renders the CHARACTER REGISTER 990 effective to pass the first CHARACTER of the RECORD as a binary-coded signal via the READ BUS to the CALCULATOR 1100**.

So long as a DRUM MARK CHARACTER is not read, a positive signal is maintained on $\overline{\text{DRUM MARK}}$ line to condition the AND circuit 742 in the RESPONSE DISCONNECT GENERATOR 740 (see FIG. 5C4). Five microseconds later, the positive pulse on the R5 line renders the AND circuit 742 in the RESPONSE DISCONNECT GENERATOR 740 effective to initiate production of a positive pulse on the RESPONSE line (see FIG. 51A) which is routed to signal the CALCULATOR 1100 to commence a CHARACTER cycle and cause the first CHARACTER to be stored in the CALCULATOR at the ADDRESS designated by READ instruction.

Five S pulses later, the DRUM 100 is at the S1010 position corresponding to the CHARACTER 2 position of SECTION 9 and the PRECESS RING COUNTER 636 is stepped again to the 5 ON condition. Consequently, the AND circuit 702 in the READ/WRITE SAMPLE GENERATORS 656 (see FIG. 5C3) is again conditioned to pass the B1010 pulse to initiate production of positive pulses on the R line, R/W line, R5 lines, R/W5 line and R/W10 line (see FIG. 51A). The positive pulse on the R line causes the second CHARACTER of the RECORD to be read from the CHARACTER 2 position of SECTION 9 in CHANNEL 12 and transferred via the READ BUS to the CALCULATOR 1100. Another RESPONSE signal is produced signalling the CALCULATOR 1100 to sense the second CHARACTER transferred thereto. Hence, in a similar manner, each succeeding CHARACTER of the RECORD is read from the correct positions of the DRUM 100 and transferred via the READ BUS to the CALCULATOR 1100.

When the DRUM 100 reaches the S1996 position, the DRUM TIMER DECODER 380 applies a positive signal via the CHARACTER 200 line to condition the AND circuit 852 of ADDRESS REGISTER COUNTER CONTROL UNIT 850 (see FIG. 5C7). When the DRUM 100 reaches the S2000 position, the DRUM TIMER DECODER 380 applies a positive signal via the SECTION 9 CHARACTER 200 line to condition the AND circuit 854 of the ADDRESS COUNTER CONTROL UNIT 850. At a time corresponding to the trailing edge of the B2000 pulse, a positive pulse is applied via the R/W line to render the AND circuits 852 and 854 effective to set the R/W AT SECTION END CONTROL trigger 860 and the R/W AT CHANNEL END CONTROL trigger 862 of the ADDRESS COUNTER CONTROL UNIT 850 to their ON states, respectively, causing positive signals to be effectively produced on the SECTION COUNTER CARRY CONTROL line (see FIG. 51A) to condition SECTION COUNTER 402 (see FIG. 5B1) and on the CHANNEL COUNTER CARRY CONTROL line (see FIG. 51A) to condition the UNITS ORDER 442 and TENS ORDER 456 of the CHANNEL COUNTER (see FIG. 5B3). Ten microseconds later, the now conditioned AND circuit 874 and 882 of the ADDRESS COUNTER CONTROL UNIT 850 are rendered effective by the positive pulse on the R/W10 line to initiate production of positive pulses on the SECTION COUNTER ADVANCE line and the CHANNEL COUNTER ADVANCE line (see FIG. 51A). The positive pulse on the SECTION COUNTER ADVANCE LINE effectively steps the SECTION COUNTER 402 to a value corresponding to the next SECTION, namely, SECTION 0. Likewise, the positive pulse on the CHANNEL COUNTER ADVANCE line is effective to step the CHANNEL COUNTER to a value corresponding to the next CHANNEL, namely, CHANNEL 13. Hence, it is obvious that the next CHARACTER of the RECORD is to be READ from the CHARACTER 1 position of the SECTION 0 in CHANNEL 13.

The DRUM 100 continues to rotate and the GAP INTERVAL of the DRUM 100 again passes under the timing head TH. At a time corresponding to 50 microseconds after the S2000 pulse, another INDEX pulse $I_1$ is produced (see FIG. 51A) by the INDEX GENERATOR 238 (see FIG. 5A1) which is routed via the PRECESS RING COUNTER 636 and applied to the $I_{1/4}$ ON line (see FIG. 51A). The positive pulse on the $I_{1/4}$ ON line is applied to reset the R/W AT SECTION END trigger 860 and the R/W AT CHANNEL END trigger 862 of the ADDRESS REGISTER COUNTER CONTROL UNIT 850 to their respective OFF states in preparation for the end of the next SECTION or CHANNEL.

Previously, at S2000 time, the PRECESS RING COUNTER 636 was set to the 5 ON condition by the S2000 pulse and since no S pulses are generated during the GAP INTERVAL the PRECESS RING COUNTER 636 remains set in this condition during the GAP INTERVAL and during the time corresponding to the S1 pulse, inasmuch as the PRECESS RING COUNTER 636 is deconditioned until B1 time. Consequently, during S1 time, a positive signal is maintained on the 5 ON line to condition the AND circuit 702 in the READ/WRITE SAMPLE GENERATOR 656 (see FIG. 5C3) to pass the B1 pulse and initiate production of positive pulses on the R line, R/W line, R5 line, R/W5 line, and the R/W10 line (see FIG. 51A). The positive pulse on the R line is effective to cause the next CHARACTER of the RECORD to be READ, in a manner as previously described, from the CHARACTER 1 position of SECTION 0 in CHANNEL 13. Hence, it should be apparent that no precession occurs when writing is carried over from SECTION 9 of CHANNEL 12 to SECTION 0 of CHANNEL 13 or, in other words, when writing is carried over from one channel to the next succeeding channel.

The DRUM 100 continues to rotate and when it reaches the S996 position, the next CHARACTER of the RECORD is READ from the CHARACTER 200 position of SECTION 0 in CHANNEL 13, and the ADDRESS REGISTER COUNTER CONTROL UNIT 850 produces another positive signal on the SECTION COUNTER CARRY CONTROL line (see FIG. 51B), in a manner as previously described, to condition the SECTION COUNTER 402. Ten microseconds later, the ADDRESS REGISTER COUNTER CONTROL UNIT 850 in response to the R/W10 pulse, applies a positive pulse to the SECTION COUNTER ADVANCE line (see FIG. 51B) which is applied to step the SECTION COUNTER 402 to a value corresponding to the next section, namely, SECTION 1.

The DRUM 100 continues to rotate and the next 200 CHARACTERS of the RECORD are read from the 200 CHARACTER positions of SECTION 1 in the manner as previously described, and transferred via the READ BUS to the CALCULATOR 1100. When the DRUM 100 reaches the S996 position, corresponding to the CHARACTER 200 position of SECTION 1, the ADDRESS REGISTER COUNTER CONTROL UNIT 850 again produces a positive signal on the SECTION COUNTER CARRY CONTROL line to condition the SECTION COUNTER 402 so that ten microseconds later, when a positive pulse is applied to the SECTION COUNTER ADVANCE line, from the ADDRESS REGISTER COUNTER CONTROL unit 850, the SECTION COUNTER 402 is stepped to a value corresponding to the next section, namely, SECTION 2.

The DRUM 100 continues to rotate and at S2000 time, the S2000 pulse is applied to set the PRECESS RING COUNTER 636 to the 4 ON condition. Since no S pulses are generated during the GAP INTERVAL of the DRUM 100, the PRECESS RING COUNTER 636 remains in the 4 ON condition during the GAP INTERVAL and during the time corresponding to the S1 pulse, inasmuch as the PRECESS RING COUNTER 636 is deconditioned until B1 time. Hence, at the beginning of the next revolution of the DRUM 100, when READING is carried over from an odd numbered section such as SECTION 1, to an even numbered section such as SECTION 2, in the same CHANNEL such as CHANNEL 13, the first S pulse that steps the PRECESS RING COUNTER 636 from the 4 ON condition to the 5 ON condition is the S2 pulse. Hence as in the WRITE operation, there is a CHARACTER position delay in time before a positive signal is applied to the 5 ON line in comparison to when a positive signal was applied to the 5 ON line at INITIAL COINCIDENCE, or, in other words, a precession of one CHARACTER position occurs when READING is carried over from an odd numbered SECTION to an even numbered SECTION of the same CHANNEL.

Thus, when the DRUM 100 reaches the S2 position, the S2 pulse is applied to step the PRECESS RING COUNTER 636 from the 4 ON condition to the 5 ON condition, thereby permitting, in effect, the next and last CHARACTER of the RECORD to be READ and transferred to the CALCULATOR 1100. The DRUM 100 continues to rotate and when it reaches the S7 position, corresponding to the CHARACTER 2 position of SECTION 2, the S7 pulse is applied to step the PRECESS RING COUNTER 636 from the 4 ON condition to the 5 ON condition which, in turn again causes positive pulses to be produced on the R line, R5 line, R/W line, R/W5 line and the R/W10 line (see FIG. 51C). It will be remembered that a DRUM MARK CHARACTER was written in the CHARACTER 2 position of SECTION 2, so that the negative AND circuit 1004 of the CHARACTER REGISTER 990 (see FIG. 5D5) senses the DRUM MARK CHARACTER and initiates production of a positive signal on the DRUM MARK line and a negative signal on the $\overline{\text{DRUM MARK}}$ line (see FIG. 51C). The positive signal on the DRUM MARK line conditions the AND circuit 748 in the RESPONSE DISCONNECT GENERATOR 740 (see FIG. 5C4) so that five microseconds later, when a positive pulse is applied to the R5 line, the AND circuit 748 is rendered effective to initiate production of positive signals on the DISCONNECT line and on the END R/W line (see FIG. 51C). The positive signal on the DISCONNECT line signals the CALCULATOR 1100, that the end of RECORD has been reached in the DRUM 100 and therefore to commence a CHARACTER cycle to store a RECORD MARK CHARACTER in the CALCULATOR 1100. The trailing edge of the positive pulse of the END R/W line is effective to set the END OF OPERATION trigger 784 of the END OPERATION CONTROL UNIT 776 (see FIG. 5C5) to its ON state with a resulting positive signal being effectively applied to the END OPERATION line and a negative signal being effectively applied to the $\overline{\text{END OPERATION}}$ line (see FIG. 51C). Since the DRUM 100 is not at last character position of SECTION 9 of CHANNEL 29, a positive signal is maintained on the $\overline{\text{END OF DRUM CHECK}}$ line which, in conjunction with the positive signal now on the END OPERATION line conditions the AND circuit 794 of the DISCONNECT RESET UNIT 790 (see FIG. 5C5).

The DRUM 100 continues to rotate and when it reaches the S11 position, the S11 pulse is applied to step the PRECESS RING GENERATOR 636 to the 4 ON condition thereby effectively causing a positive pulse to be applied via the $I_{1/4}$ ON line to render the AND circuit 794 in the DISCONNECT RESET UNIT 790 effective to produce the X DISCONNECT and DISCONNECT RESET signals. The X DISCONNECT signal is applied to reset the READ CONDITION CONTROL trigger **620*b* and the READ CONDITION trigger 622*b* of the READ/WRITE CONDITION GENERATOR 602 (see FIG. 5C1) to their respective OFF states; set and reset the various triggers of the PRECESS RING COUNTER 636 to the 5 ON condition; reset the INITIAL COINCIDENCE TRIGGER 730 of the READ/WRITE SAMPLE GENERATOR 656 (see Fig. 5C3) to its OFF state; and reset the R/W AT SECTION END trigger 860 and the R/W CHANNEL END TRIGGER 862 of the ADDRESS REGISTER COUNTER CONTROL UNIT 850 to their respective OFF states; in preparation for the next operation. The DISCONNECT RESET signal is effective to reset the END OF OPERATION trigger 784 of the END OPERATION CONTROL UNIT 776** (see FIG. 5C5) to its OFF state; in preparation for another operation.

Approximately 30 microseconds after the DISCONNECT signal is routed to the CALCULATOR 1100, the positive signal on the R CALL line is terminated to thereby end the READ operation.

Thus, it is seen that by a process of two instructions, namely a SELECT instruction followed by a READ instruction, that a RECORD of CHARACTERS may be read from the DRUM 100, starting at a selected SECTION of a selected CHANNEL and transferred to the CALCULATOR 1100.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a data processing machine, a storage unit for storing records consisting of variable numbers of characters comprising a rotatable member having a magnetizable storage channel divided into a predetermined number of sections each containing a fixed number of character positions, means operable in synchronism with the rotation of said member for producing synchronizing signals corresponding to the character positions in said storage channel, addressing means for addressing the sections of said storage channel, said addressing means being effective for selecting a section of said storage channel in which a record is to start being written or from which a record is to start being read, timing means responsive to said synchronizing signals for producing section addresses corresponding to the sections of said storage channel including means for producing character one signals corresponding to the first character positions in the sections of said storage channel, means responsive to said character one signals for comparing the address selected by said addressing means with the continuously changing addresses produced by said timing means and producing a character one selected section signal when coincidence occurs between the respective addresses and one of said character one signals, read/write means associated with said storage channel, said addressing means being effective to condition said read/write means, and control means being conditioned by said addressing means and initially rendered effective by said character one selected section signal to be operatively controlled thereafter by said synchronizing signals to selectively enable said read/write means to write a record in or to read a record from said rotatable means starting at the first character position in the selected section of said storage channel and continuing at succeeding character positions in the selected section and if necessary at succeeding character positions in succeeding sections of said storage channel thereby permitting variable length records to be written in or read from said member.

2. In a data processing machine, a storing unit for storing records consisting of variable numbers of characters comprising a rotatable member having a magnetizable storage channel divided into a predetermined number of sections each containing a fixed number of character positions, means operable in synchronism with the rotation of said member for producing synchronizing signals, magnetic transducing means associated with said storage channel, addressing means for addressing a predetermined section of said storage channel including section means for producing a section address signal in accordance with the selected section, timing means responsive to said synchronizing signals for producing section address signal corresponding to the sections of said storage channel including means for producing signals identifying the first character positions in the sections of said storage channel, means responsive to said identifying signals for comparing the selected section address signal produced by said addressing means with the section address signals produced by said timing means and producing a character one selected section signal when coincidence occurs between the respective section address signals and one of the signals identifying the first character positions in the sections of said storage channel, and means initially rendered effective by said character one selected section signal and operatively controlled thereafter by said synchronizing signals for selectively enabling said transducing means to perform transducing operations starting at the first character position in the selected section of said storage channel and continuing at succeeding character positions in the selected section and if necessary at succeeding character positions in succeeding sections of said storage channel thereby permitting variable length records to be transferred between said member and said data processing machine.

3. In a data processing machine, a storage unit for storing records consisting of variable numbers of characters comprising a rotatable member having a magnetizable storage channel divided into a predetermined number of sections each containing a fixed number of character positions, means operable in synchronism with the rotation of said member for producing synchronizing signals corresponding to the character positions of said storage channel, addressing means including means for addressing said rotatable member, means for addressing said storage channel and means for addressing each of said sections in said storage channel, for selecting one of said sections of said storage channel in which a record is to start being written or from which a record is to start being read, said section addressing means being effective to produce a section voltage pattern in accordance with the selected one of said sections, said channel addressing means being effective to produce a channel signal, said member addressing means being effective under control of said channel addressing means for producing a selected member signal in accordance with the selected rotatable member, timing means responsive to said synchronizing signals for producing section voltage patterns corresponding to the sections of said storage channel including means for producing character one signals corresponding to the first character positions in the sections of said storage channel, means for comparing the selected section voltage pattern produced by said section addressing means with the continuously changing section voltage pattern produced by said timing means and producing a coincidence signal corresponding to each character position of the selected section, means responsive to said coincidence signals and said character one signals and rendered effective when one of said coincidence signals coincides with one of said character one signals to provide a character one selected section signal, read/write means associated with said storage channel being conditioned by said channel signal, and read/write enabling means being conditioned by said selected member signal and initially rendered effective by said character one selected section signal to be operatively controlled thereafter by said synchronizing signals for selectively enabling said read/write means to write a record in or to read a record from said selected rotatable member starting at the first character position in the selected one of said sections of said storage channel and continuing at succeeding character positions in succeeding sections of said storage channel thereby permitting variable length records to be written in or read from said member.

4. In a data processing machine, a storage unit for storing records consisting of variable numbers of characters comprising a rotatable drum having a magnetizable periphery, a storage channel extending circumferentially about said drum being divided into a predetermined number of sections each containing a fixed number of character positions, a timing signal track adjacent said storage channel and extending circumferentially about said drum, means responsive to said timing signal track and operable in synchronism with the rotation of said drum for producing synchronizing signals, magnetic transducing means associated with said storage channel, addressing means for addressing a predetermined section in said storage channel including section means for producing a section address signal in accordance with the selected section, timing means responsive to said synchronizing signals for producing section address signals corresponding to the sections of said storage channel including means for producing signals identifying the first character positions in the sections of said storage channel and means for producing a signal identifying the last character position of said storage channel, means responsive to said identifying signals for comparing the selected section address signal produced by said addressing means with the section address signals produced by said timing means and producing a character one selected section signal when coincidence occurs between the respective section address signals and one of the signals identifying the first character positions in the sections of said storage channel, and means initially rendered effective by said character one selected section signal and operatively controlled thereafter by said synchronizing signals for selectively enabling said transducing means to perform transducing operations and continuing at succeeding character positions in succeeding sections of said storage channel thereby permitting variable length records to be written in or read from said member, and means responsive to the signal identifying the last character position of said storage channel for disabling said enabling means after a transducing operation has occurred therein.

5. In a data processing machine, a storage unit for storing records consisting of variable numbers of characters comprising a rotatable member having a magnetizable periphery, a plurality of storage channels extending circumferentially about said member, each of which is divided into a predetermined number of sections containing a fixed number of character positions, means operable in synchronism with the rotation of said drum for producing synchronizing signals, magnetic transducing means associated with each of said storage channels, addressing means for addressing a predetermined section in one of said storage channels at which a transducing operation is to commence including section means for producing a section address signal in accordance with the selected section and channel means for producing a channel address signal in accordance with the selected one of said storage channels, said channel address signal being effective to condition the transducing means associated with the selected one of said storage channels to perform transducing operations, timing means responsive to said synchronizing signals for producing section address signals representing corresponding sections in each of said channels including means for producing signals identifying the first character positions of corresponding sections in each of said storage channels and means for producing signals identifying the last character position in each of said storage channels, means responsive to said signals identifying the first character positions for comparing the selected section address signal produced by said addressing means with the section address signals produced by said timing means and producing a character one selected section signal when coincidence occurs between the respective section address signals and one of said signals identifying the first character positions in the sections of the selected one of said storage channels, means initially rendered effective by said character one selected section signal and operatively controlled thereafter by said synchronizing signals for selectively enabling the transducing means associated with the selected one of said storage channels to perform transducing operations starting at the first character position in the selected section of the selected one of said storage channels and continuing at succeeding character positions in the selected section and if necessary at succeeding character positions in succeeding sections of the selected one of said storage channels, said enabling means including means responsive to the signal identifying the last character position in the selected one of said storage channels for advancing the address in said channel means to a value corresponding to the next succeeding channel thereby causing said channel means to produce another channel address signal to condition the transducing means associated with the next succeeding storage channel to perform transducing operations in said next succeeding channel so that transducing operations may continue if necessary at succeeding character positions in succeeding sections of said next succeeding storage channel thereby permitting variable length records to be transferred between said member and said data processing machine.

6. In a data processing machine, a storage unit for storing records consisting of variable numbers of characters comprising a rotatable drum having a magnetizable periphery, a plurality of storage channels extending circumferentially about said drum, each of which is divided into a predetermined number of sections containing a fixed number of character positions, means operable in synchronism with the rotation of said drum for producing synchronizing signals, magnetic transducing means associated with each of said storage channels, addressing means for addressing a predetermined section in one of said storage channels at which a transducing operation is to commence including section means for producing a section address signal in accordance with the selected section and channel means for producing a channel address signal in accordance with the selected one of said storage channels, said channel address signal being effective to condition the transducing means associated with the selected one of said storage channels to perform transducing operations, timing means responsive to said synchronizing signals for producing section address signals representing corresponding sections in each of said channels including means for producing signals identifying the first character positions of corresponding sections in each of said storage channels and means for producing signals identifying the last character position in each of said storage channels, means responsive to said signals identifying the first character positions for comparing the selected section address signal produced by said addressing means with the section address signals produced by said timing means and producing a character one selected section signal when coincidence occurs between the respective section address signals and one of said signals identifying the first character position of the selected section in the selected one of said storage channels, means initially rendered effective by said character one selected section signal and operatively controlled thereafter by said synchronizing signals for selectively enabling the transducing means associated with the selected one of said storage channels to perform transducing operations starting at the first character position in the selected section of the selected one of said storage channels and continuing at succeeding character positions of the selected section and if necessary at succeeding character positions of succeeding sections in the selected one of said storage channels, said enabling means including means responsive to the signals identifying the last character position in each of said storage channels for advancing the address in said channel means to values corresponding to the succeeding channels thereby causing said channel means to produce successive channel address signals to successively condition the transducing means associated with the succeeding storage channels so that transducing operations may continue if necessary at succeeding character positions of succeeding sections in succeeding storage channels thereby permitting variable length records to be transferred between said drum and said data processing machine.

7. In a data processing machine, a storage unit for storing records consisting of variable numbers of characters comprising a rotatable drum having a magnetizable periphery, a plurality of parallel channels extending circumferentially about said drum, each of which is divided into a predetermined number of sections containing a fixed number of character positions, means operable in synchronism with the rotation of said drum for producing synchronizing signals, address means, including means for addressing said drum, means for addressing each of said channels of said drum and means for addressing each of said sections in each of said channels of said drum, for selecting one of said sections in one of said channels of said drum in which a record is to start being written or from which a record is to start being read, said section addressing means being effective to produce a section voltage pattern in accordance with the selected one of said sections, said channel addressing means being effective to produce a channel signal in accordance with the selected one of said channels, said drum addressing means being effective under control of said channel addressing means for producing a selected drum signal in accordance with said selected drum, timing means responsive to said synchronizing signals for producing section voltage patterns representing corresponding sections in each of said channels, said timing means including means for producing character one signals corresponding to the first character positions of corresponding sections in each of said channels and means for producing signals corresponding to the last character position in each of said channels, means for comparing the selected section voltage pattern produced by said section addressing means with the continuously changing section voltage pattern produced by said timing means and producing a coincidence signal corresponding to each character position of the selected section, means responsive to said coincidence signals and said character one signals and rendered effective when one of said coincidence signals coincides with the character one signal corresponding to the selected section to provide a character one selected section signal, read/write means associated with each of said channels of said selected drum, said channel signal being effective to condition the read/write means associated with the selected one of said channels, and read/write enabling means being conditioned by said selected drum signal and initially rendered effective by said character one selected section signal so as to be operatively controlled thereafter by said synchronizing signals for enabling said conditioned one of said read/write means to write a record in or to read a record from said selected drum starting at the first character position of the selected one of said sections in the selected one of said channels of said selected drum, said read/write enabling means selectively controlling said conditioned one of said read/write means so that succeeding characters of the record are written in or read from succeeding character positions of the selected one of said sections and if necessary in or from succeeding character positions of succeeding sections of the selected one of said channels, said read/write enabling means including means responsive to the signal corresponding to the last character position in the selected one of said channels for advancing the address in said channel addressing means to a value corresponding to the next succeeding channel thereby causing said channel addressing means to produce another channel signal to condition the transducing means associated with the next succeeding channel so that if necessary a record may be written in or read from succeeding channels of said selected drum thereby permitting variable length records to be written in or read from said selected drum.

8. In a data processing machine, a storage unit for storing records consisting of variable numbers of characters comprising a rotatable drum having a magnetizable periphery, a plurality of parallel channels extending circumferentially about said drum, each of which is divided into a predetermined number of sections containing a fixed number of character positions, a timing signal track adjacent said channels and extending circumferentially about said drum, means responsive to said timing signal track for producing synchronizing signals corresponding to the character positions in each of said channels, address means, including means for addressing said drum, means for addressing each of said channels of said drum and means for addressing each of said sections in each of said channels of said drum, for selecting one of said sections in one of said channels of said drum in which a record is to start being written or from which a record is to start being read, said section addressing means being effective to produce a section voltage pattern in accordance with the selected one of said sections, said channel addressing means being effective to produce a channel signal in accordance with the selected one of said channels, said drum addressing means being effective under control of said channel address means for producing a selected drum signal in accordance with said selected drum, timing means responsive to said synchronizing signals for producing section voltage patterns corresponding to the sections of the selected one of said channels, said timing means including means for producing character one signals corresponding to the first character position of corresponding sections in each of said channels and means for producing signals corresponding to the last character position in each of said channels, means responsive to said character one signals for comparing the selected section voltage pattern produced by said section addressing means with the continuously changing section voltage pattern produced by said timing means and producing a character one selected section signal when coincidence occurs between the respective voltage patterns and one of said character one signals, read/write means associated with each of said channels of said selected drum, said channel signal being effective to condition the read/write means associated with the selected one of said channels, read/write enabling means being conditioned by said selected drum signal and initially rendered effective by said character one selected section signal to be operatively controlled thereafter by said synchronizing signals to selectively enable said conditioned one of said read/write means to write a record in or to read a record from said selected drum starting at the first character position of the selected one of said sections in the selected one of said channels, said read/write control means selectively controlling said conditioned one of said read/write means so that succeeding characters of the record are written in or read from succeeding character positions of the selected one of said sections and if necessary in or from succeeding character positions of succeeding sections of the selected one of said channels, said read/write enabling means including means responsive to the signals corresponding to the last character positions in each of said channels for advancing the address in said channel addressing means to values corresponding to the succeeding channels thereby causing said channel addressing means to produce successive channel signals to successively condition the transducing means associated with the succeeding channels so that if necessary a record may be written in or read from succeeding channels of said selected drum thereby permitting variable length records to be written in or read from said selected drum and means responsive to the signal identifying the last character position in the last of said channels for disabling said read/write enabling means if an attempt is made to read or write off the end of said drum.

9. In a data processing machine, a rotatable drum having a magnetizable periphery, a plurality of parallel storage channels extending circumferentially about the periphery of said drum, each of which is divided into a predetermined number of sections containing a fixed number of storage positions, the sections of each of said storage channels being arranged so that even sections are positioned on one side of said drum and odd sections are positioned on the other side of said drum, a timing signal track extending circumferentially about the periphery of said member, magnetic transducing means associated with said timing signal track for producing synchronizing signals corresponding to the storage positions in each of said storage channels, magnetic transducing means associated with said storage channels, means for selectively enabling said last mentioned transducing means to perform transducing operations under control of said synchronizing signals, said enabling means including means for precessing said transducing operations one storage position when stepping from the last storage position in succeeding odd sections to the first storage position in the next succeeding even sections but inhibiting said precessing when stepping from the last storage position in one of said storage channels to the first storage position in the next succeeding channel.

10. In a data processing machine, a rotatable member having a plurality of magnetizable storage channels, each of which is divided into a predetermined number of sections containing a fixed number of storage positions, the sections of each of said storage channels being arranged so that even sections are positioned on one side of said member and odd sections are positioned on the other side of said member, means operable in synchronism with the rotation of said member for producing timing signals, magnetic transducing means associated with said storage channels, means responsive to said timing signals for selectively enabling said transducing means to perform transducing operations in synchronism with the rotation of said member, said enabling means including means for precessing said transducing operations one storage position when stepping from the last storage position in succeeding odd sections to the first storage position in the next succeeding even sections but inhibiting said precessing when stepping from the last storage position in one of said storage channels to the first storage position in the next succeeding channel.

11. In a data processing machine operable to produce a read call signal, a storage unit for storing records consisting of variable numbers of data characters followed by a character identifying the end of a record, comprising a rotatable drum having a magnetizable periphery, means operable in synchronism with the rotation of said drum for producing synchronizing signals, magnetic transducing means associated with said drum including means responsive to the absence of said character identifying the end of a record for producing a first control signal and means responsive to the presence of said character identifying the end of a record for producing a second control signal, means conditioned by said read call signal and operable under control of said synchronizing signals for selectively enabling said transducing means to read a record from said drum and transfer it to said data processing machine, means conditioned by said first control signal and operating under control of said enabling means for signalling said data processing machine to sample each data character of a record being read from said drum, and means responsive to said second control signal for disabling said enabling means at the end of a record and signalling said data processing machine to terminate said read call signal.

12. In a data processing machine, a rotatable member having a magnetizable storage track divided into a predetermined number of storage positions including a fixed last storage position, means operable in synchronism with the rotation of said member for producing synchronizing signals, synchronizing signal counting means responsive to said synchronizing signals for producing a signal identifying the fixed last storage position in said storage track when said predetermined number of synchronizing signals are counted, magnetic transducing means associated with said storage track, settable means operative under control of said synchronizing signals for selectively enabling said transducing means to perform transducing operations, and means responsive to said signal identifying the last storage position in said storage track for resetting said enabling means to an ineffective condition.

13. In a data processing machine, a rotatable drum having a magnetizable storage track divided into a predetermined number of storage positions including a fixed last storage position, means operable in synchronism with the rotation of said drum for producing synchronizing signals, synchronizing signal counting means responsive to said synchronizing signals for producing a signal identifying the fixed last storage position in said storage track when said predetermined number of synchronizing signals are counted, magnetic transducing means associated with said storage track, means settable by said data processing machine and operative under control of said synchronizing signals for selectively enabling said transducing means to perform transducing operations, and means responsive to said signal identifying the last storage position in said storage track for resetting said enabling means and signalling said data processing machine.

14. In a data processing machine, a rotatable member having a predetermined number of magnetizable storage channels, each of which is divided into a predetermined number of storage sections, means operable in synchronism with the rotation of said member for producing synchronizing signals, magnetic transducing means associated with each of said storage channels of said member, addressing means set by said data processing machine for selecting a predetermined storage section in one of said storage channels of said member at which transducing operations may commence, said addressing means including member selecting means for producing a selected member signal and channel selecting means for conditioning a selected one of said last mentioned transducing means to perform transducing operations in the selected channel, means responsive to said selected member signal and operable under control of said synchronizing signals for enabling said selected one of said last mentioned transducing means to selectively perform transducing operations, and means coupling said channel selecting means to said member selecting means in such a manner as to block production of said selected member signal if the channel selecting means is set to a value which is greater than said predetermined number of channels thereby disabling said enabling means.

15. In a data processing machine, a rotatable drum having a magnetizable periphery, a predetermined number of parallel storage channels extending circumferentially about the periphery of said drum, each of which is divided into a predetermined number of storage positions, a timing signal track extending circumferentially about the periphery of said member, magnetic transducing means associated with said timing signal track and operable in synchronism with the rotation of said drum for producing timing signals, magnetic transducing means associated with each of said storage channels of said drum, addressing means set by said data processing machine for selecting a predetermined storage position in one of said storage channels of said drum at which transducing operations may commence, said addressing means including drum selecting means for producing a selected drum signal and channel selecting means for conditioning a selected one of said last mentioned transducing means to perform transducing operations in the selected channel, means responsive to said selected drum signal and operable under control of said synchronizing signals for enabling said selected one of said last mentioned transducing means to commence transducing operations, and means coupling said channel selecting means to said drum selecting means in such a manner as to block production of said selected drum signal if the channel selecting means is set to a value which is greater than said predetermined number of channels thereby disabling said enabling means.

16. In a data processing machine, a rotatable member having a magnetizable storage channel containing a fixed number of storage positions, said storage positions being divided into several groups and each group into a plurality of interspersed sections, means operable in synchronism with said rotatable member for producing a timing signal for each storage position, and an address generating means responsive to said timing signals to indicate the section with which each storage position is identified, said generating means having an output line for each section, a distributor having a plurality of outputs, the number of outputs being equal to the number of sections in a group and repeatedly energized seriatim by said timing signals, and a switching means responsive to said timing signals to successively connect the output lines for the sections of a group to said distributor outputs.

17. In a data processing machine, a rotatable drum having a magnetizable storage channel extending circumferentially about said drum and containing a fixed number of storage positions, said storage positions being divided into several groups and each group containing a plurality of interspersed sections, a magnetic transducing head cooperative seriatim with the storage positions of said channel, means operable in synchronism with said drum to produce a timing pulse for each storage position in said channel, an output line for each section and means to energize the output line for the section of which the storage position cooperative with said magnetic transducing head is a part, said energizing means comprising a distributor having a number of outputs equal to the number of sections in a group and responsive to said timing pulses to repeatedly energize said outputs in sequence and switching means also responsive to said timing signals to selectively connect the output lines for the sections of a group to the outputs of said distributor.

18. In a data processing machine, a rotatable drum having a magnetizable periphery, a storage channel containing a number of storage positions extending circumferentially about said drum, said storage positions being equally divided into several groups and each group being divided into a plurality of similar sections with the like numbered storage positions of said plurality of sections being together in an interspersed arrangement, a timing signal track on said drum, a pair of transducing means, one to read timing signals from said signal track and the other to read signals from or record signals on said storage channel and means to indicate the section to which the storage position passing the transducing means for the storage channel is assigned, said indicating means including an output line for each section of said channel, a ring counter having a stage and an output for each section in a group and responsive to said timing signals to repeatedly energize said outputs seriatim, additional counter stages responsive to said timing signals to indicate the group of the sections passing the storage channel transducing means and switching means controlled by the outputs of said additional counter stages to sequentially connect the output lines for the sections of each group to the outputs of said ring counter whereby each section output line will receive an output when one of its storage positions is passing the second transducing means.

19. In a data processing machine, a rotatable drum having a magnetizable storage channel having a plurality of storage positions divided into a plurality of groups, each group being subdivided into a number of like sections with the corresponding storage positions of the sections of a group being adjacent each other to intersperse the sections of a group, a first magnetic transducer cooperative with said storage positions seriatim, a timing track on said drum and a second transducing means cooperative therewith to generate a timing signal as each storage position is aligned with said first transducer, and position identifying means responsive to said timing signals to energize a first signal line so long as the first storage position of any section is cooperative with said first magnetic transducer and to energize a second signal line so long as the last storage position of any section is cooperative with said first magnetic transducer.

20. In a data processing machine, a rotatable drum having a magnetizable storage channel with a plurality of storage positions divided into several groups, each group being subdivided into a number of like sections with the corresponding storage positions of the sections of a group being adjacent each other to intersperse the sections of a group, a first magnetic transducer cooperative with said storage positions seriatim, a timing track on said drum and a second transducing means cooperative therewith to generate a timing signal as each storage position is aligned with said first transducer, a plurality of counter stages in sequence and responsive to said timing signals to count said signals, a first position indicating means controlled by selected counter stages to energize a first character line so long as the first character storage position of any section is cooperative with said first magnetic transducer, and a second position indicating means controlled by other counter stages to energize a last character line so long as the last character storage position of any section is cooperative with said first magnetic transducer.

21. The structure as set out in claim 20 and including a line energized to indicate that a storage position of the last section of the final group of sections is in processing position with respect to said first magnetic transducer and a final character indicator jointly controlled by energization of said last character line and by energization of said last section line to indicate that the last storage position of said storage channel is in processing position.

22. In a data processing machine, a storage unit for storing signals representative of records of variable numbers of characters, said storage unit comprising a rotatable member having a plurality of magnetizable storage channels, each channel being divided into a predetermined number of like sections and each section containing a fixed number of character storage positions, a magnetic transducing means for each storage channel, timing means operable in synchronism with the rotation of said member to produce a synchronizing signal for each character position in a channel, means responsive to said synchronizing signals to produce a first position signal when said transducing means are cooperative with the first character storage position of any section and to produce a last position signal when said transducing means are cooperative with the last character storage position of any section, a first settable means to enable selection of one of said channels, a second settable means to enable selection of a section of said channels, enabling means settable jointly by said first position signal, said first settable means and said second settable means and thereafter controlled by said synchronizing signals to enable said transducing means for the selected channel to perform transducing operations starting at the first character storage position in the selected section of the selected channel, means controlled by said last position signal to advance the setting of said second settable means to indicate that transducing operations are being performed in a succeeding section of said selected channel and a channel switching means controlled by said last position signal and by said second settable means to change the setting of said first settable means to select for operation the transducing means of another channel.

References Cited in the file of this patent

UNITED STATES PATENTS

| | | |
|---|---|---|
| 2,484,226 | Holden | Oct. 11, 1949 |
| 2,540,654 | Cohen | Feb. 6, 1951 |
| 2,587,532 | Schmidt | Feb. 26, 1952 |
| 2,609,498 | Bachelet | Sept. 2, 1952 |
| 2,611,813 | Sharpless | Sept. 23, 1952 |
| 2,614,169 | Cohen | Oct. 14, 1952 |
| 2,679,638 | Bensky | May 25, 1954 |
| 2,714,843 | Hooven | Aug. 9, 1955 |
| 2,718,356 | Burrell | Sept. 20, 1955 |
| 2,739,301 | Greenfield | Mar. 20, 1956 |
| 2,745,006 | Chu | May 8, 1956 |
| 2,813,259 | Burkhart | Nov. 12, 1957 |
| 2,817,072 | Li Chien | Dec. 17, 1957 |
| 2,819,457 | Hamilton et al. | Jan. 7, 1958 |
| 2,913,706 | Thorensen et al. | Nov. 17, 1959 |

FOREIGN PATENTS

| | | |
|---|---|---|
| 732,221 | Great Britain | June 22, 1955 |